United States Patent [19]
Menendez et al.

[11] Patent Number: 5,113,494
[45] Date of Patent: May 12, 1992

[54] HIGH SPEED RASTER IMAGE PROCESSOR PARTICULARLY SUITED FOR USE IN AN IMAGE MANAGEMENT SYSTEM

[75] Inventors: Juan G. Menendez, Dublin, Ireland; William P. Caterisano; John Ball, both of Rochester, N.Y.

[73] Assignee: Eastman Kodak Company, Rochester, N.Y.

[21] Appl. No.: 614,047

[22] Filed: Nov. 9, 1990

Related U.S. Application Data

[63] Continuation of Ser. No. 20,047, Feb. 27, 1987, abandoned.

[51] Int. Cl.⁵ .............................................. G06F 3/14
[52] U.S. Cl. .................... 395/163; 395/162; 340/747; 364/231.8; 364/948.34
[58] Field of Search ............... 364/518, 521, 231.8, 364/948.34; 382/47, 56; 340/731, 747

[56] References Cited

U.S. PATENT DOCUMENTS

| | | | |
|---|---|---|---|
| 4,408,301 | 10/1983 | Iida | 364/900 |
| 4,528,693 | 7/1985 | Pearson et al. | 382/47 |
| 4,532,602 | 7/1985 | DuVall | 364/577 |
| 4,549,275 | 10/1985 | Sukonick | 364/521 |
| 4,587,621 | 5/1986 | DuVall | 364/577 |
| 4,587,633 | 5/1986 | Wang et al. | 364/900 |
| 4,595,958 | 6/1986 | Anderson, Jr. et al. | 358/296 |
| 4,653,112 | 3/1987 | Ouimette | 382/69 |
| 4,665,501 | 5/1987 | Saldin et al. | 364/900 |
| 4,672,680 | 6/1987 | Middleton | 382/44 |
| 4,684,997 | 8/1987 | Romeo et al. | 358/263 |
| 4,694,396 | 9/1987 | Weisshaar et al. | 364/300 |
| 4,718,024 | 1/1988 | Guttag et al. | 364/518 |
| 4,722,064 | 1/1988 | Suzuki | 364/518 |
| 4,727,589 | 2/1988 | Hirose et al. | 382/56 |
| 4,748,511 | 5/1988 | Nichols et al. | 358/256 |
| 4,785,394 | 11/1988 | Fischer | 364/200 |

FOREIGN PATENT DOCUMENTS 0179936 10/1984 European Pat. Off.
WO8301696 5/1983 PCT Int'l Appl.
2152249 10/1984 United Kingdom.

OTHER PUBLICATIONS

Ghiotti M. M., "A Single System Interface Using the IBM 3270-PC" IBM Systems Journal, vol. 24, Nos. 3/4 1985 pp. 236-247.

Tatsumi et al., "IEEE 1985 Proceedings of the International Conference on Cybernetics and Society" Arizona, Nov. 1985, pp. 834-837.

Nicolae et al., "Multiprocessor System for the Real Time Digital Processing of Video-Image Series" 258 Elektronische Rechen Aug. 1979 pp. 171-182.

Bergmann et al., "An Experimental Text Image Workstation" Siemens Forsch 1983 pp. 55-60.

IBM Dictionary of Computing (©1987: IBM Corporation, Poughkeepsie, N.Y.), p. 324.

Primary Examiner—Gary V. Harkcom
Assistant Examiner—Phu K. Nguyen
Attorney, Agent, or Firm—Dennis R. Arndt

[57] ABSTRACT

Apparatus for a pipe-lined raster image processor (RIP), that is capable of driving a printing engine at a high rate illustratively for use in an image management system. Specifically, this RIP contains a bus and a number of separate image processing components such as a scaler, a decompressor and various interface circuits. Each of these components is connected to the bus and is capable of undertaking a respective image processing task substantially in parallel with those undertaken by other of these image processing components. In addition, a arbiter is also connected to the bus. The arbiter, typically a microcomputer system, receives a request, from any one of the image processing components (the source component), for service, from another one of the image processing components (the destination component). Then, depending upon the availability of the bus and the destination component, the arbiter defines a data path over the bus between the source and destination components, and thereafter initiates an information (typically data) transfer over the bus and between these components. Once this transfer is complete, the destination component is then able to undertake its respective image processing task substantially independent of the tasks undertaken by both the arbiter and the source component. At this point, both the arbiter and the source component are free to perform other image processing tasks while the destination component is performing its respective task. This pipe-lined operation substantially and advantageously increases the throughput of the RIP.

40 Claims, 73 Drawing Sheets

FIG. 9
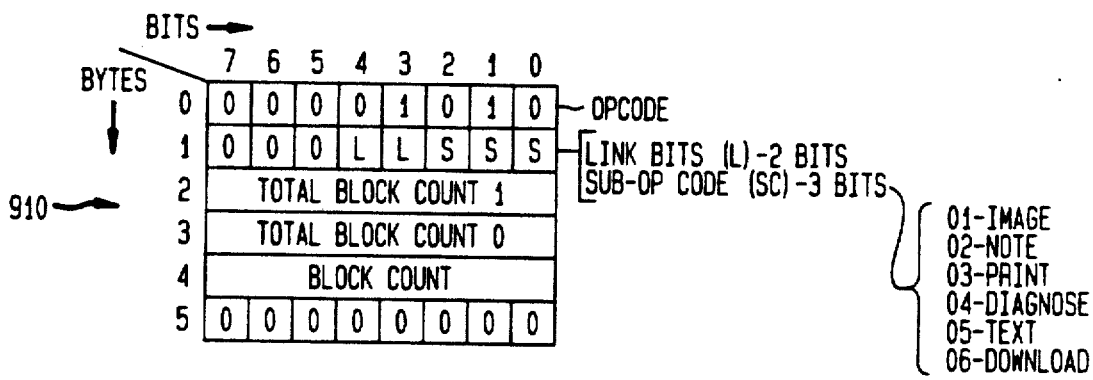
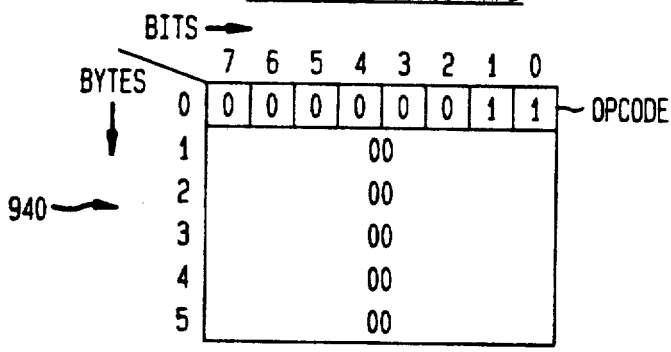
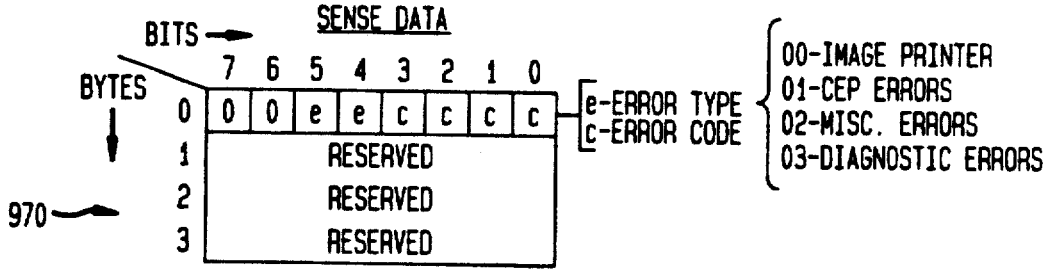

| FIG. 10A |
|----------|
| FIG. 10B |

FIG. 10B
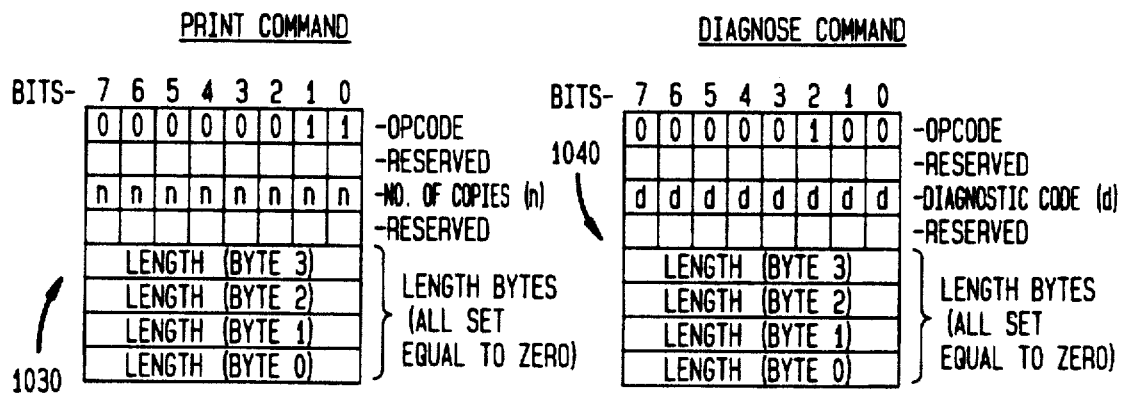
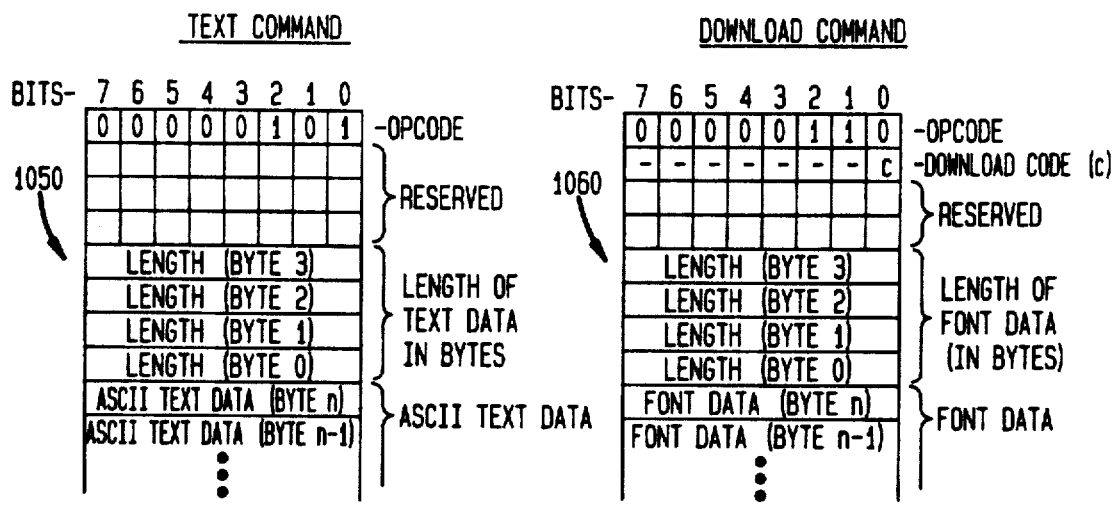

MAIN PROGRAM 1100

| FIG. 11A |
| FIG. 11B |
| FIG. 11C |

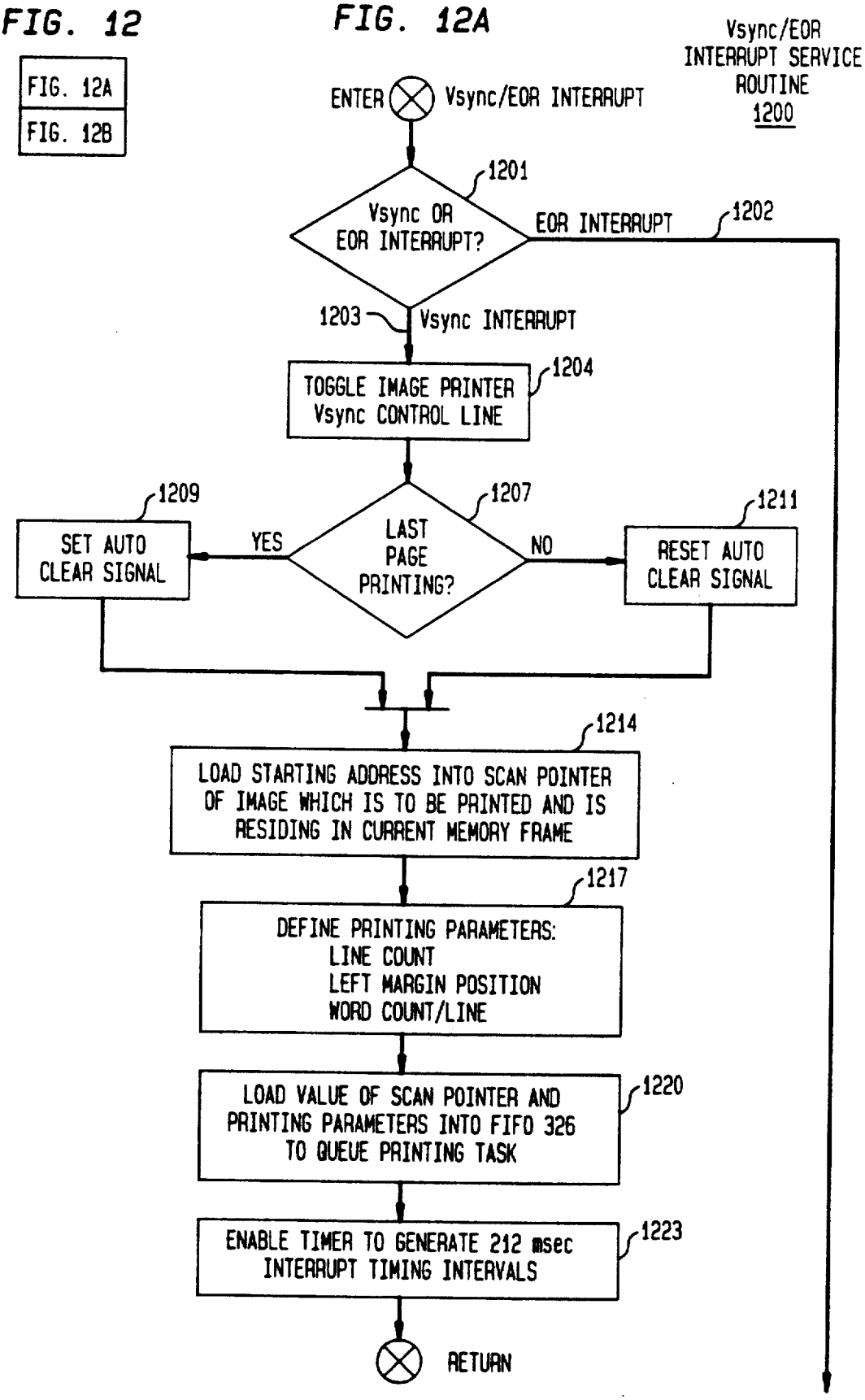

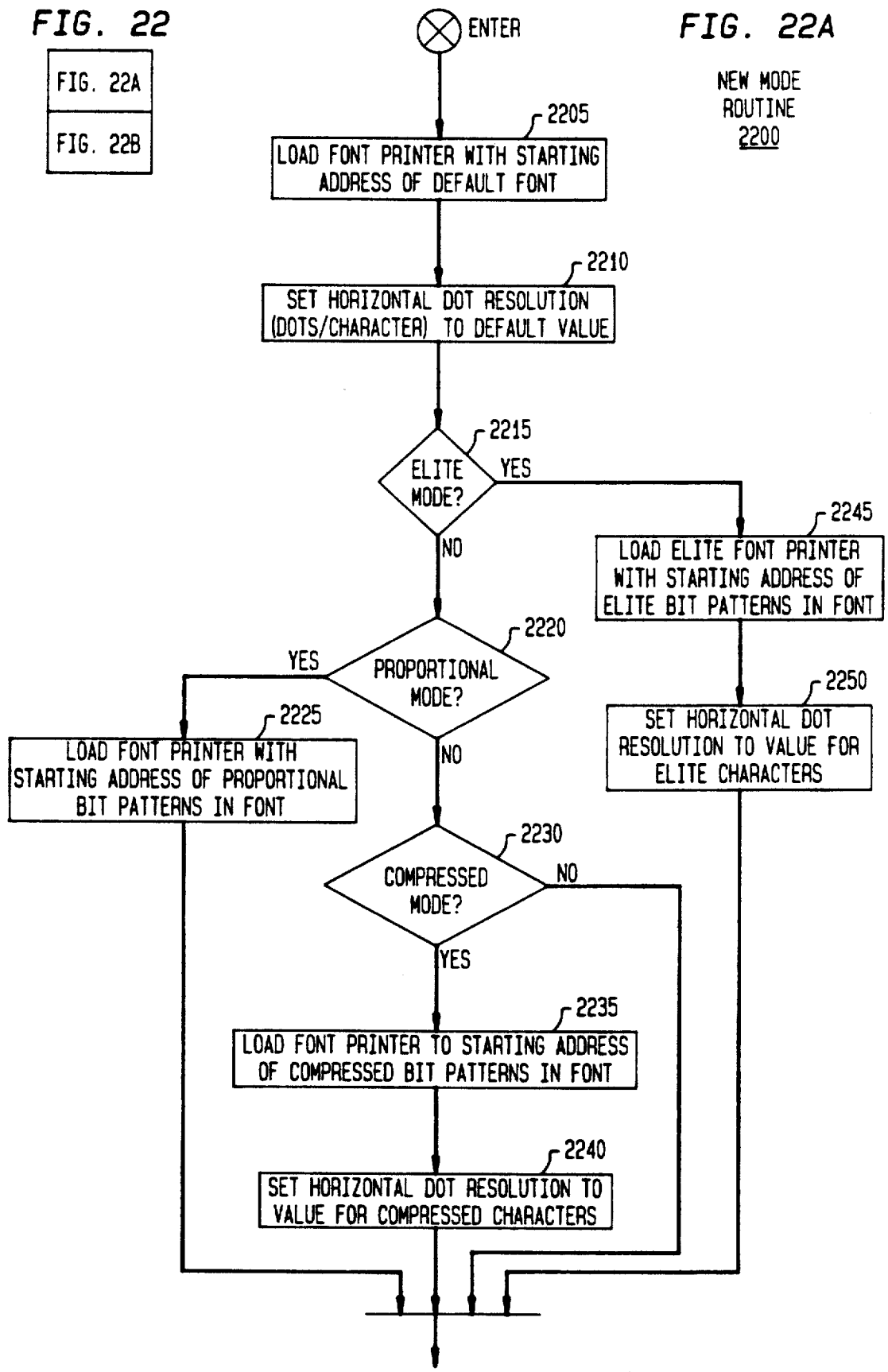

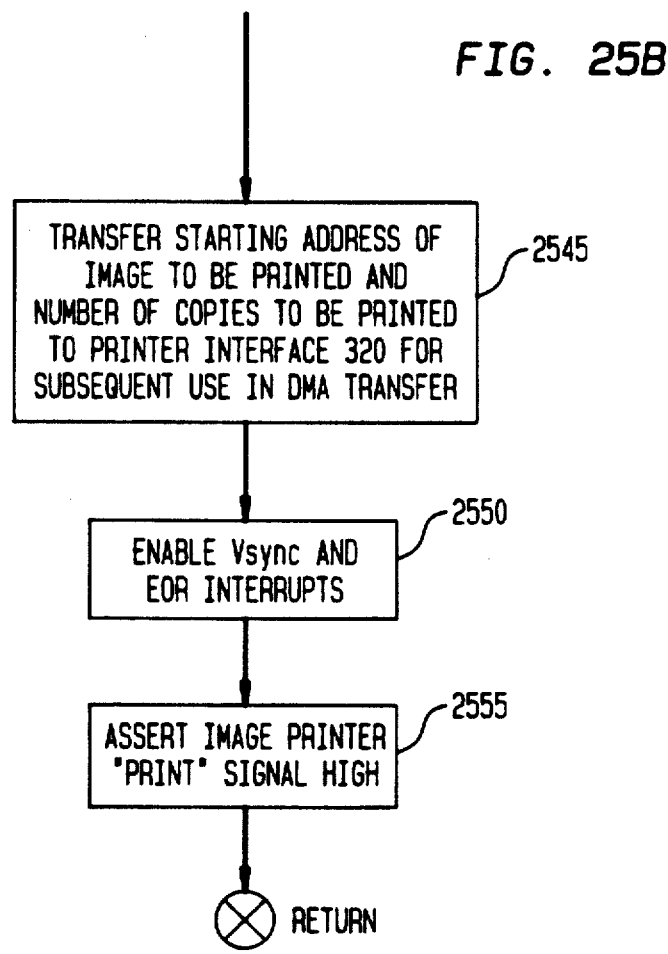

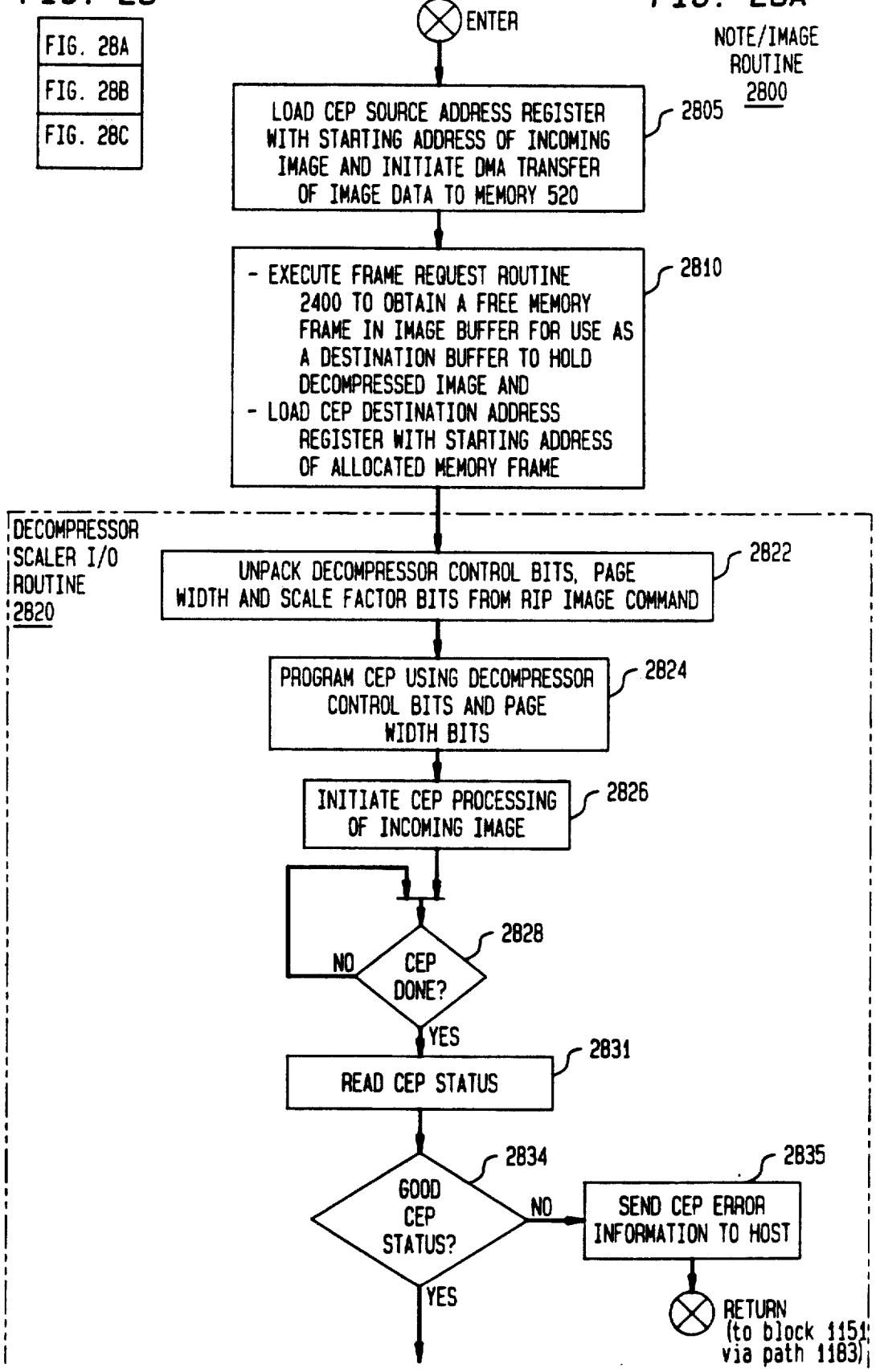

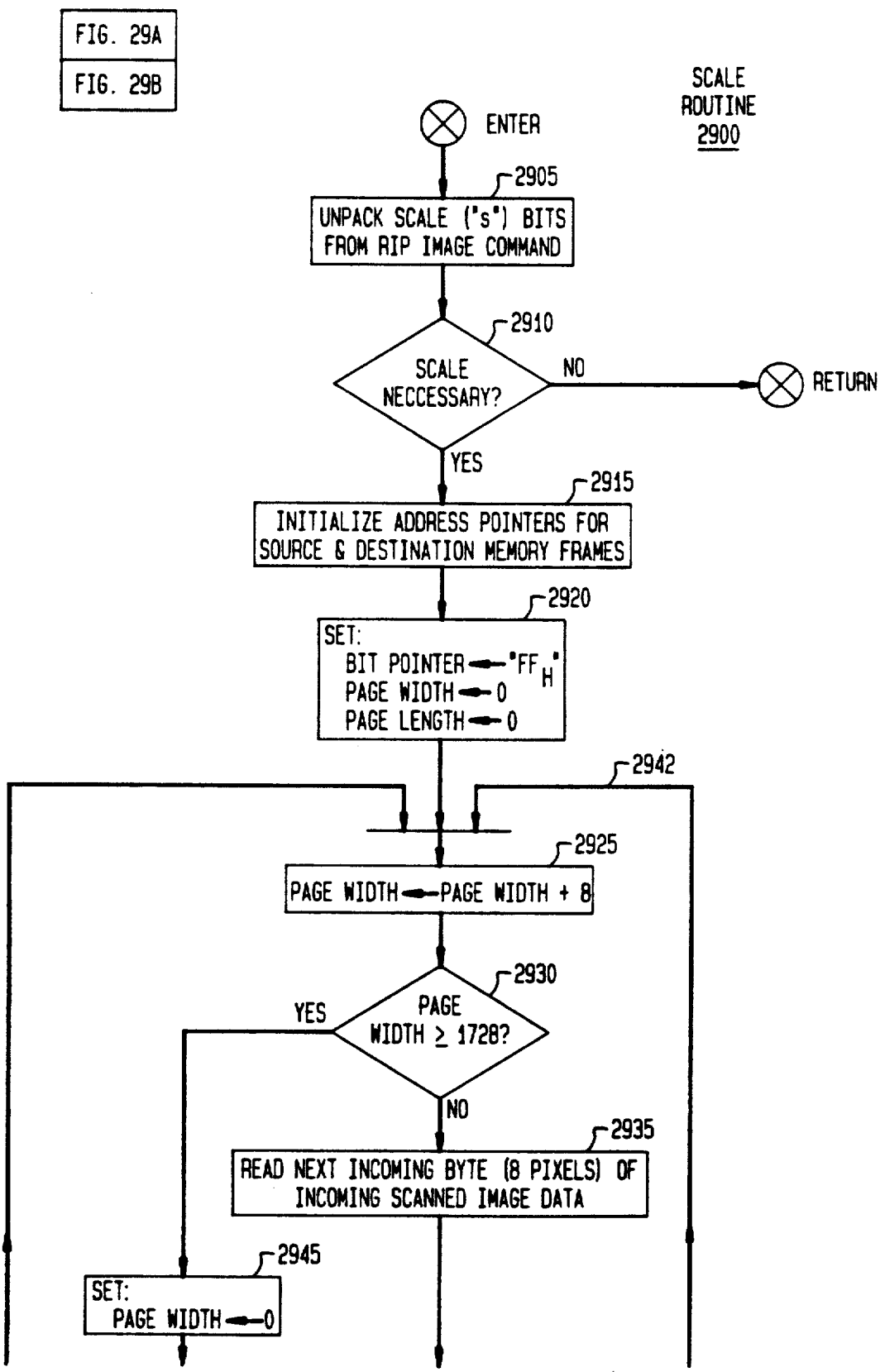

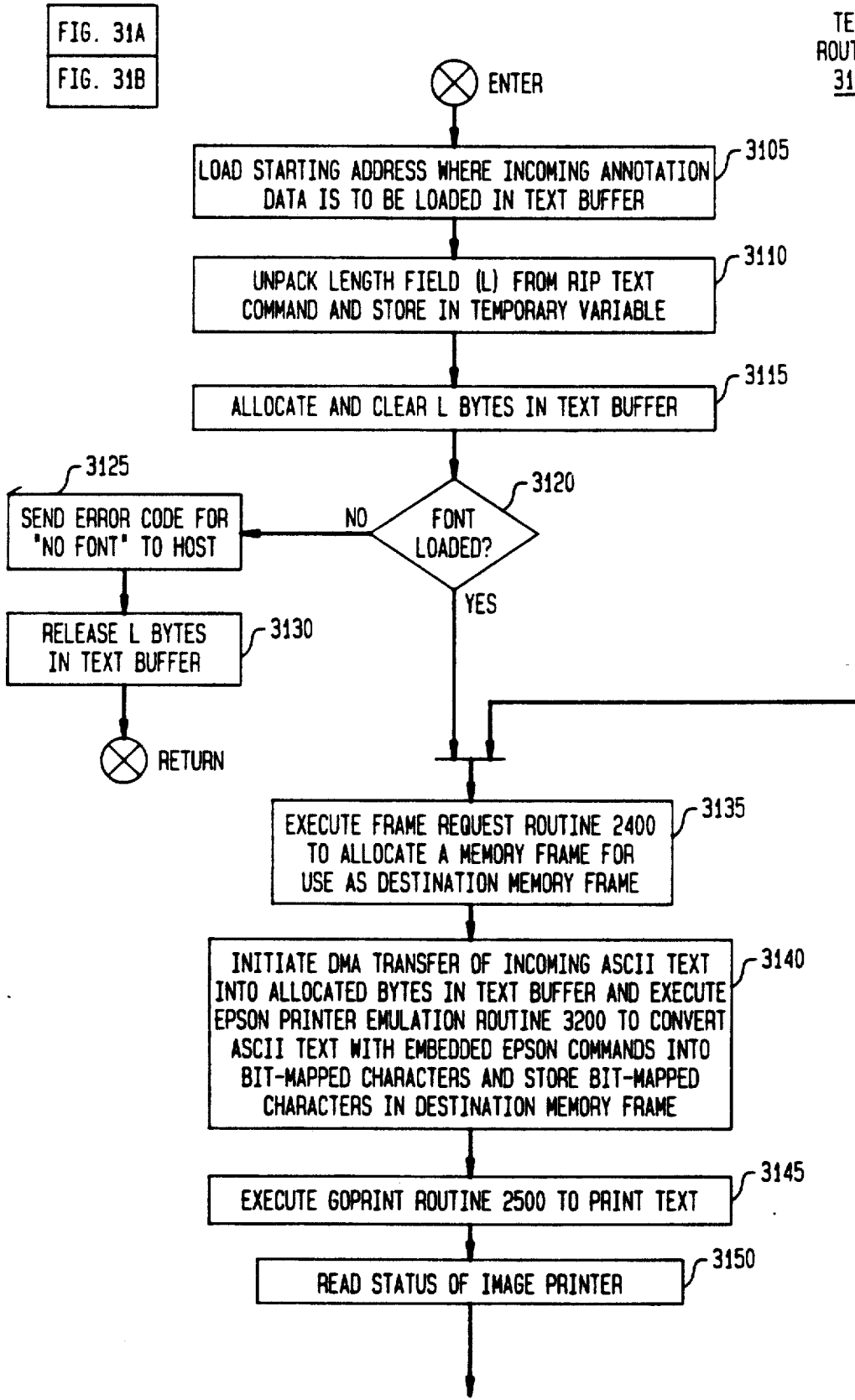

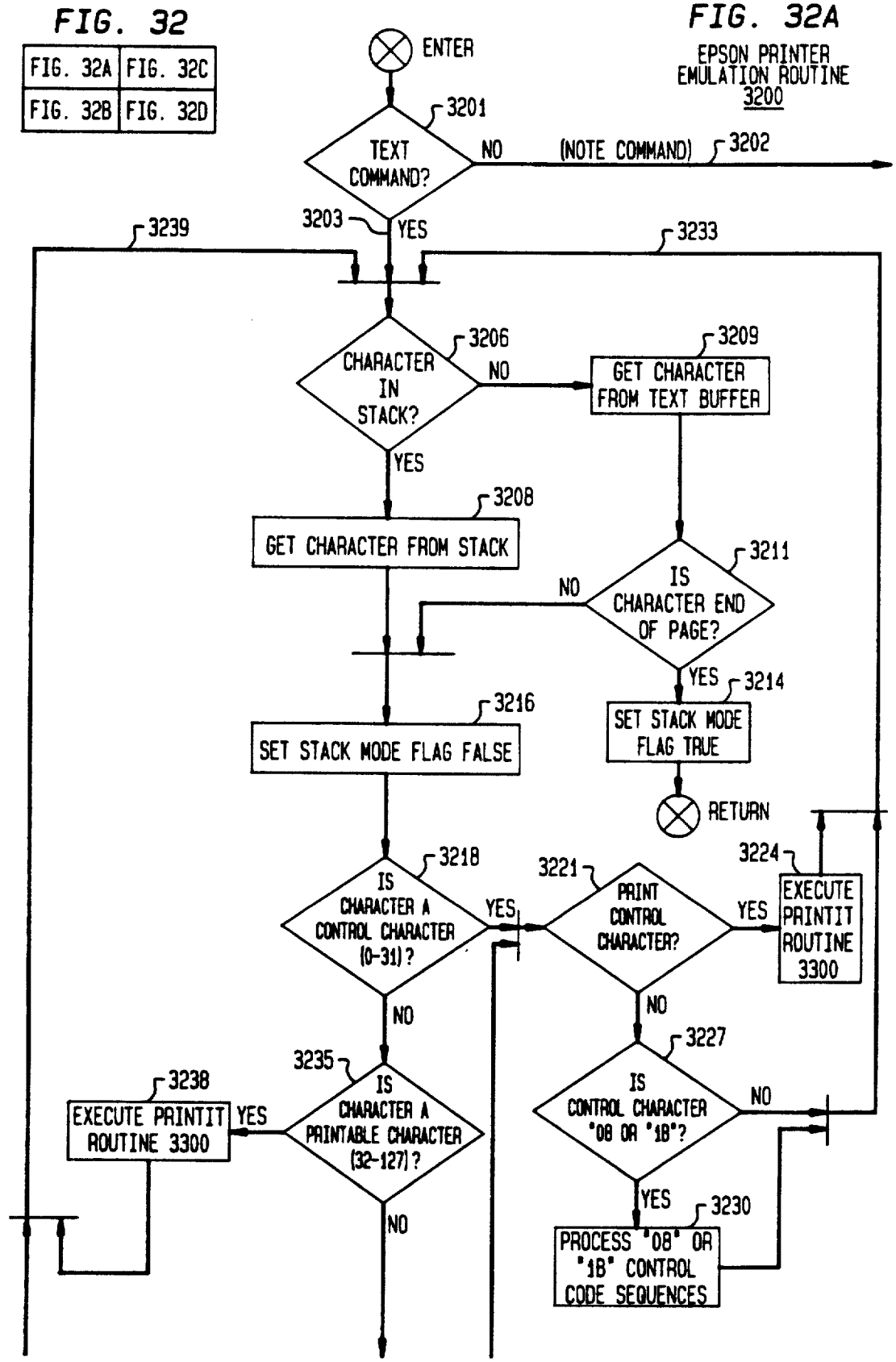

| FIG. 33A |
| FIG. 33B |
| FIG. 33C |

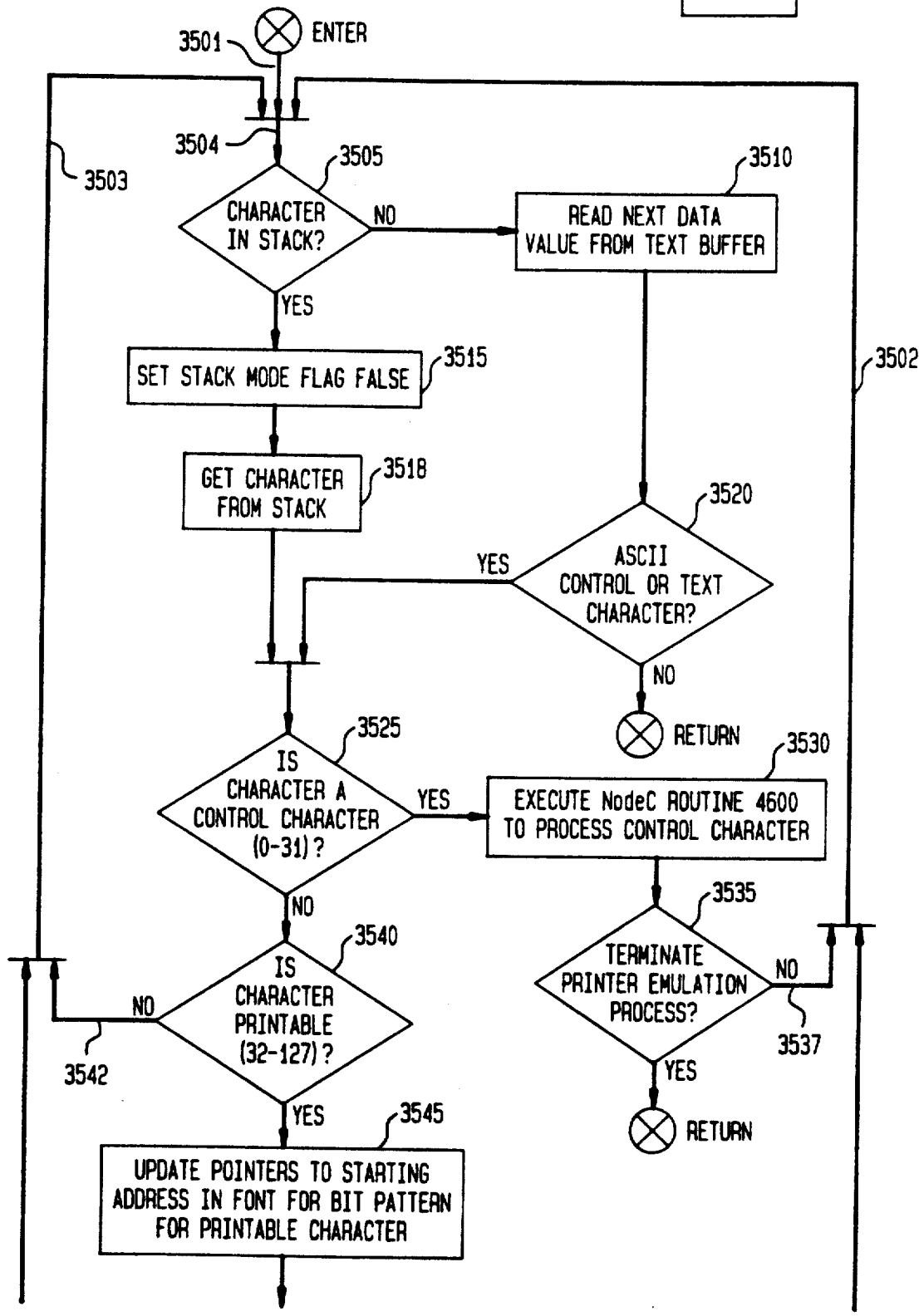

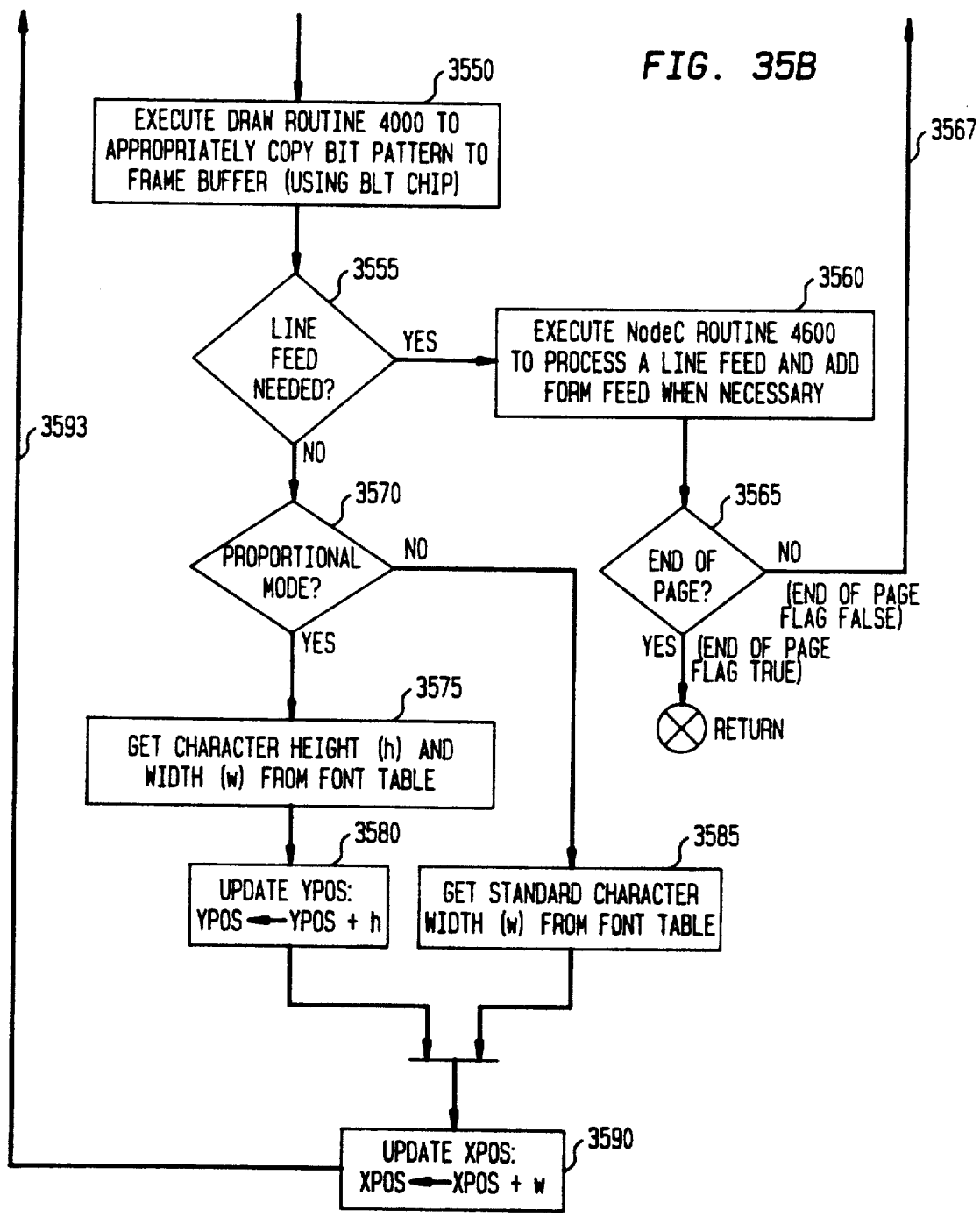

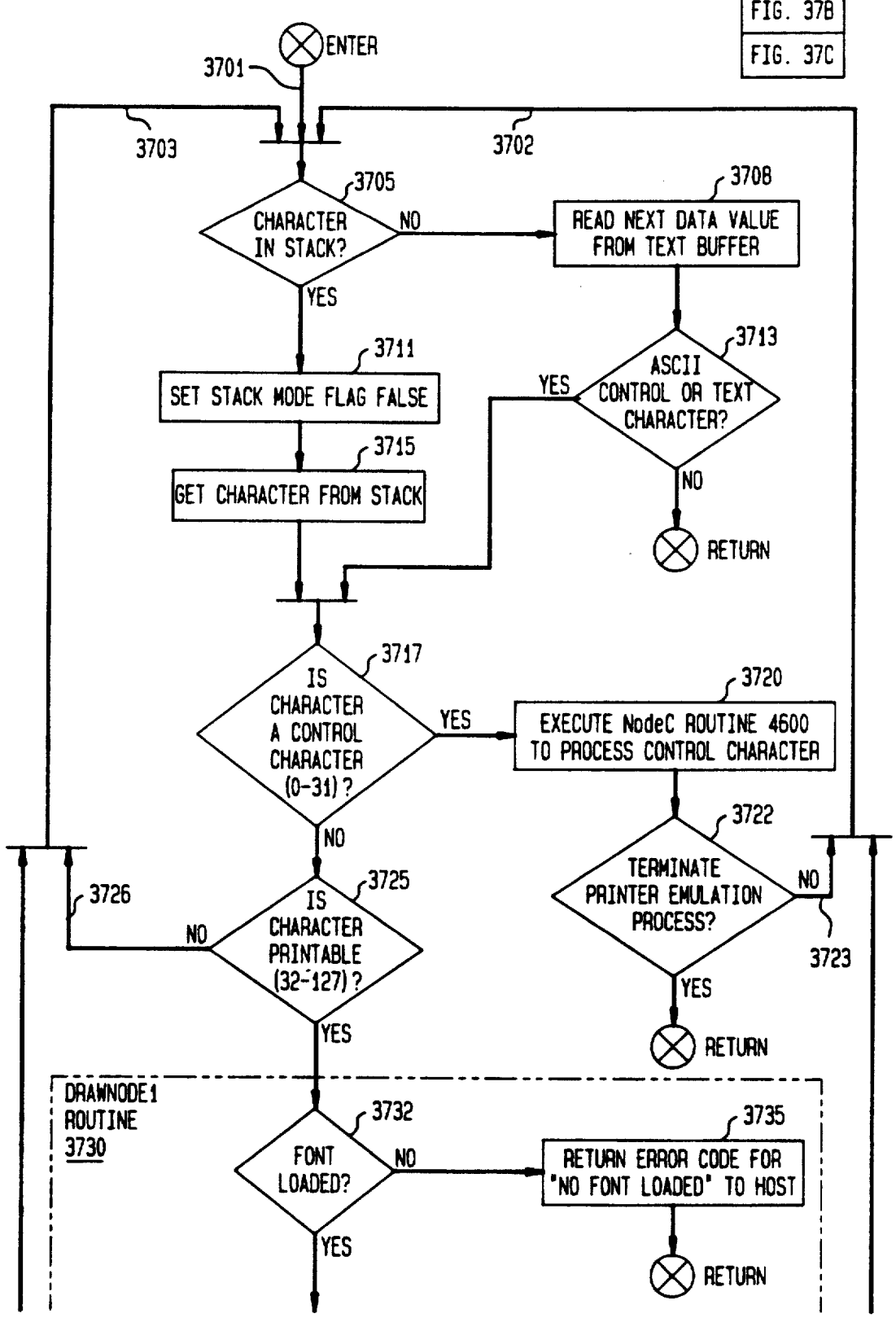

| FIG. 40A |
| FIG. 40B |
| FIG. 40C |

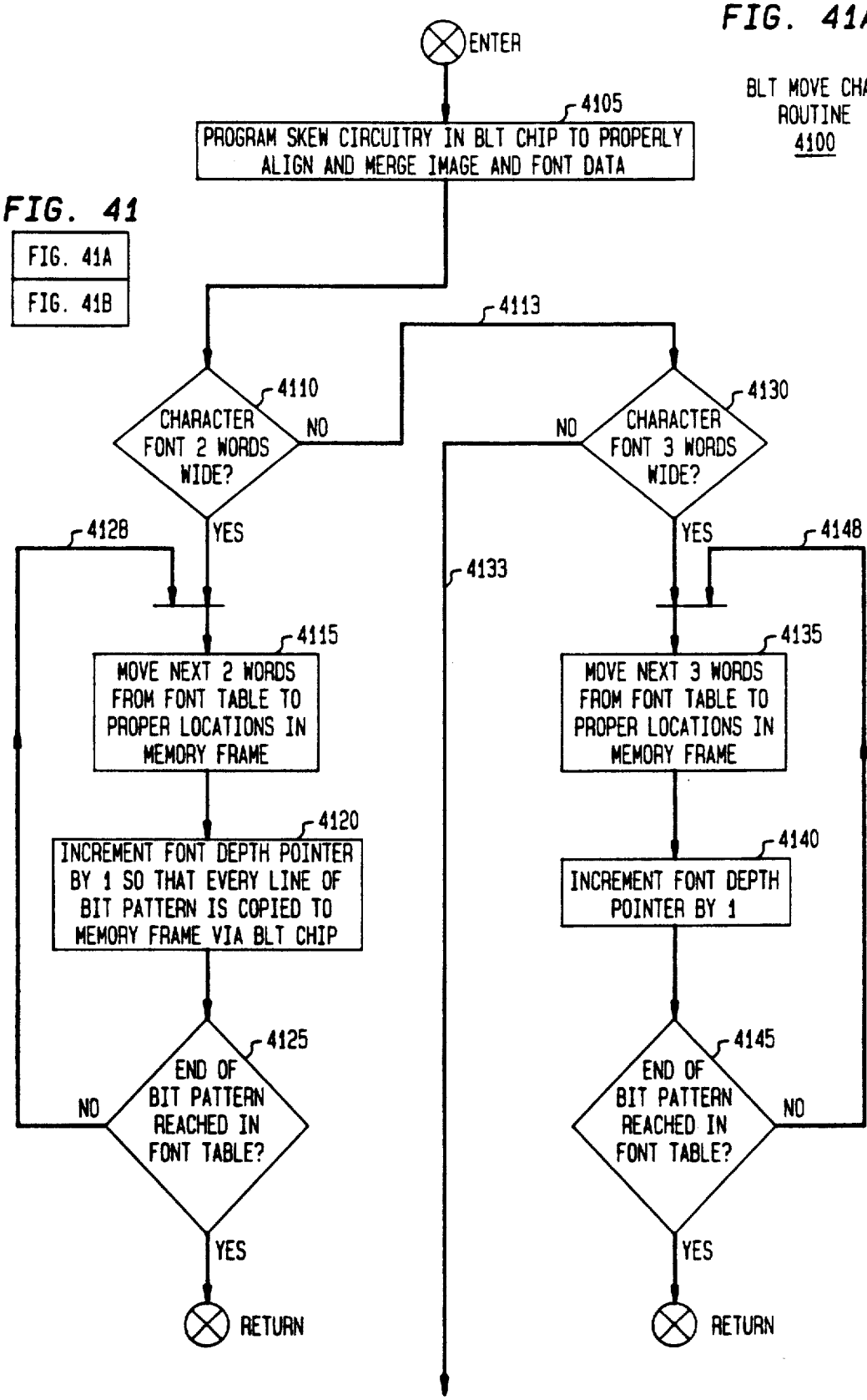

REVERSE BLT MOVE
CHARACTER ROUTINE
4200

| FIG. 42A |
| FIG. 42B |

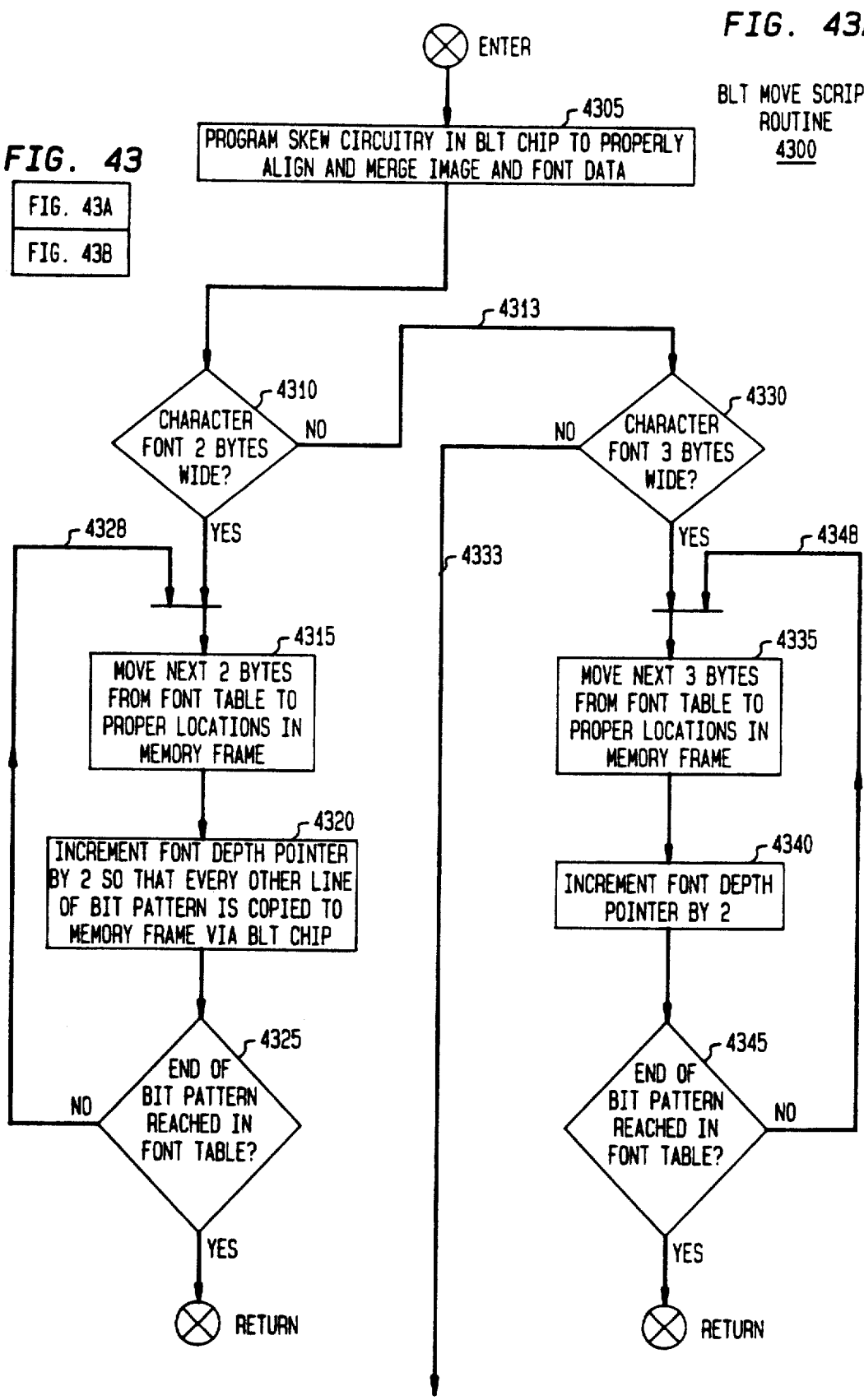

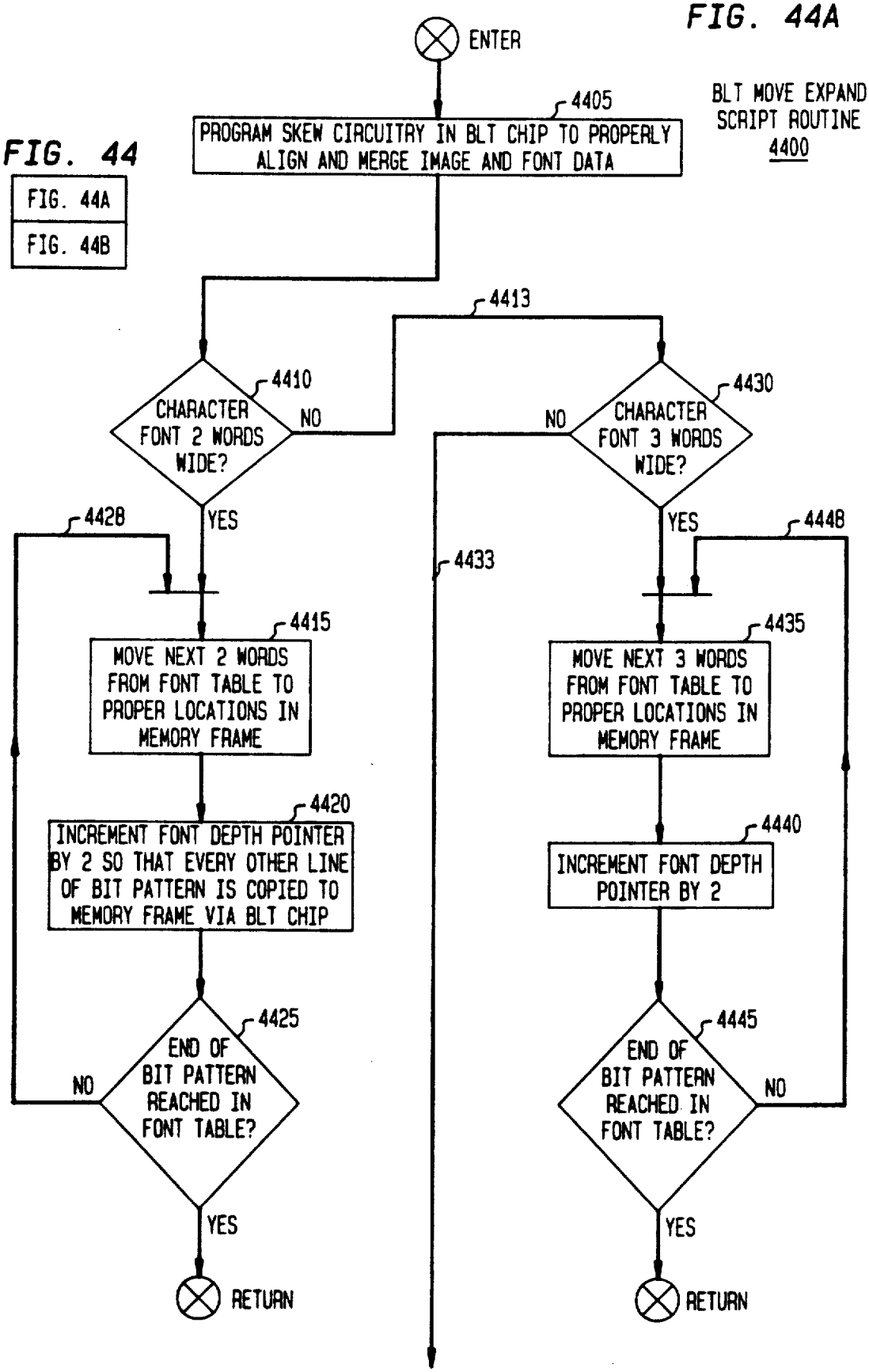

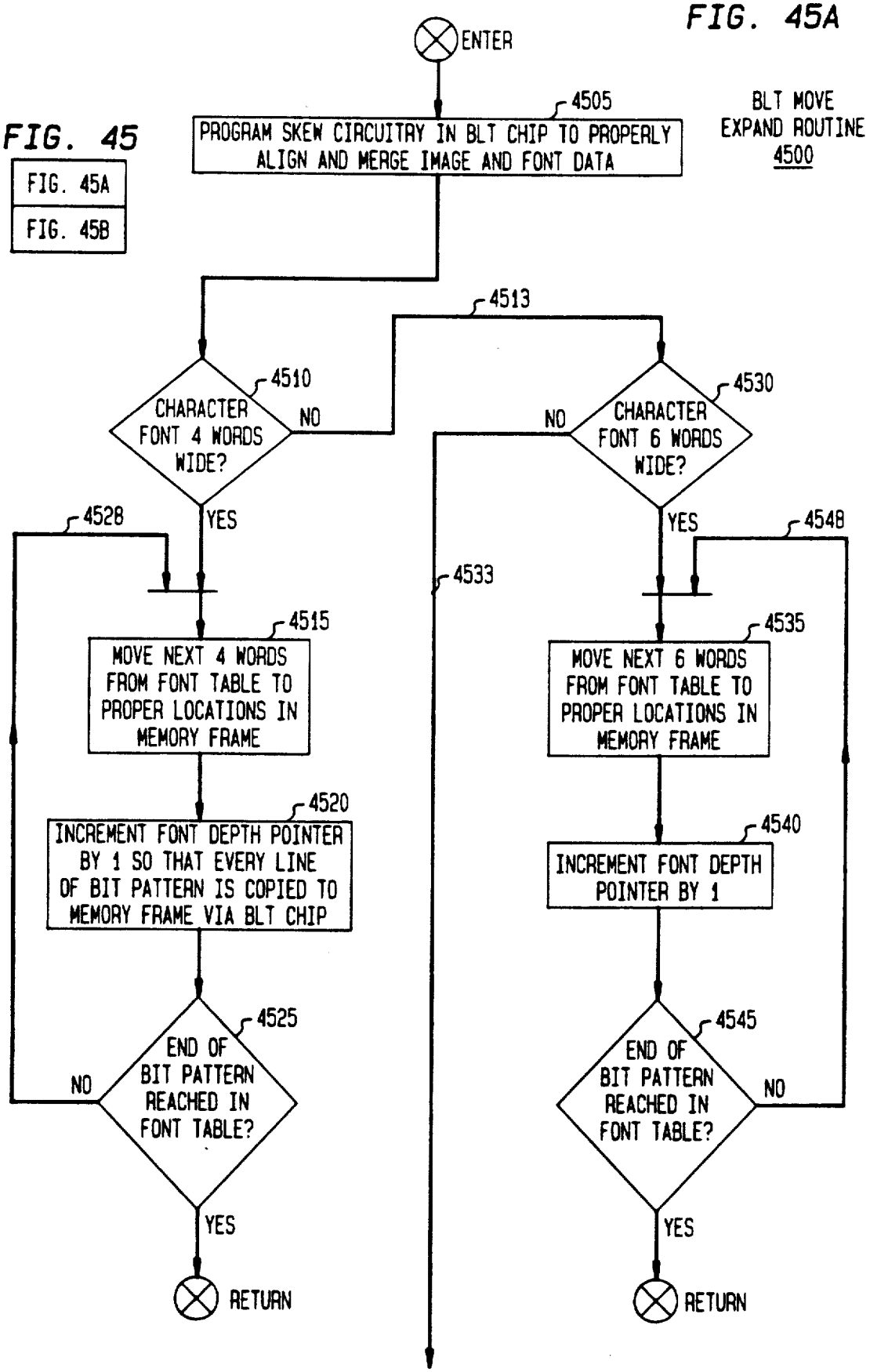

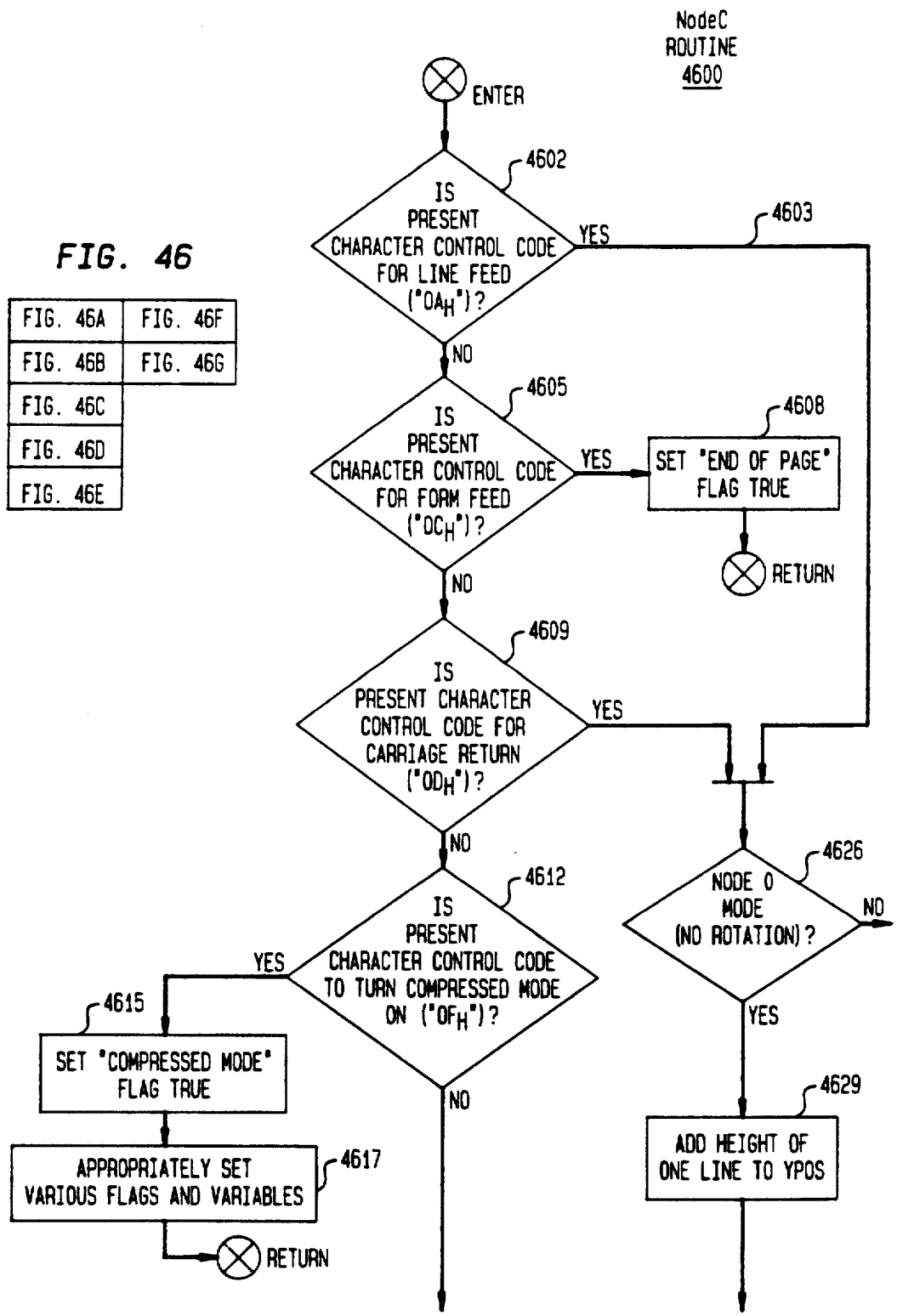

HIGH SPEED RASTER IMAGE PROCESSOR PARTICULARLY SUITED FOR USE IN AN IMAGE MANAGEMENT SYSTEM

This is a continuation of application Ser. No. 020,047 filed Feb. 27, 1987, now abandoned.

BACKGROUND OF THE INVENTION

1. Field of the Invention

The invention relates to apparatus for a raster image processor, that is capable of driving a printing engine at a high rate, for use in illustratively an image management system.

2. Description of the Prior Art

For various reasons, storage of documents is becoming an increasingly pressing problem for most businesses today. As set forth below, computerized information retrieval systems provide an efficient solution.

Generally speaking and by way of background, there are several steps and many documents involved in a typical business transaction. In particular, paper documents (such as, for example, purchase orders and outgoing bills) are first obtained from several sources. Next, information from these documents is typically entered, through one or more computer terminals, into various computer databases that form part of a computerized filing system. Thereafter, the paper documents are sorted and stored in a paper file for subsequent use. Since valuable information can be quickly accessed from these databases, use of such a computer filing system makes document handling quite efficient. However, when users cannot obtain all the information they need from the databases, they are forced to access the actual documents that have been stored in the paper file. The paper file for a given transaction usually contains a variety of documents: the original document for that transaction (e.g. a specific purchase order for certain goods), associated reference documents that show the history of the transaction (e.g. quotations, manufacturing papers and bills of lading respectively showing that the exact nature of the goods quoted, that these goods have been manufactured and thereafter shipped to the customer) and annotations (notes) relating to the transaction (such as past actions and/or future plans) that exist either on separate documents or appear on the original document itself. As a result, the paper file for any one transaction is often quite voluminous.

Unfortunately, many problems arise when documents are stored in paper form. First, as the number of documents increases, the cost of storing all the documents and accessing any one document correspondingly increases, often substantially. This cost typically includes: the cost of labor needed to maintain the paper files; the cost of delivering the documents in paper form, which typically includes the cost of maintaining and operating copying equipment and microfilm readers and copiers; the cost of physical storage devices, such as cabinets; and, lastly, the cost of the space required to house the documents and all ancillary equipment. Second, paper documents for any transaction are usually filed by only one parameter, typically a name of one of the parties involved in that transaction. As a result, gaining access to a specific document can be extraordinarily arduous and time consuming, if this document is to be accessed by a parameter other than that under which it has been filed. Third, to reduce storage costs, paper files usually contain only one copy of a document, typically the original itself. As a result, only one user can examine a paper document at a time. Hence, if several users desire simultaneous access to a document, only one user can be serviced at any given time and all the other users must wait their respective turns to obtain access. This wastes time and effort. Fourth, paper files are often disorganized, incomplete and frequently lost. Consequently, as the number of paper files grows in size, information often becomes increasingly hard to find and productivity of those that depend upon these files correspondingly decreases.

In recognition of these problems, the art has turned to the use of computer based document storage systems. Early attempts, so-called computer assisted retrieval of microimage (CAR) systems, relied on microfilming the document and recording pertinent identifying information in a computer database. This information included a unique microfilm address (typically microfilm roll and frame numbers) which specified where, on microfilm, the document was stored and data relating to the document itself (parties involved, type of document and the like). This database could be quickly searched using any one of several parameters to readily locate the address of a particular document. With the address in hand, a user could quickly retrieve a particular roll of microfilm and, using a microfilm reader, manually access the desired document that has been stored in the roll. Once this document has been accessed, the microfilm reader prints a paper copy image of the document. Inasmuch as a microfilm copy often legally serves the function of a paper copy, the original document can be destroyed after it has been microfilmed. Such a system advantageously eliminates the need for paper files and the problems associated therewith.

Since the computer in a CAR system only provides microfilm addresses, the image produced by a CAR system is exactly that which was recorded on microfilm. As such, CAR systems do not possess any ability to process and manipulate these images electronically.

Consequently, CAR systems, though providing significant advantages over paper files, contain several drawbacks. First, microfilm images often contain noise. CAR systems can not remove noise from a microfilm image in order to enhance the image quality. In addition, wide documents are often twisted ninety degrees to facilitate filming in a lengthwise fashion. CAR systems can not rotate accessed documents. Furthermore, a user frequently desires to focus (zoom) into a particular area of an image, for example to read fine print. CAR systems can not electronically expand a desired region of an image. Therefore, print that is difficult to read in the original document remains difficult to read when an image of that document is produced by a CAR system. Moreover, the output speed of a CAR system is limited to that of the microfilm readers. Inasmuch as these readers are often manually operated, significant amounts of time are often expended in accessing and printing documents that contain a substantial number of pages.

Consequently, image management systems have been developed in the art in order to overcome the limitations of a CAR system while still retaining the advantages of a microfilm based system. As in a CAR system, an image management system uses a computer to locate a particular microfilm address of a desired image. However, unlike a CAR system, each accessed microfilm image is then scanned, i.e. digitized, rather than merely being printed. Once the image has been scanned, it is then processed electronically in order to overcome the limitations of a CAR system.

Specifically, one such image management system, presently manufactured by the present assignee and referred to as the Kodak Image Management (KIM) system, relies on applying the scanned image onto a local area network. This network provides a communications link between various workstations and various computer peripherals, such as printers and mass storage devices (e.g. disk drives). In this system, an image can be sent to a workstation which appropriately processes the image, as instructed by the user. For example, the user can instruct the workstation to rotate the image and/or zoom into and expand a desired area of the image. Thereafter, the user can instruct the workstation to route the processed image to a printer to form a paper copy of the image and/or route the processed image to memory from which it can be accessed by other workstations for subsequent processing and printing. Such a system readily permits each user to append annotations to an accessed image. An annotation is typically writing, e.g. a comment, that has been overlaid onto a desired area of an image by a user. In particular, a user situated at a KIM workstation first accesses a microfilm image through the workstation, positions a cursor at a desired location on the image and types a comment (an annotation) onto the image. The workstation, in turn, instructs the KIM system to store the comment in memory along with the addresses of both the corresponding accessed image and the desired image location. Subsequently, whenever another user accesses the same microfilm image, that image is digitized and the comment is automatically read from memory. The workstation then overlays the comment onto the image at the proper location and displays the result.

While image management systems, such as KIM systems, overcome the drawbacks associated with CAR systems, image management systems have heretofore not possessed a sufficient throughput to satisfy the needs of large volume users. In particular, image management systems include a raster image processor (RIP) which appropriately processes a scanned microfilm image, in a manner desired by the user, and thereafter routes the processed image either to a printer and/or to a local area network. Currently, high quality image printers, such as various laser printers, that possess the capability to print high quality images at a rate in excess of 10 pages/minute are becoming readily available. However, RIPs known to the art are quite slow and, as such, do not provide processed images as output data at a rate commensurate with the throughput of an image printer. Consequently, processing delays inherent in the RIP substantially limit the throughput of an image management system.

These delays develop primarily because the entire image, often a large bit-map, is sequentially routed through and processed by the central processing unit, typically a microprocessor, situated within the RIP. In use, a RIP first transfers a compressed image from the local area network to a frame store memory. This memory is used to temporarily store the image during subsequent decompression and image processing. Once this transfer is complete, the microprocessor decompresses the image prior to performing image processing. After this processing has been completed, the processed decompressed image is typically transferred from the frame store memory to an image printer for printing. The architecture of RIPs known in the art often mandates that the image must disadvantageously pass through the microprocessor during any such transfer. Unfortunately, excessive processing time is consumed in performing either image decompression or an input-/output (I/O) transfer of a large bit-mapped image.

In particular, to maximize the efficiency of the network and mass storage devices used therein, a microfilm image is typically compressed, using single or two dimensional run length coding, prior to being transmitted over the local area network. Once an image is received by a RIP, the RIP decompresses the image prior to displaying and/or subsequently processing the image. Most currently available RIPs are microprocessor based with the decompression process implemented in software. Owing to the complexity of the processing required to decompress even a small area of an image, e.g. a one inch square area, decompressing a complete image may require upwards of fifteen minutes of processing time even using a 32 bit microprocessor operating at high clock rates. As a result, such RIPs operating on compressed bit-mapped image data can not generate output data for printing at a rate that even approaches one page/minute.

Moreover, RIPs known in the art are generally unable to perform simple I/O transfers of bit-mapped image data at a sufficiently rapid rate to match the input rate of an image printer. Typically, a single uncompressed bi-tonal image bit-map, of the type generally applied to an image printer, may contain upwards of 3-4 Mbytes of pixel data. Presently available high speed microprocessors require approximately 3 microseconds to perform an I/O transfer of one pixel of image data from a frame store memory to an image printer. As such, these microprocessors are simply incapable of transferring 10 complete uncompressed images per minute to an image printer.

Inasmuch as these microprocessors are incapable of decompressing, processing and transferring ten complete bit-mapped images per minute between a local area network and an image printer, the throughput of available image management systems has been disadvantageously limited by the use of RIPs known in the art.

Therefore, a need exists in the art for a raster image processor that operates on incoming compressed bit mapped images at a rate commensurate with the throughput of currently available high quality image printers. Such a RIP will advantageously facilitate the implementation of high throughput image management systems.

SUMMARY OF THE INVENTION

The deficiencies inherent in raster image processors known in the art, particularly those designed for use in image management systems, are advantageously eliminated in accordance with the teachings of the present invention by a raster image processor (RIP) that contains a bus, an arbiter circuit and a number of separate image processing components all interconnected to a bus. These components typically include a scaler, a decompressor and various interface circuits. Each of these components can perform a respective image processing task substantially in parallel with those undertaken by other of these image processing components. The arbiter, typically a microcomputer system, receives a request, from any one of the image processing components (the "source" component), for service, from another one of the image processing components (the "destination" component). Then, depending upon the availability of the bus and the destination component, the arbiter defines a data path over the bus between the source and destination components, and thereafter initiates an information (typically data) transfer over the bus and between these components. Once this transfer is complete, the destination component is then able to undertake its respective image processing task substantially independent of the tasks undertaken by both the arbiter and the source component. At this point, both the arbiter and the source component are free to perform other image processing tasks while the destination component is performing its respective task. This pipelined operation substantially and advantageously increases the throughput of the RIP over that available from raster image processors known in the art.

In accordance with a preferred embodiment disclosed herein, the RIP contains an interface, coupled through a file server to a local area network, for routing incoming image processing commands (RIP commands and accompanying data) to the bus. The RIP also contains a dedicated decompressor, connected to the bus, for performing image decompression in hardware. This advantageously eliminates the need to perform decompression in software and thereby advantageously relieves a processor, which here implements the arbiter, of a significant burden. In addition, the RIP contains a scaler, which receives input data directly from the decompressor, for scaling a de-compressed image from one resolution to another in order to match a scanner generating an image at one resolution to an image printer that requires data with a different resolution. The scaler is also connected to the bus and routes its scaled output data thereto. A memory, for temporarily storing images, text and font data, is also connected to the bus. Lastly, the RIP also contains a rasterizing circuit, connected to the bus, for converting bit-mapped images to raster form.

The inventive RIP is capable of performing several different image processing operations, each based upon an incoming command to the RIP. Each command contains an op-code which specifies a desired operation to be performed followed by data for use in providing that operation. These commands are transferred to and within the RIP on a block-by-block basis. Now, specifically, in response to an image command appearing on the bus, the RIP stores an incoming bit-mapped image, that forms the data portion of that command, within a memory frame situated within the memory. A text command causes the RIP to store incoming textual (ASCII) data, that forms the data portion of the text command, within the memory, convert that data into bit-mapped characters and then print a single page containing these characters. A note command instructs the RIP to overlay incoming textual data, which forms the data portion of the note command, over a bit-mapped image beginning at a location specified within the data portion of the note command. This, in turn, provides an annotated bit-mapped image. Overlaying is provided by sequentially and selectively copying bit patterns, which correspond to each character in the incoming textual data, from the font data stored in memory to specific locations within the bit-mapped image stored in a memory frame. The bit patterns can also be overlaid with a 90, 180 or 270 degree rotation, if desired. This is accomplished by copying the values of the bits that form a bit pattern from either a non-rotated or 270 degree rotated font in either forward or reverse order into the bit-mapped image. Control characters embedded within the incoming textual data alter the manner in which the bit patterns are copied into the bit-mapped image, for a note command, or merely into memory, in the case of a text command, to produce characters of desired size, shape and/or location on a printed page. In addition, in response to a print command, the RIP will repetitively transfer a bit-mapped image from the memory to an image printer in order to produce a desired number of paper copies of the image. Furthermore, a font can be downloaded into the RIP, in response to a download command, for use in printing an annotated image. The RIP can also execute various diagnostics, in response to and specified by a diagnose command.

In accordance with a feature of the present invention, the architecture of the inventive RIP can be easily modified to provide increased throughput. If additional compressor/decompressor and scaler circuits were to be connected to the bus, multiple bit-mapped images could then be decompressed and/or scaled simultaneously. In a similar fashion, additional interface circuits can also be connected to the bus such that the RIP could simultaneously receive commands from several sources and/or provide raster images to several image printers and/or to other output devices. Furthermore, two busses can be used to interconnect the image processing components and the arbiter through appropriate input/output ports on each. In the event one of the two busses is being used, then the arbiter could define a data path between source and destination components using the other bus. Advantageously, any of these techniques provide an additional degree of pipe-lined operation which further increases the throughput of the inventive raster image processor.

BRIEF DESCRIPTION OF THE DRAWING

The teachings of the present invention may be clearly understood by considering the following detailed description in conjunction with the accompanying drawing, in which:

FIG. 9 shows the formats of SCSI commands that occur over leads 18 between File Server 15 and RIP 20 depicted in FIG. 2;

FIGS. 10a–10b collectively show the formats of RIP commands appearing on main bus 80 shown in FIG. 2 and also on bus 85 shown in FIG. 8;

FIG. 12 shows the correct alignment of the drawing sheets for FIGS. 12a and 12b;

FIGS. 12a and 12b collectively show a flowchart of Vsync/EOR Interrupt Service Routine 1200 that is executed as part of Interrupt Service Routines 1190 depicted in FIGS. 11a-11c;

FIG. 22 shows the correct alignment of the drawing sheets for FIGS. 22a-22b;

FIGS. 22a-22b collectively show a flowchart of New Mode Routine 2200 that is executed by Font Initialize Routine 2000 shown in FIG. 20;

FIG. 25 shows the correct alignment of the drawing sheets for FIGS. 25a-25b;

FIGS. 25a-25b collectively show a flowchart of Goprint Routine 2500 that is also executed within Image Test Print Routine 1130;

FIG. 28 shows the correct alignment of the drawing sheets for FIGS. 28a-28c;

FIGS. 28a-28c collectively show a flowchart of Note/Image Routine 2800 that is also executed within Command Processor Routine 1150;

FIG. 29 shows the correct alignment of the drawing sheets for FIGS. 29a-29b;

FIGS. 29a-29b collectively show a flowchart of Scale Routine 2900 that is executed as part of Note/Image Routine 2800 shown in FIGS. 28a-28c;

FIG. 31 shows the correct alignment of the drawing sheets for FIGS. 31a-31b;

FIGS. 31a-31b collectively show a flowchart of Text Routine 3100 that is also executed within Command Processor Routine 1150 that forms part of Main Program 1100 depicted in FIGS. 11a-11c;

FIG. 32 shows the correct alignment of the drawing sheets for FIGS. 32a-32d;

FIGS. 32a-32d collectively show a flowchart of EPSON Printer Emulation Routine 3200 that is executed as part of Text Routine 3100 depicted in FIGS. 31a-31b;

FIG. 35 shows the correct alignment of the drawing sheets for FIGS. 35a-35b;

FIGS. 35a-35b collectively show a flowchart of NodeO Routine 3500 that is also executed as part of EPSON Printer Emulation Routine 3200;

FIG. 37 shows the correct alignment of the drawing sheets for FIGS. 37a-37c;

FIGS. 37a-37c collectively show a flowchart of NODE 1/2/3 Routine 3700 that is also executed as part of EPSON Printer Emulation Routine 3200;

FIG. 41 shows the correct alignment of the drawing sheets for FIGS. 41a-41b;

FIGS. 41a-41b collectively show a flowchart of BLT Move Char Routine 4100 that is executed as part of NODE 1/2/3 Routine 3700 and Draw Routine 4000 depicted in FIGS. 37a-37c and 40a-40d, respectively;

FIG. 43 shows the correct alignment of the drawing sheets for FIGS. 43a-43b;

FIGS. 43a–43b collectively show a flowchart of BLT Move Script Routine 4300 that is executed as part of Draw Routine 4000;

FIG. 44 shows the correct alignment of the drawing sheets for FIGS. 44a–44b;

FIGS. 44a–44b collectively show a flowchart of BLT Move Expand Script Routine 4400 that is also executed as part of Draw Routine 4000;

FIG. 45 shows the correct alignment of the drawing sheets for FIGS. 45a–45b;

FIGS. 45a–45b collectively show a flowchart of BLT Move Expand Routine 4500 that is also executed as part of Draw Routine 4000;

FIG. 46 shows the correct alignment of the drawing sheets for FIGS. 46a–46g; and FIGS. 46a–46g collectively show a flowchart of NodeC Routine 4600 that is executed as part of NodeO Routine 3500 and NODE 1/2/3 Routine 3700 depicted in FIGS. 35a–35b and 37a–37c, respectively.

To facilitate understanding, identical reference numerals have been used to denote identical elements common to the figures.

DETAILED DESCRIPTION

The inventive raster image processor (RIP) is particularly suited for use in an image management system and, for that reason, will be discussed in that context. Nonetheless, after reading the following description, those skilled in the art will readily appreciate that the inventive RIP can be used in any one of many applications that require a high throughput of bit-mapped image data.

A. BACKGROUND

Figure 1:
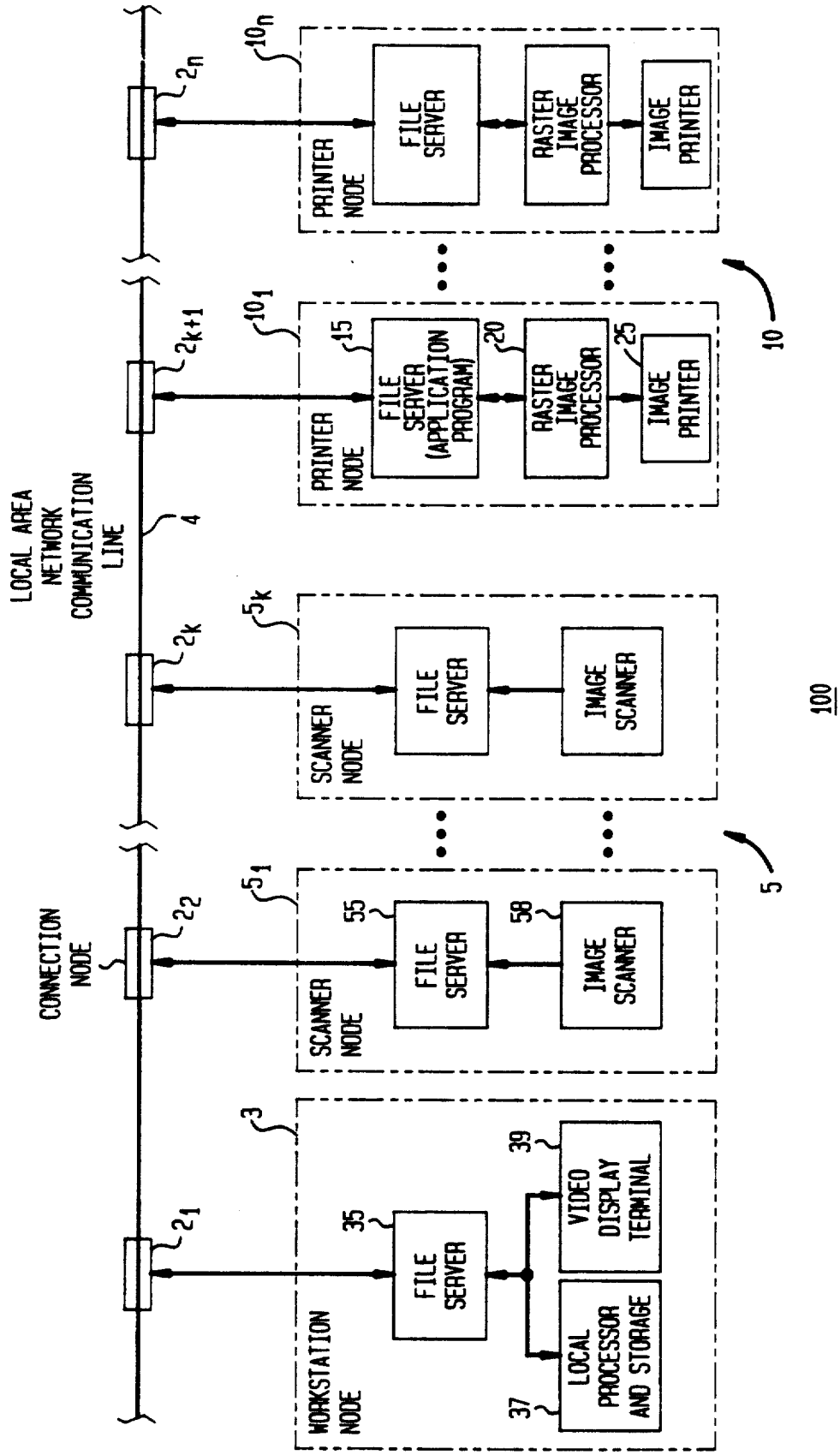
FIG. 1 shows a block diagram of the overall architecture of a local area network (LAN) portion of an image management system.

FIG. 1 shows a block diagram of the overall architecture of local area network (LAN) portion 100 of a typical image management system such as that produced by the present assignee and referred to as the Kodak Image Management (KIM) system.

As shown, this system contains at least one workstation node 3, several distinct scanner nodes $5_1, \ldots, 5_k$—all collectively referred to as scanner nodes 5; and several distinct printer nodes $10_1, \ldots, 10_n$—all collectively referred to as printer nodes 10. All these nodes are interfaced through respective connection nodes $2_1, 2_2, \ldots, 2_k, 2_{k+1}, \ldots, 2_n$ to local area network communication line 4. Each connection node is identical and well known and is used to provide a buffered tap into communication line 4. Such a node may typically contain both line receiver-driver pairs for use in bi-directionally repeating the signals appearing on line 4 and various bi-directional buffers for use in providing a buffered bi-directional tap to and from communication line 4. The LAN comprising communication line 4, the connection nodes and the file servers (described below) may be illustratively implemented using an ETHERNET type LAN (ETHERNET is a trademark of the Xerox Corporation). Each scanner node contains a file server and an image (video) scanner, such as file server 55 and image scanner 58 which together form scanner node $5_1$. Each printer node contains a file server, a raster image processor (RIP) and an image printer, such as file server 15, RIP 20 and image printer 25 all of which form printer node $10_1$. Each image printer is a high resolution graphics printer such as the LBP-CX laser printer presently manufactured by Canon Incorporated. The workstation node contains file server 35, local processor and storage 37 and video display terminal 39—all of which form a workstation.

In use, an operator of the KIM system, stationed at a workstation, such as at that which forms workstation node 3, accesses a desired image through a host computer (hereinafter referred to as the KIM host computer which is well known and not shown) connected to the LAN by supplying various input information through the workstation to identify the desired image. Using this information, the KIM host computer searches a database which contains both index information for each image stored on the KIM system and also corresponding address information for that image, such as the microfilm roll and frame number where that image is stored. Once the KIM host computer matches the input information with the stored index information, the KIM host computer provides the address of the desired image. This address and an associated instruction are then sent to a mass storage device that stores the image. In the case of microfilmed images, the address and instructions are routed to a device commonly referred to as an autoloader (also known and not shown). The autoloader then retrieves the particular roll of microfilm specified by the address and loads that roll into one of scanner nodes 5. One or more of these scanner nodes are located within each autoloader. Thereafter, the scanner node sequentially advances the microfilm to every frame specified by the address, digitizes the image appearing on each frame and compresses each resulting digitized image(s) using a well known single or two dimensional run length coding technique. Each resulting digitized image is a bi-tonal compressed bit-mapped image, typically occurring at respective resolutions of 160 and 170 dots/inch along the x and y directions. The compressed image, along with its associated address information which specifies the location of the image and the device on which it is stored, is routed onto communication line 4 through a file server—typically a dedicated microprocessor based system (which can illustratively be implemented using a MICRO-VAX computer manufactured by Digital Equipment Corporation which also owns the trademarks VAX and MICRO-VAX)—located within the scanner node. In addition, non-compressed images can also be stored on optical and/or magnetic disk. Image storage devices of this sort can also be appropriately interfaced to the LAN, through appropriate file servers, and, through use of internal compressors, can provide compressed image data for subsequent processing. These storage devices can be used together with or in lieu of the image scanners and autoloaders depending upon the medium(s) used to store images.

Now, depending upon the commands entered by the operator at the workstation, the accessed image can be routed from its associated image storage device over the network to: the workstation for display and, if additional image processing is desired, to a magnetic disk (not shown) for temporary storage or to a RIP for generating a paper copy of the accessed and/or processed image. Local processor and storage 37 situated within the workstation advantageously provides the workstation with the capability to scale (expand or contract) the entire image to a desired size, to zoom into a desired portion of an image, to digitally filter the image in order to enhance its quality, to overlay an annotation (textual information) onto the image at a desired location and orientation, to rotate the image and to perform other similar image processing tasks.

Anytime an operator desires to print an image, whether displayed by the terminal at the workstation or not, the operator provides a suitable instruction to the workstation. This, in turn, causes the workstation to first generate a request, which contains a print command along with suitable addressing information for that image, and then transmit this print request, via through the file server associated with the workstation and the LAN, to the KIM host computer. The host computer then routes the print request, through the LAN, to an available printer node. The file server in each printer node executes, as part of its application program, a software process commonly referred to as a "print symbiont". Whenever, the file server in a printer node receives a print request, the print symbiont executing within that file server sends a request with accompanying address information to an addressed storage device (e.g. the autoloader, magnetic or optical disk) to retrieve desired image or text (annotation) data. If the device that stores the image data successfully locates the desired image, the image data is then routed to an image compressor stationed within that device. Thereafter, the file server associated with this device transmits a file containing compressed image data over the LAN to that printer node. Once the text data, if requested, is located on a corresponding storage device (typically a magnetic disk), then the file server associated with that device routes the text data to the same printer node. If, for any reason, the image or text retrieval fails, then the corresponding storage device sends an appropriate message to the KIM host computer which routes the message back to printer node that generated the request. The print symbiont executing there appropriately notifies the operator, through the network, that the retrieval was not successful.

The file server within each printer node also executes a print manager as part of its application program. The print manager: monitors the status of the RIP located at that node and relays status information to the KIM host computer upon request, generates an internal service request in response to each incoming print request, converts each service request into a well-known SCSI (small computer system interface) type command (which will be discussed in detail below) for transmission to the RIP, controls a print queue containing these commands, and lastly transmits each SCSI command to the RIP at an appropriate time. Now, specifically, once the print request is received at the printer node, the print manager in the file server, fabricates and queues an SCSI Print command corresponding to each print request. Whenever the RIP becomes available, the print manager accesses the next SCSI Print command from its queue and transmits that command to the RIP.

Each SCSI Print command is transferred to the RIP by the file server in standard length consecutive blocks of 512 bytes. As explained in detail below, particularly in conjunction with FIGS. 9 and 10a-10b, each block that forms each SCSI Print command contains a header followed by accompanying data. The header contains a sub-op code that specifies an operation that will be executed by the RIP. The data portion of a SCSI Print command contains a RIP command. The RIP command itself consists of a header, having an op code and various accompanying parameters, and accompanying image or text data. The RIP command header is generated by the application program, executing within the file server, in response to the print request received over the LAN from the KIM host computer. The file server does not generate or modify any of the accompanying image or text data but instead merely transfers the data, on a block by block basis, from the LAN to the RIP as part of a RIP command.

Each RIP performs a variety of different operations on incoming text and bit-mapped image data. These operations, invoked by corresponding RIP commands, include: receiving an image which includes decompressing and scaling the image to an appropriate resolution (RIP Image command); receiving textual data that forms an annotation which includes selectively rotating the data 0, 90, 180 or 270 degrees and then overlaying the rotated data onto the received image at a specified location in order to produce the annotation (RIP Note command); receiving textual data (RIP Text command); downloading a desired font to the RIP for subsequent use during printing (RIP Download command); instructing the associated image printer to print an image, stored within a memory frame, a specified number of times (RIP Print command); and executing a desired diagnostic operation involving the RIP itself and/or its associated image printer (RIP Diagnose command).

During its operation, each RIP located within every printer node supplies information to the file server, located within that node, regarding the status of both the RIP and of its associated image printer. This status information is relayed over the LAN, by the file server, to the KIM host computer for subsequent use.

B. RIP HARDWARE DESCRIPTION

1. Basic Architecture

Figure 2:
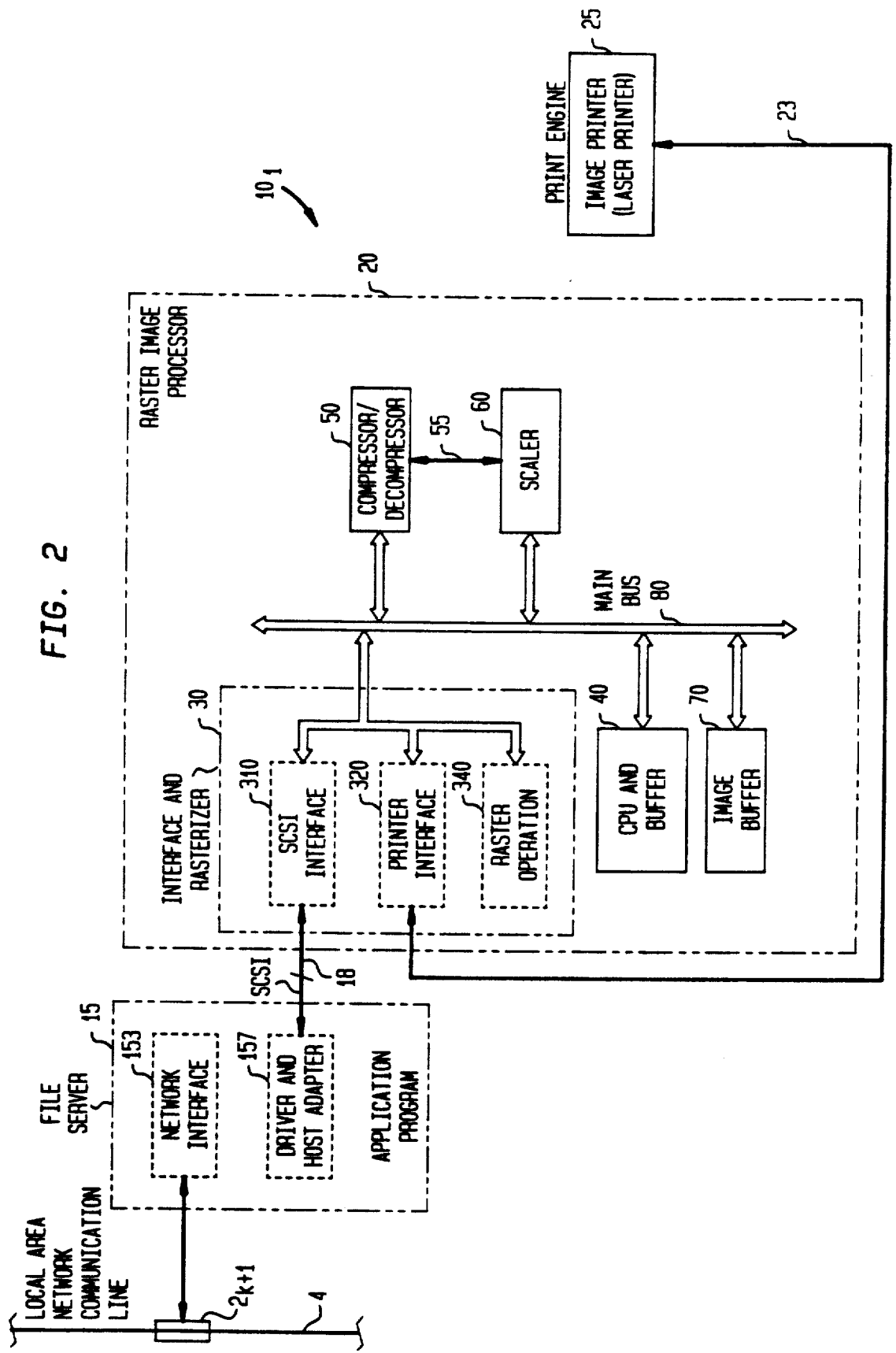
FIG. 2 is a block diagram of one embodiment of inventive Raster Image Processor (RIP) 20 and the associated circuitry that comprises printer node $10_1$ contained within the LAN portion of the image management system shown in FIG. 1.
Figure 4:
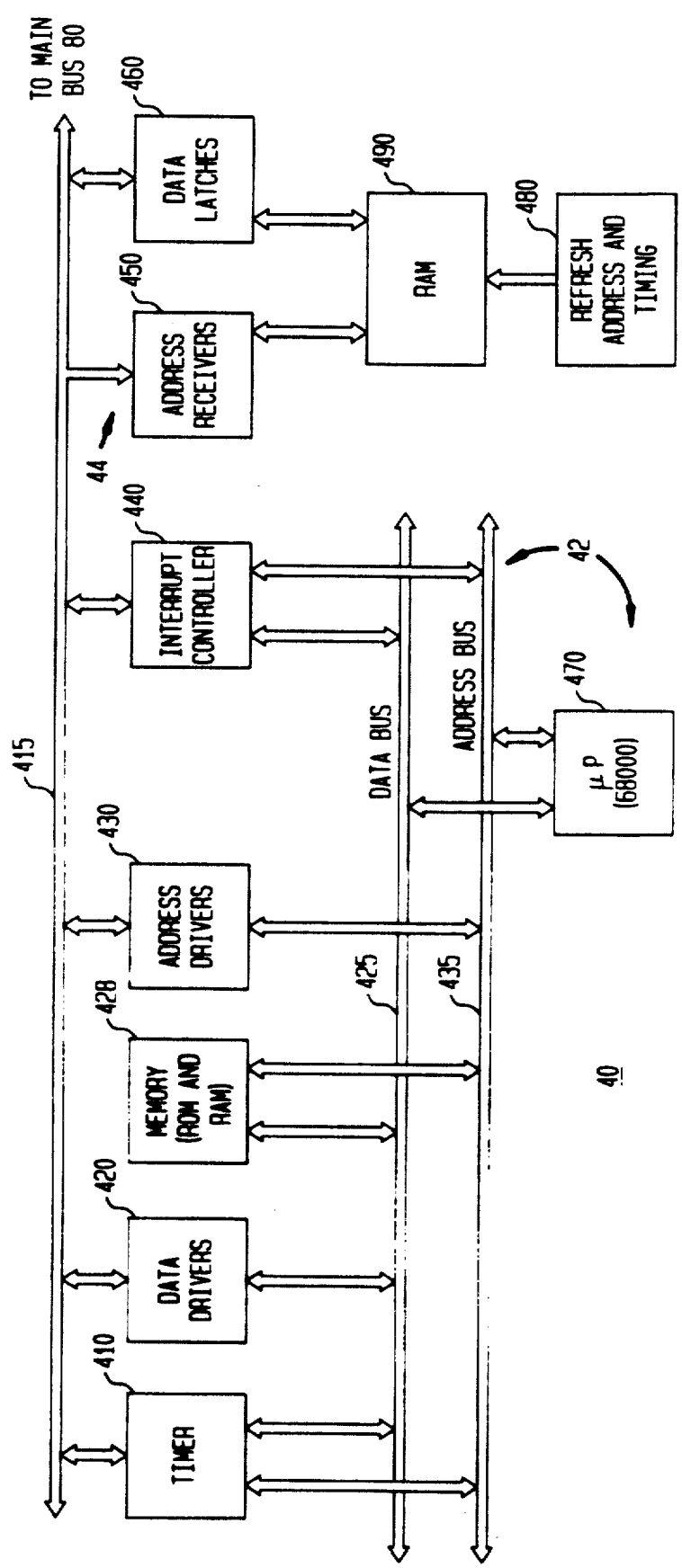
FIG. 4 shows a block diagram of CPU and Image Buffer 40 shown in FIG. 2.

FIG. 2 shows a block diagram of one embodiment of RIP 20 located within printer node $10_1$. As shown, RIP 20 contains interface and rasterizer 30, central processing unit (CPU) and buffer 40, image buffer 70, compressor/decompressor circuit 50 and scaler circuit 60 all interconnected through main bus 80. The CPU is illustratively a well known microprocessor based system, preferably fabricated using a Motorola 68000 type 32-bit microprocessor, and is shown in FIG. 4 and discussed in detail below. Besides a microprocessor, the CPU also contains a timer, an interrupt controller, memory (random access memory (RAM) for local data storage, and read only memory (ROM) for program and constant storage) and internal address and data busses and accompanying bus drivers.

As noted above, whenever incoming communication is received, over communication line 4, as shown in FIG. 2, that requires service by printer node $10_1$, an application program residing within file server 15 stores the incoming communication which consists of an image-related command and data (image or textual data). Thereafter, the application program generates a service request which, in turn, produces a SCSI Print command to transfer data in block form to RIP 20 from the file server. This data includes an appropriate RIP command and accompanying image or textual data received over line 4. In particular, in response to the service request generated by the application program, the processor situated in the file server sets various fields that will form part of the SCSI Print command. This SCSI command, as noted, includes both a RIP command as well as accompanying image or textual data. This accompanying data, which has been received over line 4, is merely appended to the RIP command by the driver and host adapter in order to form the entire SCSI command that will then be transmitted to the RIP to satisfy the service request. The image data is processed within RIP 20 in a manner specified by the RIP command and thereafter, if appropriate, is routed to image printer 25, via leads 23, for printing. Specifically, within RIP 20, incoming SCSI commands from file server 15 are received, via leads 18, through well known SCSI interface 310 situated within interface and rasterizer 30. Similarly, RIP 20 can also transfer data to the KIM host computer, via the LAN, by utilizing SCSI interface 310 to apply an appropriate SCSI command to file server 15—as fully discussed in conjunction with FIG. 9. Network interface 153 situated within the file server provides an electrical interface to communication line 4 and ensures that the protocols used by file server 15 match those appearing on communication line 4.

During operation of the RIP, the CPU is primarily used to: monitor the status of each RIP component (interface and rasterizer 30, compressor/decompressor circuit 50, scaler circuit 60, image buffer 70), define a data path between a source and a destination RIP component, and thereafter initiate a data transfer between these two components. In particular, the CPU monitors the status of each RIP component. Whenever, any RIP (source) component requests service from another RIP (destination) component, such as to transfer information (RIP commands and/or data) to the destination component, the source component requests the CPU to define a data path and initiate a transfer. Once a data path has been defined by the CPU based upon the availability of the destination component and main bus 80, the destination component is then notified—typically by receiving memory addresses for a direct memory access transfer, and thereafter information is transferred over bus 80 on a block-by-block basis until the transfer is complete. In this manner, the CPU is substantially isolated from bit-mapped image data (graphics or text) inasmuch as this data is transferred over the defined path but does not pass through the CPU itself. Consequently, the CPU functions as an arbiter in establishing data paths and thereby is relieved of performing substantial amounts of image processing which would otherwise consume an inordinate amount of processing time. As a result, image processing speed of the RIP is advantageously not limited by the relatively slow instruction execution speed of the CPU, and particularly that of the microprocessor used therein. Throughput limitations now occur primarily due to speed limitations of the image processing components in the RIP itself; however, these components advantageously operate at much higher rates than the CPU.

Moreover, once a data path has been established and a transfer thereover has been initiated, the CPU is advantageously free to execute another task during the time the transfer is occurring. For example, once a transfer of a SCSI command into the RIP has been initiated, the CPU can then instruct compressor/decompressor 50 to decompress an image. Image decompression will then occur simultaneously with the transfer. In general, several images can simultaneously exist in different stages of processing; one image might be transferring into the RIP, while a second image is being decompressed or printed. Parallel processing of this sort, commonly referred to as pipe-lining, advantageously increases throughput. Now, by substantially isolating the CPU from the bit-mapped image data and by operating the RIP in a pipe-lined fashion, RIP 20 can advantageously operate at a throughput that matches that of image printer 25. As a result, the throughput of the entire image management system is significantly increased over that obtainable in the past.

Now, within RIP 20 itself, interface and rasterizer 30 contains SCSI interface 310, printer interface 320 and raster operation circuit 340. SCSI interface 310 provides a well known bi-directional interface between file server 15 and RIP 20 to transfer information therebetween on a block-by-block basis. Printer interface 320 provides the appropriate circuitry to interface image printer 25, typically a laser printer as noted above, via leads 23, to RIP 20 and specifically main bus 80. Based upon the data requirements of image printer 25, raster operation circuit 340 utilizes bit-mapped data to form individual lines of image data and then adds appropriate synchronization signals thereto as required by the image printer. This image data is then transferred to printer interface 320 which, in turn, converts this data into a bit-serial raster form as required by image printer 25. Alternatively, printer interface 320 can also obtain incoming lines of image data directly from bus 80 for subsequent printing by the image printer.

Image buffer 70 contains approximately 2 Megabytes (Mbytes) of RAM which is sufficient to hold two complete bit-mapped images. This buffer functions as a frame store and provides temporary storage of image data during processing. One Mbyte of RAM is contained within CPU and buffer 40 and is used as an additional image or text buffer, as described below.

Inasmuch as bit-mapped data incoming over the LAN and originating from a scanning node is compressed, compressor/decompressor circuit 50 is used to initially decompress the bit-mapped data before any further image processing occurs. To provide decompression, the CPU directs bit-mapped image data for a frame into compressor/decompressor circuit 50 and then appropriately sets various control registers. Once this occurs, compressor/decompressor circuit 50 performs decompression without any further intervention by the CPU. As described in detail below, compressor/decompressor circuit 50 is fabricated using the Am7970 Compression/Expansion Processor integrated circuit manufactured by Advanced Micro Devices located in Sunnyvale, Calif. This integrated circuit is also capable of compressing an image; although image compression is not used in the RIP as described herein. Nonetheless, if RIP 20 were to be instructed to transmit a processed image over the LAN, then image compression could be used to minimize storage and transmission time. To do so, the processed image would first be compressed by compressor/decompressor circuit 50 prior to being transmitted over the LAN. Image compression would be invoked by the CPU in the same fashion as decompression. A block diagram of compressor/decompressor 50 is provided in FIG. 5 and discussed in detail below.

Lastly, the resolution of an incoming image produced by a scanning node seldom matches that of an image printer. Moreover, several different image scanners, having different resolutions, may be used in various scanning nodes. For that reason RIP 20 includes scaler circuit 60 which is used to expand or contract an image by any one of several pre-defined values. As a result, the resolution of a scanned image (typically 170-by-160 dots/inch for a microfilm scanner and 200-by-200 or 400-by-400 dots/inch for a paper scanner) can be readily matched to that of an image printer (typically 300-by-300 dots/inch). In addition, scaler circuit 60 can be used to expand a selected portion of an image by a desired amount to provide a zoom capability. A block diagram of scaler circuit 60 is provided in FIG. 6 and discussed in detailed below.

2. Interface and Rasterizer 30

Figure 3:
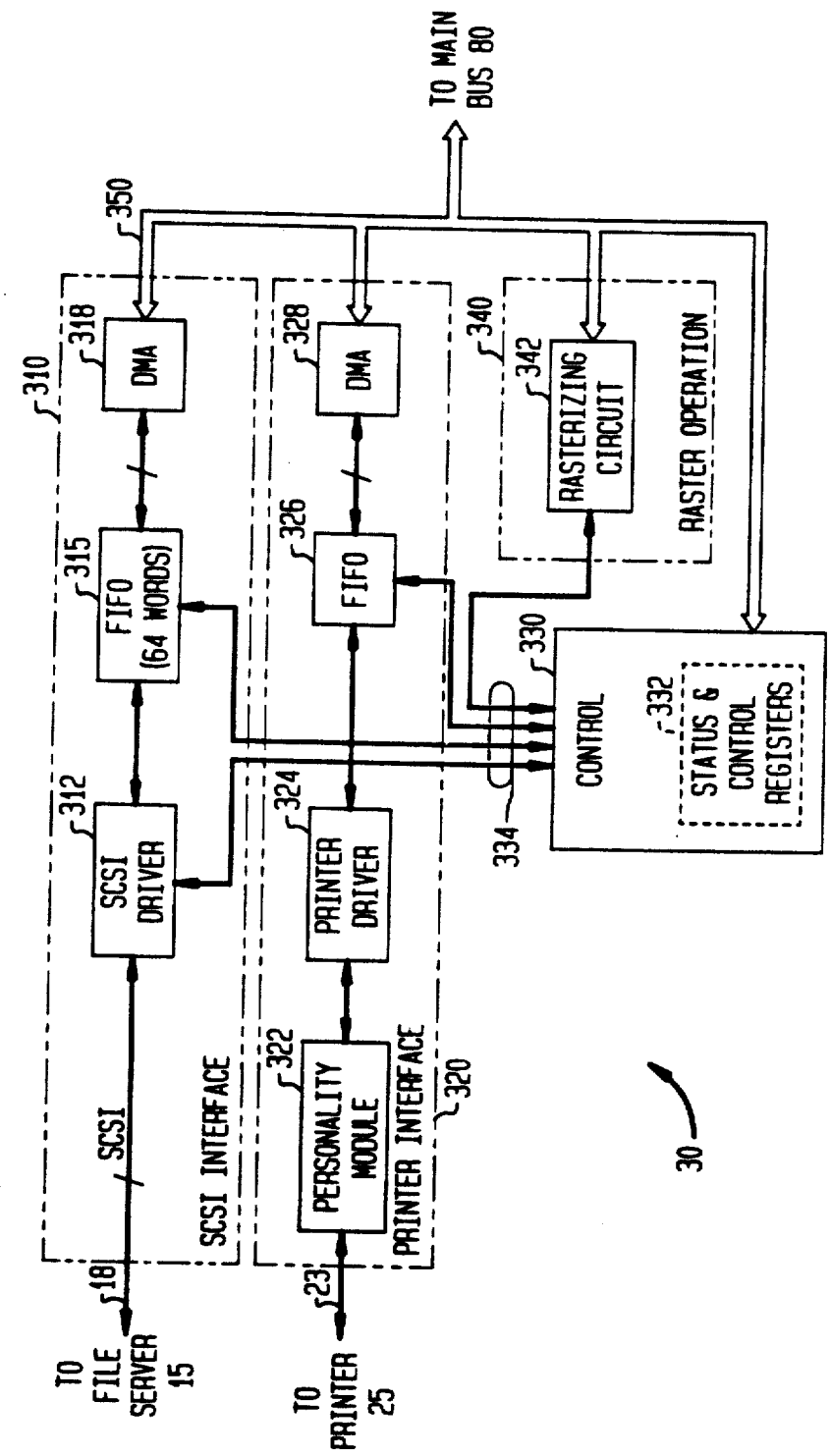
FIG. 3 shows a block diagram of Interface and Rasterizer 30 shown in FIG. 2.

FIG. 3 depicts a block diagram of interface and rasterizer 30. As depicted, interface and rasterizer 30 comprises SCSI interface circuit 310, printer interface circuit 320 and raster operation circuit 340 all connected to and controlled by control circuit 330.

Incoming SCSI commands originating from file server 15 and appearing over leads 18 are routed to SCSI interface 310. This interface comprises SCSI driver 312, first-in first-out (FIFO) circuit 315 and direct memory access (DMA) circuit 318. As soon as an incoming SCSI command is received by SCSI driver 312, the driver appropriately signals control circuit 330. This circuit then instructs SCSI driver 312 to begin extracting the data portion of the SCSI command and, in turn, route the data portion (containing the RIP command and accompanying image or text data) into FIFO 315 for temporary storage. Control 330 also applies appropriate control signals to the FIFO to permit it to accept this data. At the same time, control circuit 330 applies appropriate signals, via bus 350, to main bus 80 to inform the CPU of an incoming SCSI command. Specifically, control circuit 330 reads a length field (block count) occurring in the first incoming block of the SCSI command, as described in detail below in conjunction with FIG. 9, to ascertain the length in 512-byte blocks of the incoming SCSI command that is to be transferred to a SCSI command buffer located within buffer 44 (see FIG. 4 which will be discussed in detail below) situated within CPU and buffer 40. The CPU uses the length information to program DMA 318 as shown in FIG. 3 with an address of first and last locations of an available contiguous memory segment in the SCSI command buffer. Once this has occurred, the CPU appropriately signals control circuit 330 to transfer the SCSI command data, on a direct memory access basis using DMA circuit 318, between FIFO 315 and the specified memory locations within buffer 44. The FIFO is appropriately sized to provide an acceptably large buffer for temporarily holding incoming SCSI data while the CPU is setting up the data path. Once the SCSI command has been loaded into the SCSI command buffer located within buffer 44, then shortly thereafter, depending upon the particular RIP operation that is to be invoked, the CPU sets up a data path between buffer 44 and a particular destination RIP component. Once this occurs, the RIP command, residing within the SCSI command, is routed, on a DMA basis, from buffer 44 to a particular destination RIP component for further processing. For example, if a SCSI Print command containing a RIP Image command and compressed image data has just been received and stored within buffer 44, then this RIP Image command containing the compressed image data will be routed from buffer 44, on a DMA basis, to memory resident within the decompressor for temporary storage and, ultimately, decompression. Alternatively, if a SCSI Print command containing a RIP Download command and font data has just been received and stored within buffer 44, then this RIP command containing the font data will be routed, on a DMA basis, from buffer 44 to a section of the image buffer that has been reserved for font data.

SCSI interface 310 also operates in the reverse fashion to handle transfers initiated by the RIP to the file server. In this case, the CPU sets up a data path within the RIP between an originating RIP component and SCSI interface 310 by appropriately programming various bits within control registers that form a portion of registers 332. Once this occurs, DMA 318 is loaded with the first and last memory addresses at the originating RIP component of the information that is to be transferred into FIFO 315 from the originating component. A direct memory access transfer is then initiated using DMA circuit 318. At this point, information begins to enter FIFO 315 and, from there, is transmitted in block form over leads 18 by SCSI driver 18.

Control circuit 330 sets the values of various bits in its internal status registers, which form part of registers 332, to reflect the status (busy, inactive) of SCSI interface 310, printer interface 320 and raster operation circuit 340. This information is read by the CPU in setting up a data path involving any portion of interface and rasterizer 310. Control circuit 310 is preferably implemented using programmable logic arrays.

As noted, printer interface 320 and raster operation circuit 340 provide the appropriate circuitry to interface the image printer to main bus 80. In order to print data, the CPU first establishes a data path between an originating component of the RIP (typically an image buffer) and printer interface 320. Once the data path has been established, and appropriate starting and ending memory locations of the originating RIP component have been provided by the CPU to DMA circuit 328, data transfer into printer interface 320 begins. If the image data to be printed is in raster form, then this data is routed, on a direct memory access basis, from the originating RIP component, via bus 80, to FIFO 326 and, from there, to printer driver 324. This driver provides the appropriate protocols and voltage signal levels as required by the printer. Personality module 322, which is generally a hardwired wiring block, assures that the signal wiring appearing on leads 23 matches that required by image printer 25. The input-output wiring configuration appearing in the personality module will usually vary with different image printers. Now, alternatively, in the event the image data is in bit-mapped form, then this data is first routed to rasterizing circuit 340. This circuit, using rasterizing circuit 342, converts the bit-mapped image data appearing on main bus 80 into a bit-serial raster form and then routes the resulting raster data, via leads 334, to FIFO 326. Rasterizing circuit 342 is preferably a PMR 96016 Block Transfer (BLT) integrated circuit manufactured by Pacific Mountain Research, Inc. located in Seattle, Wash.

3. CPU and Buffer 40

FIG. 4 shows a block diagram of CPU and buffer 40. As shown, CPU and buffer 40 contains CPU 42 which is illustratively a well known microprocessor based system which utilizes a Motorola 68000 type 32-bit microprocessor. Besides a microprocessor, the CPU also contains timer 410 which provides a timing pulse every 212 milliseconds for use by 212 msec Interrupt Service Routine 1300 (see FIG. 13 and which will be discussed below). CPU 42 also contains internal data and address busses 425 and 435, respectively, and accompanying data and address bus drivers 420 and 430, respectively. Memory 428, which also forms part of CPU 42, includes ROM memory for program and constant storage and RAM memory for local data storage. Lastly, CPU 42 also includes interrupt controller 440 which monitors interrupt lines that form part of main bus 80 and prioritizes the interrupts occurring thereon. Certain of these interrupts are caused by requests from other RIP components for servicing by the CPU. For example, an interrupt is generated whenever an incoming SCSI command is detected by SCSI interface 310, a RIP component is requesting that a RIP command be transferred to another component or that such a transfer has just been completed.

CPU and buffer 40 also contains buffer 44 which contains approximately 1 Mbyte of RAM. This buffer is sufficiently sized to store incoming SCSI commands, textual data and font data that has just been downloaded from the host. In addition, buffer 44 also serves as a scratchpad RAM memory for user programs that are to be executed during image processing. Specifically, buffer 44 contains RAM 490 which is accessed from main bus 80 via address receivers 450 and data latches 460. For maximum speed, RAM 490 is advantageously implemented using dynamic RAM integrated circuits. Consequently, refresh address and timing circuit 480 is used to appropriately control the refresh cycle of the RAM.

4. Compressor/Decompressor Circuit 50

Figure 5:
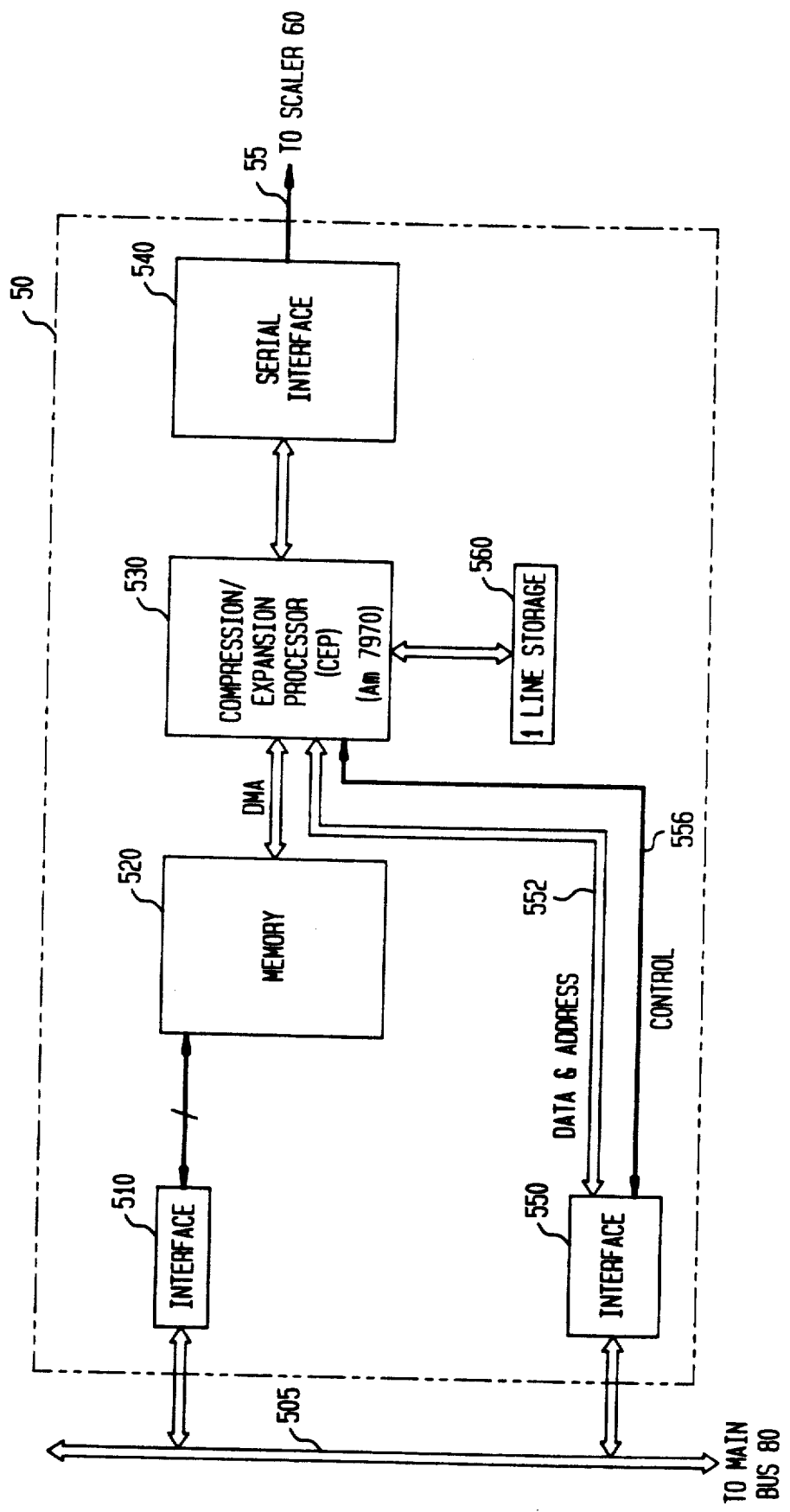
FIG. 5 shows a block diagram of Compressor/Decompressor 50 shown in FIG. 2.

FIG. 5 shows a block diagram of Compressor/Decompressor circuit 50. This circuit contains memory 520, Compression/Expansion Processor 530, serial interface 540, one line store 560 and interfaces 510 and 550. Interfaces 510 and 550 are bi-directional line drivers and receivers for interfacing I/O lines of memory 520 and compression/expansion processor 530 to bus 505 which is, in turn, connected to main bus 80.

As noted hereinabove, the Am7970 Compression/Expansion Processor (CEP) integrated circuit manufactured by Advanced Micro Devices forms Compression/Expansion Processor 530. The CEP compresses and expands decompressed bi-tonal bit-mapped image data using modified Huffman one-dimensional or modified READ two-dimensional run length coding as per CCITT standards T.4 and T.6. In two dimensional run length coding, a "K" parameter specifies the number of lines used in run-length encoding. The value of this parameter is specified to the CEP by an incoming RIP Image command appearing on main bus 80. After the CEP has decompressed any one line of bit-mapped image data and two-dimensional run length decoding is being used, then that decompressed line is stored in one line store 560 for use as a reference line by the CEP in decompressing the next line. Store 560 is fabricated using random access memory. Since the RIP described herein processes previously compressed bit-mapped images, the compressor portion of the CEP is not used.

Memory 520 is a dual ported 1 Mbyte frame store memory capable of storing 2 complete non-scaled bit-mapped images. Through this, the CEP is capable of processing one image occupying half of memory 520 while the other half of this memory is being simultaneously used to transfer image data on a DMA basis to or from another RIP component.

Serial interface 540 is used to transfer non-compressed bit-mapped image data produced by the CEP on a bi-directional bit-serial basis to scaler 60, via lead 55.

If a RIP command indicates that decompression is to be performed, then the CPU routes the RIP command and the accompanying compressed image data in block form to Compressor/Decompressor 50. The RIP command contains a header that has various fields which are used to appropriately program various control registers within CEP, specifying, for example, a desired value of the "K" parameter, desired values of various attributes that described certain characteristics of the image data and source and destination addresses. Once the CEP has been programmed, then the data portion of the RIP command, i.e. the image to be decompressed, is loaded into memory 520, via interface 510. In the event this memory is full or busy, then the CPU routes the entire RIP command to the image buffer in the event it has sufficient storage space available. When memory 520 becomes available, then the CPU transfers the entire RIP command to Decompressor/Compressor 50 and specifically routes the data portion to memory 520. Thereafter, interface 550 routes various control signals, via leads 556, to CEP 530 from main bus 80. Once a full frame of image data has been loaded into memory 520, the CPU loads a start processing code into a master control register within the CEP to initiate decompression of the image data existent within memory 520. Depending upon the destination address, the CEP can route decompressed image data either to memory 520 or to scaler 60, via serial interface 540 and lead 55. Various initial values are provided to the CEP during system initialization, via interface 550 and through busses 80, 505 and data and address bus 552, to program corresponding internal registers situated within the CEP, as will be discussed below in conjunction with CEP Initialize Routine 2300 (see FIG. 23).

5. Scaler 60

Figure 6:
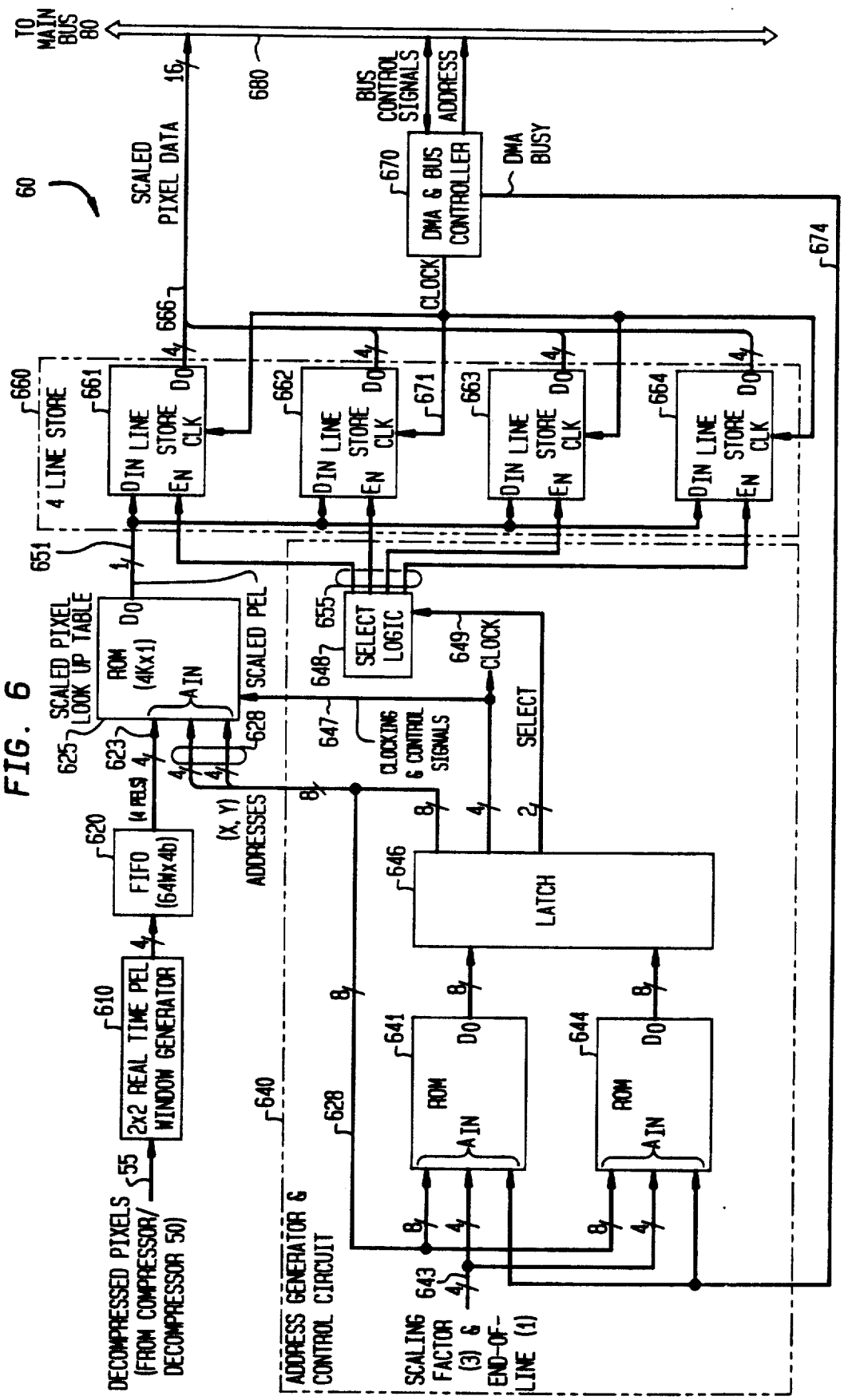
FIG. 6 shows a block diagram of Scaler 60 depicted in FIG. 2.

As noted, scaler 60 is used to expand or contract an image bit-map by any one of several pre-defined values. This permits the resolution of an scanned image (typically 170-by-160 dots/inch for a microfilm scanner and 200-by-200 or 400-by-400 dots/inch for a paper scanner) to be readily matched to that of an image printer (typically 300-by-300 dots/inch). Moreover, scaler circuit 60 can be used to expand a selected portion of an image by a desired amount to provide a zoom capability. Scaling occurs in real time as decompressed picture elements (hereinafter synonymously referred to as either pixels or pels) are provided from decompressor/compressor circuit 50. A block diagram of Scaler Circuit 60 is shown in FIG. 6.

As shown, scaler 60 contains 2 by 2 real time window generator 610, FIFO 620, scaled pel look up table 625, four line store 660, address generator and control circuit 640 and DMA and bus controller 670.

Within scaler 60, incoming decompressed pels are serially provided from decompressor 50, over lead 55, to real time window generator 610. This generator provides a real time moving square window of four pels which consists of the current pel, the previous pel and two corresponding pels situated below in the immediately preceding scan line. These four pels are simultaneously applied as input to FIFO 620, which, in turn, routes its outputs to scaled pel look up table 625. FIFO 620 is used to compensate for any disparity occurring in the throughput of real time window generator 610 and that of the remaining circuitry situated within scaler 60. Look up table 625 provides the value of one output pel based upon a window of four pels and a specified scaling factor. In particular, look up table 625 is a ROM that has been appropriately programmed to provide a value of a single output pel for every possible combination of pels that can form a 2 by 2 window and for every preselected scaling factor. The output pel (scaled pel) values stored in look up table 625 can be determined using any one of several scaling algorithms. For example, each such value can be obtained by calculating a two-dimensional bilinear interpolation of the values of the four pels that form the window and then suitably rounding the result. To do so, the following formula could be used to calculate the output pel value, OP, by interpolating the values, A, B, C, and D, of the four pels that respectively occupy the upper left, upper right, lower left and lower right positions in the window:

$$OP = A^*[(1-p)(1-q)] + B^*[q(1-p)] + C[pq] + D[p(1-q)]$$

where p and q are pre-defined weighting factors that have values which typically change with different scaling factors. Alternatively, the output pel values could be determined through other interpolative based scaling algorithms as taught in, for example, U.S. Pat. Nos. 4,528,693 (issued to K. A. Pearson et al on Jul. 9, 1985); 4,532,602 (issued to D. R. DuVall on Jul. 30, 1985); 4,587,621 (issued to D. R. DuVall on May 6, 1986); and 4,595,598 (issued to W. F. Anderson, Jr. et al on Jun. 17, 1986).

Both the four incoming pel values for the window and x and y addresses are applied as address information to the ROM over leads 623 and 628, respectively. For bi-tonal images, each location in the ROM is only be one bit wide; however, for grey scale or color images, each location in the ROM would need to store an appropriately larger number of bits in order to hold color or grey scale information. Thus, in operation, the location and value of an output pel in an image depends upon the value of the corresponding pels in the window and appropriate x and y addresses. The value of these addresses is dictated by the desired scaling factor. This scale factor determines the desired degree of expansion or contraction of an input decompressed image present in an output image. Clearly, the values of x and y scaling factors can be different to produce differing amounts of expansion or contraction along the x and y axes. By expanding only a portion of an image, scaler 60 provides a zoom capability. Since the x and y addresses are each four bits wide, 256 different values of expansion and compression (scaling factors) are provided.

Scaled pels are serially provided over lead 651 to four line store 660 which contains four separate single line stores 661, 662, 663 and 664. Each line store contains a shift register organized as 256 words by 16 bits and holds a complete line of scaled image data. Four separate single line stores are needed because maximum image expansion will produce four separate lines of scaled image data for every single incoming line. The line stores are successively filled with four scaled pel values, in the order of line stores 661, 662, 663 and 664. Once a group of four pel values have been stored in one line store, the next group of four pel values is stored in the next line store and so on. Hence, the first four groups of four pel values are sequentially stored in line stores 661, 662, 663 and 664. In operation, scaled pels are simultaneously applied to the data input of all four single line stores. However, select logic 648 applies a strobe pulse, via one of leads 655, to the enable input of only one of the line stores in order to load the scaled pel values into the line store. Appropriate clock pulses are provided by DMA and bus controller 670.

The line stores are read under the control of DMA and bus controller 670. As soon as a complete line has been scaled and stored in the line stores, that line of scaled pel values is ready to be transferred from scaler 60 onto bus 680 and, from there, to main bus 80. By the time this transfer is to occur, the data path over bus 80 between scaler 60 and a destination RIP component will have already been established by the CPU which has programmed into DMA 670 the addresses of the destination starting and ending memory locations for the transfer. To perform this transfer, DMA and bus controller 670 provides clock pulses, via lead 671, to all the line stores. All four line stores will simultaneously shift their contents out, via the digital output leads, onto leads 666. In this manner, 16 pel values will be simultaneously transferred onto bus 680 and, from there, onto main bus 80.

Address generator and control circuit 640 generates a portion of the addresses, i.e. the x and y addresses, applied to scaled pel look up table 625. This address portion, appearing on leads 628, is dictated by the value of the scaling factor specified in a RIP image command, as described below in conjunction with FIGs. 10a-10b. As shown, this circuit contains ROMs 641 and 644, and latch 646 all connected as a finite state machine. The address applied to these ROMs is formed of two portions: eight bits of feedback data from latch 646 and four bits of input data, namely, three bits specified by the scaling factor in the RIP image command and a one bit end of line (EOL) indicator that exists in the decompressed image data. The EOL indicator is extracted from the decompressed image data and applied to one of leads 643 by well known circuitry that is not shown. The 8-bit feedback portion is stored in latch 646 which, in turn, provides discrete output signals, eight bits of which are applied, via feedback path 628, to the address inputs of both of these ROMs. The feedback signals are also the x and y addresses applied over leads 628 to scaled pel look up table 625. Latch 646 also provides various clock and control signals on leads 647 to control look up table 625 and a 2-bit select signal on leads 649 for controlling select logic 648. The value of this select signal specifies the desired single line store located within four line store 660 that will be filled with scaled pel data.

In operation and immediately prior to the start of a new line—signified by an appropriate value of the end of line (EOL) signal appearing on leads 643, the feedback values appearing on leads 628 are zero. Therefore, at the occurrence of the first decompressed pel in that line and appearing over lead 623, the output of ROMs 641 and 644 will be solely dictated by the scaling factor value appearing on leads 643. At the next clock cycle, i.e. at the occurrence of the next decompressed pel on lead 623, a portion of the previously accessed contents of ROMs 641 and 644 will become the x and y addresses to scaled pel look up table 625 and will also be used as a portion of the addresses applied to these ROMs. These x and y addresses will select the appropriate bi-tonal pel value in table 625 given the desired scaling factor. This process continues with each successive decompressed input pel in the line. As each line of decompressed image data is scaled, the x and y addresses appearing on leads 628 will repetitively cycle through only four specific values corresponding to the particular value of the scaling factor specified in the RIP Image command. Each different value of the scaling factor will have a different set of four corresponding x and y addresses. In this manner, each set will only access the proper values in scaled pel look up table 625 that correspond to the scaling factor in use.

DMA and bus controller 670 provides a DMA busy signal on lead 674 which indicates whether the controller is busy. This signal is fed back over lead 674 to an address input of ROMs 641 and 644. In the event the controller is busy, then the ROMs provide an output which temporarily halts the scaling process until the DMA controller once again becomes available.

Figure 7:
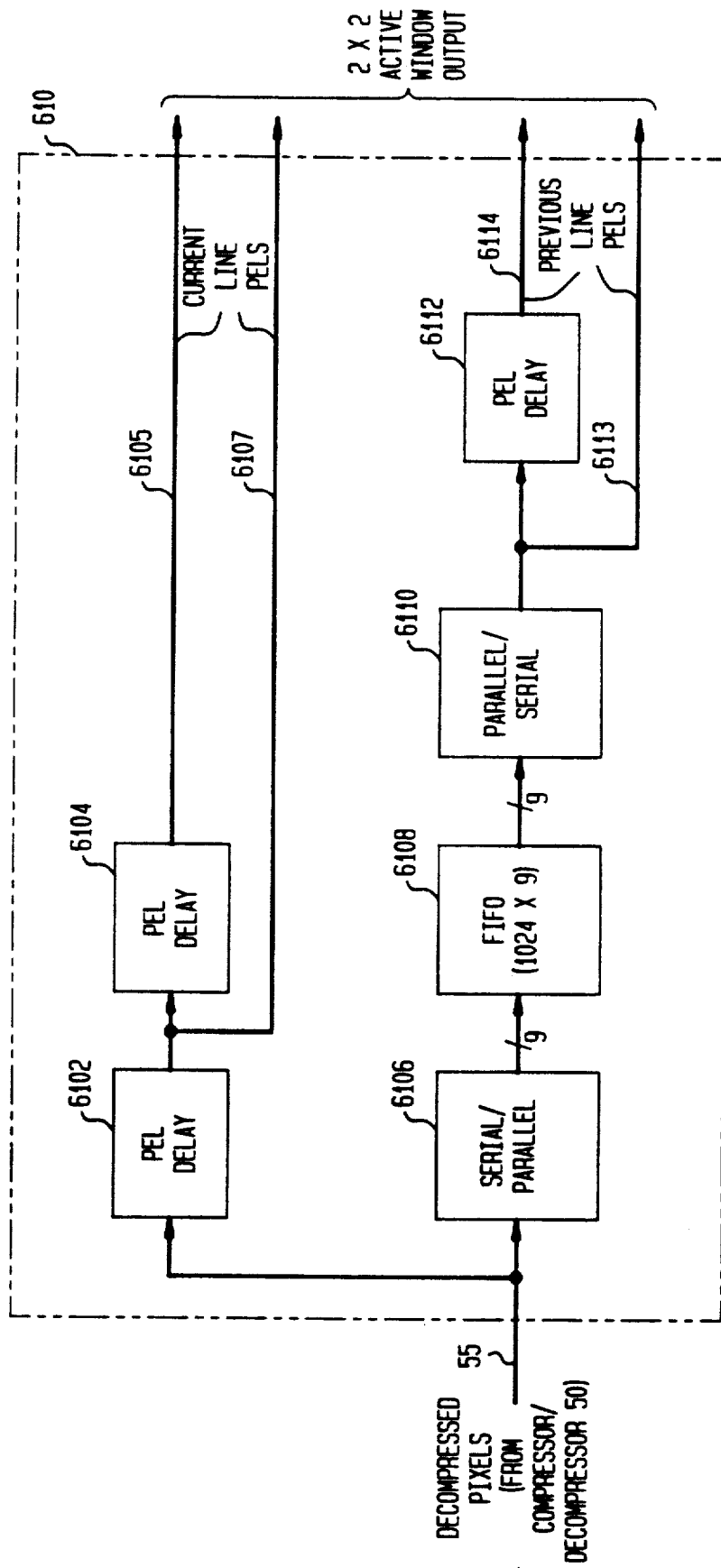
FIG. 7 shows a block diagram of 2×2 Real-time Pel Window Generator 610 depicted in FIG. 6.

FIG. 7 shows a block diagram of 2 by 2 real time pel window generator 610 depicted in FIG. 6. As noted above, this circuit produces a moving 2 by 2 pel window. This square window contains the present pel, the immediately preceding pel situated on the same line and the two corresponding pels situated immediately therebelow on the previous line. Specifically, incoming decompressed pels are applied over leads 55 to serially connected pel delay circuits 6102 and 6104 to produce the present pel on lead 6107 and the immediately preceding pel on lead 6105. In addition, incoming pel values are applied through serial/parallel converter 6106, FIFO 6108, parallel/serial converter 6110 and pel delay 6112 to produce the two corresponding pels situated on the previous scan line. Specifically, incoming pels applied over lead 55 are converted into parallel form by serial/parallel converter 6106 and, from there, applied as input to FIFO 6108. The FIFO provides a one line delay between its input and output. Therefore, at the instant incoming pels are written in 9-bit parallel form into FIFO 6108, corresponding pels situated on the same position but on the previous scan line appear at the output of the FIFO. The output pels are converted back into serial form by parallel/serial converter 6110 and applied through pel delay 6112. The pels correspondingly situated under the present and immediately preceding pels, both located on the present scan line, appear on leads 6113 and 6114, respectively. At the beginning of every new image, the window generator requires a period of only one line delay before it is capable of generating window data. This period is necessary to store the first line within FIFO 6108. Use of dedicated hardware components advantageously permits window generator 610 to operate at a 50 mHz throughput. This circuit could readily handle pel windows larger than 2 by 2 if more memory, pel delays, and serial/parallel and parallel/serial converters were added to the circuit and also the size of those components already existing in the circuit were appropriately increased.

6. Throughput Enhancements

Figure 8:
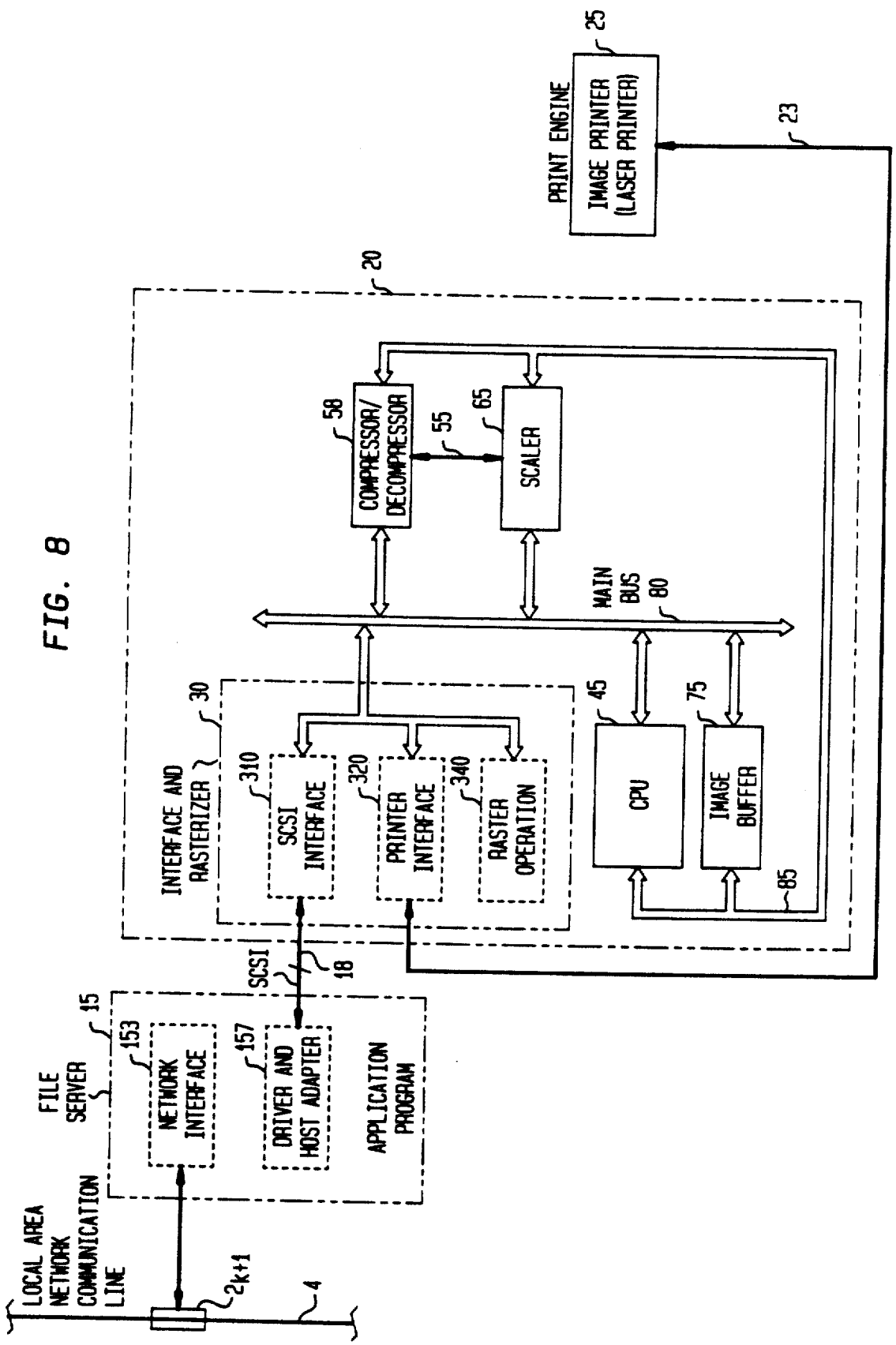
FIG. 8 shows a block diagram of a printer node and specifically depicts an alternate embodiment of RIP 20.

The throughput of the RIP shown in FIG. 2 can be advantageously increased by adding a second bus 85 to the architecture as shown in FIG. 8. As shown in FIG. 8, bus 85 interconnects CPU 45, image buffer 75, compressor/decompressor 58 and scaler 65. The RIP components interconnected by bus 85 are similar to those shown in FIG. 2 except for the addition of a second port and appropriate interfacing circuitry. This two bus architecture allows CPU 45 to define data paths between RIP components using either bus 80 or bus 85. Therefore, if a RIP component requests a data transfer and either bus 80 or 85 is busy, then the CPU need not wait until this bus becomes free prior to initiating a transfer but instead can define a data path utilizing the other bus and then initiate a transfer of information (RIP commands and/or data) thereover. In this manner, data can be simultaneously transferred over both busses 80 and 85. Inasmuch as this two bus architecture increases the degree of pipe-lining over that present in the architecture shown in FIG. 2, the throughput of the RIP and consequently of the entire image management system correspondingly increases again.

With respect to the individual RIP components, CPU 45, shown in FIG. 8, would be identical to CPU 40, shown in FIG. 4, with the addition of a second set of data and address drivers and a second interrupt controller (not shown) all interconnected between bus 85 and data and address busses 435 and 425. This permits microprocessor 470 to communicate with other RIP components over both busses 80 and 85. Image buffer 75, shown in FIG. 8, would be a dual ported RAM memory in lieu of single ported memory used to implement image buffer 70 shown in FIG. 2. Compressor/Decompressor 58 would utilize a triple ported memory in lieu of dual ported memory 520. Two of the ports would be separately interfaced through appropriate interface circuits connected to busses 80 and 85; while the third port would be connected, via a DMA channel to CEP 530, as shown in FIG. 5. In this manner, two data transfers can simultaneously take place involving the triple ported memory, while the CEP is processing an image. To ensure that sufficient memory space exists to accommodate three separate simultaneous transfers, the memory would need to be sufficiently large to accommodate three full images, i.e. at least 1.5 Mbytes in size.

Furthermore, to accommodate a dual bus architecture, scaler 65 would be substantially identical to scaler 60, shown in FIG. 6, with the addition of a second DMA and bus controller circuit (similar to circuit 670) to interface four line store 660 to bus 85. In this manner, scaled output pels could be directed to bus 85 if main bus 80 was busy. Inasmuch as most of the time required for compression, decompressing or scaling is not consumed in transfers of bit-mapped data but in actual image processing, i.e. executing the compression, decompression or scaling processes, throughput can be substantially increased by connecting both an additional compressor/decompressor circuit and an additional scaler circuit (compressor/decompressor and scaler circuit pair) to main bus 80 within the RIP. In this manner, two decompression/scaling processes can be simultaneously executing in parallel. The CPU could then transfer image data to either decompressor/compressor and scaler circuit pair that was not busy. Clearly, more than two such circuit pairs can also be included into the RIP to provide an even greater degree of parallel image processing than that possible with only two such circuit pairs. Now, to provide an even greater throughput of processed image data, each decompressor/compressor and scaler circuit pair could also include interfaces to both busses 80 and 85.

Lastly, throughput can also be increased by employing more than one printer interface, and accompanying image printers, (not shown) connected to bus 80. This increase can be heightened by connecting some of these additional printer interfaces to bus 85.

B. SCSI AND RIP COMMANDS

FIG. 9 shows the formats of the block form SCSI commands that occur between File Server 15 and RIP 20 over leads 18. The file server transmits two basic SCSI commands to the RIP: SCSI Print command 910 and SCSI Request Sense command 940. In response to a Request Sense command, as discussed below, the RIP transmits a one block SCSI command to the file server: SCSI Sense Data command 970.

Specifically, SCSI Print command 910 invokes a desired RIP operation based upon a request from the KIM host computer and also transfers a specified number of blocks (each being 512 bytes) of text or bit-mapped image data from the host, over the LAN via the file server, to the RIP. The application program executing in the file server generates this print command. Based upon the RIP operation specified within the SCSI Print command command, the RIP will first store this command in a software FIFO situated within the SCSI command buffer. Thereafter, when the RIP is ready to execute this command, the RIP will define a data path between this buffer and an appropriate RIP component and then route the data portion of the SCSI command (containing a RIP command and associated data) from the SCSI interface, via the SCSI command buffer situated within buffer 44, to this RIP component for processing.

The SCSI Print command, when received by SCSI interface 310 (see FIG. 2), is identified by the RIP through the "0A" operation code (op code) appearing in byte 0. Byte 1 contains three sub-op code ("SC") bits and two link ("L") bits. The sub-op code bits indicate which RIP command is being requested by the application program. Driver and host adapter 157 (see FIG. 2) situated within file server 15 appropriately sets the sub-op code field in response to a command generated by the application program and originating with a request provided by the KIM host computer. As shown, the value of the sub-op code field correspondingly varies between "01" and "06" depending upon whether the requested RIP command is an image, note, print, diagnose, text or diagnose operation. The block count field, situated in byte 4 of command 910, as shown in FIG. 9, specifies the number of blocks of image data that must be subsequently be transferred to the RIP for this SCSI print command if the sub-op code field signifies an RIP image, note, text or download operation. In the event the sub-op code field signifies a RIP print or diagnose operation, then no data will be transferred to the RIP and the block count field is set to "01". The RIP will merely carry out either of these two latter operations without requesting any data transfer. The link command is valid only if the sub-op code specifies a RIP image, note, text or download operation. For such operations, the link bits signify whether the data to be transferred has been partitioned into several successive blocks by driver and host adapter 157. In particular, if the link bits have been set to the value "00", then this indicates that the no data partitioning has occurred. Alternatively, if the value of the link bits is "01", "02" or "03", this indicates that partitioning has occurred and that the present block is the first, last or an intermediate block, respectively, in the SCSI Print command. The total block count 1 and 0 fields are valid only when the sub-op code field signifies an image, note, text or download operation and the value of the link bits has been set to either "00" or "01". The total block count field is organized with the most significant eight bits occupying byte 2 and the least significant eight bits occupying byte 3. If valid, the total block count fields indicate the total number of successive blocks that comprise the bit-mapped image or full set of font data. Alternatively, if the sub-op code field is set for a RIP print operation, then the total block count 0 field specifies the desired number of copies of an image that is to be printed. If the sub-op code field signifies a RIP diagnose operation, then the total block count 0 field specifies a code ("d") for a desired diagnostic operation that is to be executed by the RIP, as explained below in conjunction with the RIP Diagnose command. The total block count field 1 is ignored if the sub-op code field signifies either a RIP print or a diagnose operation. Byte five in the SCSI print command is zero-valued.

SCSI Request Sense command 940 is used by the file server to obtain the status of the RIP. This command is identified by the "03" op code appearing in byte 0. All the other bytes in this command are zero-valued.

Upon receipt of the SCSI Request Sense command, the RIP transmits a SCSI Sense Data command to the file server. This command merely contains data indicative of any errors occurring in the RIP and sensed by the CPU. In particular, this command contains two fields: a two bit "e" field which specifies the type of error that has been detected and a four bit "c" field which provides a code that indicates the particular error that has been detected. The error type bits take on: the value "0" if the error occurs within the image printer; the value "1" if the error is produced by the CEP while it performs image compression or expansion; the value "2" if the error is one not associated with any particular RIP component (such as a parity error, an inconsistent block count occurring within a RIP command, an illegal RIP command or the like); or, lastly, the value "3" if the error results from a diagnostic operation involving one of the RIP circuits (such as a memory checksum error). Illustratively, for image printer type errors, the "c" bits are set to the value "02" for no paper, "03" for a paper jam, "04" if the image printer is not ready and so on for other image printer related errors. The "c" bits are set to corresponding values for specific error conditions for the three other error types.

Figure 10:
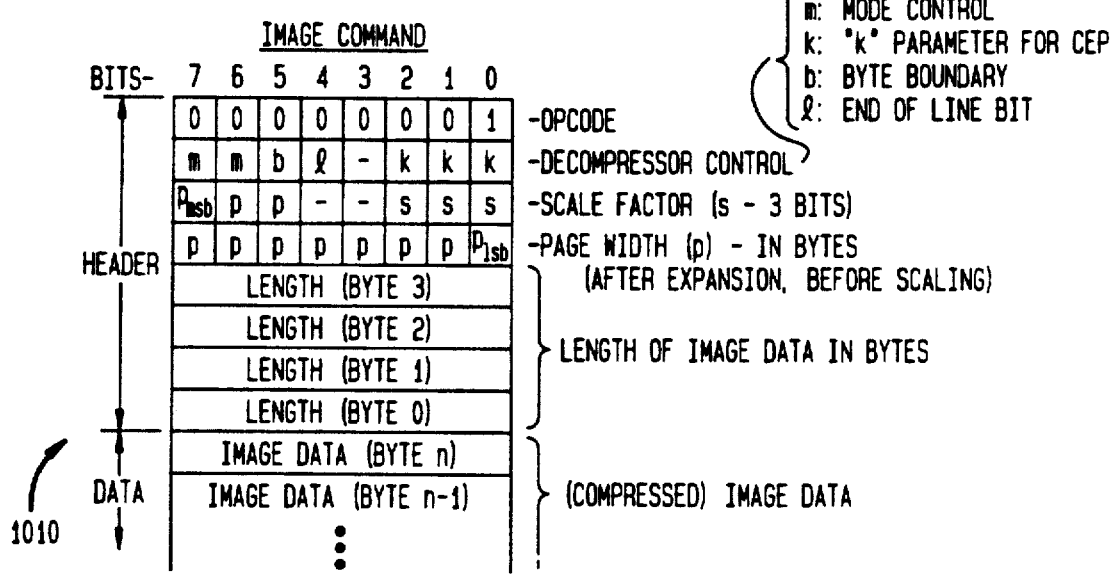
FIG. 10 shows the correct alignment of the drawing sheets for FIGS. 10a–10b.
Figure 10A:
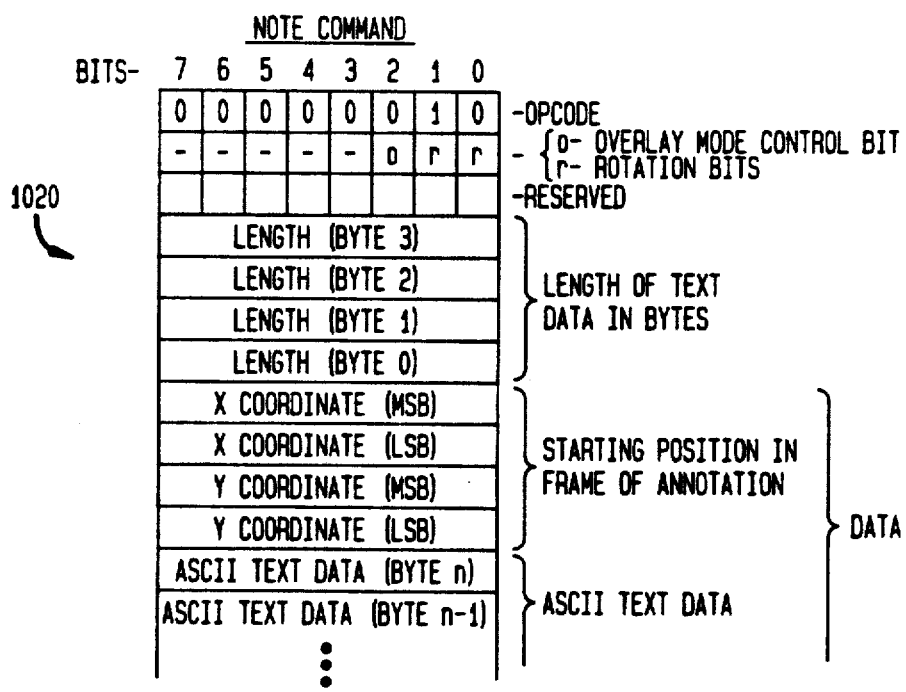

The formats of the RIP commands appearing on main bus 80 situated within RIP 20 (and on bus 85 in the embodiment shown in FIG. 8) are collectively shown in FIGS. 10a and 10b, for which the correct alignment of the drawing sheets is depicted in FIG. 10. As shown, the RIP commands include: RIP Image command 1010, RIP Note command 1020, RIP Print command 1030, RIP Diagnose command 1040, RIP Text command 1050 and RIP Download command 1060. As noted, these commands and their accompanying data form the data portion of a SCSI Print command that has been supplied to the RIP by file server 15. These RIP commands are then routed, in their entirety via buffer 44, for processing, to an appropriate RIP component over a data path defined by the CPU located within the RIP.

Specifically, RIP Image command 1010 informs the RIP that the accompanying bit-mapped image data will require decompression through the CEP. As with all RIP commands, the RIP Image command contains two portions: a header and data. This command is identified by the value "01" appearing as an op code in the header and more specifically as the first byte of the command. Thereafter, the two bit mode control ("m") bits, byte boundary control ("b") bit, the end of line ("l") bit and the three "k" parameter bits situated within this command are written by Compressor/Decompressor 50 into corresponding internal registers within the CEP to appropriately program its operation. The "k" parameter defines the period to be used for two dimensional run length decoding (decompression); this parameter has no meaning for non-compressed or one dimensionally compressed images. The three scaling ("s") bits specify the desired scale factor and are applied, within Compressor/Decompressor 50 by well known circuitry (not shown), as input to leads 643 (see FIG. 6) located within scaling circuit 60. The page width field ("p") bits specify the length of an image line after expansion and before scaling. The following four length bytes specify the length of the accompanying image data in bytes. Actual compressed image data follows the last length byte.

RIP Note command 1020 informs the RIP that the bytes in the accompanying data are to be interpreted as either printer emulation commands (illustratively for an EPSON type FX-80 printer—EPSON is a registered trademark of the Shinshu Seiki Corporation of Japan) or as ASCII text (the annotation). This command is identified by the value "02" appearing as an op code in the first byte of the command. An overlay mode control ("o") bit and two rotation ("r") bits appear in the second byte of the command. If the value of the overlay bit is zero, then the accompanying data will be rasterized and merged into (overlaid onto) the contents of the current memory frame (i.e. that portion of the image buffer that temporarily stores the current image). Alternatively, if the value of the overlay bit is "one", then the data will be written over a white background within the current memory frame. The orientation of the annotation will be governed by the value of the rotation bits, where the value "zero" specifies that the annotation will not be rotated and will run horizontally to the right of the origin, and the values "one", "two" and "three" respectively specify a "90", "180" and "270" degree rotation of the annotation. The following four length bytes specify the length, in bytes, of the accompanying data. The next four bytes specify X and Y coordinates (with the most significant bits occupying a full byte preceding that for the least significant bits) that designate the starting position, in terms of pixel addresses, within a frame where the annotation is to begin. As a reference, a starting position in which the values of both the X and Y coordinates equal zero specifies the pixel situated at the top, left corner (i.e. the first pixel in the image). In contrast, if the X coordinate equals the value "2399" and the Y coordinate equals the value "3199", then this specifies a pixel at the bottom, right corner of the image (i.e. the last pixel in the image). The X and Y coordinates always refer to the first pixel within the first text character that comprises the annotation. Specifically, when the value of the "r" bits equals "0", "1", "2" or "3", then the X and Y coordinates refer to the pixel at the left, top; left, bottom; right, bottom; or, right, top portion of the first text character that forms the notation.

RIP Print command 1030 instructs the RIP to direct the contents of the current frame to the image printer in order to print the image stored therein. This command is identified by the value "03" appearing as an op code in the first byte of the command. Eight number ("n") bits located in the third byte specify the number of times the contents of the current memory frame are successively routed to the image printer and hence the number of separate copies of the image that will be printed. If the value of the "n" bits equals zero, then 256 copies will be printed. Once the requisite number of copies has been printed, then the contents of the current memory frame are cleared.

RIP Diagnose command 1040 instructs the RIP to perform one or more specific diagnostic operations. This command is identified by the value "04" appearing as an op code in the first byte of the command. Each one of eight diagnostic code ("d") bits specifies a particular diagnostic that can be executed. Specifically, whenever bit 0 is set, this causes the CPU to route a known image to the image printer. Alternatively, whenever bit 2 or 3 are is set, a diagnostic test is performed jointly on compressor/decompressor 50 and scaler 60, or on the compressor/decompressor alone. Bit 4, when set, invokes a test of SCSI interface 310, printer interface 320 and raster operation circuit 340. Bits 5, 6 or 7, when set, respectively invoke separate tests on image buffer 70, CPU 40 and its associated RAM, and a separate checksum test on the ROM that forms part of memory 428 located within the CPU. If two or more bits are set, then multiple diagnostic operations are successively performed in a fixed descending prioritized order. The diagnostic for the highest order bit (e.g. bit 7 if set) that has been set is performed first and that for the lowest order bit (bit "0" if set) is performed last. If none of the diagnostic code bits is set, then a system reset operation —as explained below in conjunction with FIG. 11c—is performed. Inasmuch as no data accompanies a Diagnose command, the value of all four length bytes is set to zero.

RIP Text command 1050, shown in FIG. 10b, instructs the RIP to interpret the accompanying data as either printer emulation commands (illustratively for an EPSON type EX-80 printer) or as ASCII text. This command is identified by the value "05" appearing as an op code in the first byte of the command. This command, when executed, causes the RIP to parse any embedded printer emulation commands from the accompanying data and rasterize the ASCII text. The rasterize text is then routed to the image printer for printing. Only one copy is printed. The four length bytes specify the length, in bytes, or the accompanying data section. The data then follows the last length byte, on a byte-by-byte basis.

Lastly, RIP Download command 1060 instructs the RIP to store the accompanying data section in memory as font data. The length, in bytes, of the accompanying font data is specified in the four length bytes. A font must be downloaded to the RIP and acknowledged to the application program in the file server before the RIP will execute RIP Note or Text commands. For font data, the value of the download code bit ("c") bit is set to zero. In the event the "c" bit is set to the value "1", then the RIP will interpret the accompanying data not as font data, but instead as a program. The first four bytes of the font data section of the command will then specify the first address in memory where the program is to be loaded. The second four bytes will specify the starting address where program execution is to begin. The program then occupies the rest of the data section. In the case of a downloaded program, the length field includes the length of the program and both address fields. Once the RIP ackowledges that a program has been successively downloaded, the RIP will immediately begin executing it.

C. RIP SOFTWARE

1. Main Program

Figures 11, 11A:
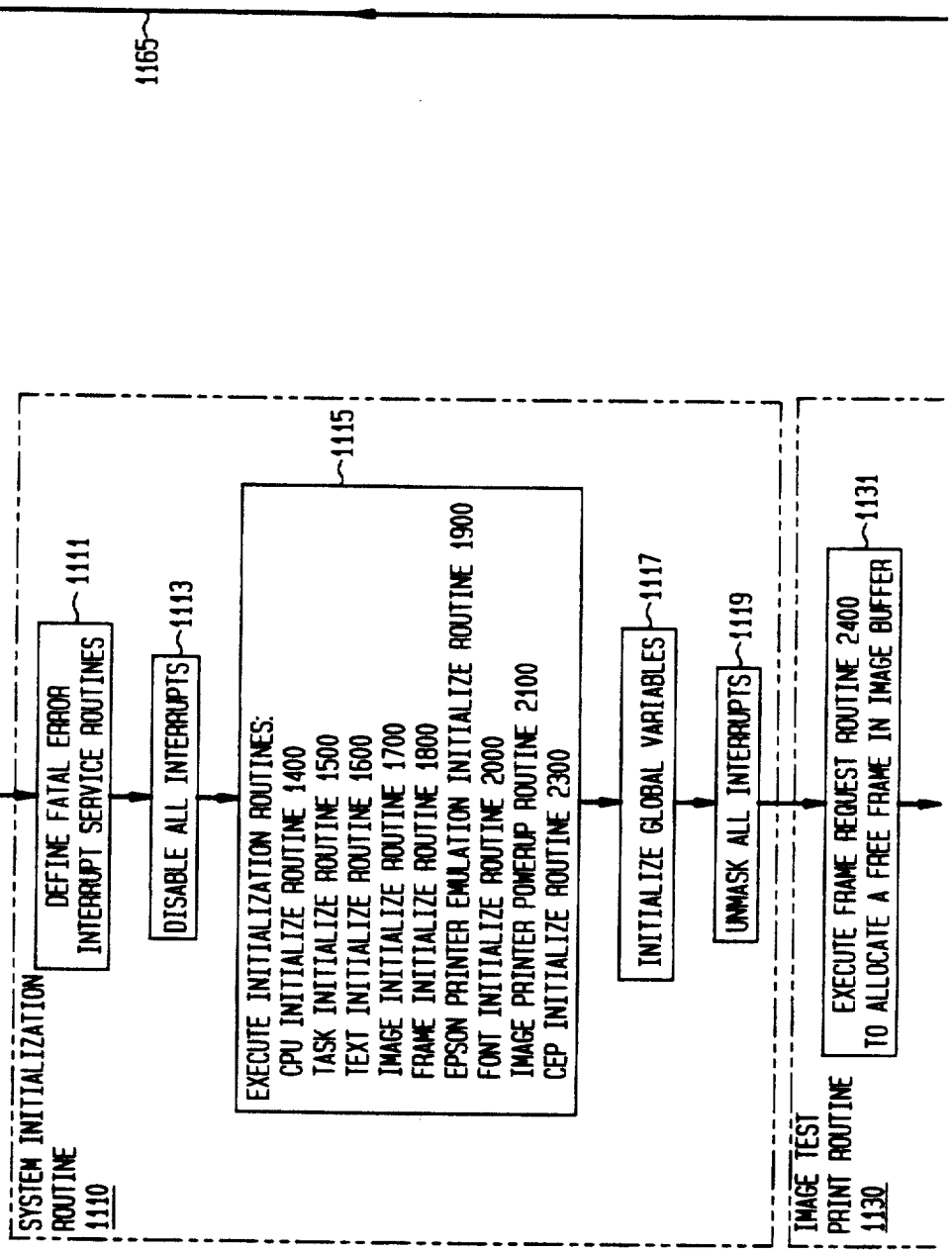
FIG. 11 shows the correct alignment of the drawing sheets for FIGS. 11a-11c.
FIGS. 11a-11c collectively show a flowchart of Main Program 1100.
Figure 11B:
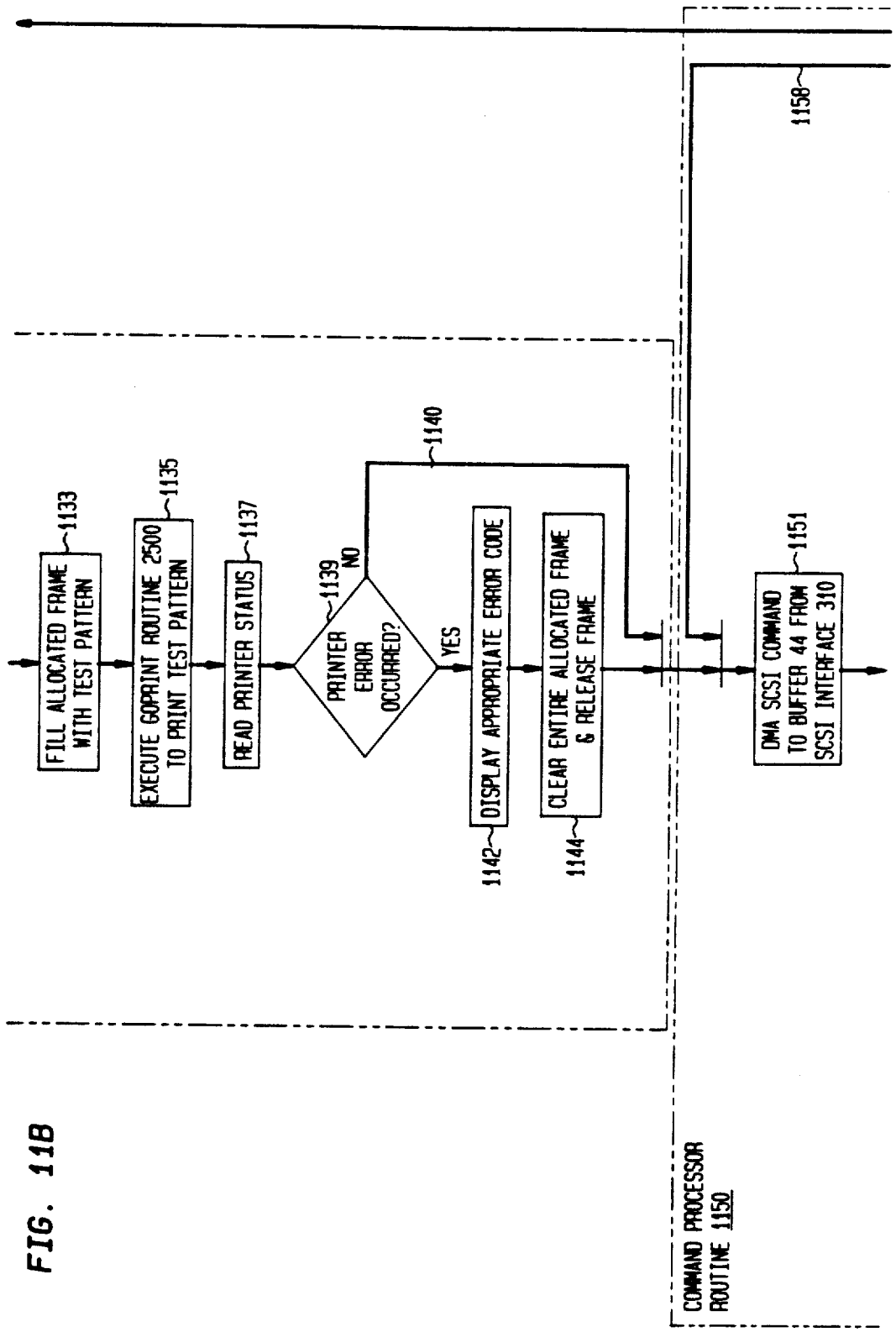
Figure 11C:
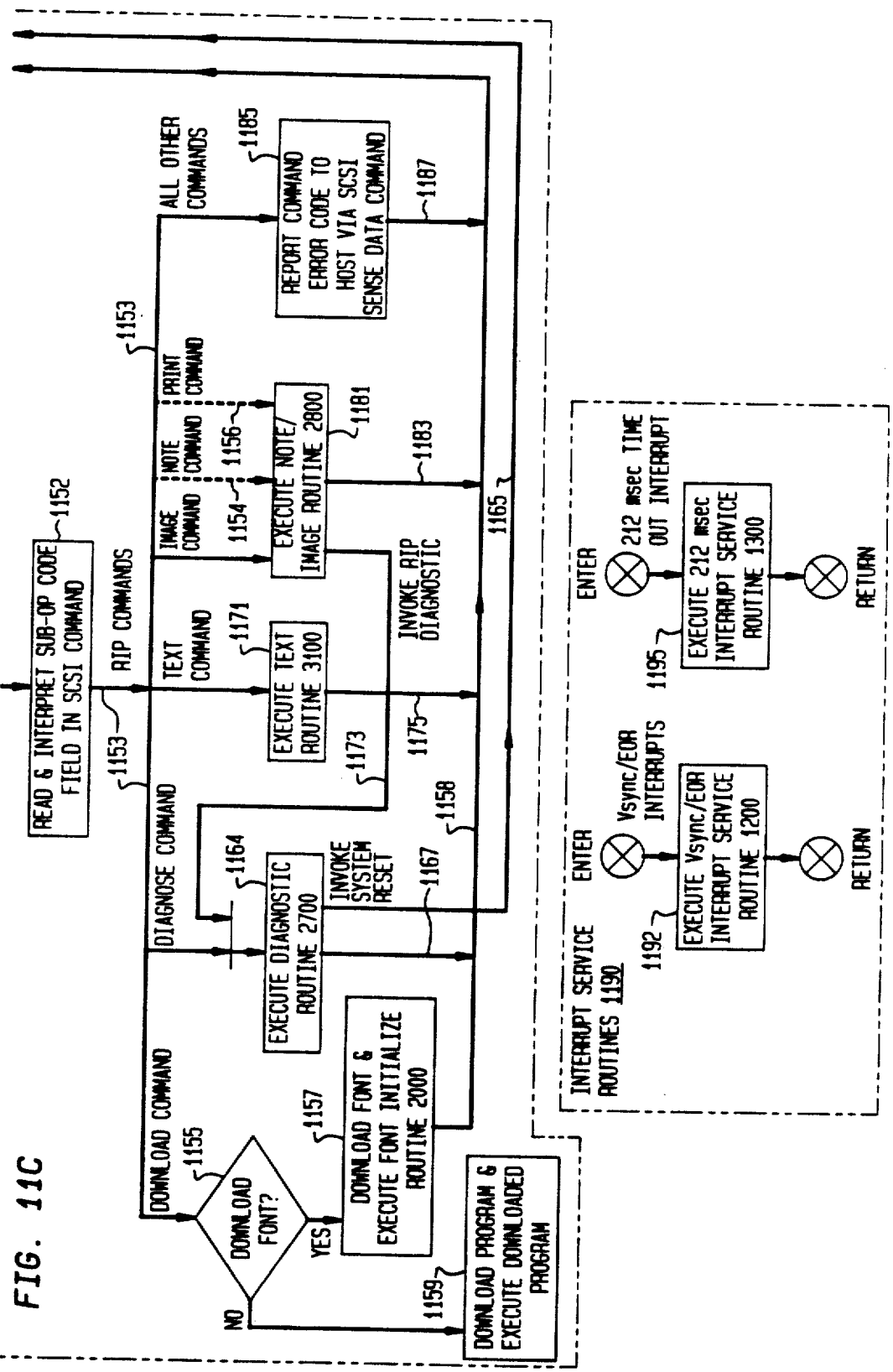

A flowchart of Main Program 1100 executed by the CPU located within the RIP is shown in FIGS. 11a-11c with the correct alignment of the drawing sheets for these figures depicted in FIG. 11.

As shown, the main program is comprised of a main loop containing: System Initialization Routine 1110, Image Test Print Routine 1130 and Command Processor Routine 1150. This loop continuously executes until an interrupt occurs, such as either a Vsync/EOR interrupt or a 212 millisecond interrupt —both of which will be discussed in detail below. When either of these interrupts occurs, execution of the loop will be temporarily suspended until either the Vsync/EOR or 212 msec interrupt service routine has fully executed.

Now, when power is first applied to the system, the RIP first executes a power on reset after which execution proceeds to System Initialization Routine 1110 to initialize the RIP. Within block 1110, execution first proceeds to block 1111 which, when executed, defines all the fatal error interrupt service routines. Fatal errors include an illegal instruction occurring within the program, a bus error, a zero divide, and address error, a privilege error and the like. Upon occurrence of a fatal error, an interrupt occurs and, in turn, causes an appropriate fatal error interrupt service routine to execute and indicate the error to the user and halt further execution. Execution can only be re-started through a power on reset. Once, block 1111 has been executed, execution proceeds to block 1113 which disables all interrupts other than the fatal error interrupts. Thereafter, execution proceeds to block 1115 which sequentially executes a number of initialization routines —as more fully discussed below: CPU Initialize Routine 1400 (see FIG. 14) for initializing the CPU and its associated components; Task Initialize Routine 1500 (see FIG. 15) for initializing various variables and pointers to the SCSI command buffer (a software FIFO where incoming SCSI commands are stored within buffer 44); Text Initialize Routine 1600 (see FIG. 16) for initializing various variables and pointers to a text buffer (situated within buffer 44) where incoming ASCII text characters are stored; Image Initialize Routine 1700 (see FIG. 17) for initializing various variables and for defining the available number of memory frames in the entire image buffer to be equal to a pre-determined maximum number; Frame Initialize Routine 1800 (see FIG. 18) for initializing various variables used in accessing individual memory frames and also setting the valve of a pointer to the next frame in the image buffer equal to the value associated with frame zero; EPSON Printer Emulation Initialize Routine 1900 (see FIG. 19) for clearing all emulation flags and setting various emulation variables equal to corresponding default values; Font Initialize Routine 2000 (see FIG. 20) for setting various pointers to select a default font and to appropriately set various parameters associated therewith Image Printer Powerup Routine 2100 for initializing the image printer controller; and, lastly, CEP Initialize Routine 2300 (see FIG. 23) for initializing the CEP present in decompressor/compressor 50 (see FIG. 5). After all these initialization routines have been executed, execution first passes to block 1117, as shown in FIGS. 11a-11c, to initialize various global variables and from there to block 1119 which, when executed, unmasks all interrupts. This completes the execution of system initialization routine 1110.

Execution now proceeds to Image Test Print Routine 1130 which causes a pre-defined test image to be printed by the image printer. Upon entry into this routine, execution proceeds to block 1131 which executes frame request routine 2400. This routine determines if a free frame of memory exists within the image buffer. If so, this frame is allocated to hold a pre-defined image for the test page. Thereafter, block 1133 is executed to fill the allocated frame with the pre-defined image, which is illustratively a diagonal line pattern running across the entire image. Once this has occurred, block 1135 invokes Goprint Routine 2500 (see FIG. 25 and discussed in detail below) which transfers a bit-mapped image. here the test image, stored within the current frame in the image buffer to the image printer and then instructs the printer to print that image. Thereafter, execution proceeds to block 1137 which, when executed, reads a status byte supplied by the image printer. This byte specifies the status of the printer. Decision block 1139 then executes to test the status byte to detect any printer errors. In the event a printer error has occurred, then execution proceeds, via the "YES" path from decision block 1139, to block 1142 which, when executed, displays an appropriate error code on an indicator to suitably alert an operator. Thereafter, execution proceeds to block 1144 which clears the allocated frame in the image buffer and releases that memory frame for subsequent use. Execution then proceeds either from block 1144 or via the "NO" path from decision block 1139 to exit from routine 1130 and proceed to Command Processor Routine 1150.

In essence, Command Processor Routine 1150 reads the present RIP command and performs the desired processing. In particular, upon entry into routine 1150, block 1151 is executed to transfer an incoming SCSI Command from SCSI interface 310 (see FIG. 3 and which has been discussed above), on a direct memory access basis over bus 80 using DMA circuit 318, to the SCSI command buffer located within buffer 44. Thereafter, block 1152, shown in FIGS. 11a-11c, is executed to read the sub-op code contained with the incoming SCSI command. As noted, this sub-op code specifies the RIP command that is contained as data within the incoming SCSI command (see FIG. 9 and which has been discussed above). Now, based upon the value of the sub-op code, block 1152 routes execution, via path 1153, to one of several blocks to execute the RIP command. A RIP Download, RIP Diagnose, RIP Text, or RIP Image command can occur at any time. RIP Print and RIP Note commands can only follow after a RIP Image command and, for that reason, are both shown as corresponding dotted lines 1154 and 1156.

If the sub-op code indicates that the RIP command is a download command, then execution proceeds, via path 1153, to decision block 1155 which determines whether a font or a user program is to be downloaded. As noted hereinabove, this is specified by the status of the download code ("c") bit located within the RIP Download command (see FIG. 10b). As shown in FIG. 11c, if a program is to be downloaded the value of the "c" bit is a one), then execution proceeds, via the "NO" path from decision block 1155 to block 1159. This latter block, when executed, downloads the user program into the RAM memory located within memory 428 (see FIG. 4), beginning at a specified address, and thereafter initiates execution of this program at a specified starting address, as explained above. Alternatively, if a font is to be downloaded, then exectution proceeds, via the "YES" path, from decision block 1155 to block 1157. This latter block, when executed, downloads the font into an appropriate portion of buffer 44 as the new default font and thereafter executes Font Initialize Routine 2000, as discussed in detail below in conjunction with FIG. 20, to initialize various parameters associated therewith. Execution then exits from block 1157, via path 1158, and then loops back to block 1151 in order to process the next RIP command.

Alterntively, if the sub-op code of the SCSI command indicates a RIP diagnose command, then execution proceeds, via path 1153, to block 1164 to invoke Diagnostic Routine 2700 (see FIG. 27 which is discussed in detail below). In the event, the diagnostic code specified within the RIP Diagnose command (diagnostic code bits "d" shown in FIG. 10) specifies a system reset (bits "d" are all zero), then routine 2700 redirects execution, via path 1165, back to the entry point of System Initialization Routine 1110 to re-initialize and thereby reset the entire RIP system. If, however, the diagnostic code is non- zero, then Diagnostic Routine 2700 executes the specific diagnostic operation(s) specified by the diagnostic code. Thereafter, as shown in FIG. 11c, execution exits from block 1164 and loops back to block 1151, via paths 1167 and 1158.

Now, in the event, the sub-op code specifies a RIP text operation, then execution is routed, via path 1153, to block 1171. This block, when executed, invokes Text Routine 3100 (see FIG. 31 and discussed in detail below). Thereafter, as shown in FIG. 11c, execution loops back to block 1151, via paths 1175 and 1158.

Alternatively, if the sub-op code specifies a RIP image command, then execution proceeds, via path 1153, to block 1181. When executed, this block invokes Note/Image Routine 2800 (see FIGS. 28a-28c which are discussed in detail below). This routine routes image data to an avialable frame of memory, decompresses and then scales the decompressed image data, if necessary, and reads and executes the next RIP command which can only be a Diagnose, Print or Note command. If the next command is a Diagnose command, then execution passes, via path 1173, to block 1164. If, on the other hand, the next RIP command is a RIP Print or RIP Note command (indicated aby dotted lines 1154 and 1156), then this next command is appropriately executed within routine 2800 as explained later in conjunction with FIGS. 28a-28c. After either the print or note command has been fully executed, then execution loops back, via paths 1183 and 1158, to block 1151.

Now, if the sub-op code specifies a command other than those discussed above or a note or print command not preceded by an image command, then a command error has occurred. In this case, execution proceeds, via path 1153, to block 1185 which reports this error to the host, by instructing the file server to send a SCSI Sense Data command containing an appropriate error code to the host, as discussed above. Thereafter, execution loops back, via paths 1187 and 1158, to block 1151.

While either Image Test Print Routine 1130 or Command Processor Routine 1150 is executing, one or more of several different non-fatal interrupts will normally occur. With the exception of three image printer related interrupts, which will be discussed shortly, all the other interrupts are used to signal the CPU that a RIP component is requesting service or for other well known administrative tasks. In particular, SCSI interface 310 (see FIG. 2) generates an interrupt whenever it receives a SCSI command from the file server. Generally speaking, whenever any interrupt occurs, execution jumps to Interrupt Service Routines 1190 to execute an appropriate interrupt service routine. Inasmuch as these other interrupts are well known, the associated service routines are not shown nor will these interrupts be discussed any further.

Now, with regard to the image printer, three printer related interrupts occur as part of the normal printing process in order to properly synchronize the timing of the image printer (a laser printer) to that of the CPU. These interrupts are the Vsync (vertical synchronization), EOR (end of raster) and 212 msec (millisecond) interrupts. These interrupts occur during execution of Image Test Print Routine 1130 and Command Processor Routine 1150. Specifically, once the image printer has been signaled to begin printing, the Vsync interrupt is generated by the image printer as soon as a photoconductive drum located within the printer begins turning and thereby begins feeding in a blank sheet of paper. In response to this interrupt as discussed below, execution jumps to block 1192 to invoke Vsync/EOR Interrupt Service Routine 1200 (see FIGs. 12a and 12b, which will be discussed in detail below). In response to the portion of this routine that services the Vsync interrupt, the CPU sets up a data transfer from the current memory frame to the image printer. However, due to the internal circuitry of the image printer, 212 milliseconds must elapse to enable the drum to rotate beyond a non-printable area at which point, but not sooner, will the printer accept incoming data. Therefore, the CPU also programs timer 410 (see FIG. 2) to generate a pulse at the end of a 212 millisecond timing interval. Execution then returns to the main loop within main program 1100. After 212 milliseconds has elapsed, timer 410 generates a 212 msec interrupt. Whenever this occurs, execution jumps to block 1195, as shown in FIGS. 11a-11C, 212 msec Interrupt Service Routine 1300 (see FIG. 13 which is discussed in detail below). This service routinge, when executed, initiates a data transfer between the current memory frame and the image printer. As soon as the image printer reaches the end of each line on a page, i.e. a laser situated within the printer has scanned all the way across the photoconductive drum, then the image printer generates an EOR interrupt to the CPU which again jumps to block 1192, as shown in FIGS. 11a-11c, to execute Vsync/EOR Interrupt Service Routine 1200. The portion of this routine that services the EOR interrupt merely determines whether there are more lines and pages to print. If so, the printer is instructed to continue rotating the drum; if not, the printer is instructed to stop after the it has dispensed the present sheet of paper. Thereafter, execution returns to the main loop within Main Program 1100.

2. Vsync/EOR and 212 msec Interrupt Service Routines

Figure 12B:
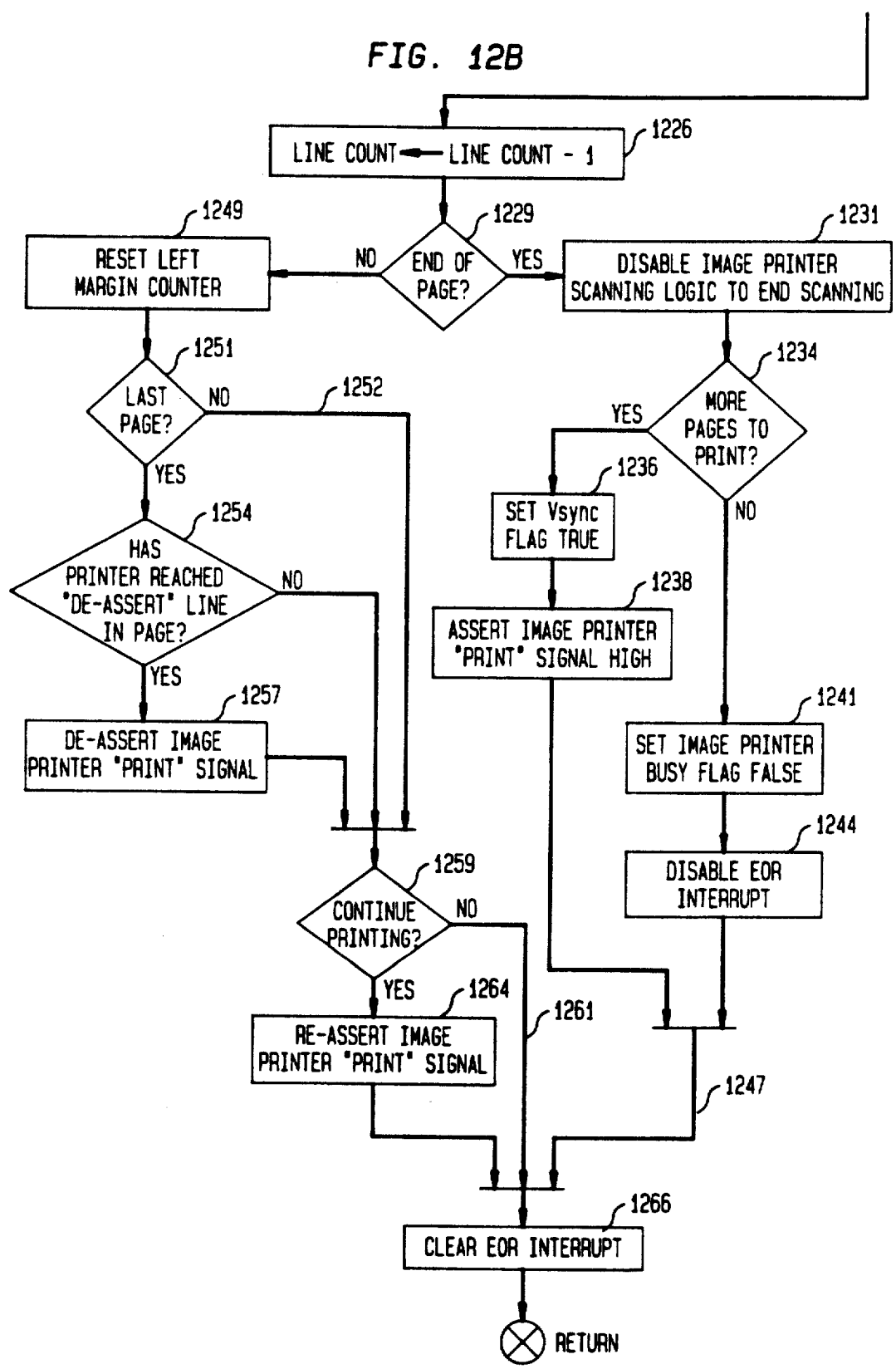

A flowchart of Vsync/EOR Interrupt Service Routine 1200 is shown in FIGS. 12a and 12b, for which the correct alignment of the drawing sheets for these figures is depicted in FIG. 12.

Upon the occurrence of either a Vsync or EOR interrupt, execution enters routine 1200 and is directed to decision block 1201 which, in the case of a Vsync interrupt, routes execution to path 1203 or, in the case of an EOR interrupt, routes execution to path 1202.

In the event of a Vsync interrupt, execution proceeds, via path 1203, to block 1204. This block acknowledges the occurrence of a Vync interrupt that has been generated by the printer by toggling (strobing) a vertical sync control line running to the printer. Thereafter, execution proceeds to decision block 1207 which tests whether the page that is to be printed is a last page in a current print task. If so, then execution proceeds to block 1209, via the "YES" path from decision block 1207. Block 1209, when executed, sends an instruction to the image printer to set an internal auto clear signal line in order for the printer to clear its internal frame store in preparation for the next printing task. Thus, after the current page has been fully printed, the printer will automatically clear (zero) this frame store. Alternatively, it the present page is not the last page in the current print task, then execution is routed, via the "NO" path emanating from decision block 1207, to block 1211 which sends an appropriate instruction to the image printer to reset the internal auto clear signal. After either block 1209 or block 1211 has executed, block 1214 is executed. This block loads the starting address of the image stored in the current memory frame into a scan pointer in the CPU. This pointer will subsequently be used to initiate a DMA transfer of the image from the current memory frame in the image buffer to the printer interface. Thereafter, block 1217 is executed to define the value of various default printing parameters, such as line count, left margin position and word count/line. Once this occurs, execution passes to block 1220 which loads the value of the scan pointer and the defined default printing parameters into FIFO 326 situated within the printer interface (see FIG. 3) to queue the printing task for subsequent transfer to the image printer. At this point, block 1223, as shown in FIGS. 12a and 12b, is executed to enable the 212 msec interrupt to occur. Specifically, this block first programs timer 410 located within the CPU (see FIG. 4) to generate a 212 millisecond timing pulse and then enables the timer. This pulse produces the 212 msec interrupt. This completes the portion of Vsync/EOR interrupt service routine 1200 that services the Vsync interrupt. Consequently, execution exits from routine 1200 and returns to the main loop in main program 1100 (see FIG. 11).

Now, alternatively, as shown in FIGS. 12a and 12b, if an EOR interrupt occurs, then execution proceeds from decision block 1201, via path 1202, to the portion of Vsync/EOR interrupt service routine 1200 that services the EOR interrupt. This portion sets up the image printer to print the next line. Specifically, execution first proceeds to block 1226 which subtracts one from the current value of a line count variable. Next, decision block 1229 is executed to test whether the end of the page has been reached, i.e. whether the value of the line count equals zero.

If the end of the page has not been reached, then execution is directed, via the "NO" path from decision block 1229, to block 1249. This latter block, when executed, resets the left margin counter situated within the image printer. Thereafter, decision block 1251 is executed to determine if the last page is being printed. If the next page to be printed is not the last page in the current printing task, then execution proceeds, via "NO" path 1252 from this decision block, to decision block 1259. This latter decision block determines whether printing is to continue. If so, execution proceeds, via the "YES" path from this decision block, to block 1264 which re-asserts the "PRINT" control signal (sets it to a high state) supplied as input to the image printer by the printer interface. Execution then passes to block 1266. This control signal ensures that the image printer continues to print the current page. If, on the other hand, printing is not to continue, then execution is routed over the "NO" path from decision block 1259 to block 1266. In this case, the "PRINT" control signal remains de-asserted (reset) and printing halts. When executed, block 1266 clears the EOR interrupt. At thi point, execution of the portion of the Vsync/EOR interrupt routine that services the EOR interrupt has been completed. Consequently, execution exits from routine 1200 back into the main loop in main program 1100 (see FIG. 11). Now, alternatively, if decision block 1251 determines that the next page to be printed is the last page in the current printing task, then execution proceeds, as shown in FIGS. 12a and 12b, via the "YES" path from this decision block, to decision block 1254. This latter decision block determines whether the photoconductive drum within the printer has advanced to a specific position, sometimes referred to as the "de-assert" line, where the printer can be instructed to stop prior to the next printing task. If the drum has reached this position, then execution proceeds, via the "YES" path, from decision block 1254 to block 1257 which de-asserts (resets) the "PRINT" control signal supplied as input to the image printer by the printer interface. Execution then passes to decision block 1259, which has just been discussed.

Now, if decision block 1229 determines that the end of the page has been reached, then this decision block routes execution to block 1231. This block, when executed, disables the scanning logic situated within the image printer. This prevents the image printer from accepting any further image data. The scanning logic is enabled by 212 msec Interrupt Service Routine 1300 (see FIG. 13) which will be discussed shortly. Thereafter, as shown in FIGS. 12a and 12b execution proceeds to decision block 1234. This block determines whether there are any additional pages to be printed in the current printing task. If there are additional pages to print, then execution is directed, via the "YES" path from this decision block, to block 1236 which sets the state of the Vsync flag true. This flag, when set, indicates that the next interrupt will be a Vsync interrupt. Thereafter, block 1238 is executed to assert the "PRINT" control signal applied to the image printer. Execution then proceeds, via path 1247, to block 1266, which has been previously discussed. Alternatively, if there are no more pages to print, then decision block 1234 routes execution, via its "NO" path, to block 1241. This block sets an image printer busy flag false, thereby indicating that the image printer is available for the next printing task. Thereafter, block 1244 is executed to disable the EOR interrupt. This interrupt is initially enabled by execution of 212 msec Interrupt Service Routine 1300 (see FIG. 13) which will be discussed shortly. After the interrupt has been disabled by block 1244, execution then proceeds, via path 1247, to block 1266, which has been previously discussed above.

Figure 13:
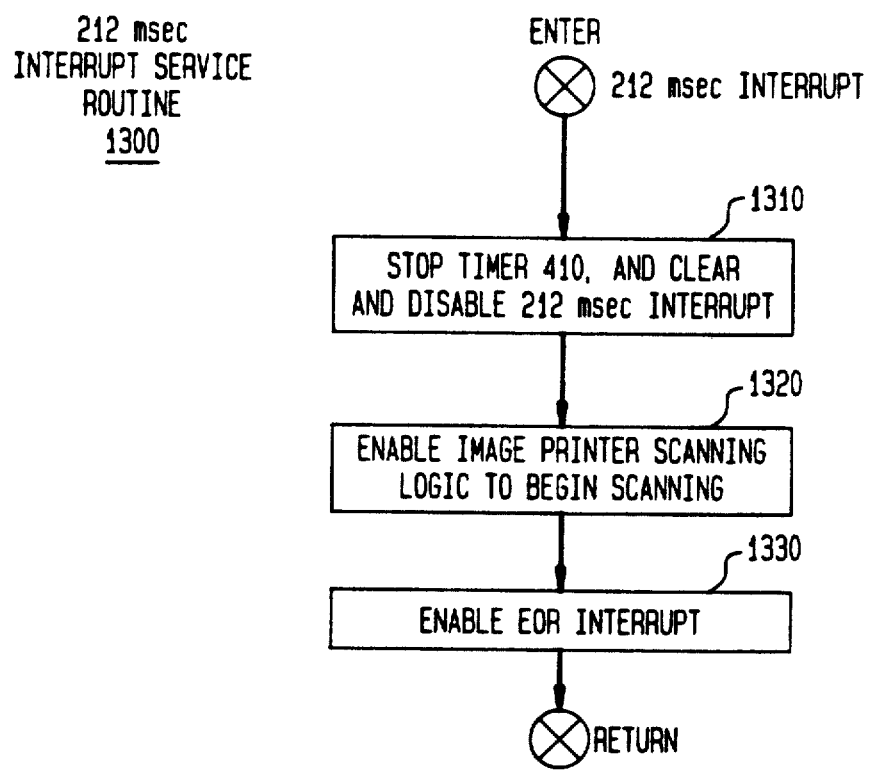
FIG. 13 shows a flowchart of 212 msec Interrupt Service Routine 1300 that is also executed as part of Interrupt Service Routines 1190.

A flowchart of 212 msec Interrupt Service Routine 1300 is shown in FIG. 13. Upon entry into this routine, at the occurrence of a 212 msec interrupt, execution is first routed to block 1310. This block, when executed, stops timer 410, clears the 212 msec interrupt and then disables this interrupt from re-occurring. This interrupt will be re-enabled during printing of a next page and specifically in response to the next Vsync interrupt and execution of Vsync/EOR Interrupt Service Routine 1200, as discussed above. Once block 1310 has executed, execution proceeds to block 1320 to enable the scanning logic located within the image printer. In essence, printer interface 320 provides a signal to the image printer indicating that the interface is ready to transmit data to the printer. At this point, the image printer acknowledges this signal thereby causing the CPU to initiate a data transfer from printer interface 320 to the image printer. Once this logic has been enabled, block 1330 is executed to enable the EOR interrupt. At this point, execution of 212 msec Interrupt Service Routine 1300 has been completed and returns to the main loop within Main Program 1100.

3. Initialization Routines

As noted, block 1115 located within System Initialization Routine 1110 of Main Program 1100 (see FIG. 11 and discussed above) executes various initialization routines: CPU Initialize Routine 1400; Task Initialize Routine 1500; Text Initialize Routine 1600; Image Initialize Routine 1700; Frame Initialize Routine 1800; EPSON Printer Emulation Initialize Routine 1900; Font Initialize Routine 2000; Image Printer Powerup Routine 2100 and CEP Initialize Routine 2300. Each of these initialization routines will now be specifically discussed.

a. CPU Initialize Routine 1400

Figure 14:
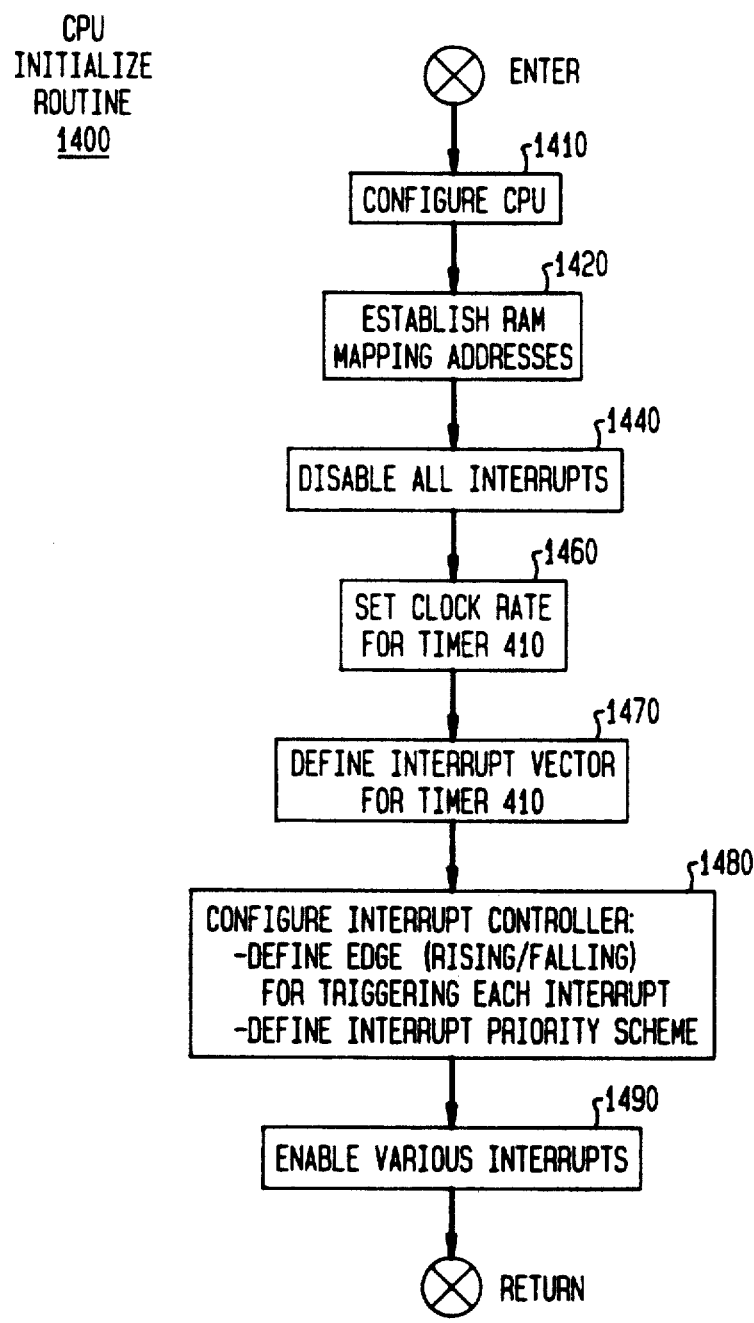
FIG. 14 shows a flowchart of CPU Initialize Routine 1400 that is executed within System Initialization Routine 1110 that forms part of Main Program 1100 depicted in FIGS. 11a-11c.

A flowchart of CPU Initialize Routine 1400 appears in FIG. 14.

Upon entry into this routine, execution is routed to block 1410. This block appropriately configures the Motorola 68000 microprocessor used in the CPU. Thereafter, block 1420 is executed to establish a table of RAM mapping addresses which specifies the address space of all the RAM memory existing in the RIP. Of this memory, 3 Mbytes comprises the buffer 44 located within CPU 40 and image buffer 70 (see FIGS. 2 and 4) and an additional 1 Mbyte is located within the Compressor/Decompressor. Next, block 1440, as shown in FIG. 14, is executed to temporarily disable all the interrupts. Thereafter, execution passes to block 1460 which sets the clock rate for timer 410 (see FIG. 4). Once this has occurred, block 1470 is executed to define the interrupt vector for timer 410. Next, block 1480 is executed to configure interrupt controller 440 (see FIG. 4) located within CPU 40. This entails defining whether an interrupt will be triggered on the rising or falling edge of each interrupt line and defining a priority scheme among all the possible interrupts. Once this has been accomplished, execution proceeds, as shown in FIG. 14, to block 1490 which enables certain interrupts, i.e. those not specifically enabled as part of any interrupt service routine, as discussed above. This now concludes the execution of CPU Initialize Routine 1400. At this point, execution returns to block 1115 situated within Main Program 1100.

b. Task Initialize Routine 1500

Figure 15:
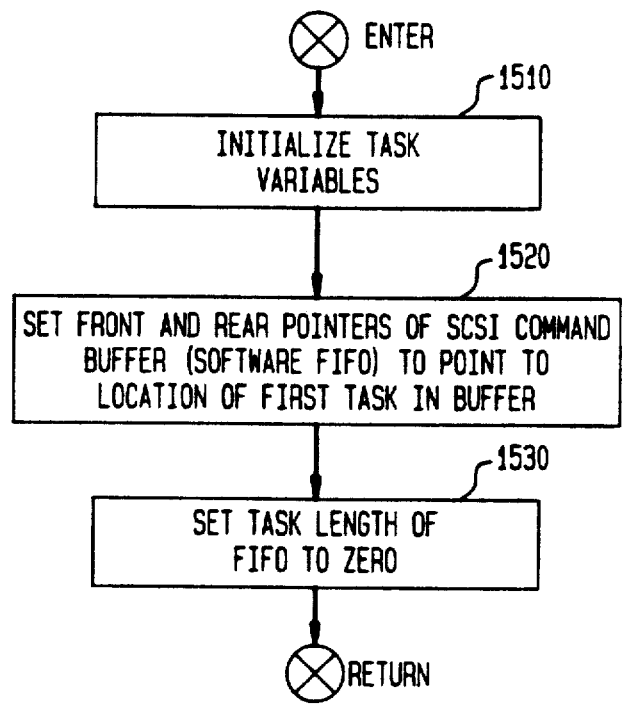
FIG. 15 shows a flowchart of Task Initialize Routine 1500 that is also executed within System Initialization Routine 1110.

FIG. 15 shows a flowchart of Task initialize Routine 1500. As noted, this routine initializes various variables and pointers used in conjunction with the SCSI command buffer where incoming SCSI commands are stored. This buffer, as noted, is implemented as a software FIFO and is situated within buffer 44. Specifically, upon entry into routine 1500, various variables associated with processing incoming SCSI commands are initialized by execution of block 1510. Thereafter, block 1520 is executed to set front and rear pointers to the software FIFO to point to the location of the first task in the FIFO (i.e. task zero). Next, block 1530 is executed to set a software task length counter to zero. This counter monitors the number of pending SCSI commands stored within the software FIFO and hence awaiting service. Whenever the contents of this counter are zero, this indicates that this FIFO is completely empty and hence no SCSI commands are pending. Though not part of this initialization routine, as the FIFO fills with incoming tasks, the CPU adjusts the pointers to point to the first and last tasks in the FIFO and also sets the value stored within the task length counter to reflect the number of separate SCSI commands stored within the FIFO. Once block 1530 has been executed, execution exits from initialization routine 1530 and returns to block 1115 located within Main Program 1100.

c. Text Initialize Routine 1600

Figure 16:
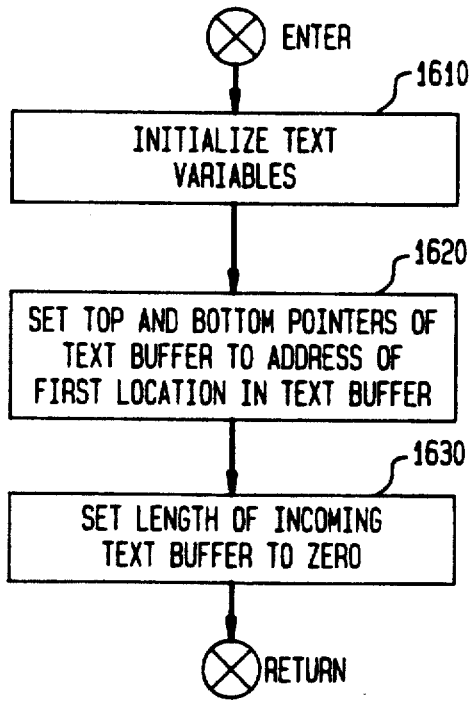
FIG. 16 shows a flowchart of Text Initialize Routine 1600 that is also executed within System Initialization Routine 1110.

FIG. 16 shows a flowchart of Text Initialize Routine 1600. As noted above, this routine initializes various variables associated with processing ASCII text data and also initializes the values of various pointers to a text buffer where incoming ASCII text characters along with embedded EPSON printer commands will be stored. This text buffer resides within a pre-determined region of buffer 44 (see FIG. 4). Pointers are necessary to delineate this region of memory from that used to store other data, such as bit-mapped image and font data. Specifically, upon entry into routine 1600, block 1610 is first executed to initialize various variables associated with the text buffer. Thereafter, block 1620 is executed to set both top and bottom pointers associated with the text buffer to point to the address of the first location in the text buffer. Once this has been accomplished, block 1630 is executed to set the value of a software text buffer length counter that tracks the length of the text buffer to zero, thereby indicating that this buffer is completely empty. Though not part of this initialization routine, as the text buffer fills with incoming data, the CPU adjusts the pointers to point to the top and bottom locations in the buffer that contain data and also sets the value stored within the text buffer length counter to reflect the number of bytes of data stored within the buffer. Once block 1630 has been executed, then execution returns to block 1115 situated within Main Program 1100.

d. Image Initialize Routine 1700

Figure 17:
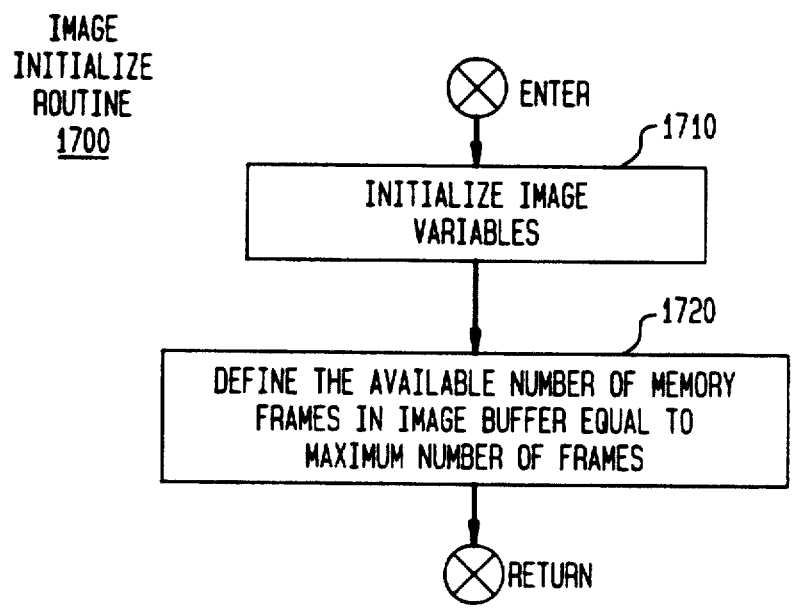
FIG. 17 shows a flowchart of Image Initialize Routine 1700 that is also executed within System Initialization Routine 1110.

A flowchart of Image Initialize Routine 1700 is shown in FIG. 17. As noted above, this routine initializes various variables associated with processing an image and also defines the available number of memory frames in the image buffer to be equal to a pre-determined maximum number. Each frame is used to temporarily store an image. Specifically, upon entry into this routine, block 1710 is executed to initialize the values of various variables associated with processing an image. Thereafter, block 1720 is executed to initialize the value of a variable, that tracks the available number of memory frames in the image buffer, to the maximum number of frames permitted by the size of the image buffer. Once this occurs, execution exits from Image Initialize Routine 1700 and returns to block 1115 situated within Main Program 1100.

e. Frame Initialize Routine 1800

Figure 18:
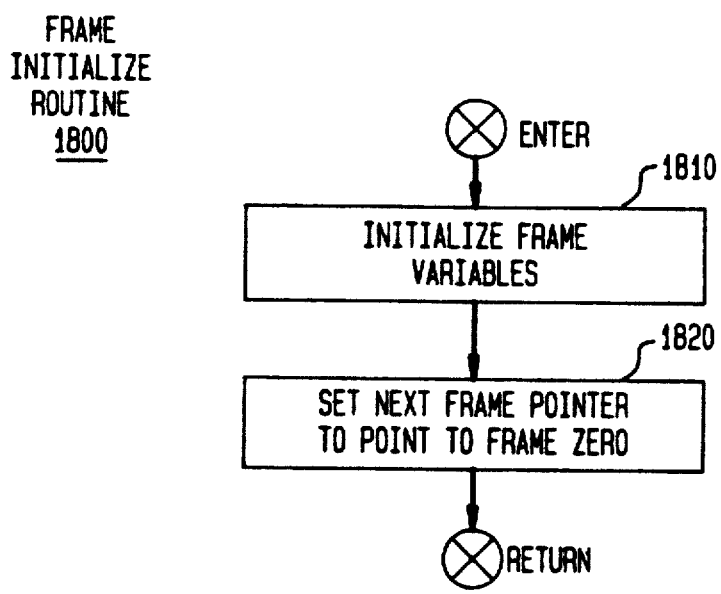
FIG. 18 shows a flowchart of Frame Initialize Routine 1800 that is also executed within System Initialization Routine 1110.

FIG. 18 shows a flowchart of Frame Initialize Routine 1800. As noted above, this routine initializes various variables associated with accessing individual memory frames and also sets the value of a pointer to the next frame in the image buffer equal to the value associated with frame zero. Specifically, upon entry into this routine, block 1810 is executed to initialize the values of various pointers which store starting addresses of each memory frame located within the image buffer. Thereafter, block 1820 is executed to set the value of a pointer, which points to the address of the next available memory frame in the image buffer, equal to the address of a pre-defined first frame, i.e. frame zero. As such, frame zero will be the first memory frame that will be subsequently used. Once this pointer has been appropriately set, execution exits from routine 1800 and returns to block 1115 located within Main Program 1100.

f. EPSON Printer Emulation Initialize Routine 1900

Figure 19:
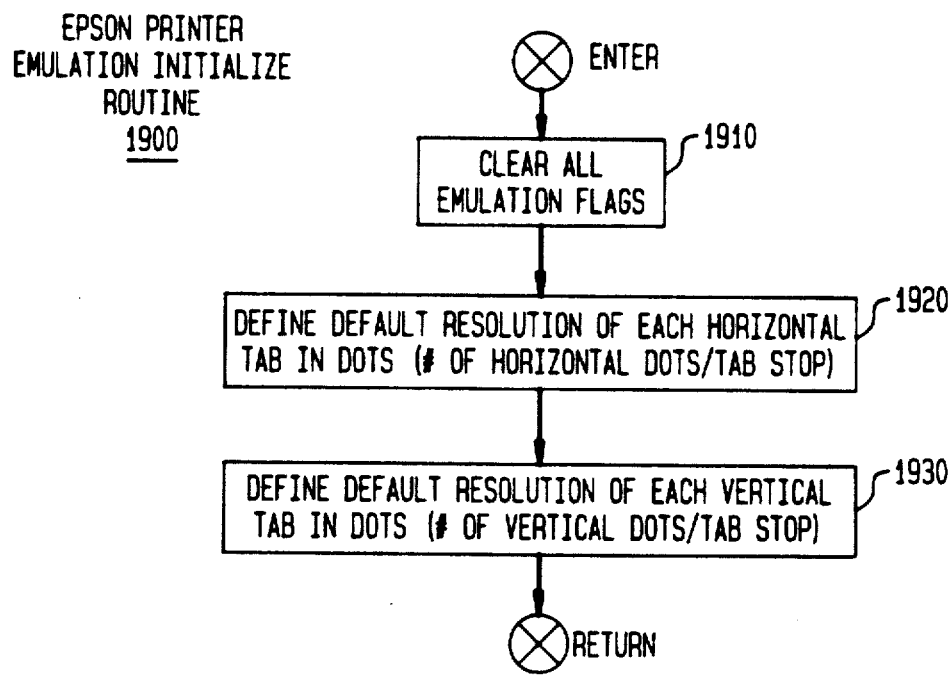
FIG. 19 shows a flowchart of EPSON Printer Emulation Initialize Routine 1900 that is also executed within System Initialization Routine 1110.

A flowchart of EPSON Printer Emulation Initialize Routine 1900 is shown in FIG. 19. As noted above, this routine clears all emulation flags and sets various emulation variables equal to corresponding default values. In particular, as discussed, incoming text data (an ASCII file) contains both ASCII characters and embedded printer commands (line spacing, tab commands, bolded text and the like) illustratively of an EPSON type FX-80 printer. The RIP interprets these commands and suitably instructs the image printer to fully emulate these commands. Upon entry into this routine, block 1910 is first executed to clear the values of all flags associated with EPSON emulation. Thereafter, blocks 1920 and 1930 are sequentially executed to define the default resolution of a horizontal and vertical tab stop, in terms of horizontal and vertical dots/tab stop, respectively. During emulation, the RIP will convert each embedded tab stop (horizontal or vertical) into the equivalent number of dots in order to properly combine text into bit-mapped images. The resolutions are changed to accommodate different size text (fonts). Once these default resolutions have been defined, execution then exits from EPSON Printer Emulation Initialize Routine 1900 and returns to block 1115 located within Main Program 1100.

g. Font Initialize Routine 2000 and New Mode Routine 2200

Figure 20:
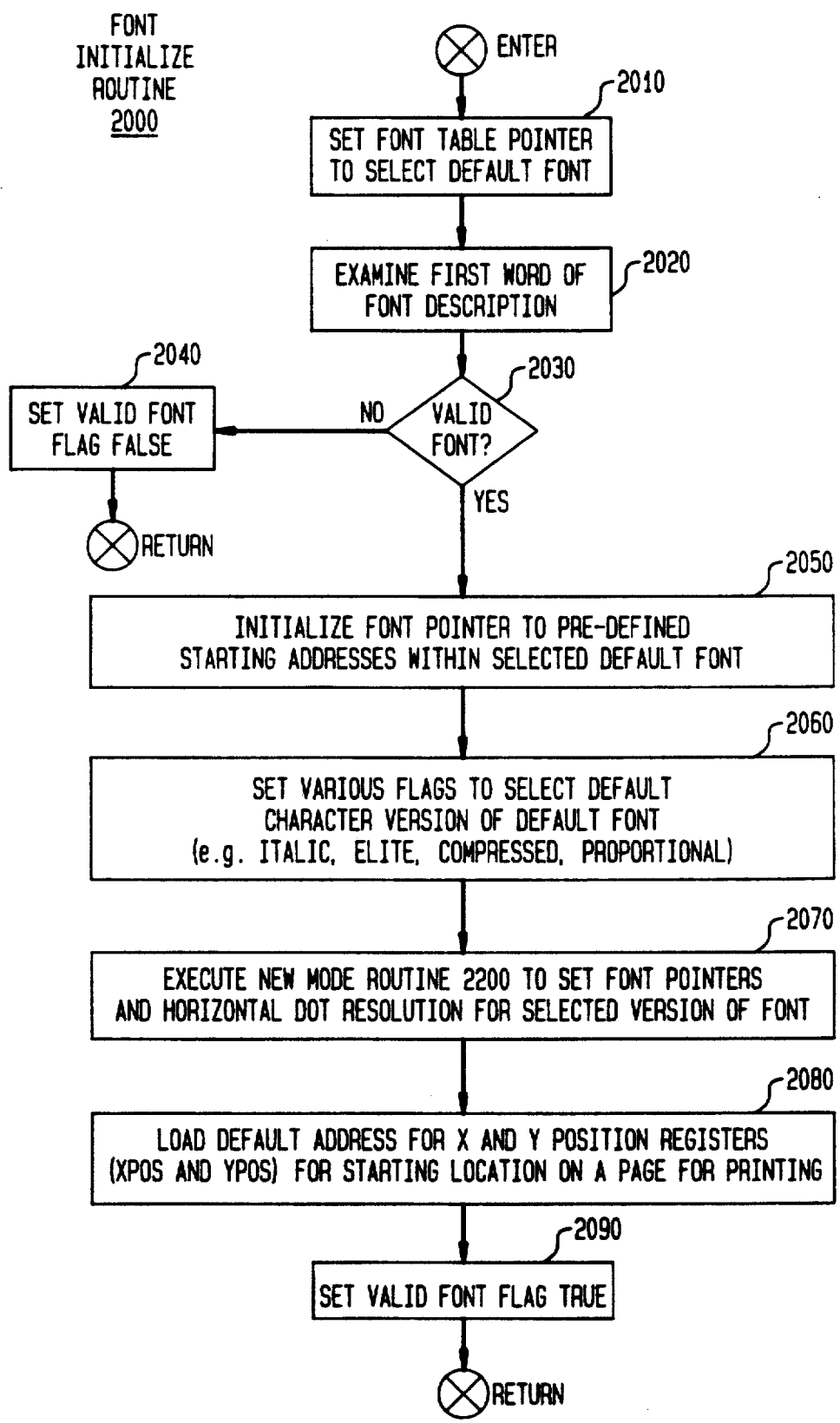
FIG. 20 shows a flowchart of Font Initialize Routine 2000 that is also executed within System Initialization Routine 1110.

A flowchart for Font Initializ Routine 2000 is shown in FIG. 20. This routine sets various pointers to select a default font, to select a character version within the default font and to appropriately set various parameters associated therewith. This routine is executed during system initialization and immediately after a font has been downloaded to the RIP, from the host processor within the file server, during execution of Command Processor Routine 1150 within Main Program 1100 (see FIG. 11).

Upon entry into routine 2000, execution passes to block 2010. This block sets the value of a font table pointer to select a default font from the fonts that are available. The font table lists each available font and the specific character versions available on that font (e.g. elite, compressed, italic and proportional) that have been downloaded to the RIP and their corresponding starting addresses. Thereafter, block 2020 is executed to read the first byte of the downloaded font which is a code that describes the font (e.g. pica, courier). Once this byte is read, execution passes to decision block 2030. This decision block tests the font description word that has just been read to determine whether the font exists in memory and is valid, i.e. one of the predefined fonts that can be printed by the RIP. If the font does not yet exist, which occurs during System Initialization Routine 1110 and Image Test Print Routine 1130 (both of which have been discussed above in conjunction with FIG. 11), then decision block 2030, as shown in FIG. 20, routes execution, via its "NO" path, to block 2040. This block merely sets the state of a valid font flag to "false". Execution then exits from Font Initialize Routine 2000 and returns to block 1115 located within Main Program 1100.

Now, as noted, Font Initialize Routine 2000 is also executed immediately after a font has been downloaded into the RIP. This downloading occurs as the first RIP command after a test page has been printed and Command Processor Routine 1150 begins executing. During this pass through the Font Initialize Routine, blocks 2010 and 2020 are executed as described above. Now, since a valid font has now been downloaded into the RIP, execution is routed, via the "YES" path from decision block 2030, to block 2050. For the selected default font, block 2050, when executed, initializes various font pointers located within the font table to the starting address of that font. Each pointer identifies a starting address of the bit patterns associated with a specified corresponding character version available in that font. For example, a specific pointer indicates the start of elite bit patterns; another pointer indicates the start of italic bit patterns and so on. Thereafter, execution passes to block 2060 which selects the default character version by setting the state of various flags, as discussed below in conjunction with New Mode Routine 2200. Block 2070 is then executed to invoke New Mode Routine 2200 (see FIG. 22 and which will be discussed shortly) to appropriately set various parameters and pointers with values appropriate to the selected default font and the selected character version therein. Once this has occurred, execution passes to block 2080 to load default x and y addresses of the first location on a page that will be printed by the image printer into respective x and y registers (XPOS and YPOS) located within the CPU. Thereafter, block 2090 is executed to set the state of the valid font flag to "true." Execution now exits from Font Initialize Routine 2000 and returns to the calling program.

Figure 22B:
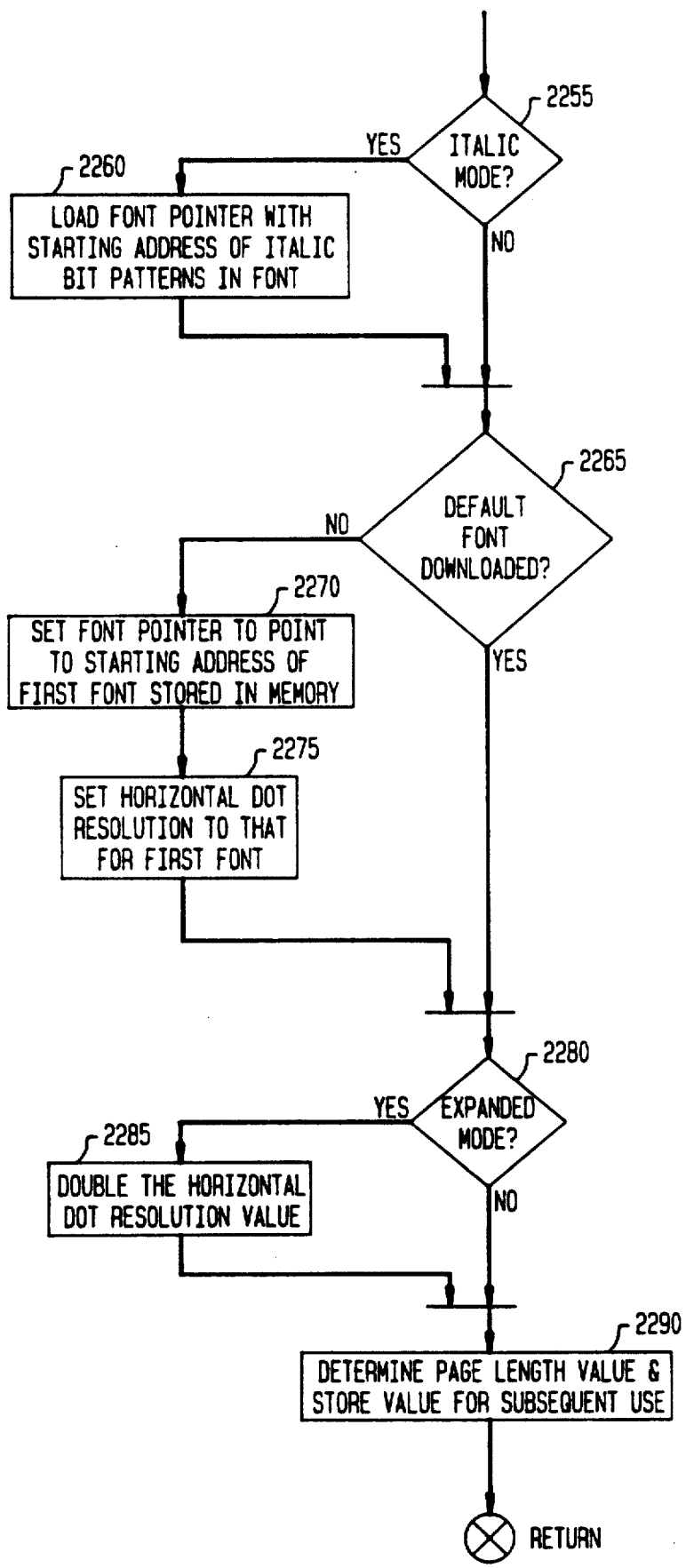

A flowchart of New Mode Routine 2200, which is called by Font Initialize Routine 2000, is shown in FIGS. 22a–22b, for which the correct alignment of the drawing sheets for these figures is depicted in FIG. 22. This routine, as noted, appropriately sets various parameters and pointers with values appropriate to the downloaded font and a selected character version therein.

Specifically, upon entry into New Mode Routine 2200, block 2205 is executed. This block loads the starting address of the default font, i.e. the font that has just been selected as part of Font Initialize Routine 2000, as discussed above. As noted, each font includes all the separate bit patterns needed to generate elite, compressed, italic and proportionally spaced versions of characters of a specific typeface. Thereafter, execution is routed to block 2210 which sets the horizontal dot resolution to the previously accessed default value. At this point, execution now passes to decision block 2215 which tests whether the elite mode is to be used, i.e. whether elite characters within this font are to be used, by testing the value of an associated "Elite Mode" flag. The value of the "Elite Mode", "Proportional Mode", "Compressed Mode" and "Italic Mode" flags are set by embedded printer commands contained within an ASCII text file, as discussed in detail below in conjunction with NodeC Routine 4600 shown FIG. 46. In any event, if elite characters are to be used, decision block 2215, as shown in FIGS. 22a and 22b, routes execution, via its "YES" path to block 2245. This block, when executed accesses the font table and sets the value of the font pointer to the starting address of the elite bit patterns stored within the font. Thereafter, block 2250 is executed to set the horizontal dot resolution to the value associated with elite characters. Execution then proceeds to decision block 2255, which will be discussed shortly. In the event elite characters are not to be used, then execution is routed, via the "NO" path from decision block 2215, to decision block 2220. This latter decision block tests whether proportional mode is to be used, i.e. whether the proportionally spaced characters within this font are to be used, by testing the value of the "Proportional Mode" flag. If the value of this flag indicates that proportionally spaced characters are to be used, then decision block 2220 directs execution, via its "YES" path, to block 2225 which accesses the font table and sets the value of the font pointer to the starting address of the bit patterns for the proportionally spaced characters. Thereafter, execution proceeds from block 2225 to decision block 2255. Now, in the event proportional spacing is not to be used, then execution is routed, via the "NO" path from decision block 2220, to decision block 2230. This latter decision block tests whether compressed mode is to be used, i.e. whether the compressed characters stored within this font are to be used, by testing the value of the "Compressed Mode" flag. If compressed characters are to be used, then decision block 2230 directs execution, via its "YES" path, to block 2235 which accesses the font table and sets the value of the font pointer to the starting address of the bit patterns for the compressed characters situated within the downloaded font. Thereafter, block 2240 is executed to set the horizontal dot resolution value to that associated with compressed characters. Thereafter, execution proceeds to decision block 2255. Alternatively, if the downloaded font is not a compressed font, then execution is routed, via the "NO" path from decision block 2230, to decision block 2255.

Decision block 2255 tests whether italic characters stored within the font are to be used, by testing the value of the "Italic Mode" flag. If italic characters are to be used, then decision block 2255 routes execution, via its "YES" path, to block 2260. This block, when executed, sets the value of the font pointer to the starting address of italic bit patterns stored within the downloaded font. Execution then proceeds to decision block 2265 either from block 2260 or via the "NO" path from decision block 2255 in the event italic characters are not to be used. Decision block 2265 determines whether a default font has, in fact, been downloaded. Although a default font has been selected in block 2010 of Font Initialize Routine 2000, as dicussed above, this font may not yet have been downloaded into the RIP. If this font has, in fact, been downloaded, then execution is routed, via the "YES" path from decision block 2265 to decision block 2280. Alternatively, in the event the default font has not been downloaded, then execution is directed, via the "NO" path emanating from decision block 2265, to block 2270. This block sets the value of a default font pointer in the font table to the starting address of the first font that has been downloaded into the memory of the RIP. Block 2275 is then executed to set the horizontal dot resolution equal to that associated with this first downloaded font. Thereafter, execution passes to decision block 2280. This decision block tests whether characters are to be printed in an expanded fashion by testing the value of an "Expanded Mode" flag. If expanded characters are to be used, then execution is routed, via the "YES" path from this decision block, to block 2285. This latter block, when executed, doubles the horizontal dot resolution value associated with this font (to expand the character width by a factor of two) and stores the resulting value as the horizontal dot resolution for use whenever expanded characters are to be printed. Once this has occurred or in the event expanded mode has not been selected, then block 2290 is executed. This block determines the length (in pixels) of a page to be printed by the image printer and stores the value for subsequent use. Thereafter, execution exits from New Mode Routine 2200 and returns to Font Initialize Routine 2000.

h. Image Printer Powerup Routine 2100

Figure 21:
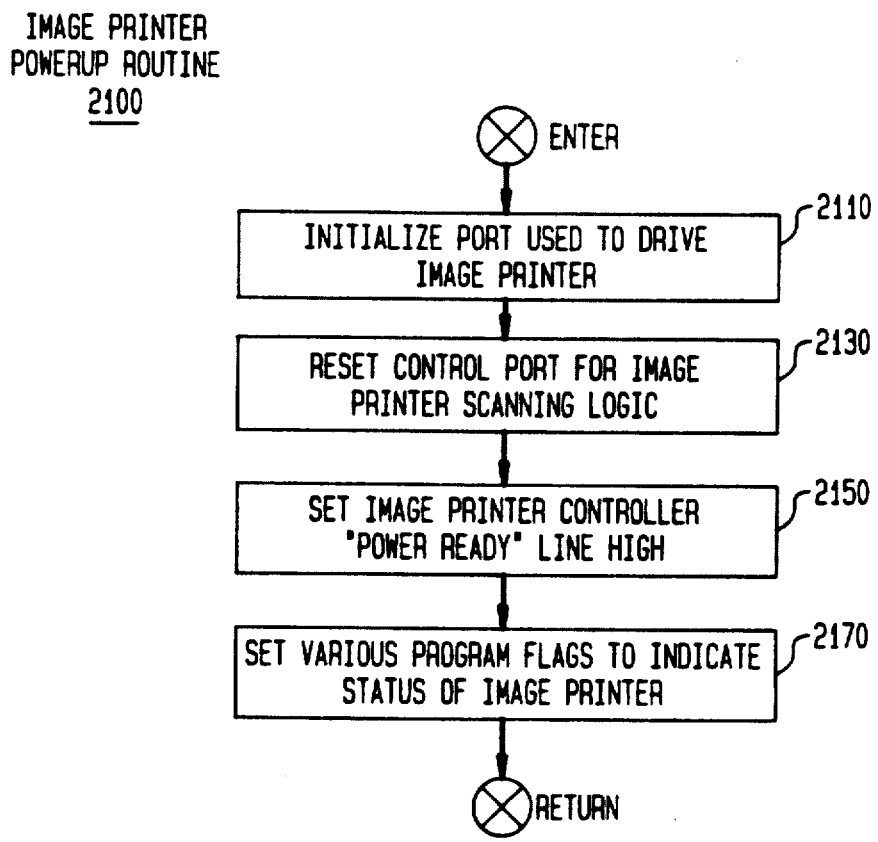
FIG. 21 shows a flowchart of Image Printer Powerup Routine 2100 that is also executed within System Initialization Routine 1110.

FIG. 21 shows a flowchart of Image Printer Powerup Routine 2100. As previously noted, this routine initializes a printer controller located internally within the image printer and which controls the image printing process. Upon entry into this routine, block 2110 first executed to initialize a port on the printer interface that drives the image printer. This entails setting the levels of various control signals supplied to the image printer to their default values. Thereafter, block 2130 is executed to reset a control port within printer driver 324 (see FIG. 3) that supplies commands to the image printer scanning logic. Execution now proceeds, as shown in FIG. 21, to block 2150 which sets the state of a "Controller Power Ready" signal supplied to the image printer to high. This informs the printer that its controller is operational and ready to send signals to and receive signals from the image printer. Next, block 2170 is executed to set various flags to reflect the current status of the image printer. This now completes execution of Image Printer Powerup Routine 2100. Therefore, execution exits from this routine and returns to block 1115 within Main Program 1100 (see FIG. 11). It should be noted that, at this point, the image printer itself has not yet been initialized. This is accomplished during subsequent execution of Image Test Print Routine 1130 (see FIG. 11) and specifically by the execution of Image Printer Initialize Routine 2600 occurring during the first pass through Goprint Routine 2500 (see FIG. 25) which will be discussed shortly.

i. CEP Initialize Routine 2300

Figure 23:
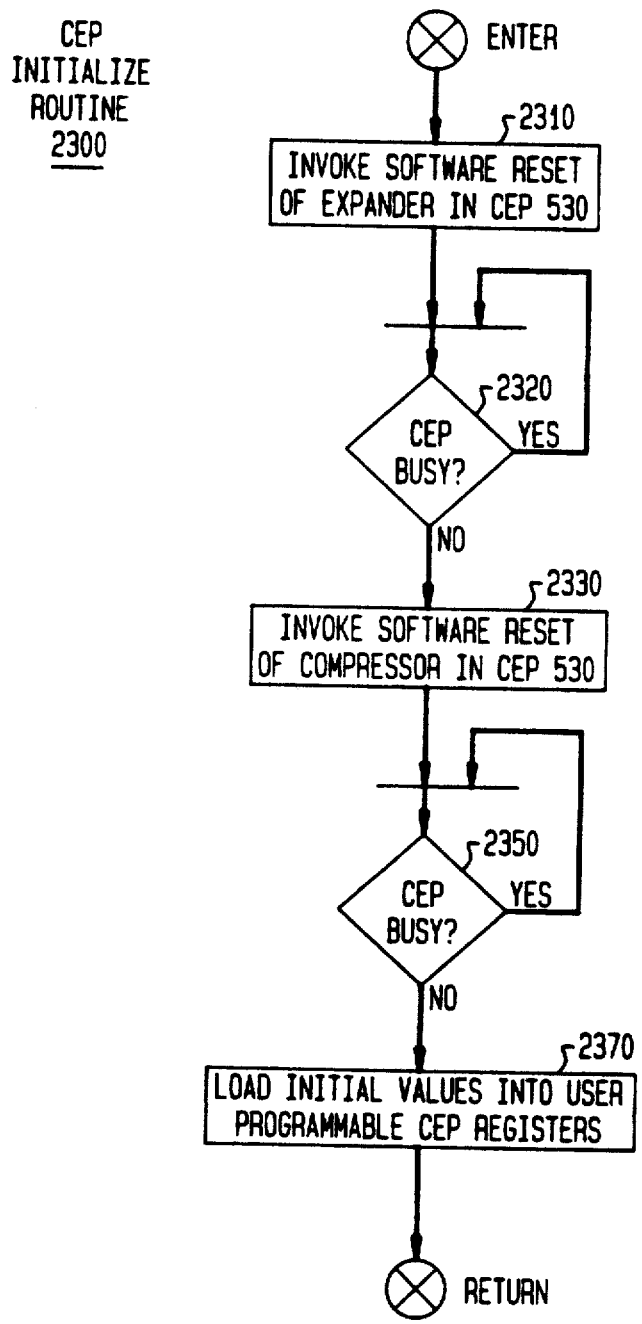
FIG. 23 shows a flowchart of Compression/Expansion Processor (CEP) Initialize Routine 2300 that is also executed within System Initialization Routine 1110.

A flowchart of CEP Initialize Routine 2300 is shown in FIG. 23. This routine initializes compression/expansion processor (CEP) 530 present in decompressor/compressor 50 (see FIG. 5 which has been discussed in detail above). Specifically, as shown in FIG. 23, upon entry into this routine, block 2310 is executed to invoke a software reset of the expander section of the CEP. To do so, the CPU sends appropriate instructions to cause the CEP to initialize its internal registers to values commensurate with an idle state. In particular, such a reset, when invoked, flushes the contents of an input queue (in this case for the expander) located within the CEP and then clears the contents of internal working registers, process control flags and an appropriate status register. User programmable control registers are not cleared. Once this operation is invoked, decision block 2320 continually executes until the expander has completely reset itself. At this point, execution proceeds to block 2330 to invoke a similar software reset of the compressor section of the CEP. Thereafter, decision block 2350 continually executes until the compressor completes its reset operation. Once the compressor has been totally reset, block 2370 is executed to load initial values into all the user programmable registers located within the CEP. After all these registers have been programmed, the CEP has been successfully initialized. Hence, execution now exits from CEP Initialize Routine 2300 and returns to block 1115 within Main Program 1100.

This now concludes the discussion of the initialization routines.

4. Image Test Print Routines

As discussed, once all the initialization routines have been executed as part of System Initialization Routine 1110, as discussed above in conjunction with FIG. 11, execution proceeds to Image Test Print Routine 1130 which causes a pre-defined test image to be printed by the image printer. Two subroutines, specifically Frame Request Routine 2400 and Goprint Routine 2500, are directly called by Image Test Print Routine 1130.

a. Frame Request Routine 2400

Figure 24:
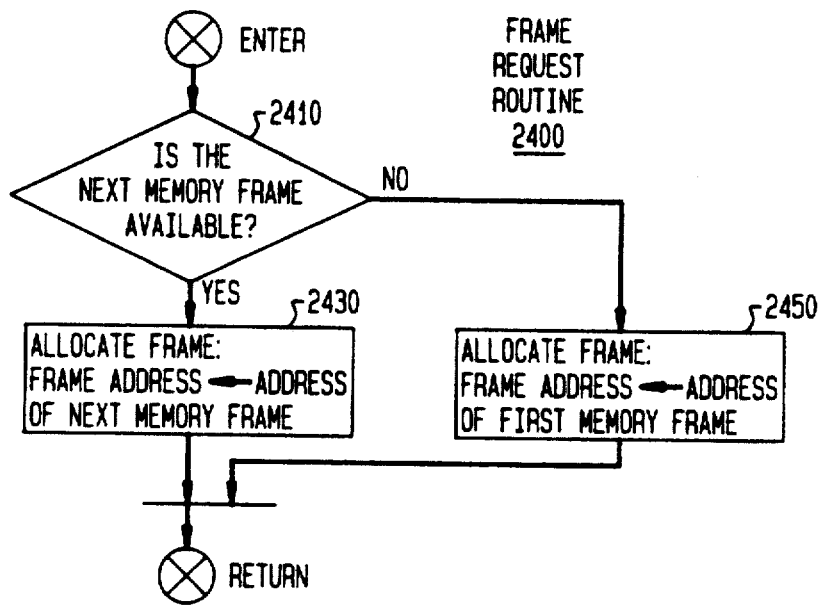
FIG. 24 shows a flowchart of Frame Request Routine 2400 that is executed within Image Test Print Routine 1130 that forms part of Main Program 1100 depicted in FIGS. 11a-11c.

A flowchart of Frame Request Routine 2400 is shown in FIG. 24. As noted above, the Frame Request Routine determines if a free frame of memory exists within the image buffer. If so, this frame is allocated to hold the pre-defined image for the test page. Specifically, upon entry into this routine, execution passes to decision block 2410 which determines whether another memory frame (i.e. a next frame in sequence) is available within the image buffer. For example, if frame one or two is the present frame in use, then decision block 2410 determines whether frames two or three, respectively, are available and so on. If the next memory frame in sequence is available, then execution is directed, via the "YES" path from decision block 2410, to block 2430 which allocates the next frame to the upcoming task by setting the current frame address to the starting address of the next frame. Alternatively, in the event the next frame in sequence is not available, then execution is directed, via the "NO" path from decision block 2410, to block 2450 which allocates the first frame in sequence (frame zero) to the upcoming task by setting the current frame address to the starting address of the first memory frame. Thereafter, execution exits from Frame Request Routine 2400 and returns to Image Test Print Routine 1130.

b. Goprint Routine 2500

Figures 25, 25A:
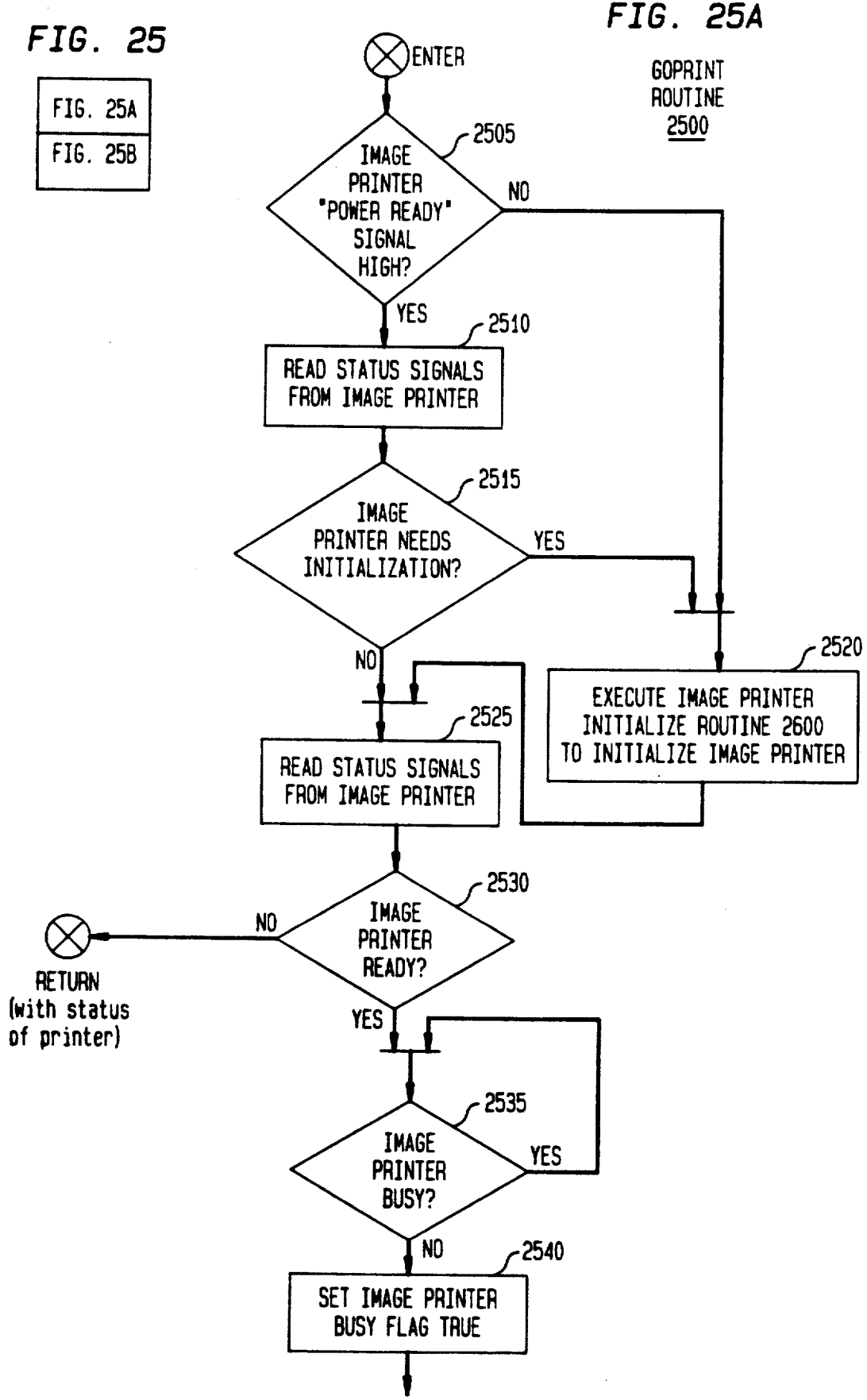

A flowchart of Goprint Routine 2500 appears in FIG. 25a-25b, for which the correct alignment of the drawing sheets for these figures is depicted in FIG. 25. The Goprint Routine, as noted above, transfers a bit-mapped image stored within a current memory frame, in the image buffer, to the image printer and then instructs the printer to print the image. While this routine executes as part of Image Test Print Routine 1130, the transferred image is a pre-defined test image. Subsequently, during execution of a RIP command, the current image which is transferred by Goprint Routine 2500 is the image that has been processed by the RIP and is ready to be printed by the image printer.

Figure 26:
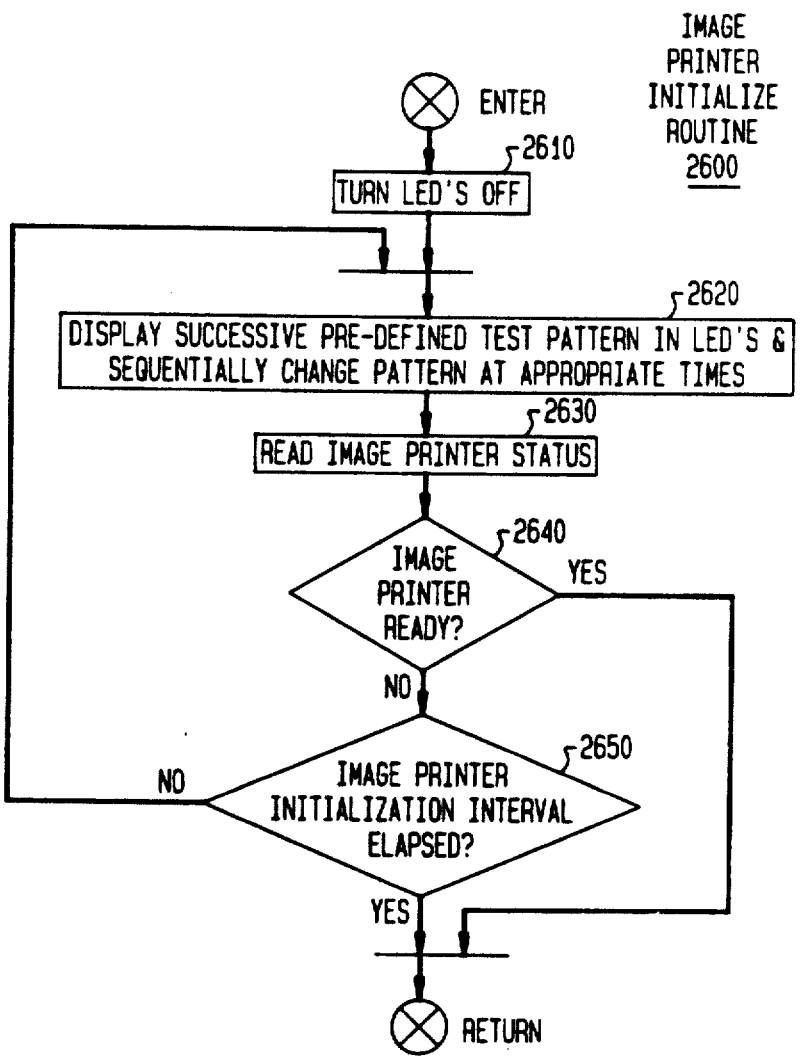
FIG. 26 shows a flowchart of Image Printer Initialize Routine 2600 that is executed by Goprint Routine 2500 depicted in FIGS. 25a-25b.

Specifically, upon entry into routine 2500, execution is directed to decision block 2505. This block reads the level of a "Power Ready Signal" produced by the image printer. The printer controller (internal to the image printer) sets this signal to a high level after: power has been applied to the image printer, the processor within the controller has initialized itself and transmission betweenj the printer controller and printer interface 320 (see FIG. 3) can begin. If the level of this signal is low, then this signifies that the image printer and/or its controller needs to be initialized. Consequently, as shown in FIG. 25, execution passes, via the "NO" path from decision block 2505, to block 2520 to invoke Image Printer Initialize Routine 2600, which is shown in FIG. 26 and will be discussed shortly, for initializing the image printer. If, however, the level of the "Power Ready Signal" is high, then execution passes, via the "YES" path from decision block 2505, to block 2510. This latter block ascertains the status of the image printer by requesting an eight bit word of status bits provided by the printer and then reading their values. Next, decision block 2515 executes to determine whether the status bits indicate that the image printer needs to be initialized. If the printer needs initialization, then execution is routed, via the "YES" path from decision block 2515, to block 2520 to invoke Image Printer Initialize Routine 2600. Now, in the event the image printer does not need initialization or block 2520 has executed to initialize the printer, execution passes to block 2525 to again read the status of the image printer. If the status bits indicate that the image printer is not ready, even though initialization has been performed, then a fault condition exists within the printer. Decision block 2530 tests for such a condition. Should a fault occur in the printer, an error register is then set to a code associated with the particular fault condition and execution exits from Goprint Routine 2500, via the "NO" path from decision block 2530. The error code is then transmitted by the RIP, via a SCSI Sense Data command, to the host processor within the file server and from there to the KIM host computer to appropriately alert a user and obtain corrective action. Now, alternatively, if the status bits indicate that the imge printer is ready, then decision block 2530 routes execution, via its "YES" path, to decision block 2535. This latter decision block determines if the image printer is busy by checking the level of a "Printer Ready Signal" supplied by the printer. The printer would be busy in the event it is still printing a page. Decision block 2535 continually executes as long as the image printer is busy. Once the printer has ceased printing and becomes available to print another page, then decision block 2535 routes execution, via its "NO" path, to block 2540. This block, when executed, sets the image printer busy flag to a false state thereby reflecting the availability of the printer. Next, block 2545 is executed to transfer the starting address of the image which is to be printed and is stored within a memory frame in the image buffer to printer interface 320, and specifically to DMA circuit 328. This address is used in transferring the image from the memory frame to the printer interface by direct memory access. Once the starting address has been loaded into DMA circuit 328, the image transfer begins without any further intervention by the CPU. After block 2545 is executed, as shown in FIG. 25, block 2550 is executed to enable the Vsync and EOR interrupts, as previously discussed above. Thereafter, execution passes to block 2555 to assert the "PRINT" signal applied to the image printer to a high level thereby instructing the image printer to begin a print cycle. Execution then exits from Goprint Routine 2500 and returns to a calling program.

FIG. 26 shows a flowchart of Image Printer Initialize Routine 2600. This routine, when executed, provides a sufficient amount of time to allow the image printer to initialize itself. Specifically, upon entry into this routine, execution passes to block 2610 to turn a cluster of four light emitting diodes (LEDs) off. These LEDs signify the status of the RIP and are used to provide a local indication of any error condition occurring within the RIP. Thereafter, execution passes to block 2620 which displays a pre-defined pattern in the LEDs, e.g. the least significant one of the four LEDs is turned on. This block sequentially changes the pattern, for example by turning the present LED off and turning the next sequential LED on, after a pre-defined interval of time (e.g. 20 seconds) has elapsed. This provides the user with a meaningful indication that the printer is initializing itself. Thereafter, block 2630 executes to access the status word from the image printer. Next, decision block 2640 tests the status word to determine if the image printer is ready, i.e. has completed initialization and is ready to receive image data. If so, then execution exits from Image Printer Initialize Routine 2600, via the "YES" path from decision block 2640, and returns to Goprint Routine 2500. Alternatively, if the image printer is not ready yet, then decision block routes execution, via its "NO" path, to decision block 2650. If the image printer is properly functioning then it will complete its initialization in a pre-defined interval of time, no greater than approixmately 1.5 minutes. If initialization has not been completed within this interval, then a fault exists within the printer. Decision block 2650 determines whether such a fault exists. In the event the pre-defined interval has not fully elapsed and initialization has not yet been completed, then this decision block routes execution, via its "NO" path, back to block 2620. Alternatively, in the event this time period has elapsed and initialization has not been completed, then execution exits from Image Printer Routine 2600, via the "NO" path from decision block 2650, back to Goprint Routine 2500.

5. RIP Command Processing Routines

Now, after a test page has been printed by the image printer, execution proceeds, as discussed above in conjunction with FIGS. 11a-11c, to Command Processor Routine 1150 to appropriately process each subsequently occurring incoming RIP command. A number of different subroutines are directly called by routine 1150 depending upon the particular incoming RIP command. These routines are: Font Initialize Routine 2000 which is executed in response to a RIP Download font command; Diagnostic Routine 2700 which is executed in response to a RIP Diagnose command; Note/Image Routine 2800 which is executed in response to either a RIP Note command or a RIP Image command; and Text Routine 3100 which is executed in response to a RIP Test command. Each of these routines will be discussed in detail below, with the exception of Font Initialize Routine 2000 which has been previously discussed in detail above in conjunction with the initializtion routines.

a. Diagnostic Routine 2700

Figure 27:
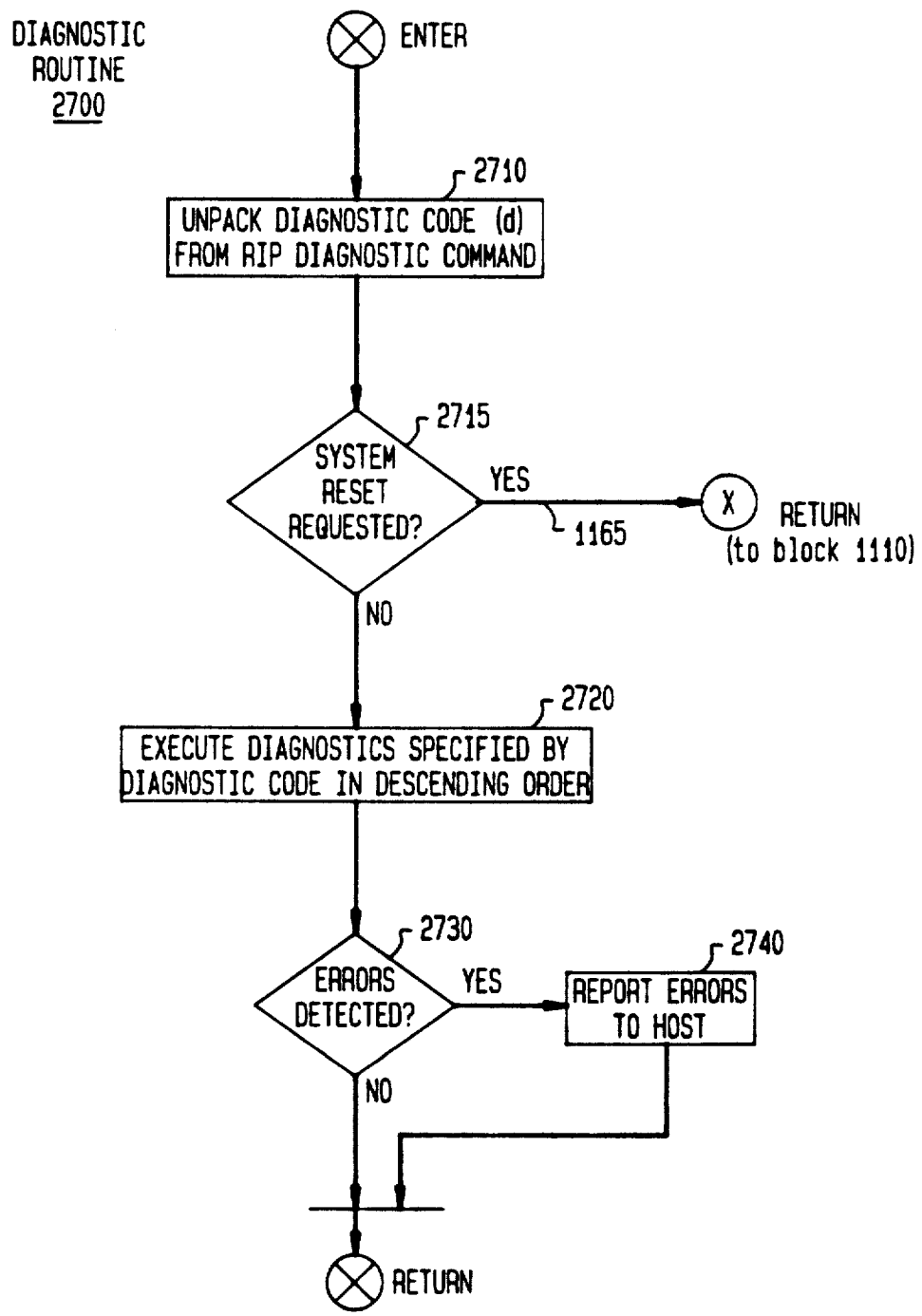
FIG. 27 shows a flowchart of Diagnostic Routine 2700 that is executed within Command Processor Routine 1150 that forms part of Main Program 1100 depicted in FIGS. 11a-11c.

A flowchart of Diagnotic Routine 2700 is shown in FIG. 27. This routine, as noted, executes a particular diagnostic operation or a system reset operation as specified by the value of the diagnostic code ("d") bits present in a RIP Diagnose command. Specifically, upon entry into Diagnostic Routine 2700, block 2710 is executed to unpack the eight diagnostic code bits from a RIP Diagnose command. Thereafter, decision block 2715 tests the value of these eight bits to determine if a system reset is being requested by the host processor within the file server. If so, execution exits from routine 2700, via "YES" path 1165, from this decision block, to System Initialization Routine 1110, as shown in FIG. 11c, to re-initialize the RIP. Alternatively, if the RIP is not to be reset, then execution proceeds to block 2720, as shown in FIG. 27, via the "NO" path from decision block 2715. Block 2720 sequentially executes the particular diagnostics in descending order that have been specified in the diagnostic code bits. Thereafter, decision block 2730 tests whether any errors have occurred during execution of any of the specified diagnostics. If such an error has occurred, then execution proceeds, via the "YES" path emanating from decsion block 2730, to block 2740 which, when executed, reports these errors to the host processor within the file server using a SCSI Sense Data command. Once all these errors have been reported or in the event no errors have occurred, execution exits from Diagnostic Routine 2700 to path 1158 situated within Command Processor Routine 1150 (see FIG. 11c).

b. Note/Image Routine 2800, Scale Routine 2900 and Annotation Routine 3000

As discussed above, an image command instructs the RIP to receive incoming bit-mapped image data and place it in a current allocated memory frame within the image buffer, then decompress and, if necessary, scale the resulting decompressed image data to a desired resolution. Thereafter, a RIP Note, Print or Diagnose command can be executed, at the request of the host processor located within the file server, to correspondingly: receive a textual annotation, appropriately rotate the annotation by 0, 90, 180 or 270 degrees, if desired, and store the rotated annotation in bit-mapped form within the current allocated memory frame but superimposed (overlaid) onto the scale bit-mapped image at a desired image location; print the image stored within the current memory frame; or, execute a desired diagnostic operation (including a system reset).

Figure 28B:
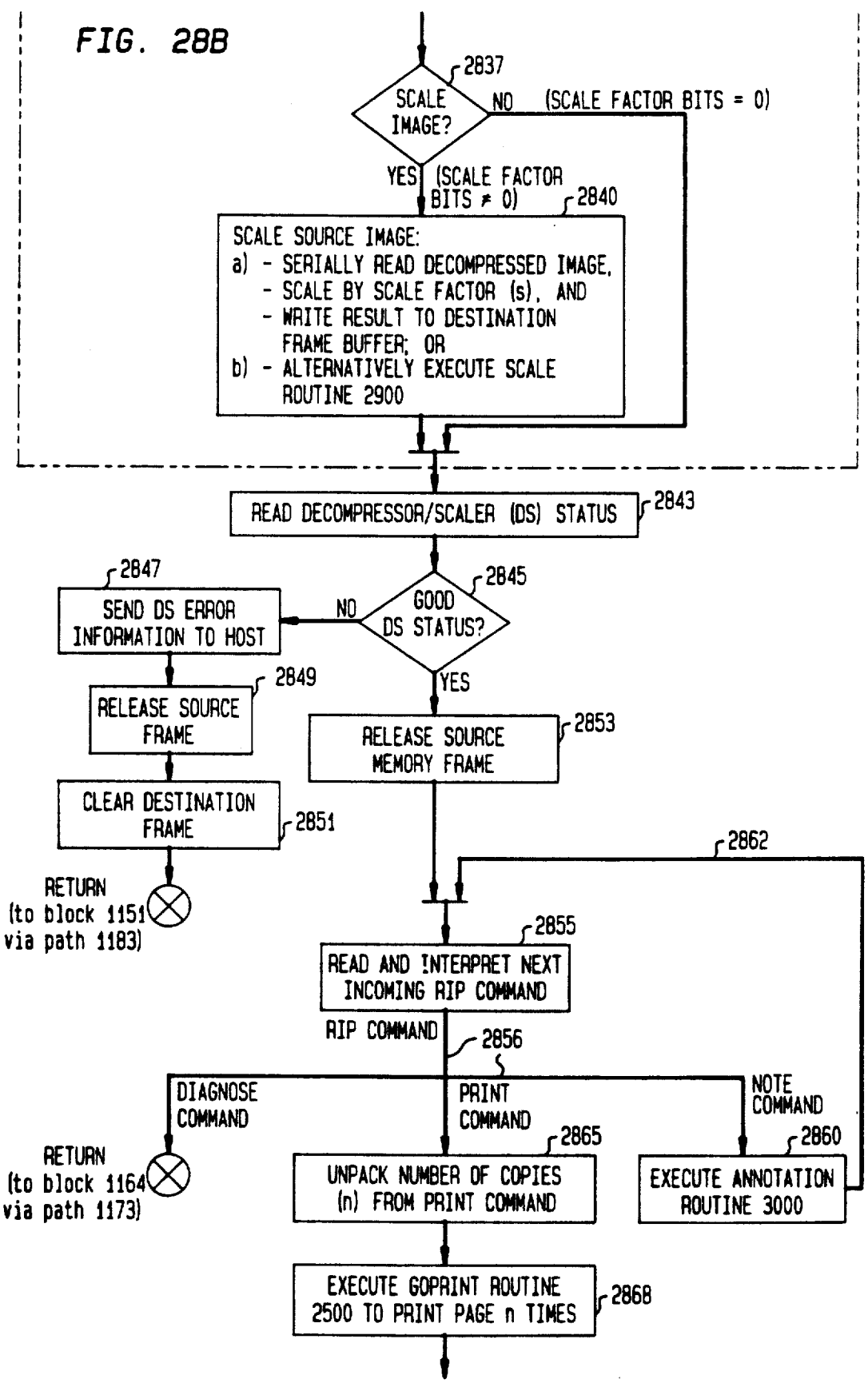
Figure 28C:
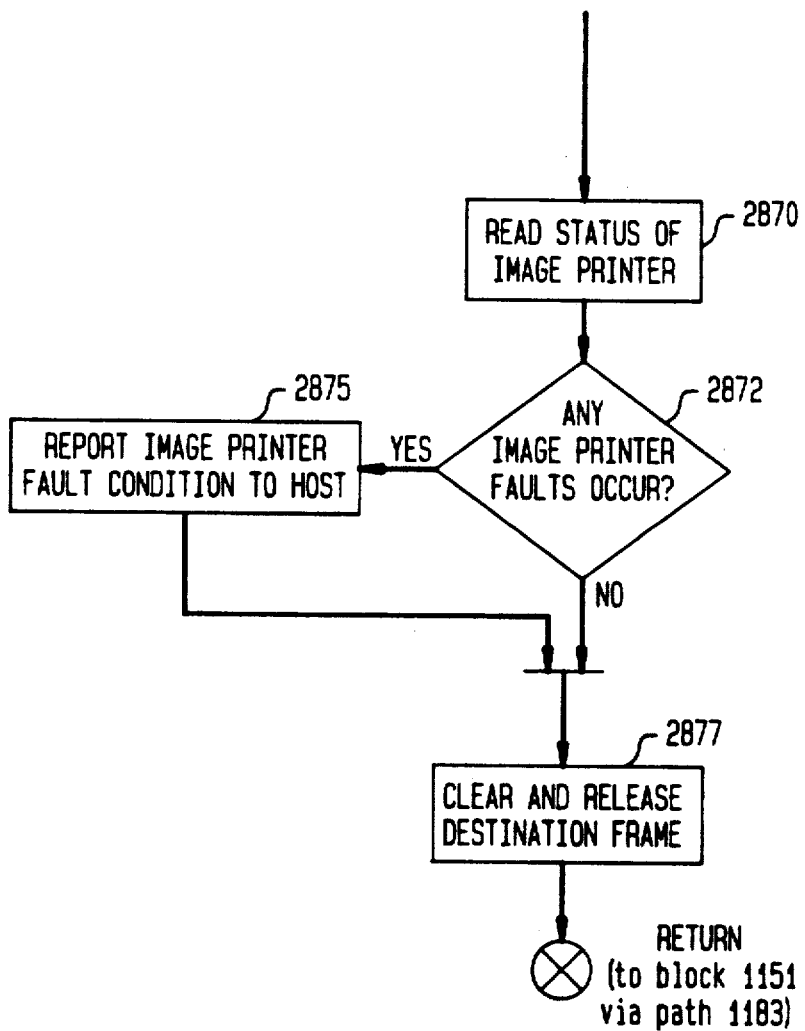

A flowchart of Note/Image Routine 2800, which processes RIP Note and Image commands, is shown in FIGS. 28a-28c, for which the correct alignment of the drawing sheets is depicted in FIG. 28.

Specifically, as shown, upon entry into this routine, execution proceeds to block 2805. This block stores the starting address of the incoming (source) image to be processed within an internal source address register in the CEP thereby defining a data path over bus 80 between buffer 44 and memory 520. Next, block 2805 initiates a DMA transfer of incoming bit-mapped image data to memory 520 from buffer 44 located within CPU 40 (see FIG. 4). Thereafter, as shown in FIGS. 28a-28c, block 2810 is executed to allocate a free memory frame, within the image buffer, to serve as a destination buffer to hold the decompressed bit-mapped image that will be produce by the CEP. This, in turn, defines a data path between the compressor/decompressor 50 and the image buffer. The starting address of the allocated memory frame is then written by block 2810 into a destination address register located within the CEP.

Once the CEP has been programmed with these starting addresses, Decompressor Scaler I/O Routine 2820 begins executing. This routine initiates image decompression and, if necessary, scaling. Specifically, upon entry into this routine, block 2822 is executed. This block unpacks the decompressor control bits—mode controls bits "m", "k" parameter bits, byte boundary bit "b" and end of line bit "1"; as well as the page width bits "p" and scale factor bits "s" (all shown in FIG. 10a and discussed above)—from the RIP Image Command. Next, block 2824 is executed to appropriately program the CEP using both the decompressor control bits and the page width bits. Thereafter, execution passes to block 2826 to appropriately instruct the CEP to initiate image decompression. Once this occurs, the CEP performs decompression without any further intervention from the CPU. The CEP provides an appropriate control signal to indicate when it has finished processing. Decision block 2828 continually re-executes, via its looped "No" path, until this signal reflects that the CEP has finished the decompression operation. Once this occurs, then decision block 2828 routes execution, via its "YES" path, to block 2831 to read status information from an internal CEP status register. To further enhance throughput of the RIP, the CPU could alternatively perform more meaningful task, i.e. other image processing tasks, than merely re-executing block 2828, while the CEP is decompressing an image. In this case, the control signal furnished by the CEP could then be used to appropriately interrupt the CPU and return execution to block 2831. In any event, once the status information has been read, decision block 2834 is executed to determine from the status information whether the status is "good", i.e. that no errors have occurred during image decompression. If such an error has occurred, then execution is routed, via the "NO" path from decision block 2834, to block 2835 which, when executed, sends an appropriate code specifying the CEP error to the host processor situated within the file server, using a SCSI Sense Data command. Thereafter, execution exits from Note/Image Routine 2800 and returns, via path 1183, to block 1151 located within Command Processor Routine 1150 (see FIG. 11c). If, alternatively, no errors have occurred during the immediately preceding decompression operation, then as shown in FIGS. 28a-28c, execution passes, via the "YES" path from decision block 2834, to decision block 2837. This latter block tests whether the decompressed image must be scaled. In the event the scale factor bits are all set to zero, then scaling is not to be performed. In this case, execution passes, via the "NO" path from decision block 2837, from Decompressor Scaler I/O Routine 2820, to block 2843. Alternatively, if scaling is requested, then execution proceeds, via the "YES" path from decision block 2837, to block 2840 which, when executed, scales the image. Specifically, if scaling is to be done in hardware, i.e. scaler 60 is to be used, then block 2840 instructs serial interface 540 located within compressor/decompressor 50 (see FIG. 5) to initiate a serial transfer of the decompressed image from compressor/decompressor 50 to scaler 60, via leads 55. Thereafter, this block programs the scaler to scale the decompressed image by the value specified in the scale factor bits. Lastly, block 2840 instructs the scaler to store the resultant scaled image, using direct memory access, into the memory frame that has been allocated by block 2810 to serve as the destination frame thereby establishing a data path therebetween. Scaling then proceeds without any further intervention by the CPU. Once these operations have finished, execution then exits from Decompressor Scaler I/O Routine 2820 to block 2843. Alternatively, in the event scaler 60 is not to be used, then scaling can be performed in software. In this case, block 2840, when executed, will invoke Scale Routine 2900 (see FIGS. 29a and 29b which will shortly be discussed in detail below).

After scaling 60 has finished scaling the image, block 2843 is executed to read status information provided by control circuitry (not shown but well known) located within Compressor/Decompressor 50. This status information relates to the scaler process and its interaction with the decompression process. Thereafter, decision block 2845 test this information to determine if the status is "good", i.e. that no errors have occurred during scaling. If such an error has occurred, then execution proceeds, via the "NO" path emanating from this decision block, to block 2847. This latter block transmits an appropriate error code, that specifies the error condition that occurred during scaling, to the host processor, situated within the file server, using a SCSI Sese Data command. Thereafter, blocks 2849 and 2851 are sequentially executed to release the memory frame that has stored the incoming image (source memory frame) for subsequent use and to clear the destination memory frame. Next, execution exits from Note/Image Routine 2800 and returns, via path 1183, to block 1151 situated within Command Processor Routine 1150. Alternatively, in the event no errors have occurred during the scaling process, then execution is directed, via the "YES" path from decision block 2845, to block 2853. This block, when executed, releases the source memory frame. Alternatively, if scaling was performed in software, i.e. through execution of Scale Routine 2900, then execution would bypass both block 2843 and 2845 and instead flow directly from block 2840 to block 2853. This now completes the processing for the RIP Image command.

At this point, block 2855 executes. This block reads and interprets the next RIP command. Now, as noted, only three specific commands can follow a RIP Image command; namely, a RIP Diagnose command, a RIP Print command or a RIP Note command. If the next command is a Diagnose command, then block 2855 routes execution, via paths 2856 and 1173, to block 1164 located within Command Processor Routine 1150 (see FIG. 11c).

Alternatively, if the next command is a Print command, then block 2855, as shown in FIG. 28b, routes execution, via path 2856, to block 2865. This latter block, when executed, unpacks the byte (bits "n") from the RIP Print command that specifies the number of copies of the image that is to be printed (see FIG. 10b). Thereafter, as shown in FIG. 28b, execution passes to block 2868 to invoke Goprint Routine 2500 (see FIG. 25 and which has been discussed in detail above) to print the image the desired number of times. Once this has occurred, as shown in FIG. 28c, execution passes to block 2870 to read the status of the image printer. If the status information indicates that a fault condition occurred within the image printer during this printing operation, then decision block 2872 routes execution, via its "YES" path, to block 2875 which reports the fault condition by sending an appropriate SCSI Sense Data command to the host processor situated within the file server. Now, after this SCSI command has been sent or in the event no image printer faults have occurred, block 2877 is executed to first clear the destination memory frame and then release this frame for subsequent re-allocation and use. Once this has occurred, execution exits from Note/Image Routine 2800 and returns, via path 1183, to block 1151 situated within Command Processor Routine 1150.

Now, alternatively, if the next RIP command is a Note command, then block 2855 routes execution, via path 2856, to block 2860. This latter block, when executed, invokes Annotation Routine 3000 (see FIG. 30 and which will be discussed in the following paragraph). This routine, as noted, receives a textual annotation, then appropriately rotates the annotation by 0, 90, 180 or 270 degrees, as appropriate, and finally stores the rotated annotation in bit-mapped form within the current memory frame but superimposed (overlaid) onto the scaled bit-mapped image at a desired image location. After Annotation Routine 3000 has fully executed, execution loops back to block 2856, via path 2862, from block 2860 in order to process the next RIP command. A RIP Print command normally follows a Note command in order to print the annotated image.

Scale routine 2900 provides software scaling and is used in the absence of scaler 60, as discussed above. This routine expands the size of a decompressed scanned image, which occurs at a resolution of 1728 pixels/ horizontal line by 2368 vertical lines, to the size of the printable area produce by the image printer, i.e. 2400 pixels/line by 3262 vertical lines for an 8½ by 11 inch (approximately 21.6 centimeters by 27.9 centimeters) image. This entails both horizontal and vertical expansions of 8:11. To accomplish the necessary horizontal expansion, every byte (formed of 8 pixels) in the decompressed (source) image is converted into an 11 pixel value which is stored within appropriate locations in the destination memory frame. There are 216 eight pixel bytes in every decompressed line. The 11 pixel value is identical to the eight pixel byte except the value of three pixels in the eight pixel byte are repeated to form the 11 pixel value. Specifically, a decompressed 8 pixel value generically represented by the following pixels "7 6 5 4 3 2 1 0" provides a generic scaled 11 pixel value represented by the following pixels "7 7 6 5 4 4 3 2 1 1 0". Consequently, for a specific unscaled byte of "01001101", the scaled 11 pixel value would be "00100011001" and so on for every other value of an eight pixel byte. To accomplish the necessary vertical expansion, every group of 32 lines of an unscaled decompressed image is converted into a corresponding group of 44 lines, thereby providing vertical expansion of 8:11. The 44 lines group is identical to the group of 32 lines except that certain lines in the 32 line group are repeated to form the 44 line group. Each bit in a pre-defined 32 bit code word specifies whether a corresponding line is to be successively repeated to form the 44 line group. The particular 32 bit code word used is "01001001001010 0100100100101". A "1" in first bit position (bit 0) indicates that the first scan line is to be scaled and the results repeated to form the first and second scaled lines in the scaled image in the destination memory frame and so on for the other bit positions.

Figure 29B:
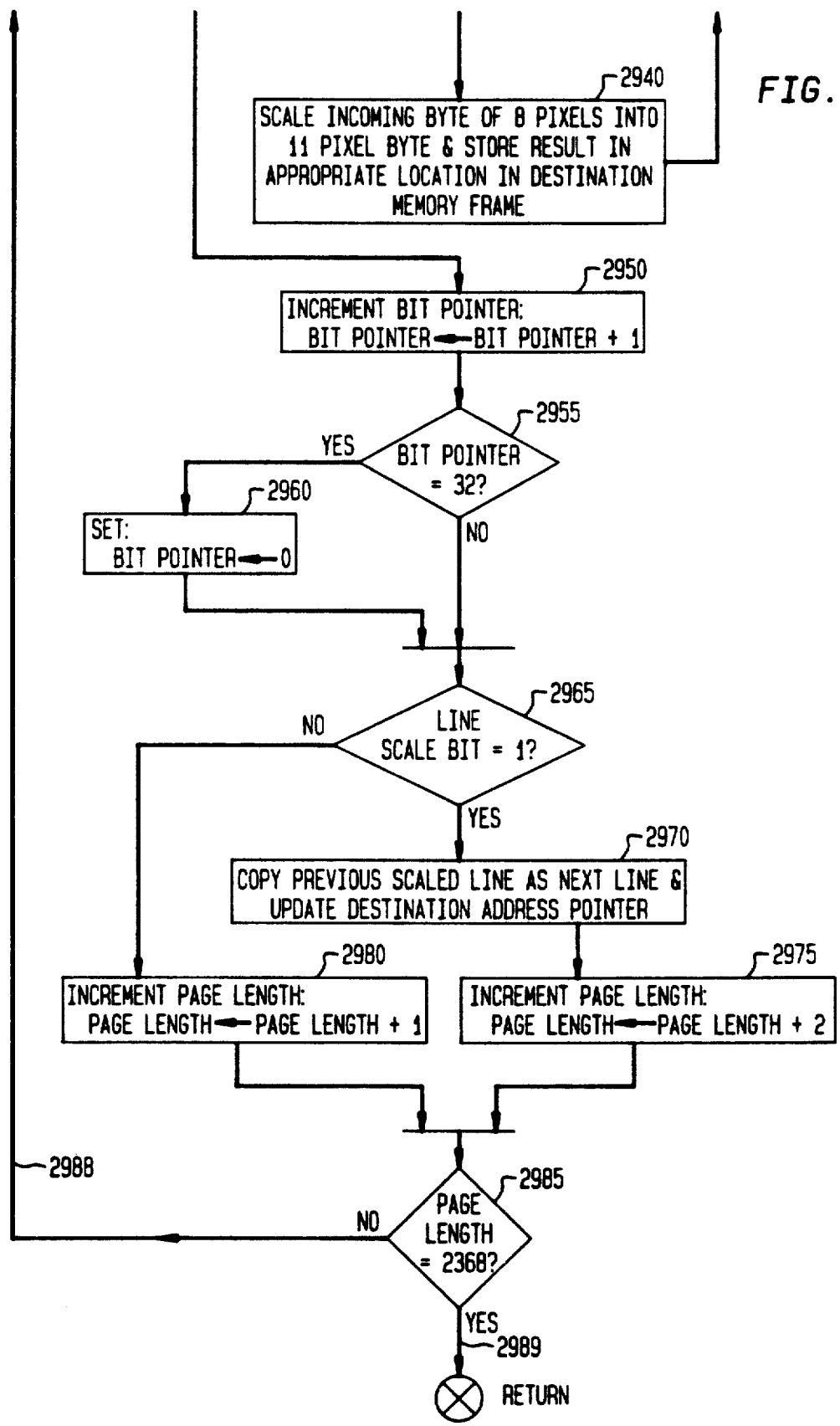

Now with this in mind, a flowchart of Scale Routine 2900 is shown in FIG. 29a–29b, for which the correct alignment of the respective drawing sheets is depicted in FIG. 29. As shown, upon entry into this routine, execution first proceeds to block 2905. This block, when executed, unpacks the scale ("s") bits (see FIG. 11) from an incoming RIP Image command. Thereafter, decision block 2910, as shown in FIG. 29a and 29b, executes to test whether any scaling is to be performed on the decompressed image bits, i.e. whether the value of the "s" bits is non-zero. If these bits are zero valued, thereby indicating that no scaling is necessary, then execution exits from routine 2900, via the "NO" path emanating from decision block 2910. Alternatively, if scaling is required, then execution proceeds, via the "YES" path emanating from decision block 2910, to block 2915. This latter block, when executed, initializes the values of source and destination address pointers which point to the first locations of the unscaled and scaled images, respectively, stored within allocated source and destination memory frames in the image buffer. Thereafter, execution proceeds to block 2920 which initializes various pointers and variables; i.e. the value of a bit pointer, used to point to specific bits in the 32 bit code word, is set to the hex value "FF" and page width and page length counters are both set to zero. Once this has occurred, execution proceeds to block 2925 which increments the value of the page width variable by eight. Thereafter, execution proceeds to decision block 2930 which tests whether the last pixel in an incoming line has been reached, i.e. whether the page width equals or exceeds the decimal value "1728". If the last pixel has not been reached, the decision block 2930 routes execution, via its "NO" path, to block 2935. This block reads the next eight pixel byte of incoming scanned image data from the source memory frame. Once this byte has been read, block 2940 executes to expand the eight pixel byte into an 11 pixel value in the manner set forth in the paragraph above. This 11 pixel value in then stored in appropriate pixel locations in the destination memory frame. Thereafter, execution loops back, via path 2942, to block 2925 to repeat the process for the next byte of incoming decompressed image data. Now, alternatively, in the event that the full line has been scaled, i.e. that the value of the page width variable has been incremented to or past the decimal value "1728", then decision block 2930 routes execution, via its "YES" path, to block 2945. This latter block, when executed, resets the value of the page width variable to zero in preparation for scaling the next incoming line.

At this point execution passes to block 2950 which increments the value of the bit pointer by one. As noted, this pointer points to a bit in the 32 bit code word. This bit indicates whether a corresponding one of 32 scaled lines is to be repeated to form the group of 44 lines. Once the pointer has been incremented, execution proceeds to decision block 2955. This decision block, when executed, determines whether, the value of the bit pointer has been incremented from zero past the last bit position, i.e. the value "32". If the value of the bit pointer has reached "32", then decision block 2955 routes execution, via its "YES" path, to block 2960 which resets the value of the bit pointer to zero. Thereafter or in the event the value of the bit pointer has not reached zero, then execution proceeds to decision block 2965. This decision block tests the state of the particular bit ("line scale bit") in the 32 bit code word designated by the value of the bit pointer. In the event this bit is one, then execution proceeds, via the "YES" path emanating from decision block 2965, to block 2970. This latter block, when executed, copies the entire line that has just been scaled as the next line in the destination memory frame and then appropriately updates the value of the destination address pointer. Thereafter, block 2975 is executed to increment the value of the page length variable by two to reflect the two latest scaled lines. Execution the proceeds to decision block 2985. Alternatively, in the event the state of the line scale bit equals zero, then decision block 2965 routes execution, via its "NO" path, to block 2980. Inasmuch as the most recently scaled line has not be copied, this latter block, when executed, merely increments the value of the page length variable by one. Thereafter, decision block 2985 is executed to determine whether the end of the page has been reached, i.e. by whether the value of the page length variable to been incremented to the decimal value "2368". In the event the end of the page has been reached, i.e. all the lines in the incoming decompressed image have been appropriately scaled, then execution exits from Scale Routine 2900, via "YES" path 2989 emanating from decision block 2985. Alternatively, if the end of the page has not been reached, i.e. there are more decompressed lines left to scale, then decision block 2985 routes execution, via "NO" path 2988, back to block 2925 in order to appropriately scale these lines.

Figure 30:
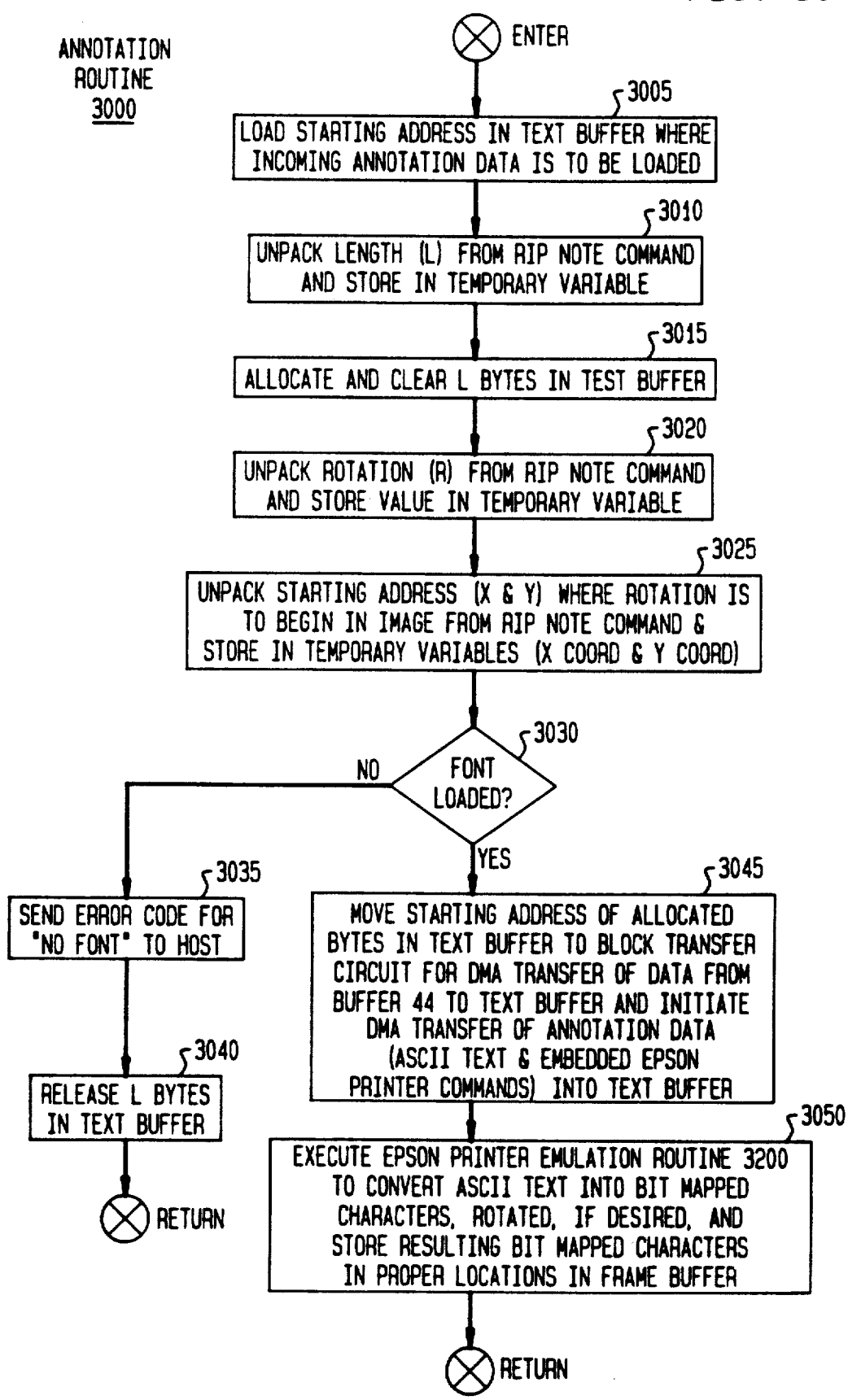
FIG. 30 shows a flowchart of Annotation Routine 3000 that is also executed as part of Note/Image Routine 2800.

A flowchart of Annotation Routine 3000 is shown in FIG. 30. Upon entry into this routine, block 3005 is executed to load the starting address of a location in a text buffer where incoming annotation data is to be stored. The text buffer resides in a pre-defined portion of buffer 44 situated within the RIP memory space.

Thereafter, block 3010 is executed to unpack the length byte (bits "L") from the incoming RIP Note command that at present is stored within the SCSI command buffer located within buffer 44 (see FIG. 4). Once this has occurred, block 3015, as shown in FIG. 30, is executed to first allocate and then clear the contents of the number of bytes within the text buffer that has been specified in the length byte. Next, block 3020 is executed to unpack the rotation ("r") bits from the RIP Note command and then store the value of these bits in a temporary variable for subsequent use. Thereafter, block 3025 is executed to unpack, from the RIP Note command, the starting location in the image (x and y coordinates) where the annotation is to begin and then store this location in corresponding temporary variables (X COORD and Y COORD) for subsequent use. At this point, decision block 3030 determines whether a font has been downloaded into the RIP from the host processor located within the file server. If not, execution proceeds, via the "NO" path from decision block 3030, to block 3035 which sends an appropriate error message to this host processor via a SCSI Sense Data command. At this point, block 3040 is executed to release the allocated bytes in the text buffer for subsequent use. Execution then exits from Annotation Routine 3000 and returns to block 2855 in Note/Image Routine 2800 (see FIG. 28b which has been discussed above). Alternatively, if a font has been downloaded, then execution proceeds, as shown in FIG. 30, via the "YES" path from decision block 3030, to block 3045. This latter block loads the starting address of the allocated bytes in the text buffer into the block transfer circuit (rasterizing circuit 342 in raster operation circuit 340—see FIG. 3 which has been discussed above) in order to then transfer annotation data from the SCSI command buffer into the text buffer. Once this address has been loaded, a data path is effectively established, and the transfer occurs via direct memory access. Thereafter, block 3050 is executed, as shown in FIG. 30, to invoke EPSON Emulation Routine 3200 (see FIG. 32 which will be discussed in detail below). When executed, routine 3200 converts the annotation data, consisting of ASCII text characters with embedded EPSON printer commands, stored within the text buffer into bit-mapped text characters, appropriately rotated if desired, and then stores each bit-mapped character within the bit-mapped image existing within the current allocated memory frame at a desired location in the image. This, in effect, overlays each bit-mapped character onto the image and creates an annotated image. The process of choosing the appropriate bit-mapped character merely entails accessing a bit pattern within the downloaded font that corresponds to each ASCII text character. Each EPSON printer command is emulated by choosing the appropriate bit pattern (to emulate bolding and the like) or positioning a bit pattern correctly within the image (to emulate horizontal and vertical tabs and the like). Once EPSON Emulation Routine 3200 has properly processed each ASCII text character that forms the annotation, execution of block 3050 is complete. Execution then exits from Annotation Routine 3000 and appropriately returns to block 2855 in Note/Image Routine 2800 (see FIG. 28 which has been discussed above).

c. Text Routine 3100

As discussed above, a RIP Text command instructs the RIP to receive incoming annotation data and interpret each byte in this data as either an ASCII text character or a printer emulation command, convert the resulting text into bit-mapped characters, using a preselected font, and finally rasterize these characters. The resulting rasterized characters are stored in an allocated frame within the image buffer. One copy of the text is then printed by the image printer.

Figure 31B:
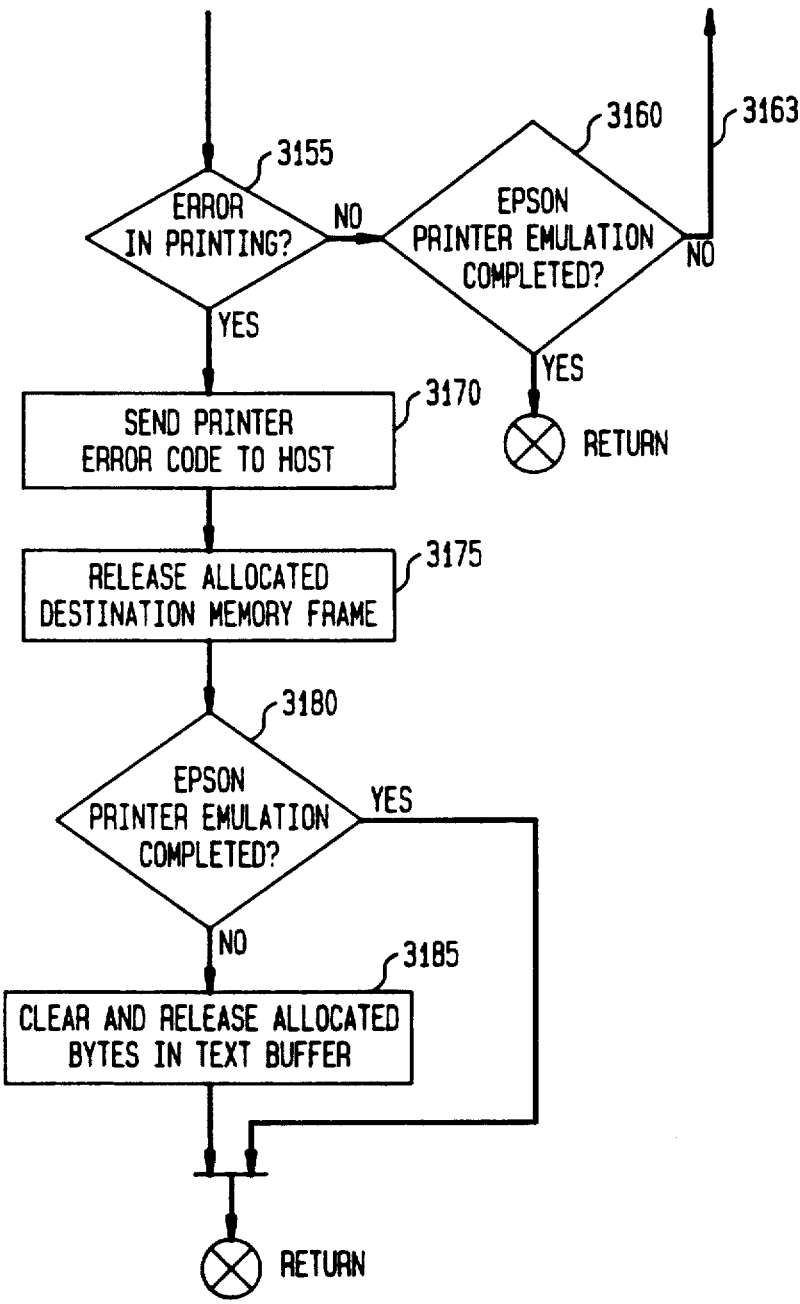

A flowchart of Text Routine 3100, which processes RIP Note and Image commands, is shown in FIGS. 31a–31b, for which the correct alignment of the drawing sheets is depicted in FIG. 31.

Upon entry into routine 3100, block 3105 is executed to load the starting address where incoming annotation data is to be loaded into the text buffer from the SCSI command buffer situated within buffer 44 (see FIG. 4) via direct memory access. Once this occurs, block 3110 is executed to unpack the length ("L") field from the RIP Text command and store the value of the length field in a temporary variable. Thereafter, block 3115 is executed to first allocate and then clear the contents of the number of bytes within the text buffer that have been specified in the length field. At this point, execution passes to decision block 3120 which determines whether a font has been previously downloaded into the RIP. If not, then execution is routed, via the "NO" path from the decision block, to block 3125. This latter block, when executed, sends an no font error code to the host processor, located within the file server, via an appropriate SCSI Sense Data command. Thereafter, block 3130 is executed to release the previously allocated bytes in the text buffer for subsequent use by another RIP Text command. Execution then exits from RIP Text Routine 3100 and returns, via path 1175, to block 1151 situated within Command Processor Routine 1150 (see FIG. 11c).

Now, alternatively, if a font has been downloaded into the RIP, then execution proceeds, as shown in FIG. 31a, via the "YES" path from decision block 3120, to block 3135. This latter block invokes frame Request Routine 2400 (see FIG. 24 and which has been discussed above) in order to allocate a memory frame to serve as a destination frame to store processed text data and thereby define a data path between the text buffer and the destination frame. Once this destination frame has been allocated, block 3140 is executed first to initiate a DMA transfer of the incoming ASCII text data from the SCSI command buffer into the allocated bytes in the text buffer and second to invoke EPSON Emulation Routine 3200 (see FIG. 32 and discussed in detail below). This routine, in response to a text command, converts annotation data, i.e. ASCII text characters with embedded EPSON printer emulation commands, appearing in buffer 44 (see FIG. 4 and discussed above) and supplied by an incoming SCSI Print command into bit-mapped text characters, and then stores each bit-mapped character within the allocated destination memory frame for subsequent printing. Once all the incoming annotation data has been processed, execution passes from block 3140 to block 3145 to invoke Goprint Routine 2500 (see FIG. 25 and discussed above) to print the contents of the destination buffer. Once printing has occurred, decision block 3155 is executed to read the status bits provided by the image printer and test the value of these bits to determine if any printer errors occurred during printing. If no such errors have occurred, then execution passes, via the "NO" path from this decision block to decision block 3160. This latter decision block tests whether all the printer emulation commands embedded in the incoming annotation data have been executed; i.e. whether EPSON printer emulation is finished. If all these commands have not been executed, then execution loops back, via the "NO" path from decision block 3160 and path 3163, to block 3135. In this case, block 3135 will allocate a second memory frame for use in processing the remaining printer emulation commands. Blocks 3140-3160 will appropriately process the remaining printer emulation commands and print the second page of processed text data. Alternatively, if all the printer emulation commands have been processed, execution exits from Text Routine 3100, via the "YES" path from decision block 3160, and returns, via path 1175, to block 1151 situated within Command Processor Routine 1150. Now, in the event a printer error occurs, then decision block 3155 alternatively routes execution to block 3170. This latter block, when executed, sends an error code corresponding to the printer error to the host processor situated within the file server, via an appropriate SCSI Sense Data command. Thereafter, block 3175 is executed to release the allocated bytes in the destination memory frame for subsequent use by another RIP command. Once this has occurred, decision block 3180 is executed to determine whether any additional printer emulation characters remain to be processed. If not, this decision block directs execution, via its "NO" path, to block 3185 to clear and release the allocated bytes in the text buffer. Now, once these bytes have been released or in the event additional emulation commands exist and decision block 3180 routes execution to its "YES" path, execution then exits from Text Routine 3100 and returns, via path 1175 (see FIG. 11c), to block 1151 situated within Command Processor Routine 1150. This completes execution of Text Routine 3100.

6. EPSON Printer Emulation Routines

As noted above, during processing of RIP Note and Text commands, EPSON Printer Emulation Routine 3200 is invoked to appropriately process incoming annotation or text data, containing both ASCII text characters and embedded EPSON printer commands, on a character-by-character basis. For a RIP Note command, this routine converts the incoming annotation data appearing within buffer 44 (see FIG. 4 and discussed above) into bit-mapped text characters, appropriately rotated if desired, and then stores each bit-mapped character within the bit-mapped image existing within the current allocated memory frame at a desired location in the image. This, in effect, superimposes (overlays) each bit-mapped character onto the image and thereby creates an annotated image. For a RIP Text command, the same operations, with exception of character rotation and overlay in the allocated memory frame, occur to process each textual character in seriatim.

Figure 32B:
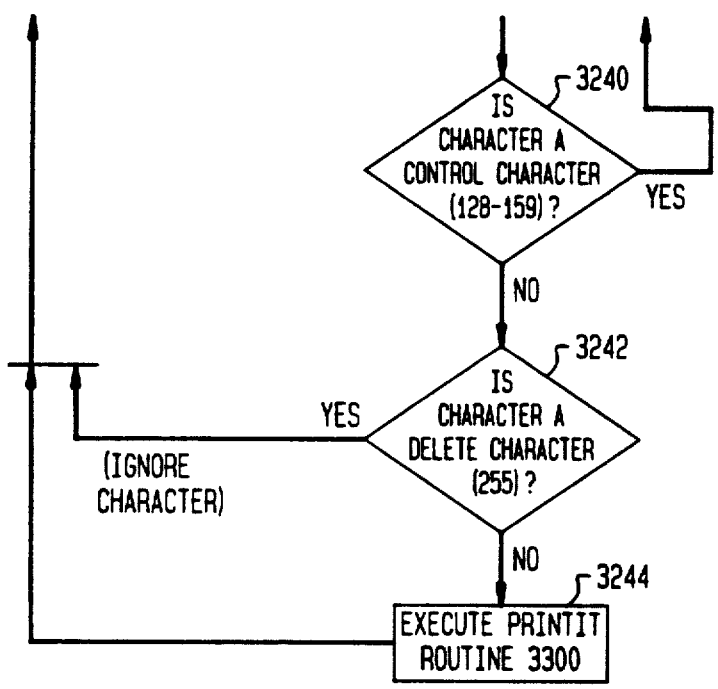
Figure 32C:
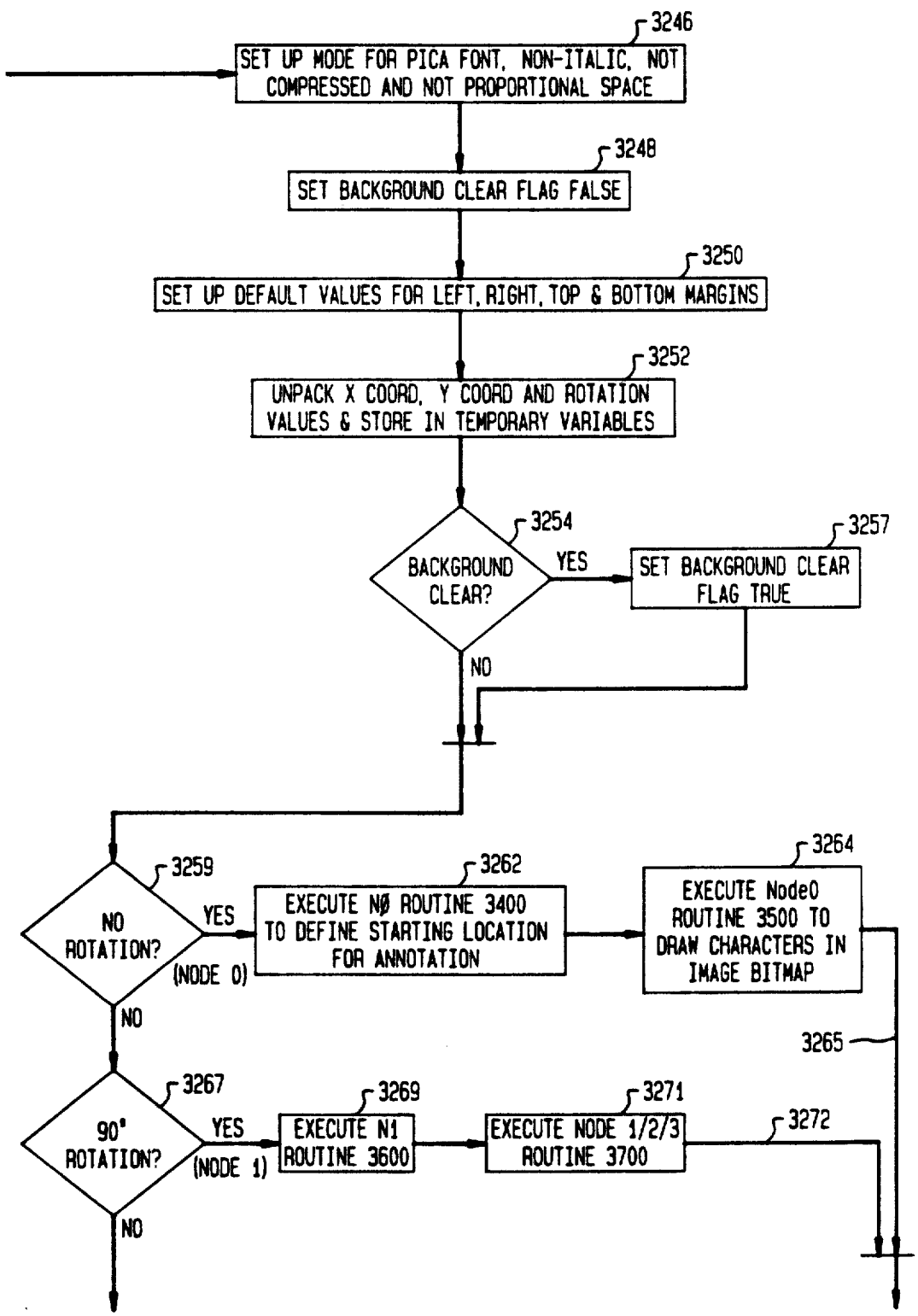
Figure 32D:
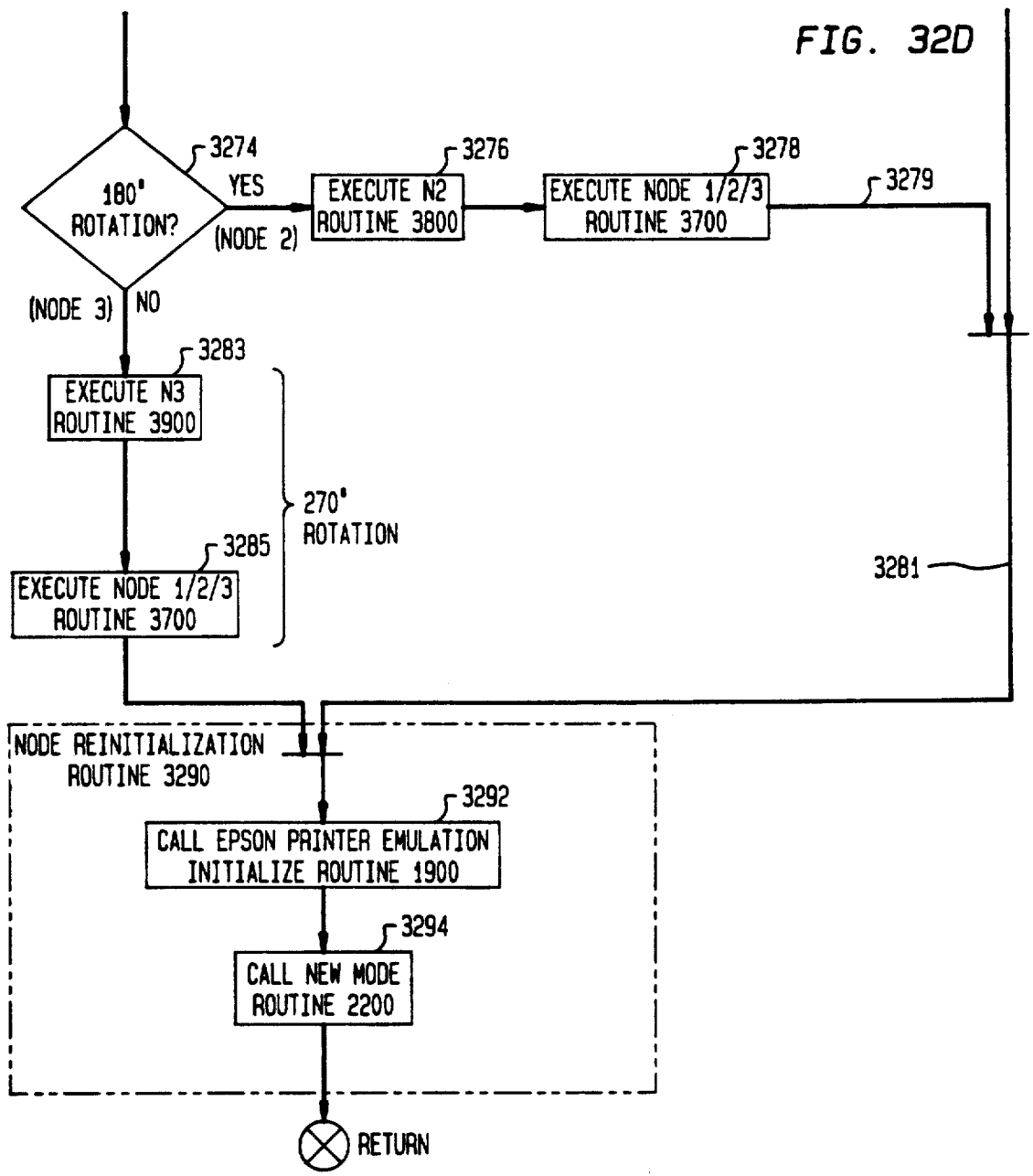

A flowchart of EPSON Printer Emulation Routine 3200 is shown in FIGS. 32a-32d, with the proper alignment of the drawing sheets for these figures depicted in FIG. 32.

Specifically, upon entry into routine 3200, execution is first routed to decision block 3201 which ascertains whether the current RIP command being processed is a RIP Text or RIP Note command. If this command is a Text or Note command, then this decision block respectively routes execution, via path 3203 to block 3206 or via path 3202 to block 3246.

a. Steps within Routine 3200 associated with a RIP Text command

The discussion will now proceed with an explanation of the remaining steps within EPSON Printer Emulation Routine 3200 that are associated with a Text command. Specifically, block 3206, when executed, tests a "Stack Mode" flag to determine whether a character is present in the stack. The stack only holds one character and is used for character wraparound. Specifically, the stack is filled with the next character to be processed in an incoming line whenever the RIP encounters a right margin on the current line before all characters on the incoming line have been processed. Should this occur, the character in the stack becomes the first character on the next succeeding line. Block 3750 located within NODE 1/2/3 Routine 3700 (see FIG. 37 which will be discussed below) fills the stack. If a character exists within the stack ("Stack Mode" flag is true), the execution proceeds, as shown in FIGS. 32a-32d, via the "YES" path emanating from decision block 3206, to block 3208 to then fetch the character from the stack. Alternatively, if a character is not present in the stack, then execution is directed, via the "NO" path from decision block 3206, to block 3209. This latter block fetches the next character from the text buffer (a portion of buffer 44, as noted above). Thereafter, decision block 3211 is executed to determine whether the next character in an "end of page" control code. If so, execution proceeds, via the "YES" path from decision block 3211, to block 3214 to set the "Stack Mode" flag to a true state. This indicates that a character (specifically an "end of page" control code) exists in the stack. Since no more data exists to be processed, execution then exits from EPSON Printer Emulation Routine 3200 and returns to the calling program. Alternatively, if the next character is not an "end of page" control character, then execution proceeds, via the "NO" path, from decision block 3211 to block 3216.

Since either a character has just been fetched from the stack or no character presently exists in the stack, block 3216 sets the "Stack Mode" flag to a false state. Execution then proceeds to decision block 3218 which tests whether the fetched character is an ASCII control character (an EPSON printer command) with an equivalent decimal value between "0" and "31" inclusive. If the value of the fetched character falls within this range, then decision block 3218 routes execution, via its "YES" path, to decision block 3221. This latter decision block tests whether the control character is printable. If it is printable, then execution proceeds, via the "YES" path from decision block 3221, to block 3224 to invoke Printit Routine 3300 (see FIG. 33 and which will be discussed in detail below). Routine 3300, when executed, performs a look up operation into the font table to access a corresponding bit pattern for the fetched character and then loads the pattern into the current memory frame with the proper character spacing given the type of character that is to be printed (i.e. standard width, expanded or proportional). Once routine 3300 has fully executed, then execution loops back, via path 3233 to block 3206 to process the next character in the text buffer. Alternatively, if the character is not a printable control character then execution is directed, as shown in FIGS. 32a-32d, via the "NO" path emanating from decision block 3221, to decision block 3227. This latter decision block determines whether the control character has a value of either "08" or "1B" hex. If the control character has neither value, then execution proceeds, via the "NO" path from decision block 3227 and path 3233 to block 3206 to process the next character. However, if the value of the control character equals either "08" or "1B", then decision block 3227 routes execution to block 3230 to appropriately process the character as an EPSON printer command. The value "1B" is the ASCII value associated with an escape key and signals the beginning of an escape command sequence; such a sequence is a printer command that extends over several characters. Consequently, when the escape key is detected, block 3230 sets an "Escape" flag true and routes execution, via path 3233, to block 3206 to fetch the next character in the escape sequence. Once all the characters in the escape sequence have been obtained, they are appropriately processed by block 3230 to emulate a desired EPSON printer operation in the current memory frame. The value "0B" indicates that the next character, by itself, should be interpreted as a control character. Therefore, whenever this value is detected, block 3230 sets an appropriate flag to enable this block to process the following character as a control character and thereby emulate a desired EPSON printer operation. Once block 3230 has finished executing, execution loops back to block 3206, via path 3233, to fetch and process the next character.

Now, alternatively, if the fetched character is not a control character, execution proceeds, via the "NO" path from decision block 3218, to decision block 3235. This latter block determines whether the character is a printable ASCII character having an equivalent decimal value of between "32" and "127". If the character is printable, then decision block 3235 routes execution, via its "YES" path, to block 3238 which invokes Printit Routine 3300 to access an corresponding bit pattern for the fetched character and load the pattern with the proper character spacing into the current memory frame. Thereafter, execution loops back, via path 3239, to block 3206 to fetch and process the next character. Alternatively, if the fetched character is not a printable text character, then decision block 3235 routes execution, via its "NO" path, to decision block 3240. This latter block tests whether the character is an ASCII control character having a decimal value between "128" and "159", inclusive. If the fetched character is such a control character, then decision block 3240 directs execution, via its "YES" path to block 3221, as discussed above, for further processing of the control character. In the event the fetched character is not such as ASCII control character, then decision block 3240 routes execution, via its "NO" path, to decision block 3242. This latter decision block tests whether the fetched character is an ASCII "delete" character, i.e. has a decimal value of "255". If the fetched character is a delete character, then this decision block routes execution, via path 3239, back to block 3206 and thereby effectively ignores this delete character. Lastly, if the fetched character is not a delete character, then decision block 3242 routes execution to block 3244 which invokes Printit Routine 3300 to access an appropriate bit pattern for the fetched character and load the pattern with the proper character spacing into the current memory frame. Thereafter, execution loops back, via path 3239, to block 3206 to fetch and process the next character. This now concludes the discussion of the steps within EPSON Printer Emulation Routine 3200 associated with a RIP Text command.

b. Steps within Routine 3200 associated with a RIP Note command

The discussion will now proceed to address the remaining steps in EPSON Printer Emulation Routine 3200 which are associated with a RIP Note command. Specifically, if the current RIP command is a Note command, then, as discussed above, decision block 3201 routes execution, via path 3202, to block 3246. When executed, block 3246 selects the default parameters for the annotation. Specifically, this block selects a non-italic non-compressed pica font without proportional spacing for the text that will form the annotation. Once this has occurred, block 3248 is executed to set the state of a "Background Clear" flag to false. This flag, when false, specifies that the annotation will be directly written over the image itself. As discussed above, the annotation will be positioned in a desired region of the image. In contrast, if this flag is true, then this region of the image will first be cleared to produce a white background in the image over which the annotation will then be written. Thereafter, block 3250 is executed to establish default values for the left, right, top and bottom margins. Once this has occurred, block 3252 is executed, to unpack the X and Y coordinates, the overlay control ("o") bit and the value of the rotation field ("r" bits) in the RIP Note command (see the Note command format in FIG. 10a which has been discussed above) and store the corresponding values in appropriate temporary variables (X COORD, Y COORD and ROTATE, respectively) for subsequent use in forming and properly positioning the annotation onto the image in the current memory frame.

Now, once block 3552 has completely executed, execution proceeds to decision block 3254 which, using the value of the overlay control bit, determines whether the note should be overlaid onto the image itself or onto a white background. In the event, the value of this bit is one, then decision block 3254 routes execution, via its "YES" path, to block 3257 to set the state of the "Background Clear" flag true. If the overlap control bit is zero-valued or once the background clear flag has been set to the true state, then execution proceeds to decision block 3259. This decision block, in conjunction with decision blocks 3267 and 3274, tests the value of the rotation bits, stored in the variable ROTATE, to determine the degree to which the annotation is to be rotated: none; or 90, 180 or 270 degrees.

Specifically, if the rotation bits specify no rotation (also referred to herein as "NODE O" mode), then decision block 3259 routes execution via its "YES" path, to block 3262. This block invokes NO Routine 3400 (see FIG. 34 and which is described in detail below) which, using the unpacked X and Y coordinate values, defines the starting location in the image, stored in the current memory frame, where the annotation is to begin. Once this occurs, block 3264, as shown in FIGS. 32a-32d, is executed to invoke NodeO Routine 3500 (see FIG. 35 and which is described in detail below) to sequentially: read each character stored within the data section of the RIP Note command, access a corresponding bit pattern for each character from a selected font table (the default table or otherwise) that contains non-rotated bit patterns and write each accessed bit pattern into the image at the proper locations within the current memory frame thereby forming the annotation. Once NodeO Routine 3500 has processed all the characters that form the annotation, execution passes from block 3264, as shown in FIGS. 32a-32d, via paths 3265 and 3281, to Node Reinitialization Routine 3290.

Alternatively, if the value of the rotation bits specifies a rotation, then execution proceeds, via the "NO" path from decision block 3259, to decision block 3267. Decision block 3267 tests this value to determine if a ninety degree rotation (also referred to herein as "NODE 1" mode) is requested. If the rotation bits specify a ninety degree rotation, then execution proceeds, via the "YES" path from decision block 3267, to block 3269. This block invokes N1 Routine 3600 (see FIG. 36 and which will be discussed in detail below) which using the unpacked X and Y coordinate values, defines the starting location in the image, stored in the current memory frame, where the ninety degree rotated annotation is to begin. Thereafter, as shown in FIGS. 32a–32d, block 3271 is executed to invoke NODE 1/2/3 Routine 3700 (see FIGS. 37a–37c and which will be discussed in detail below) to sequentially: read each character stored within the data section of the RIP Note command, access a corresponding bit pattern from a front table (the default table or otherwise) that has rotated bit patterns and write the accessed pattern into the image at the proper locations within the current memory frame. Once NODE 1/2/3 Routine 3700 has processed all the characters that form the annotation, execution passes, as shown in FIGS. 32a–32d, from block 3271, via paths 3272 and 3281, to Node Reinitialization Routine 3290.

Now, alternatively, if the value of the rotation bits specifies either a 180 or 270 degree rotation, then execution sequentially proceeds through the respective "NO" paths emanating from decision blocks 3259 and 3267, to decision block 3274. If the rotation bits specify a 180 degree rotation (also referred to herein as "NODE 2" mode), then execution proceeds, via the "YES" path from decision block 3274, to block 3276. This block invokes N2 Routine 3800 (see FIG. 38 and which will be discussed in detail below) which, using the unpacked X and Y coordinate values, defines the starting location in the image, stored in the current memory frame, where the 180 degree rotated annotation is to begin. Thereafter, as shown in FIGS. 32a–32d, block 3278 is executed to invoke NODE 1/2/3 Routine 3700 to sequentially: read each character stored within the data section of the RIP Note command, access a corresponding bit pattern from a font table (the default table or otherwise) that has rotated bit patterns and write the accessed pattern into the image at the proper locations within the current memory frame. Once NODE 1/2/3 Routine 3700 has processed all the characters that form the annotation, execution passes, as shown in FIGS. 32a–32d, from block 3278, via paths 3279 and 3281, to Node Reinitialization Routine 3290.

Lastly, if the value of the rotation bits specifies a 270 degree rotation (also referred to herein as "NODE 3" mode), then decision block 3274 routes execution, via its "NO" path, to block 3283. This block invokes N3 Routine 3900 (see FIG. 39 and which will be discussed in detail below) which, using the unpacked X and Y coordinate values, defines the starting location in the image, stored in the current memory frame, where the 270 degree rotated annotation is to begin. Thereafter, as shown in FIGS. 32a–32d, block 3285 is executed to invoke NODE 1/2/3 Routine 3700 to sequentially: read each character stored within the data section of the RIP Note command, access a corresponding bit pattern from a font table (the default table or otherwise) that has rotated bit patterns and write the accessed pattern into the image at the proper locations within the current memory frame. Once NODE 1/2/3 Routine 3700 has processed all the characters that form the annotation, execution passes, as shown in FIGS. 32a–32d, from block 3285 to Node Reinitialization Routine 3290.

At this point, all the annotation data has been appropriately written, rotated if necessary, into the current memory frame thereby either overlaying the annotation over the image directly or onto a white background at the desired image locations. At this point, all that remains is to reinitialize the printer emulation and the front selection parameters in preparation for the next RIP Note command. This is accomplished by Node Reinitialization Routine 3290. This routine sequentially executes blocks 3292 and 3294 to invoke EPSON Printer Emulation Initialization Routine 1900 and New Mode 2200. Routine 1900, as discussed above in conjunction with FIG. 19, clears various printer emulation parameters and sets various emulation flags to corresponding default values. New Mode Routine 2200, discussed above in conjunction with FIG. 22, sets various pointers to select the default font and appropriately sets various parameters associated therewith. Once these two routines have been fully executed, execution exits from EPSON Printer Emulation Routine 3200 and returns to the calling program. This now concludes the discussion of the steps within EPSON Printer Emulation Routine 3200 associated with a RIP Note command.

c. Printit Routine 3300

Figures 33, 33A:
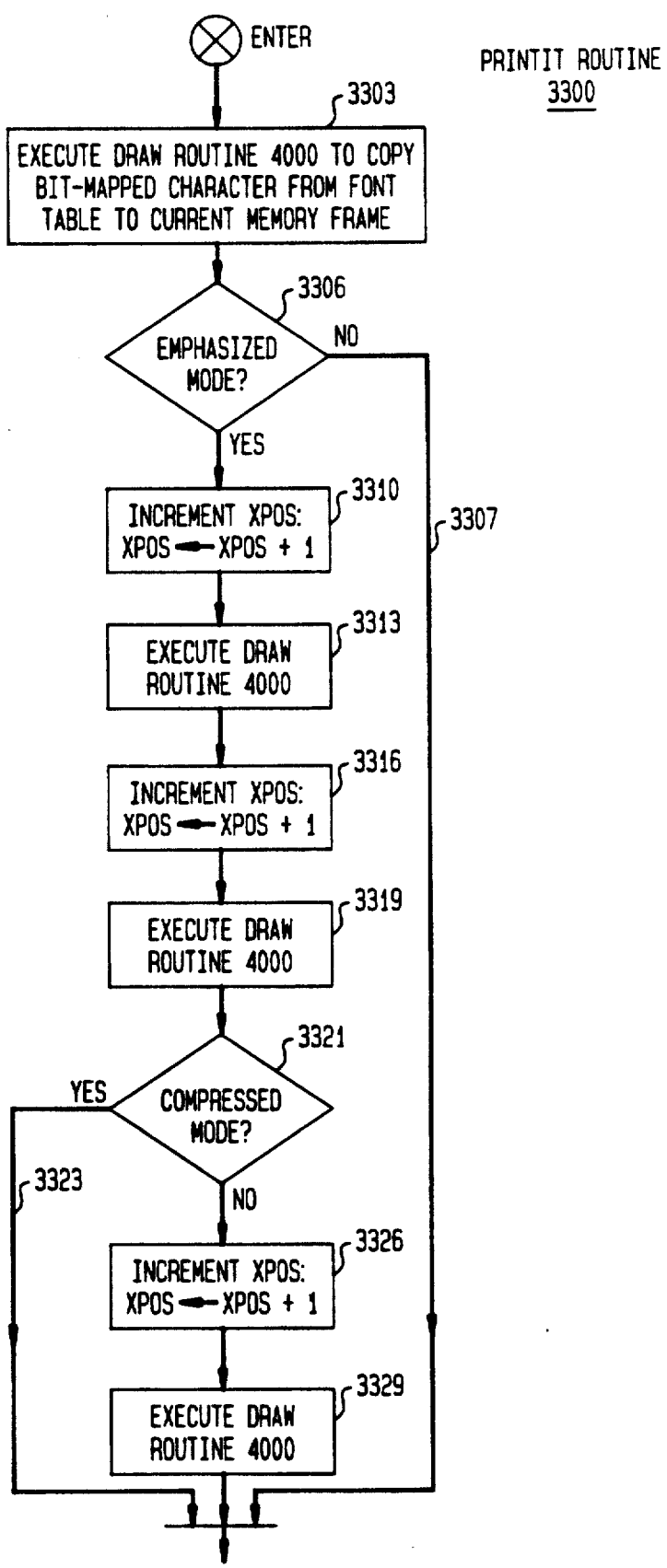
FIG. 33 shows the correct alignment of the drawing sheets for FIGS. 33a-33c.
FIGS. 33a-33c collectively show a flowchart of Printit Routine 3300 that is executed as part of EPSON Printer Emulation Routine 3200 depicted in FIGS. 32a-32d.
Figure 33B:
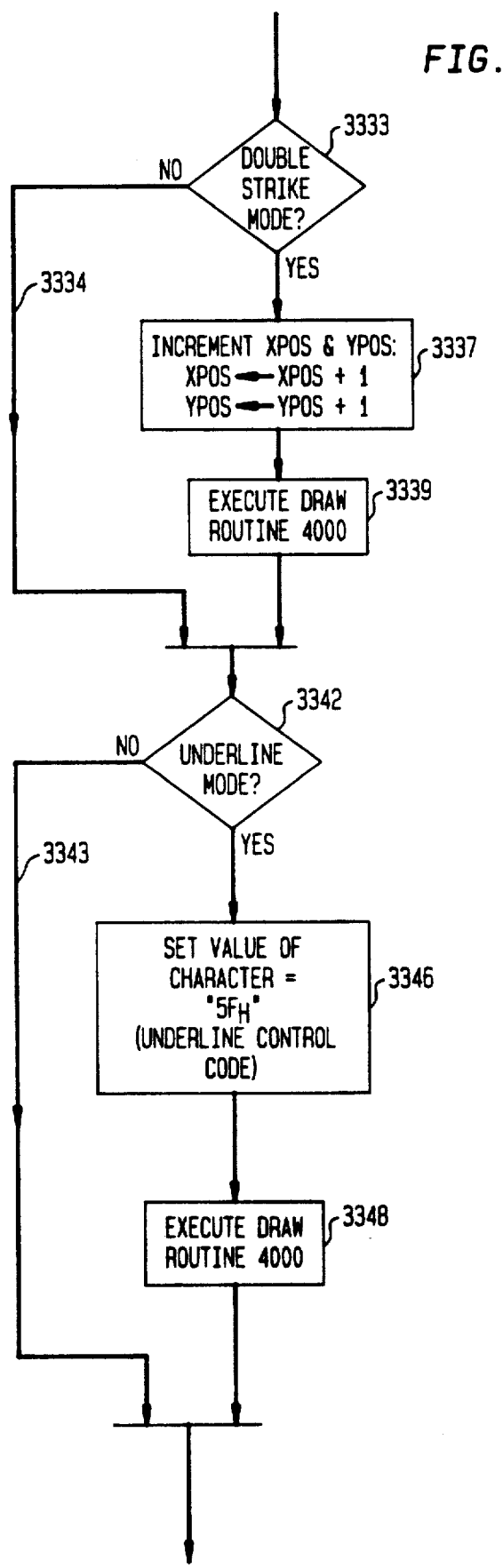
Figure 33C:
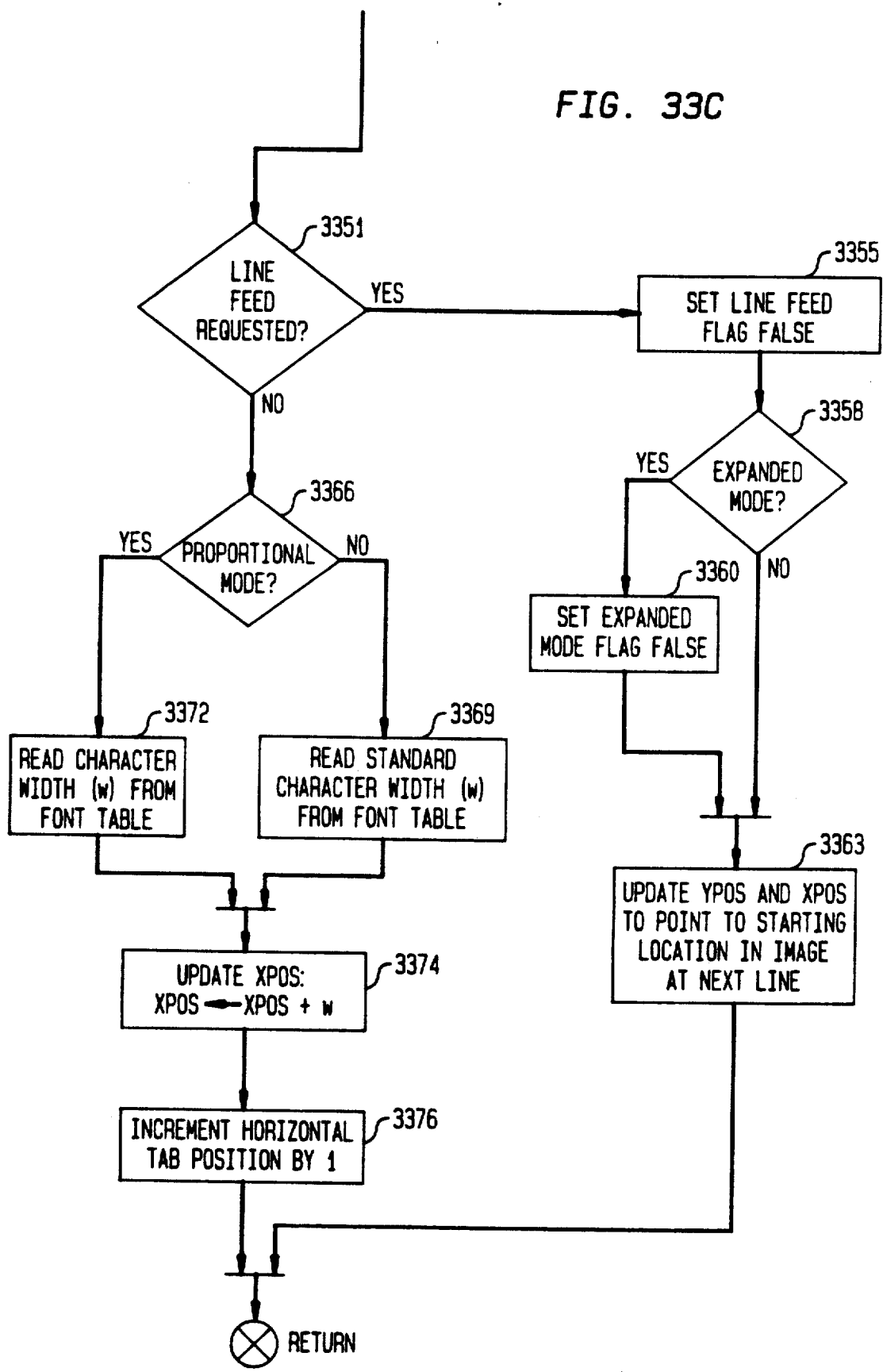

A flowchart of Printit Routine 3300 appears in FIGS. 33a–33c, for which the correct alignment of the drawing sheets for these figures is shown in FIG. 33. As noted above, this routine accesses an appropriate bit pattern for a given ASCII text character and loads the pattern with the proper character spacing into the current memory frame.

Specifically, upon entry into routine 3300, block 3303 is executed to invoke Draw Routine 4000 (see FIG. 40 and which will be discussed in detail below). This routine accesses the default font table and copies the bit pattern for a given ASCII text character into the appropriate locations in the current memory frame.

Thereafter, as shown in FIGS. 33a–33c, execution passes to decision block 3306 which determines whether "Emphasized mode" is being emulated. This mode, when used, produces a bolded character by writing the bit pattern for the text character four times, each offset by a single horizontal pixel from the previous writing, into the current memory frame. Specifically, if the emphasized mode is being used, indicated by an appropriate flag being set in response to an appropriate embedded EPSON printer control code, then decision block 3306 routes execution to block 3310. This block increments the value of the pointer XPOS, which equals the x address of the current pixel in the memory frame, by one. Thereafter, block 3313 invokes Draw Routine 4000 to again write the bit pattern for the given ASCII text character into the current memory frame at locations that have been horizontally offset by one pixel from those used during execution of block 3303. Once this occurs, blocks 3316 and 3319 are sequentially executed to increment the value of pointer XPOS by one and again invoke Draw Routine 3319. Thereafter, execution passes to decision block 3321. This decision block tests the state of an appropriate flag to determine whether the compressed mode is being used. If this mode is not being used, then decision block 3321 sequentially routes execution, via its "NO" path, to blocks 3326 and 3329. These two latter blocks increment the value of pointer XPOS and then invoke Draw Routine 4000 to write the present ASCII text character into the current memory frame for the fourth and final time so as to produce this character in the emphasized mode. Thereafter, execution proceeds to decision block 3333. Now, alternatively, if compressed mode is being used, then the present ASCII character is written only three times and not four into the current memory frame. Therefore, in this case, decision block 3321 routes execution, via "YES" path 3323, directly to decision block 3333 thereby bypassing blocks 3326 and 3329.

Next, decision block 3333 determines whether "Double Strike mode" is being used by testing the state of a corresponding flag. A double struck character is distinguished from an emphasized character in that the former is formed of the same character that has been overwritten with single pixel offsets in both the horizontal and vertical directions not just horizontally as is the latter. Therefore, if the double strike mode is being used, then decision block 3333 routes execution, via its "YES" path, to block 3337 which increments the values of both pointers XPOS and YPOS by one. Thereafter, block 3339 is executed to invoke Draw Routine 4000 to re-write the present ASCII text character into the current memory frame. Thereafter, once block 3339 has executed or in the event double strike mode is not being used and execution is directed to "NO" path 3334 by decision block 3333, decision block 3342 executes. This latter decision block determines whether underlining is being emulated by testing the state of a corresponding flag. If underlining is being emulated, then execution passes, via the "YES" path emanating from decision block 3342, to block 3346. This latter block, when executed, sets the value of the current character to "5F" hex which is a printer control code for underlining. Thereafter, block 3348 is executed to invoke Draw Routine 4000 to appropriately copy the bit pattern for underlining from the front table into the bit pattern for the previous character that has been written into the current memory frame. Thereafter, execution passes to decision block 3351. Alternatively, if underlining is not being emulated, then decision block 3342 routes execution, via "NO" path 3343, directly to decision block 3351.

After these operations have occurred, decision block 3351 is executed to determine whether a line feed has been requested by the Draw Routine. i.e. whether subsequent bit patterns are to be placed on the next line. If a line feed is needed, then decision block 3351 routes execution, via its "YES" path, to block 3355. The block, when executed, sets an appropriate "Line Feed" flag to a false state. The line feed is appropriately processed by block 3363 which will be discussed below. Once this flag has been set to a false state, execution passes to decision block 3358 which tests whether an expanded printing mode is being emulated, i.e. to create bolding, or other horizontally and/or vertically expanded text. If an expanded printing mode is being emulated, then execution passes, via the "YES" path emanating from decision block 3358, to block 3360. This latter block sets an appropriate "Expanded Mode" flag false. Inasmuch as an EPSON FX-80 printer only permits expanded mode to be invoked on only one line at a time, setting the "Expanded Mode" flag false at the end of the line turns this mode off prior to the beginning of the next line. This ensures that the expanded mode is being properly emulated. Once this flag has been properly set, execution passes to block 3363. Alternatively, in the event, that expanded mode is not being emulated, then execution is directed, via the "NO" path emanating from decision block 3358, to block 3363. This latter block appropriately updates the values of two pointers, XPOS and YPOS, which store respective X and Y addresses of a pixel situated at the starting location in the image, stored in the current memory frame, at which the next character is to be written. When a line feed occurs, pointers XPOS and YPOS mutually point to the last pixel that forms the current line. For non-rotated characters, this is the pixel located in the lower right corner of a current line of text. Specifically, in response to a line feed, block 3363 adds the line spacing to the current contents of pointer YPOS thereby causing this pointer to point to the next line. This block also resets the value of pointer XPOS to point to the first pixel location, immediately after the left margin. Therefore, these pointers are set to point to the first pixel location in the next line at which a character can be written into the image. Once block 3363 completes this updating, execution then exits from Printit Routine 3300 and appropriately returns to the calling program.

Now, in the event, a line feed has not been requested by the Draw Routine, execution is directed, via the "NO" path emanating from decision block 3351, to decision block 3366. This latter block tests a "Proportional Mode" flag to determine whether proportional spacing (a mode supported by the EPSON FX-80 printer) is being emulated. If the flag is false thereby indicating that proportional spacing is not being emulated, then decision block 3366 routes execution, via its "NO" path, to block 3369 which reads the standard character width ("w") from the front table. This standard width is the same for all characters. Alternatively, if proportional spacing is being emulated, then execution passes, via the "YES" path from decision block 3366, to block 3372. This latter block reads the character width ("w") associated with the character presently being processed. This width is pre-defined but will appropriately vary from character to character depending upon the geometry of the character presently being written into the image in the current memory frame. After either block 3369 or block 3372 has been executed, then block 3374 updates the value of address pointer XPOS, using the character width ("w"), in order to point to the starting location of the next character in the current memory frame. Thereafter, block 3376 increments the current horizontal tab position to ensure that the tab position occurs to the right of the next character. After this has occurred, execution then exits from Printit Routine 3300 and appropriately returns to the calling program.

d. NO Routine 3400 and Node0 Routine 3500

As discussed above, NO Routine 3400 defines the starting location in the image buffer, XPOS and YPOS, where the non-rotated annotation is to begin using the values X COORD and Y COORD, which, as previously discussed above, are specified within the RIP Note command. After NO Routine 3400 has executed, Node0 Routine 3500 sequentially: reads each character stored within the data section of the RIP Note command, accesses a corresponding bit pattern for each character from a selected font table (the default table or otherwise) that contains non-rotated bit patterns and, using the starting location in the image buffer provided by NO Routine 3400, writes each accessed bit pattern for each character into the image at the proper locations within the current memory frame thereby forming the annotation.

Figure 34:
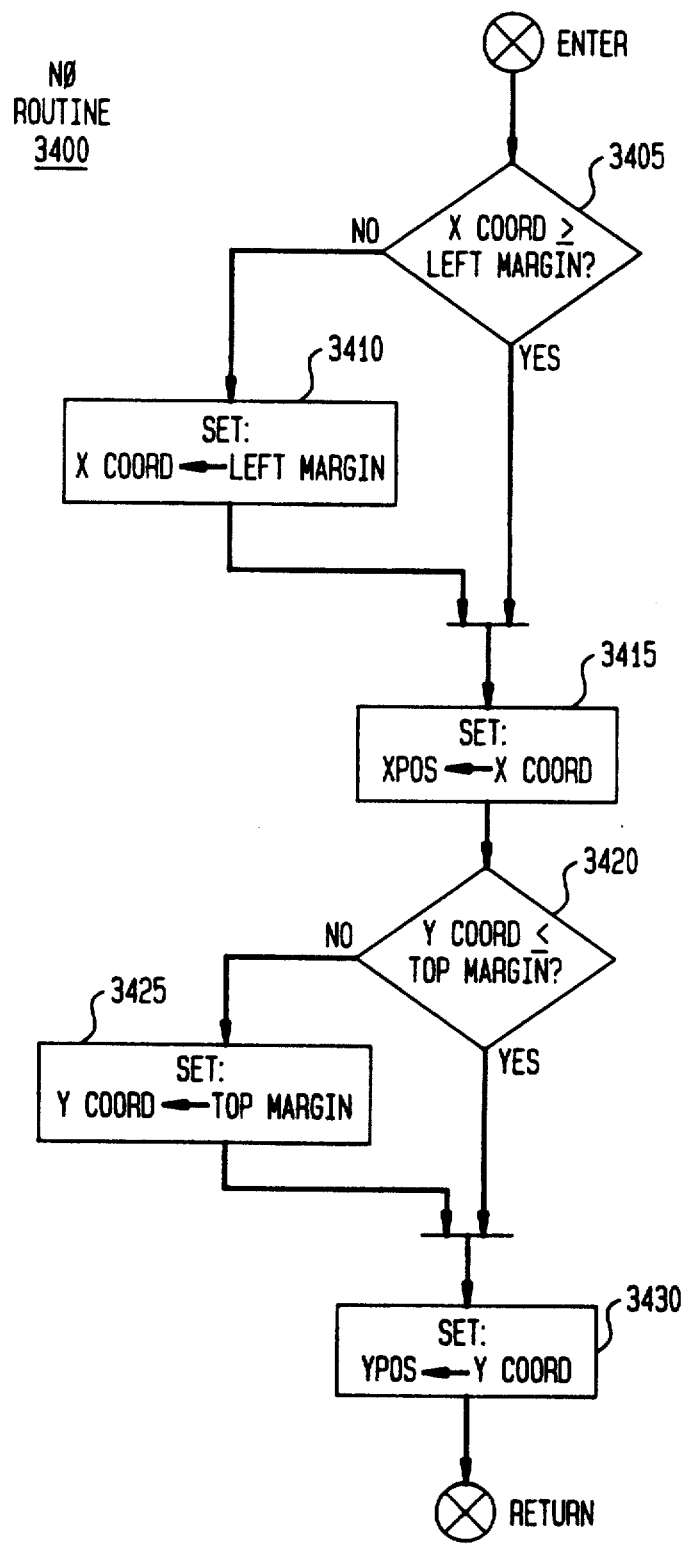
FIG. 34 shows a flowchart of N0 Routine 3400 that is executed as part of EPSON Printer Emulation Routine 3200.

FIG. 34 shows a flowchart of NO Routine 3400. Upon entry into this routine, block 3405 is executed to determine whether the current value of annotation starting location X COORD is greater than or equal to that associated with the horizontal address of the left margin in the image, i.e. whether this starting location is situated to the right of the left margin. If the value of X COORD is less than the horizontal address of the left margin, then execution proceeds, via the "NO" path from decision block 3405, to block 3410. This block, when executed, sets the annotation starting location, X COORD, to the horizontal address of the left margin. Execution then proceeds to block 3415. Alternatively, if annotation starting address X COORD points to a pixel at or to the right of the left margin, then decision block 3405 routes execution, via its "YES" path, directly to block 3415. This latter block sets the current value address XPOS to the value of annotation starting address X COORD. Thereafter, execution passes to decision block 3420. This block tests whether the current value of annotation starting location Y COORD is greater than or equal to that associated with the vertical address of the top margin in the image, i.e. whether this starting location is situated below the top margin. If the value of Y COORD is greater than the vertical address of the top margin, then execution proceeds, via the "NO" path from decision block 3420, to block 3425. This block, when executed, sets the annotation starting location, Y COORD, to the vertical address of the top margin. Execution then proceeds to block 3430. Alternatively, if annotation starting address Y COORD points to a pixel at or below the top margin, then decision block 3420 routes execution, via its "YES" path, to block 3430. This latter block sets the current value of address YPOS to the value of annotation starting address Y COORD. Once these operations have occurred, execution exits from NO Routine 3400 and returns to EPSON Printer Emulation Routine 3200 for subsequent execution of Node0 Routine 3500.

A flowchart of Node0 Routine 3500 is shown in FIGS. 35a-35b, for which the proper alignment of the drawing sheets for these figures is depicted in FIG. 35.

Upon entry into this routine, execution passes to decision block 3505. This block tests the "Stacked Mode" flag to determine if the present character to be processed is stored within the stack. If this character is in the stack, then execution is sequentially routed to blocks 3515 and 3518 to set the "Stacked Mode" flag to a false state and then to read the character from the stack. Execution then passes to decision block 3525. However, if the next character is not in the stack, decision block 3505 routes execution, via its "NO" path, to clock 3510 which, when executed, reads the next character from the text buffer existing within buffer 44 (see FIG. 4 and which has been previously discussed above). Once this character has been read, then, as shown in FIGS. 35a and 35b, block 3520 is executed to determine whether the character is either an ASCII text or control character, or a different value. If the present character is neither a text nor a control character, then execution exits from Node0 Routine 3500, via the "NO" path from decision block 3520, and appropriately returns to EPSON Printer Emulation Routine 3200. Alternatively, in the event, the present character is either a control or text character, then decision block 3520 directs execution, via its "YES" path, to decision block 3525. This latter decision block determines whether the present character is a control character possessing a decimal value between "0" and "31", inclusive. In the event the present character is such a control character, then execution proceeds, via the "YES" path emanating from decision block 3525, to block 3530. This block, when executed, invokes NodeC Routine 4600 (see FIG. 46 which will be explained in detail below) to appropriately process the control character. Once the NodeC Routine has finished executing, then execution, as shown in FIGS. 35a and 35b, from block 3530 to decision block 3535. This decision block determines whether the EPSON printer emulation process is to be terminated, i.e. an end of a page has been reached. If emulation is to terminate, then execution exits from Node0 Routine 3500, via the "YES" path from decision block 3535 and appropriately returns to EPSON Printer Emulation Routine 3200. If, instead, printer emulation is to continue, then decision block 3535 routes execution, via "NO" path 3537, to path 3502 which loops back to block 3505 to appropriately process the next character.

Now, alternatively, if the present character is not a control character having a decimal value between "0" and "31", then execution proceeds, via the "NO" path from decision block 3525, to decision block 3540. This latter decision block tests whether this character is printable, i.e. has a decimal value between "32" and "127". If this character is not printable, it is ignored. Specifically, decision block 3540 routes execution, via "NO" path 3542, to path 3503 which loops back to block 3505 to appropriately process the next character. If, on the other hand, the present character is printable, then decision block 3540 directs execution, via its "YES" path, to block 3545.

Block 3545, when executed, updates the values of various pointers, used in accessing the font table, to the starting address of the bit pattern for this printable character. Thereafter, block 3550 is executed to invoke Draw Routine 4000 to appropriately copy the bit pattern for the printable character from the font table into the current memory frame at the proper locations using the block transfer (BLT) circuit that is used to implement rasterizing circuit 340 (see FIG. 3 which was previously discussed above). Once the Draw Routine finishes, execution proceeds, as shown in FIG. 35b, to decision block 3555. This block determines whether the end of the line has been reached and hence a line feed is necessary. If a line feed is required, then execution proceeds, via the "YES" path emanating from decision block 3555, to block 3560. This latter block invokes NodeC Routine 4600 to process a line feed and, if the end of the page has also been reached, to add a form feed command to the image stored within the current memory frame. Thereafter, decision block 3565 is executed to test whether the end of the printable page has been reached during the EPSON printer emulation process. If the end of the page has been reached, indicated by an "End of Page" flag being set to true, then execution exits from Node0 Routine 3500, via the "YES" path from decision block 3565, and appropriately returns to EPSON Printer Emulation Routine 3200. Alternatively, if the end of the page has not been reached (the "End of Page" flag is false), then decision block 3565 routes execution, via "NO" path 3567, to path 3502 which loops back to block 3505 for appropriately processing the next character. Now, if decision block 3555 determines that a line feed is not necessary, then it routes execution, via its "NO" path, to decision block 3570.

Decision block 3570, in conjunction with blocks 3575, 3580, 3585 and 3590, updates the current horizontal and, when necessary, the vertical addresses (values of pointers XPOS and YPOS, respectively) in the current memory frame. Specifically, decision block 3750, when executed, tests the "Proportional Mode" flag to determine whether proportional spacing is to be emulated. If proportional spacing is not being emulated, then execution proceeds, via the "NO" path from decision block 3570, to block 3585. This latter block reads the standard character width ("w") from the font table. The standard width is the same for all characters. Execution then proceeds to block 3590 to update the horizontal address to the current memory frame with the character width in order to point to the starting address for the next character. Alternatively, if proportional spacing is being emulated, then execution proceeds, via the "YES" path from decision block 3570, to block 3575. This latter block reads the height ("h") and width ("w") of the character presently being processed. Both the height and width values are pre-defined but will appropriately vary from character to character depending upon the geometry of the character presently being written into the image. Thereafter, block 3580 updates the value of address YPOS, using the character height ("h"), in order to point to the vertical starting location of the next character in the current memory frame. Execution then proceeds to block 3590, as discussed, which appropriately updates the value of address XPOS for the next character. Thereafter, execution loops back, via paths 3593 and 3503, to block 3505 to appropriately process the next character in the non-rotated annotation.

e. N1 Routine 3600 and NODE 1/2/3 Routine 3700

As discussed above, N1 Routine 3600 defines the starting location in the allocated memory frame, XPOS and YPOS, where the 90 degree rotated annotation is to begin using the coordinates X COORD and Y COORD, which, as previously discussed above, are specified within the RIP Note command. After N1 routine 3600 has executed, NODE 1/2/3 Routine 3700 sequentially: reads each character stored within the data section of the RIP Note command, accesses a corresponding bit pattern for each character from a selected font table (the default table or otherwise) that contains 270 degree rotated bit patterns and, using the starting location in the image buffer provided by N1 Routine 3600, writes each accessed bit pattern for each character into the image at the proper locations within the current memory frame thereby forming the 90 degree rotated annotation. NODE 1/2/3 Routine 3700 is also used to implement 180 and 270 degree character rotations, as fully described below.

Figure 36:
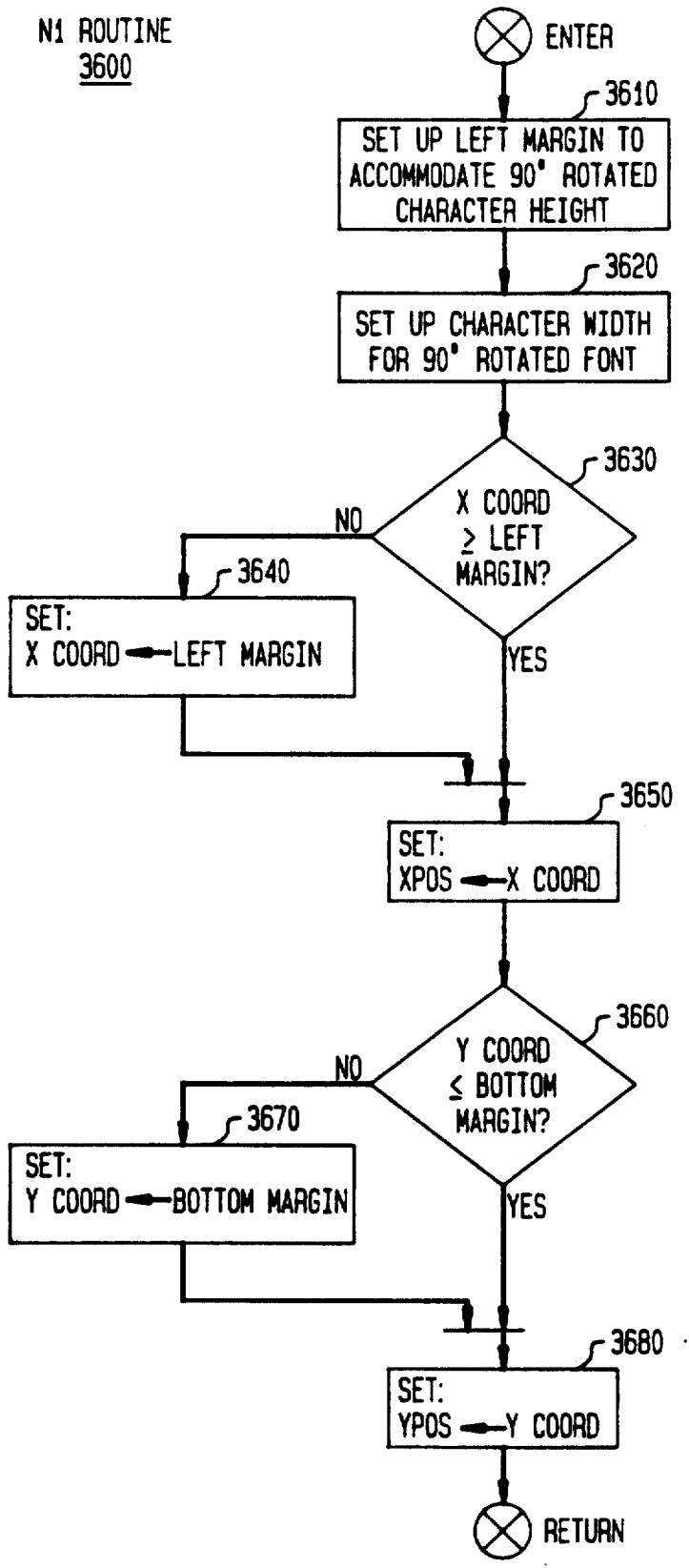
FIG. 36 shows a flowchart of N1 Routine 3600 that is also executed as part of EPSON Printer Emulation Routine 3200.

FIG. 36 shows a flowchart of N1 Routine 3600. Upon entry into this routine, block 3610 is executed to adjust the value of the left margin. Since a character can begin at the left margin, whenever that character is rotated by ninety degrees, the character will impinge into the left margin by the height of the character. Hence, block 3610, when executed, decreases the horizontal address of the left margin by an amount equivalent to the standard height, measured in pixels, of a non-rotated character. Block 3620 is then executed to define the standard character width to be the standard height of a non-rotated character. Thereafter, block 3630 is executed to determine whether the current value of annotation starting coordinate X COORD is greater than or equal to that associated with the present horizontal address of the left margin in the image, i.e. whether this starting location is situated to the right of the left margin. If the value of X COORD is less than the horizontal address of the left margin, then execution proceeds, via the "NO" path from decision block 3630, to block 3640. This block, when executed, sets the annotation starting cordinate, X COORD, to the horizontal address of the left margin. Execution then proceeds to block 3650. Alternatively, if annotation starting coordinate X COORD points to a pixel at or to the right of the left margin, then decision block 3630 routes execution, via its "YES" path, directly to block 3650. This latter block sets the current value of the address XPOS to the value of the annotation starting coordinate X COORD. Thereafter, execution passes to decision block 3660. This block tests whether the current value of annotation starting coordinate Y COORD is less than or equal to that associated with the vertical address of the bottom margin in the image, i.e. whether this starting location is situated at or above the bottom margin. If the value of Y COORD is greater than the vertical address of the bottom margin and hence the starting location lies within the bottom margin, then execution proceeds, via the "NO" path from decision block 3660, to block 3670. This block, when executed, sets the annotation starting coordinate Y COORD equal to the vertical address of the bottom margin. Execution then proceeds to block 3680. Alternatively, if annotation starting coordinate Y COORD points to a pixel at or above the bottom margin, then decision block 3660 routes execution, via its "YES" path, directly to block 3680. This latter block sets the current value of address YPOS to the value of the annotation starting coordinate Y COORD. Once these operations have occurred, execution exits from N1 Routine 3600 and returns to EPSON Printer Emulation Routine 3200 for subsequent execution of NODE 1/2/3 Routine 3700.

Figure 37B:
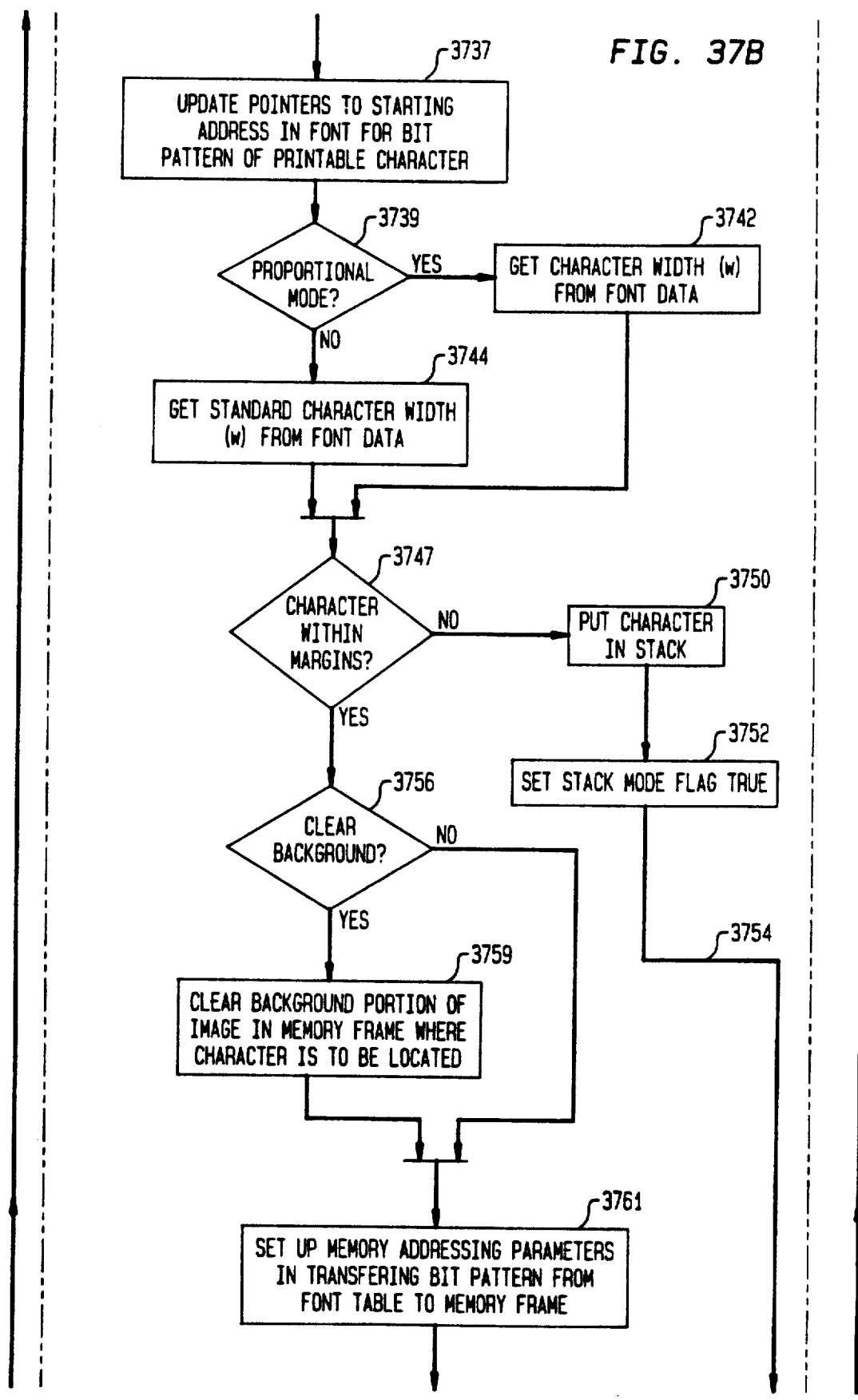
Figure 37C:
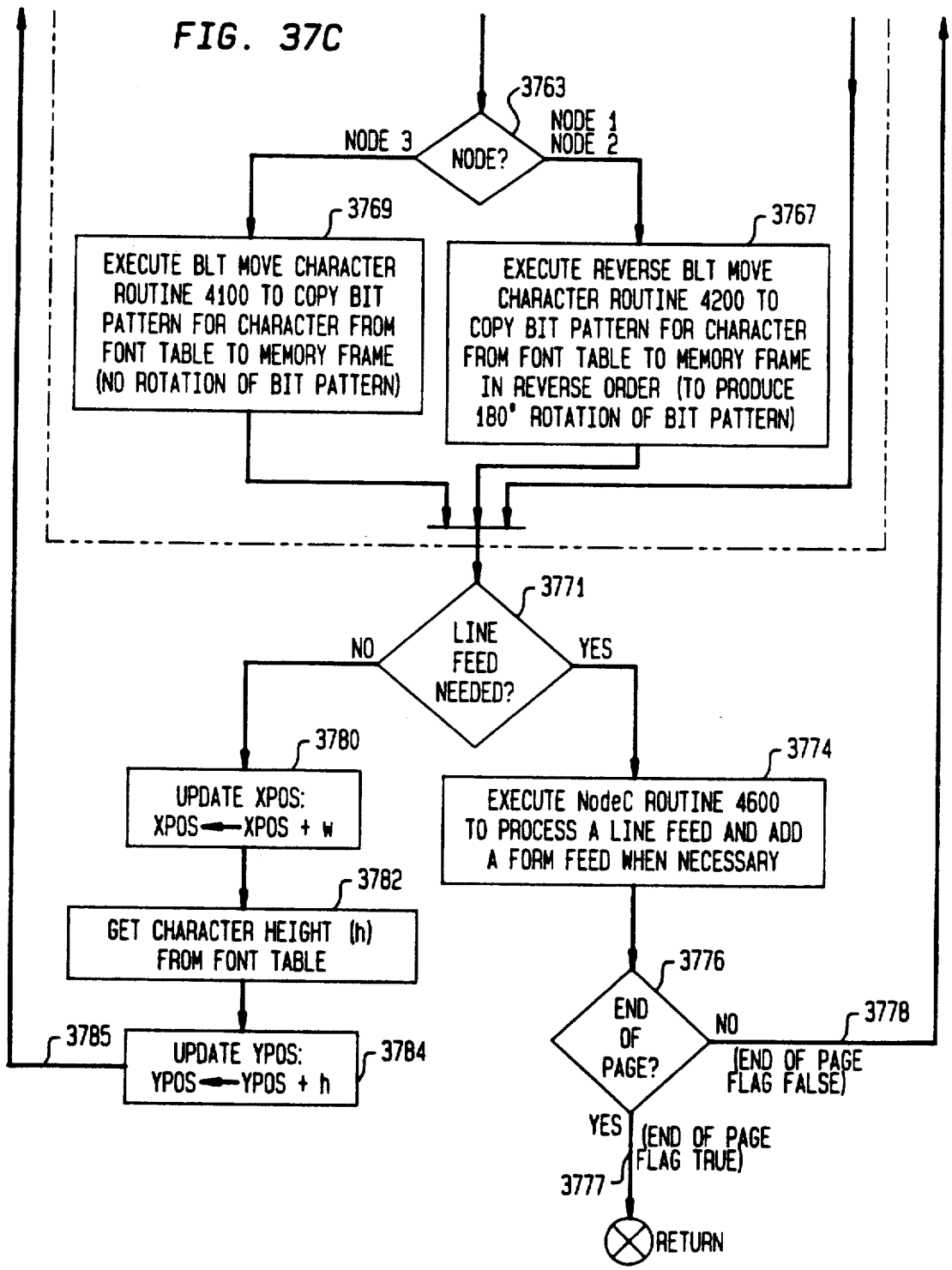

FIGS. 37a-37c collectively show a flowchart of NODE 1/2/3 Routine 3700, for which the correct alignment of the drawing sheets is depicted in FIG. 37.

Upon entry into routine 3700, execution passes to decision block 3705. This block tests the "Stacked Mode" flag to determine if the present character to be processed is stored within the stack. If this character is in the stack, then execution is sequentially routed to blocks 3711 and 3715 to set the "Stacked Mode" flag to a false state and then to read the character from the stack. Execution then passes to decision block 3717. However, if the present characer is not in the stack, decision block 3705 routes execution, via its "NO" path, to block 3708 which, when executed, reads the next character from the text buffer existing within buffer 44 (see FIG. 4 and which has been previously discussed above). Once this character has been read, then , as shown in FIGS. 37a-37c, decision block 3713 is executed to determine whether this character is either an ASCII text or control character, or a different value. If the present character is neither a text nor a control character, then execution exits from NODE 1/2/3 Routine 3700, via the "NO" path from decision block 3713, and appropriately returns to EPSON Printer Emulation Routine 3200. Alternatively, in the event, the present character is either a control or text character, then this decision block directs execution, via its "YES" path, to decision block 3717. This latter decision block determines whether the present character is a control character possessing a decimal value between "0" and "31", inclusive. If, the event the present character is such a control character, then execution proceeds, via the "YES" path emanating from decision block 3717, to block 3720. This, block, when executed, invokes NodeC Routine 4600 (see FIG. 46 which will be explained in detail below) to appropriately process the control character. Once the NodeC Routine has finished executing, then as shown in FIGS. 37a-37c, execution passes from block 3720 to decision block 3722. This decision block determines whether the EPSON printer emulation processs is to be terminated, i.e. an end of a page has been reached. If emulation is to terminate, then execution exits from NODE 1/2/3 Routine 3700, via the "YES" path from decision block 3722 and apropriately returns to EPSON Printer Emulation Routine 3200. If, instead, printer emulation is to continue, then decision block 3722 routes execution, via "NO" path 3723, to path 3702 which loops back to block 3705 for appropriately processing the next character.

Now, alternatively, if the present character is not a control character having a decimal value between "0" and "31", then execution proceeds, via the "NO" path from decision block 3717, to decision block 3725. This latter decision block tests whether this character is printable, i.e. has a decimal value between "32" and "127". If this character is not printable, it is ignored. Specifically, decision block 3725 routes execution, via "NO" path 3726, to path 3703 which loops back to block 3705 to appropriately process the next character. If, on the other hand, the present character is printable, then decision block 3725 directs execution, via its "YES" path, to Drawnodels Routine 3730. This routine handles the transfer of a bit pattern from the font to proper locations within the current memory frame.

Upon entry into Drawnodel Routine 3730, execution proceeds to decision block 3732. This decision block determines whether a font has been previously downloaded into the RIP. If no font currently exists within the RIP, then decision block 3732 routes execution to block 3735 which sends a appropriate error message to the host processor, located within the file server, using a SCSI Sense Data command. Once this has occurred, execution then exits from NODE 1/2/3 Routine 3700 and returns to EPSON Printer Emulation Routine 3200. Alternatively, if a font exists within the RIP, then execution is directed, via the "YES" path from decision block 3732, to block 3737. This latter block, when executed, updates the values of various pointers to the starting address of a bit pattern in the font corresponding to the printable character. Execution then proceeds to decision block 3739. This decision block determines, by testing the state of the "Proportional Mode" flag, whether proportional spacing is being emulated. If proportional spacing is not being used, then execution proceeds, via the "NO" path from decision block 3739, to block 3744. This latter block, when executed, gets the value of the standard character width from the font table. As noted, if proportional spacing is not being used, the same character spacing is used for all printable characters. Alternatively, if proportional spacing is being emulated, then execution proceeds, via the "YES" path emanating from decision block 3739, to block 3742. This block reads the character width that is associated with the printable character from the front table. With proportional spacing, the character width will vary from character to character. Once the appropriate character width has been obtained, either through block 3742 or block 3744, execution proceeds to decision block 3747. This decision block determines whether any portion of the printable character will lie within the margin area, i.e. stored in a location in the current memory frame that lies within a region corresponding to, for example, the right margin of the image. If so, then decision block 3747 routes execution, via its "NO"path, to sequentially execute blocks 3750 and 3752. These blocks will place the printable character in the stack and then set the state of the "Stack Mode" flag (as discussed above) to true. Once this has occurred, execution will exit from Drawnodel Routine 3730, via path 3754, and proceed to decision block 3771 to determine if a line feed is needed. The character that now exists in the stack will be appropriately processed during the next iteration through routine 3700.

Now, alternatively, if the character will lie within all the margins, then decision block 3747 routes execution, via its "YES" path, to decision block 3756. This latter decision block determines whether the printable character is to be written directly over the image or over a white background. This determination is made based upon the state of the "Background Clear" flag, which has been previously set to the state of the overlay mode control ("o") bit (as discussed above in conjunction with FIG. 10b) occurring within the RIP Note command. If the state of this flag specifies a white background, then decision block 3756 routes execution, via its "YES" path, to block 3759. This latter block, when executed, clears the contents of the current memory frame in the locations where the character is to be written. By doing so, the color of the image will be white where the character is to be appear. Hence, this white portion serves as the background for the character. Execution then proceeds to block 3761. Alternatively, if the image itself is to serve as the background, then decision block 3756 routes execution, via its "NO" path, directly to block 3761. This latter block, when executed, sets up the values of various parameters that will be used in addressing the font table to transfer the appropriate bit pattern to the current memory frame. Once this has occurred, execution then proceeds to decision block 3763.

Decision block 3763 will route execution to either block 3769, to invoke BLT Move Char Routine 4100 (see FIG. 41 which will be discussed in detail below), or to block 3767, to invoke Reverse BLT Move Char Routine 4200 (see FIG. 42 which will be discussed below). The particular path that will be chosen by decision block 3763, shown in FIGS. 37a-37c, is determined by whether a 270 degree rotation ("NODE 3" mode), a 180 degree rotation ("NODE 2" mode) or a 90 degree rotation ("NODE 1" mode) is being requested. Both routine 4100 and routine 4200 copy each bit in the bit pattern of the printable character from an appropriate font table to a proper location within the current memory frame. However, BLT Move Char Routine 4100 copies the bits in the pattern in forward order from a font table, i.e. from the first bit in the pattern to the last; while Reverse BLT Move Char Routine 4200 copies bits in reverse order, i.e. from the last bit in the bit pattern to the first. Inasmuch as forward copying produces no rotation of the bit pattern, while reverse copying rotates the bit pattern by 180 degrees, the same set of bit patterns can advantageously be used to produce characters that are either not rotated or rotated by 180 degrees. In this manner, one set of bit patterns can be used for producing characters with 0 or 180 degree rotation; while another set can be used for producing characters that are to be rotated by 90 or 270 degrees rotation. Therefore, for any one font, only two different sets of bit patterns are advantageously needed to produce all four character rotations. In the preferred embodiment, one set contains all the bit patterns with no rotation for all character versions of one font; while, another set contains the bit patterns with 270 degrees of rotation for all character versions of the same font. Therefore, depending upon whether 0 or 270 degrees of rotation have been specified by the rotation bits in the RIP Note Command—as discussed above, BLT Move Char Routine 4100 will copy, in forward order, a bit pattern from the 0 degree set or from the 270 degree set to the current memory frame. Alternatively, when Reverse BLT Move Char Routine 4200 is invoked and depending upon whether 90 or 180 degree rotation has been specified, this routine will copy, in reverse order, a bit pattern from the 270 or 0 degree sets, respectively, into the current memory frame. In any event, once the bit pattern has been completely copied from the font table to the current memory frame, then execution exits from Drawnodel Routine 3730 and proceeds to decision block 3771.

Decision block 3771 determines whether the end of the line has been reached and hence a line feed is necessary. If a line feed is required, then execution proceeds, via the "YES" path emanating from decision block 3771, to block 3774. This latter block invokes NodeC Routine 4600 to process a line feed and, if the end of the page has also been reached, to add a form feed command to the image stored within the current memory frame. Thereafter, decision block 3776 is executed to test whether the end of the printable page has been reached during the printer emulation process. If the end of the page has been reached (indicated by the "End of Page" flag being true), then execution exits from NODE 1/2/3 Routine 3700, via "YES" path 3777 from decision block 3776, and appropriately returns to EPSON Printer Emulation Routine 3200. Alternatively, if the end of the page has not been reached ("End of Page" flag being false), then decision block 3776 routes execution, via "NO" path 3778, to path 3702 which loops back to block 3705 for appropriately processing the next character. Now, if decision block 3771 determines that a line feed is not necessary, then it routes execution, via its "NO" path, to block 3780. This latter block updates the address XPOS with the character width ("w") in order to point to the starting address for the next character. Thereafter, execution proceeds to block 3782 which reads the height ("h") of the character from the font table. At this point, block 3784 executes to update the value of the address YPOS using the character height in order to point to the vertical starting location of the next character in the current memory frame. Thereafter, execution loops back, via paths 3785 and 3703, to block 3705 to appropriately process the next character in the 90, 180 or 270 degree rotated annotation.

f. N2 Routine 3800

As discussed above, N2 Routine 3800 defines the starting location in the current memory frame, XPOS and YPOS, where the 180 degree rotated annotation is to begin using the coordinates X COORD and Y COORD, which, as previously discussed above, are specified within the RIP Note command. After N2 routine 3800 has executed, NODE 1/2/3 Routine 3700 is invoked, as discussed above, to sequentially: read each character stored within the data section of the RIP Note command, access a corresponding bit pattern for each character from a font table (the default table or otherwise) that contains non-rotated bit patterns and, using the starting location in the current memory frame provided by N2 Routine 3800, write each accessed bit pattern for each character into the image at the proper locations within the current memory frame thereby forming the annotation.

Figure 38:
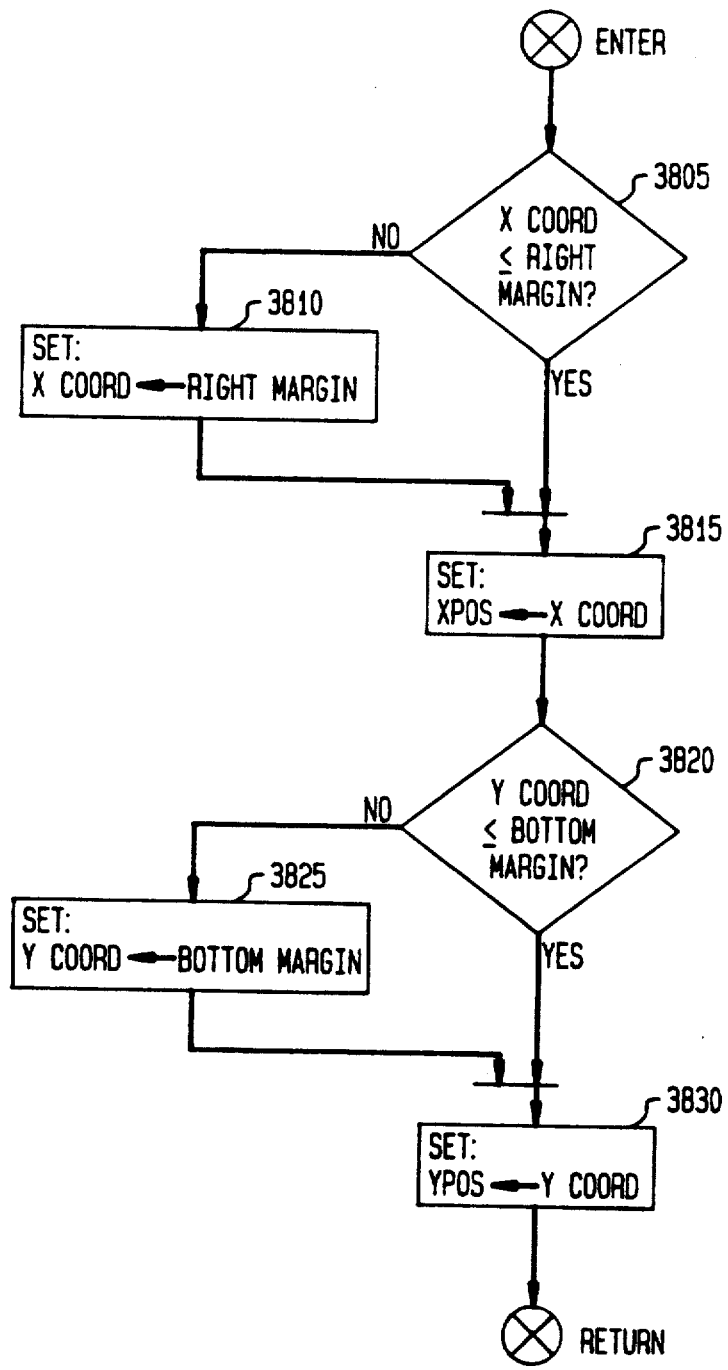
FIG. 38 shows a flowchart of N2 Routine 3800 that is also executed as part of EPSON Printer Emulation Routine 3200.

FIG. 38 shows a flowchart of N2 Routine 3800. Upon entry into this routine, block 3805 is executed to determine whether the current value of annotation starting coordinate X COORD is less than or equal to that associated with the present horizontal address of the right margin in the image, i.e. whether this starting location is situated to the left of the right margin. For an 180 degree rotation, the first character in the annotation will be to the right of the remaining characters. If the value of coordinate X COORD is less than or equal to the horizontal address of the right margin, then execution proceeds, via the "YES" path from decision block 3805, to block 3815. Alternatively, if annotation starting coordinate X COORD points to a pixel at or beyond the right margin, then decision block 3805 routes execution, via its "YES" path, to block 3810. This latter block, when executed, sets the annotation starting coordinate X COORD equal to the horizontal address of the right margin. Thereafter, execution proceeds to block 3815. This latter block sets the current value of the coordinate XPOS equal to the value of annotation starting coordinate X COORD. Thereafter, execution passes to decision block 3820. This block tests whether the current value of annotation starting coordinate Y COORD is less than or equal to that associated with the vertical address of the bottom margin in the image, i.e. whether this starting location is situated above the bottom margin. If the value of Y COORD is greater than the vertical address of the bottom margin, i.e. the starting location lies within the bottom margin, then execution proceeds, via the "NO" path from decision block 3820, to block 3825. This latter block, when executed, sets the annotation starting coordinate Y COORD equal to the vertical address of the bottom margin. Execution then proceeds to block 3830. Alternatively, if annotation starting coordinate Y COORD points to a pixel at or above the bottom margin, then decision block 3830 routes execution, via its "YES" path, directly to block 3830. This latter block sets the current value of the address YPOS to the value of the annotation starting coordinate Y COORD. Once these operations have occurred, execution exits from N2 Routine 3800 and returns to EPSON Printer Emulation Routine 3200 for subsequent execution of NODE 1/2/3 Routine 3700, as discussed above.

g. N3 Routine 3900

As discussed above, N3 Routine 3900 defines the starting location in the current memory frame, XPOS and YPOS, where the 270 degree rotated annotation is to begin using the coordinates X COORD and Y COORD, which, as previously discussed above, are specified within the RIP Note command. After N3 routine 3900 has executed, NODE 1/2/3 Routine 3700 is invoked, as discussed above, to sequentially: read each character stored within the data section of the RIP Note command, access a corresponding bit pattern for each character from a font table (the default table or otherwise) that contains 270 degree rotated bit patterns and, using the starting location in the image, stored in the current memory frame, provided by N3 Routine 3900, write each accessed bit pattern for each character into the image at the proper locations within the current memory frame thereby forming the 270 degree rotated annotation.

Figure 39:
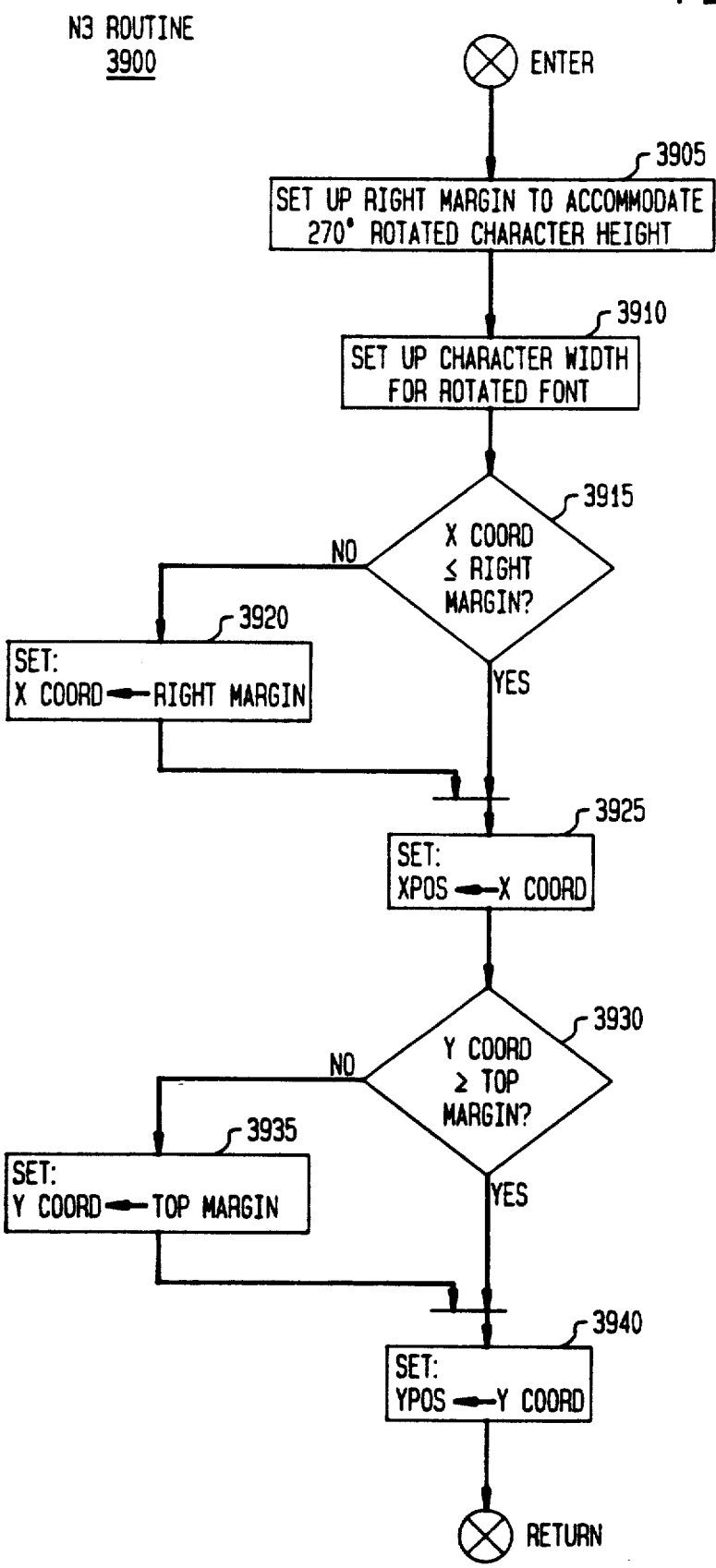
FIG. 39 shows a flowchart of N3 Routine 3900 that is also executed as part of EPSON Printer Emulation Routine 3200.

FIG. 39 shows a flowchart of N3 Routine 3900. Upon entry into this routine, block 3905 is executed to adjust the value of the right margin. Since a starting character in a 180 degree rotated annotation can exist at the right margin, whenever that character is rotated downward by another ninety degrees (for a full 270 degree rotation), the character will impinge into the right margin by the height of the character. Hence, block 3905, when executed, decreases the horizontal address of the right margin by an amount equivalent to the standard height, measured in pixels, of a non-rotated character. Block 3910 is then executed to define the standard character width to be the standard height of a non-rotated character. Thereafter, block 3915 is executed to determine whether the current value of annotation starting coordinate X COORD is less than or equal to that associated with the present horizontal address of the right margin in the image, i.e. whether this starting location is situated at or within the right margin. If the value of X COORD is greater than the horizontal address of the right margin, then execution proceeds, via the "NO" path from decision block 3915, to block 3920. This block, when executed, sets the annotation starting coordinate X COORD equal to the horizontal address of the right margin. Execution then proceeds to block 3925. Alternatively, if annotation starting coordinate X COORD points to a pixel at or to the left of the right margin, then decision block 3915 directly routes execution, via its "YES" path, directly to block 3925. This latter block sets the current value of the address XPOS to the value of annotation starting coordinate X COORD. Thereafter, execution passes to decision block 3930. This block tests whether the current value of annotation starting coordinate Y COORD is greater than or equal to that associated with the vertical address of the top margin in the image, i.e. whether this starting location lies below the top margin. If the value of coordinate Y COORD points to a pixel lying above the top margin, then execution proceeds, via the "NO" path from decision block 3930, to block 3935. This block, when executed, sets the annotation starting coordinate Y COORD to the vertical address of the top margin. Execution then proceeds to block 3940. Alternatively, if annotation starting coordinate Y COORD points to a pixel lying at or below the top margin, then decision to block 3930 directly routes execution, via its "YES" path, to block 3940. This latter block sets the current value address YPOS to the value of annotation starting coordinate Y COORD. Once these operations have occurred, execution exits from N3 Routine 3900 and returns to EPSON Printer Emulation Routine 3200 for subsequent execution of NODE 1/2/3 Routine 3700.

h. Draw Routine 4000

Figures 40, 40A:
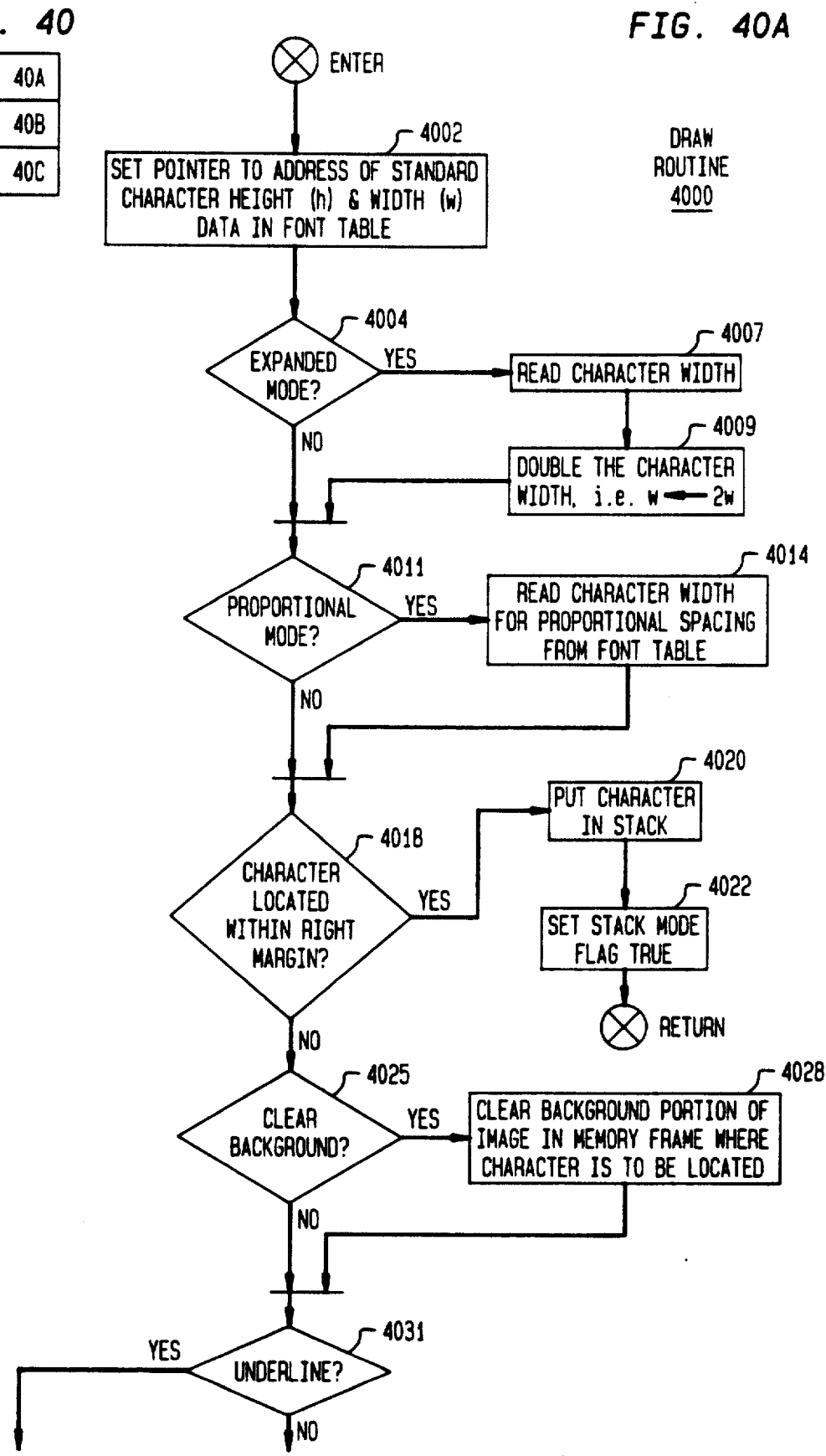
FIG. 40 shows the correct alignment of the drawing sheets for FIGS. 40a-40c.
FIGS. 40a-40c collectively show a flowchart of Draw Routine 4000 that is executed as part of NodeO Routine 3500 depicted in FIG. 35.
Figure 40B:
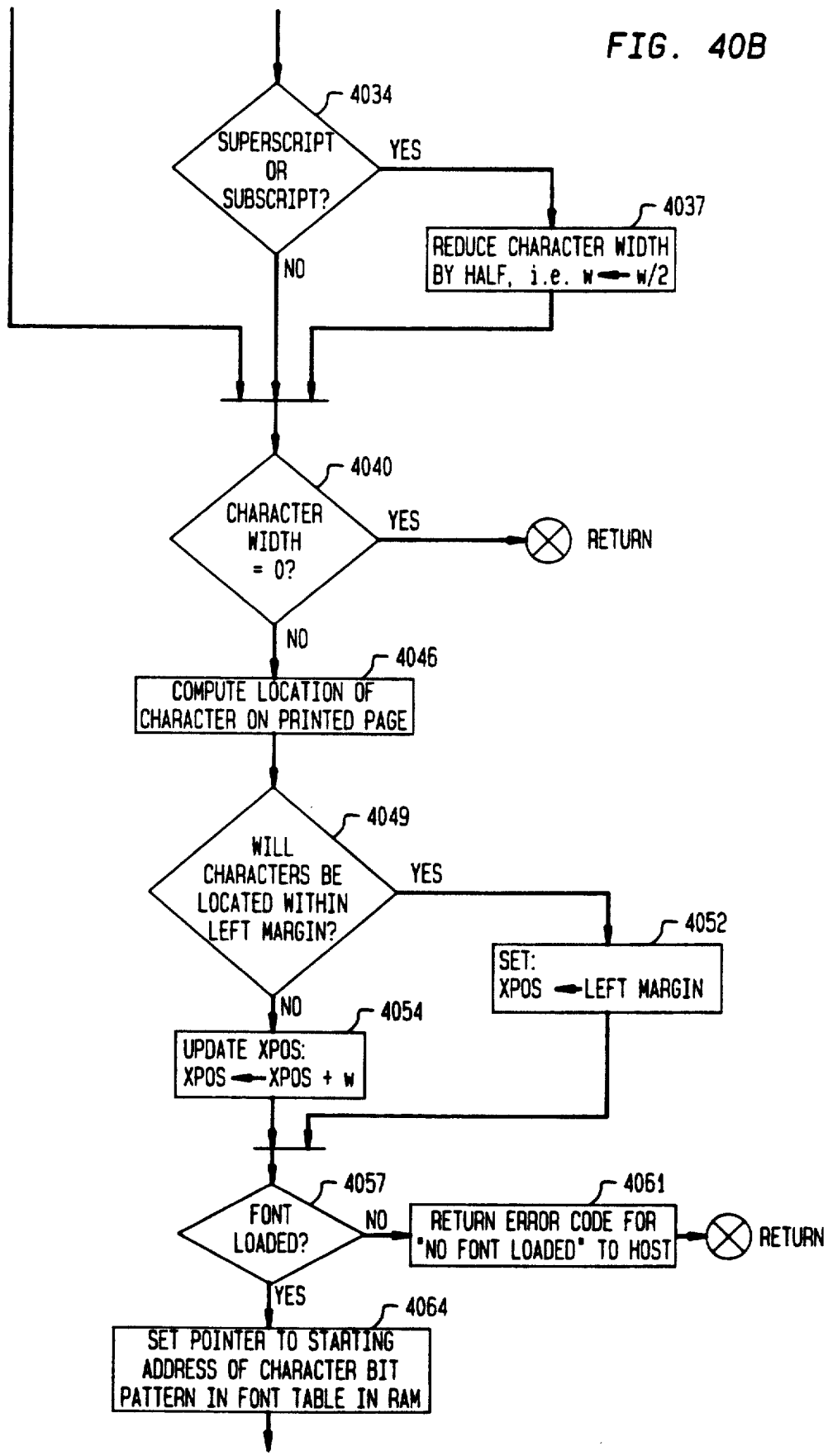
Figure 40C:
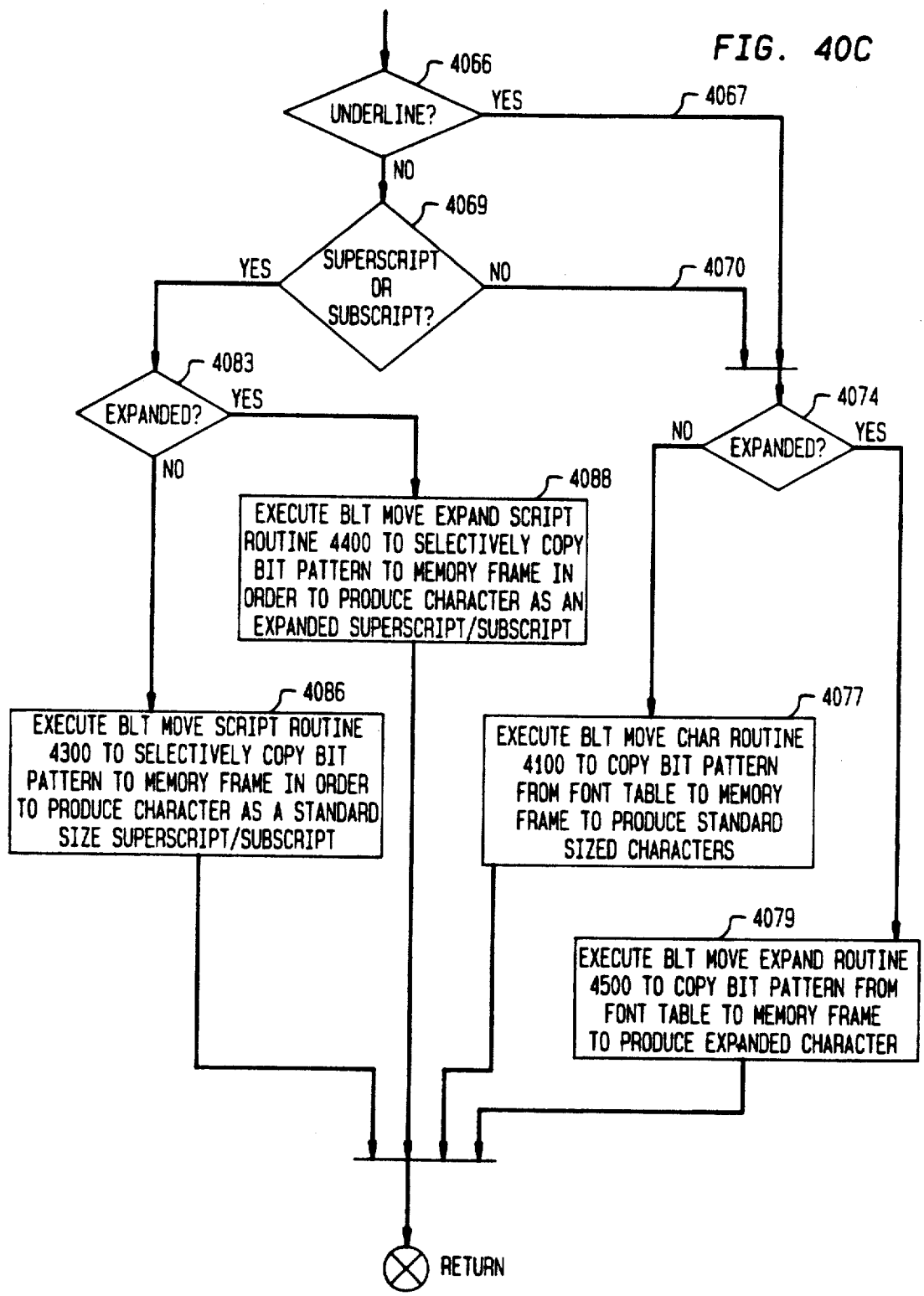

A flowchart of Draw Routine 4000 is shown in FIGS. 40a-40c, for which the correct alignment of the drawing sheets for these figures is depicted in FIG. 40. When called during the execution of a RIP Text command, and specifically during execution of Printit Routine 3300 (discussed in detail above in conjunction with FIGS. 33a-33c), Draw Routine 4000 accesses the default font table and appropriately copies the bit pattern for a given printable ASCII character into the appropriate locations in the current memory frame. Bit-mapped characters can be produced as regular text or as superscripts/subscripts and in normal, expanded or compressed form with either proportional or standard spacing. Underlined characters can also be generated.

Specifically, upon entry into this routine, execution proceeds to block 4002. This block, when executed, sets the values of various pointers to the addresses of the standard character height ("h") and width ("w") data in the font table in use. Thereafter, execution is directed to decision block 4004 which determines whether expanded mode is being emulated. If this mode is in use, then execution proceeds, via the "YES" path from this decision block, to block 4007. This latter block, when executed, reads the standard character width. Thereafter, block 4009 doubles the character width for use in producing horizontally expanded characters. Execution then passes to decision block 4011. Alternatively, if the expanded mode is not being emulated, then execution is directly routed, via the "NO" path emanating from decision block 4004, to decision block 4011. This latter decision block tests to determine if proportional spacing is being emulated. In the event proportional spacing is being emulated, then decision block 4011 routes execution, via its "YES" path, to block 4014 which reads the proportionally spaced character width from the font table for the printable character presently being processed. Execution then proceeds to decision block 4018. Alternatively, if proportional spacing is not being emulated, then execution passes, via the "NO" path from decision block 4011, directly to decision block 4018. This latter decision block tests the values of address XPOS to determine whether the present printable character will be located within the right margin. If the printable character will be located within the margin, then decision block 4018 directs execution, via its "YES" path, to block 4020. This block places the present printable character being processed into the stack. To indicate that a character is now stored within the stack, block 4022 is executed to set the state of the "Stack Mode" flag to true. Execution then exits from Draw Routine 4000 and appropriately returns to the calling program, i.e. Printit Routine 3200. Now, alternatively, if the present printable character will not be located within the right margin (i.e. is to the left of the right margin), then decision block 4018 routes execution, via its "NO" path, to decision block 4025. This latter decision block tests the state of the "Background Clear" flag to determine whether the present printable character is to be written over a white background. If the flag specifies a white background, then decision block 4025 routes execution, via its "YES" path, to block 4028. This latter block, when executed, clears the contents of the current memory frame in the locations where the printable character is to be written. By doing so, the color of the image will be white where the printable character is to appear. This white portion serves as the background for the printable character. Once this operation is finished or alternatively in the event a white background is not desired, then execution proceeds to decision block 4031. This decision block determines whether underlining is being emulated, i.e. by testing whether the value of the current character equals "5F" hex. If underlining is being emulated, then execution proceeds, via the "YES" path from decision block 4031, directly to decision block 4040. Alternatively, in the event underlining is not being used, then the present printable character could be either a superscript or a subscript. Consequently, execution passes, via the "NO" path from decision block 4031, to decision block 4034. This latter decision block, when executed, tests various flags, set by EPSON printer commands that have been embedded within the text file—as discussed above, to determine whether the printable character is or forms part of a superscript/subscript. If the present printable character is either of these, then decision block 4034 routes execution, via its "YES" path, to block 4037. This block, when executed, reduces the height of the printable character by half to that appropriate for superscripts/subscripts. Once this occurs or in the event the printable character is not a superscript/subscript, then execution respectively proceeds, either from block 4037 or via the "NO" path emanating from decision block 4034, to decision block 4040.

Decision block 4040 tests the printable character width to ensure that it is not zero. If it is zero, then execution exits from this routine, via the "YES" path from this decision block and returns to the calling program. In the event the character width is non-zero, then execution proceeds, via the "NO" path from decision block 4040, to block 4046. This latter block, when executed, computes the location where the printable character will appear on the text page that is being processed. Thereafter, decision block 4049 tests this computed location to determine whether the character will be situated within the left margin. If the character will be situated to the right of this margin, then execution passes, via the "NO" path from decision block 4049, to block 4054 which updates the value of address XPOS using the value of the character width ("w"). Execution passes to decision block 4057. Alternatively, if the character will be located within the left margin, then execution proceeds, via the "YES" path from decision block 4049 to block 4052 which, when executed, sets the value of the address XPOS equal to that associated with the left margin. Thereafter, execution passes to decision block 4057. This decision block, determines if a font has been previously downloaded into the RIP. If no such font exists, then decision block 4057 routes execution, via its "NO" path, to block 4061 which sends an appropriate error code to the host via a SCSI Sense Data command, as discussed above. Execution then exits from Draw Routine 4000 and returns to Printit Routine 3300.

Now, in the event a font exists within the RIP, then decision block 4057 routes execution, via its "YES" path, to block 4064. This latter block, when executed, sets a pointer to the starting address within the font table of the bit pattern for the present printable character. Once this has occurred, decision block 4066 again tests whether the previous character written into the current memory frame is to be underlined, i.e. whether the present character has a value equalling "5F" hex. If the previous character is to be underlined, then decision block 4066 routes execution to decision block 4074 which tests to determine whether expanded mode is being used. If the previous character was written in its standard size, then decision block 4074 routes execution, via its "NO" path to block 4077, which, when executed, invokes BLT Move Char Routine 4100 (see FIG. 41 which will be discussed shortly). This routine copies the bit pattern for the underlining from the font table to the current memory frame in an appropriate fashion in order to add that bit pattern to the bit pattern for the previous character (with standard or proportional spacing as determined above) thereby forming an underlined character in the memory frame. Alternatively, if the previous character appeared in expanded size, then, as shown in FIGS. 40a-40c, decision block 4074 routes execution, via its "YES" path to block 4079, which, when executed, invokes BLT Move Expand Routine 4500 (see FIG. 45 which will be discussed shortly). This routine copies the bit pattern for underlining from the font table to the current memory frame in an appropriate fashion that produces the underlining in an expanded form (with standard or proportional spacing as determined above) in the appropriate location on the printed page.

Now, in the event, underlining is not being used (i.e. the value of the current character is not "5F" hex), then execution proceeds, as shown in FIGS. 40a-40c, via the "NO" path emanating from decision block 4066, to decision block 4069. This latter decision block, when executed, tests various flags to determine whether the present printable character is a superscript/subscript. If the present printable character is neither of these, then decision block 4069 routes execution, via "NO" path 4070, to decision block 4074, which has been discussed above. If on the other hand, the present printable character is or forms part of a superscript/subscript, then decision block 4069 routes execution to decision block 4083 which tests whether the character is to appear expanded. If the character is to be appear as a standard sized superscript/subscript, then decision block 4083 routes execution, via its "NO" path to block 4086, which, when executed, invokes BLT Move Script Routine 4300 (see FIG. 43 which will be discussed shortly). This routine copies the bit pattern for the printable character from the font table to the current memory frame in an appropriate fashion that produces the character as a standard sized superscript/subscript (with standard or proportional spacing as determined above) in the appropriate location on the printed page. Alternatively, if the character is to be appear as a (horizontally) expanded superscript/subscript, then decision block 4083 routes execution, via its "YES" path to block 4088, which, when executed, invokes BLT Move Expand Script Routine 4400 (see FIG. 44 which will also be discussed shortly). This routine copies the bit pattern for the printable character from the font table to the current memory frame in an appropriate fashion that produces the character as a horizontally expanded superscript/subscript (with standard or proportional spacing as determined above) in the appropriate location on the printed page. After any one of bit pattern copy routines 4100, 4200, 4300 or 4400 has fully executed, then, as shown in FIGS. 40a-40c, execution exits from Draw Routine 4000 and returns to Printit Routine 3300. This completes the discussion of Draw Routine 4000.

i. Bit Pattern Copy Routines invoked by Draw Routine 4000

1. BLT Move Char Routine 4100

Figure 41B:
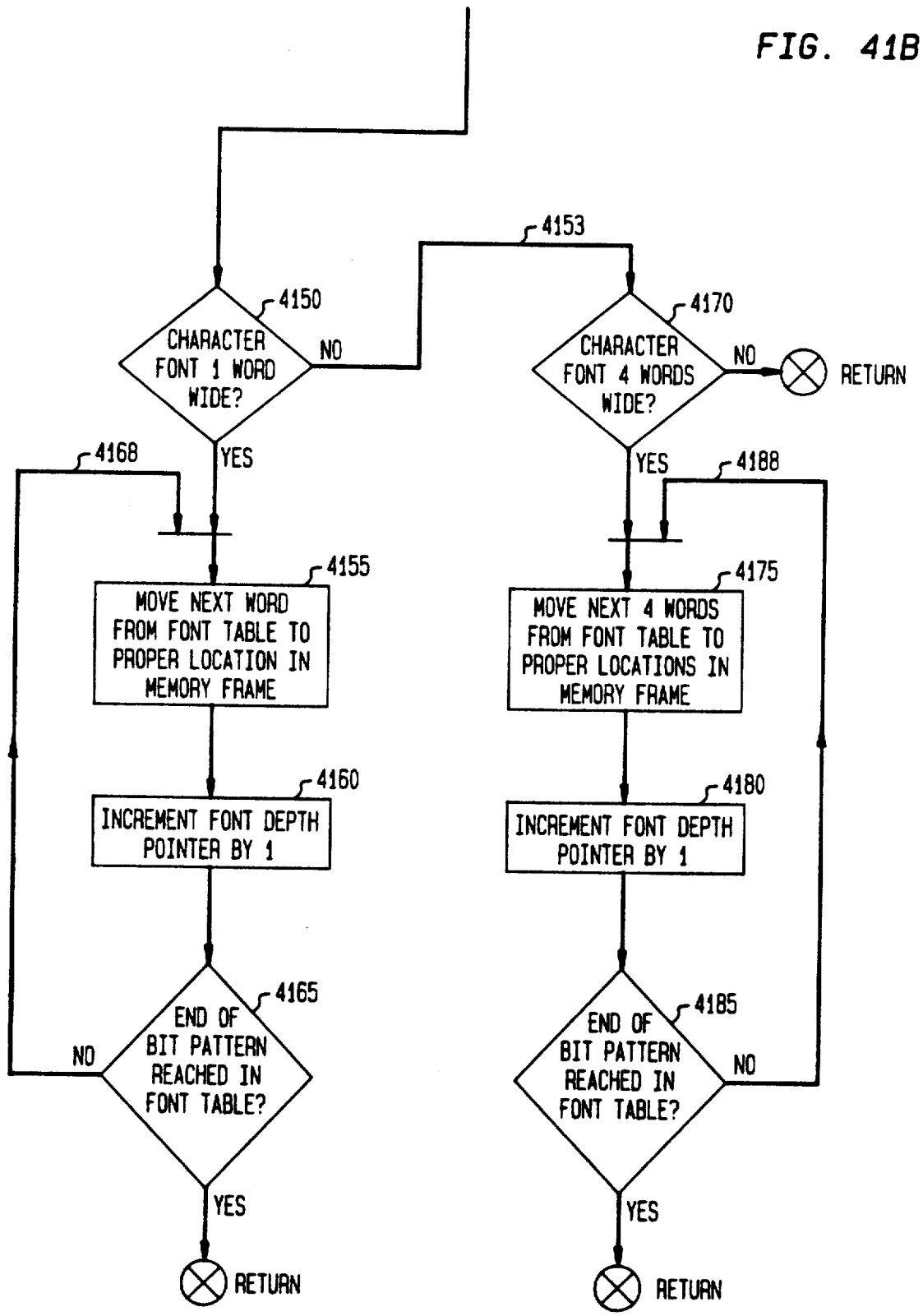

A flowchart of BLT Move Char Routine 4100 is shown in FIGS. 41a-41b, for which the correct alignment of the drawing sheets for these figures is shown in FIG. 41. As noted above, when invoked by either NODE 1/2/3 Routine 3700 (see FIG. 37 and which has been discussed above) or Draw Routine 4000 (see FIG. 40 and which also has been discussed above), BLT Move Char Routine 4100 copies the bits in a bit pattern for a printable character in forward order, i.e. from the first bit in the pattern to the last, from a font table to appropriate locations in the current memory frame.

Upon entry into this routine, execution proceeds to block 4105 which programs skew circuitry (not shown) internal to the Block Transfer (BLT) integrated circuit (chip) that forms rasterizing circuit 342 (see FIG. 3 and which has been discussed above) to align bit positions of the font and image data and thereafter properly merge the two. The BLT circuit combines the image data occurring at each location within the current memory frame with a corresponding pixel of bit-mapped font data. The resulting value of each resulting pixel of combined image and font data is then stored back into that location within the current memory frame. The BLT circuit contains so-called skew circuitry for properly aligning each incoming bit of the font data with each corresponding bit of image data and then for merging the two into a resultant single pixel. This skew circuitry has two internal registers that control its operation: a skew register and a skew mask register. The value stored in the skew register specifies the amount of rotation (in bit positions) that must be imparted to each pixel of font data, by the skew circuitry, to ensure that all the bit positions of the font data are properly aligned with corresponding bit positions of image data prior to the two being merged by the BLT chip to form a resultant pixel. Each bit of the resultant merged pixel will originate from either the image or font data depending upon the state of the corresponding bit of a skew mask register internal to the BLT circuit. Now with this in mind, block 4105, when executed, programs the skew circuitry by loading appropriate pre-defined values into the skew and the skew mask registers to specify the desired amount of bit rotation and to control the pixel merging operation.

Once the skew register has been appropriately programmed, execution then proceeds, as shown in FIGS. 41a and 41b, to decision block 4110. This decision block, when executed, tests the font data for the present character to determine if this data is two words wide. If this font data is two words wide, then execution proceeds, via the "YES" path emanating from decision block 4110, to block 4115. This latter block moves the next two words of data from the font table to appropriate locations within the current memory frame. Thereafter, execution proceeds to block 4120 which, when executed, increments a font depth pointer by one so that every line of the bit pattern for the printable character is copied into the current memory frame through the BLT circuit. Once this has occurred, decision block 4125 is executed to determine whether the end of the bit pattern has been reached, i.e. by sensing an appropriate control code stored within the font table. If the end has been reached, then the entire bit pattern has been appropriately copied, in forward order, from the font table into the image buffer. As a result, execution exits from BLT Move Char Routine 4100 via the "YES" path from decision block 4125 and returns to the calling program, e.g. NODE 1/2/3 Routine 3700 or Draw Routine 4000. Alternatively, if the end of the bit pattern has not been reached, i.e. more pixels remain to be copied, then decision block 4125 routes execution, via "NO" path 4128, back to block 4115 to copy the next pixel in the bit pattern from the font table to the current memory frame.

Now, alternatively, in the event the font data is not two words wide, then decision block 4110 routes execution, via "NO" path 4113, to decision block 4130. This decision block, when executed, tests the font data for the present printable character to determine if this data is three words wide. If this font data is three words wide, then execution proceeds, via the "YES" path emanating from decision block 4130, to block 4135. This latter block moves the next three words of data from the font table to appropriate locations within the current memory frame. Thereafter, execution proceeds to block 4140 which, when executed, increments the font depth pointer by one so that every line of the bit pattern for the printable character is copied into the current memory frame through the BLT circuit. Once this has occurred, decision block 4145 is executed to determine whether the end of the bit pattern has been reached. If the end has been reached, then the entire bit pattern has been completely copied, in forward order, from the font table into the current memory frame. As a result, execution exits from BLT Move Char Routine 4100, via the "YES" path from decision block 4145, and returns to the calling program. Alternatively, if the end of the bit pattern has not been reached, i.e. more pixels remain to be copied, then decision block 4145 routes execution, via "NO" path 4148, back to block 4135 to copy the next pixel in the bit pattern from the font table to the current memory frame.

If, however, the font data is not two or three words wide, then decision block 4130 routes execution, via "NO" path 4133, to decision block 4150. This decision block, when executed, tests the font data for the present printable character to determine if this data is one word wide. If this font data is one word wide, then execution proceeds, via the "YES" path emanating from decision block 4150, to block 4155. This latter block moves the next word of data from the font table to appropriate locations within the current memory frame. Thereafter, execution proceeds to block 4160 which, when executed, increments the font depth pointer by one so that every line of the bit pattern for the printable character is copied into the current memory frame through the BLT circuit. Once this has occurred, decision block 4165 is executed to determine whether the end of the bit pattern has been reached. If the end has been reached, then the entire bit pattern has been completely copied, in forward order, from the font table into the current memory frame. As a result, execution exits from BLT Move Char Routine 4100, via the "YES" path from decision block 4165, and returns to the calling program. Alternatively, if the end of the bit pattern has not been reached, i.e. more pixels remain to be copied, then decision block 4165 routes execution, via "NO" path 4168, back to block 4155 to copy the next pixel in the bit pattern from the font table to the current memory frame.

Now, if the font data is not one, two or three words wide, then decision block 4150 routes execution, via "NO" path 4153, to decision block 4170. This decision block, when executed, tests the font data for the present printable character to determine if this data is four words wide. Since printable font data can only be one, two, three or four words wide, the font data is erroneous if it has any other width. Should this occur, then execution exits from BLT Move Char Routine 4100, via the "NO" path from decision block 4170. Alternatively, if the font data is four words wide, then execution proceeds, via the "YES" path emanating from decision block 4170, to block 4175. This latter block moves the next four words of data from the font table to appropriate locations within the current memory frame. Thereafter, execution proceeds to block 4180 which, when executed, increments the font depth pointer by one so that every line of the bit pattern for the printable character is copied into the current memory frame through the BLT circuit. Once this has occurred, decision block 4185 is executed to determine whether the end of the bit pattern has been reached. If the end has been reached, then the entire bit pattern has been completely copied, in forward order, from the font table into the current memory frame. As a result, execution exits from BLT Move Char Routine 4100, via the "YES" path emanating from decision block 4185, and returns to the calling program. Alternatively, if the end of the bit pattern has not been reached, i.e. more pixels remain to be copied, then decision block 4185 routes execution, via "NO" path 4188, back to block 4175 to copy the next pixel in the bit pattern from the font table to the current memory frame.

2. Reverse BLT Move Char Routine 4200

Figures 42, 42A:
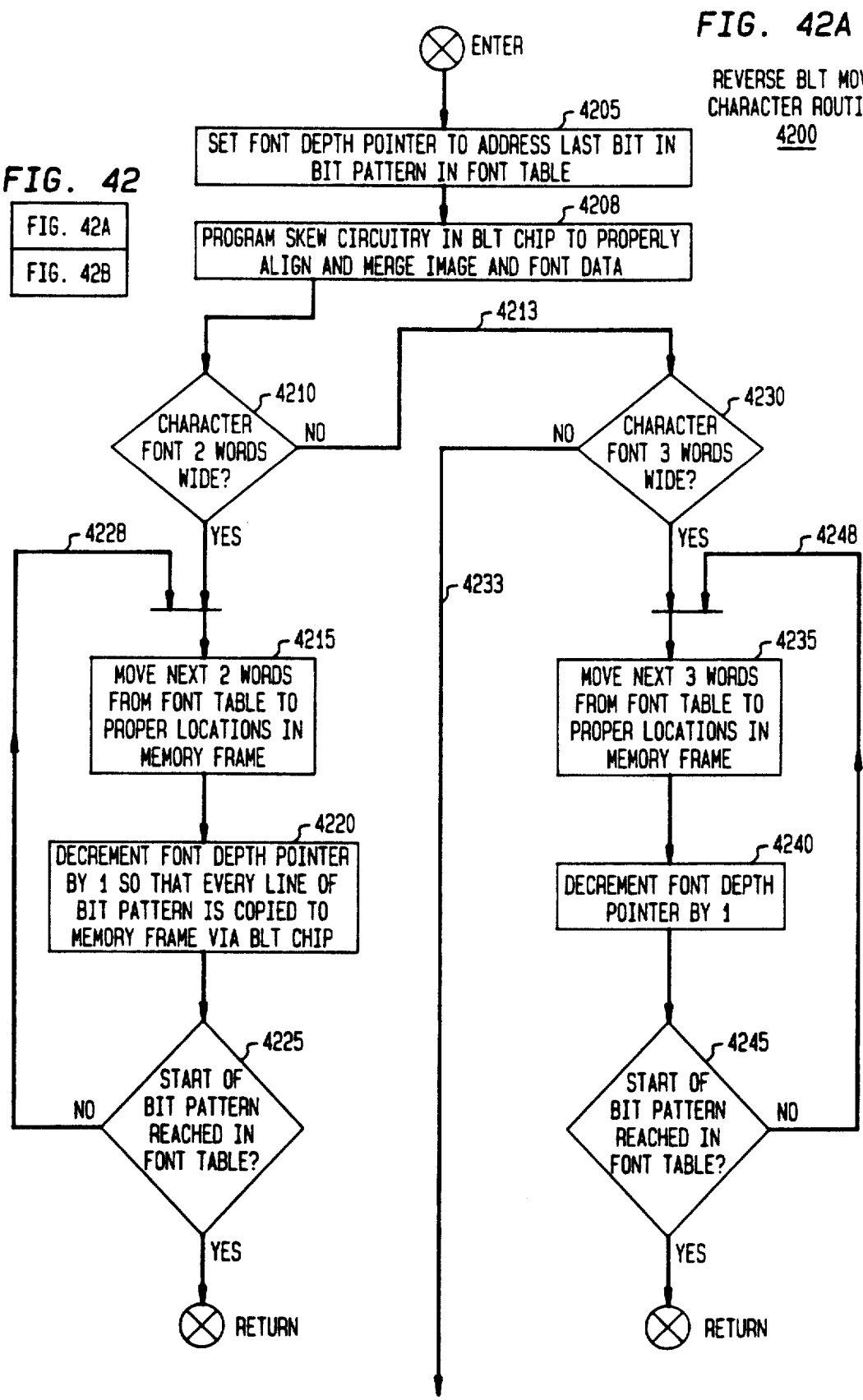
FIG. 42 shows the correct alignment of the drawing sheets for FIGS. 42a-42b.
FIGS. 42a-42b collectively show a flowchart of Reverse BLT Move Char Routine 4200 that is executed as part of NODE 1/2/3 Routine 3700.
Figure 42B:
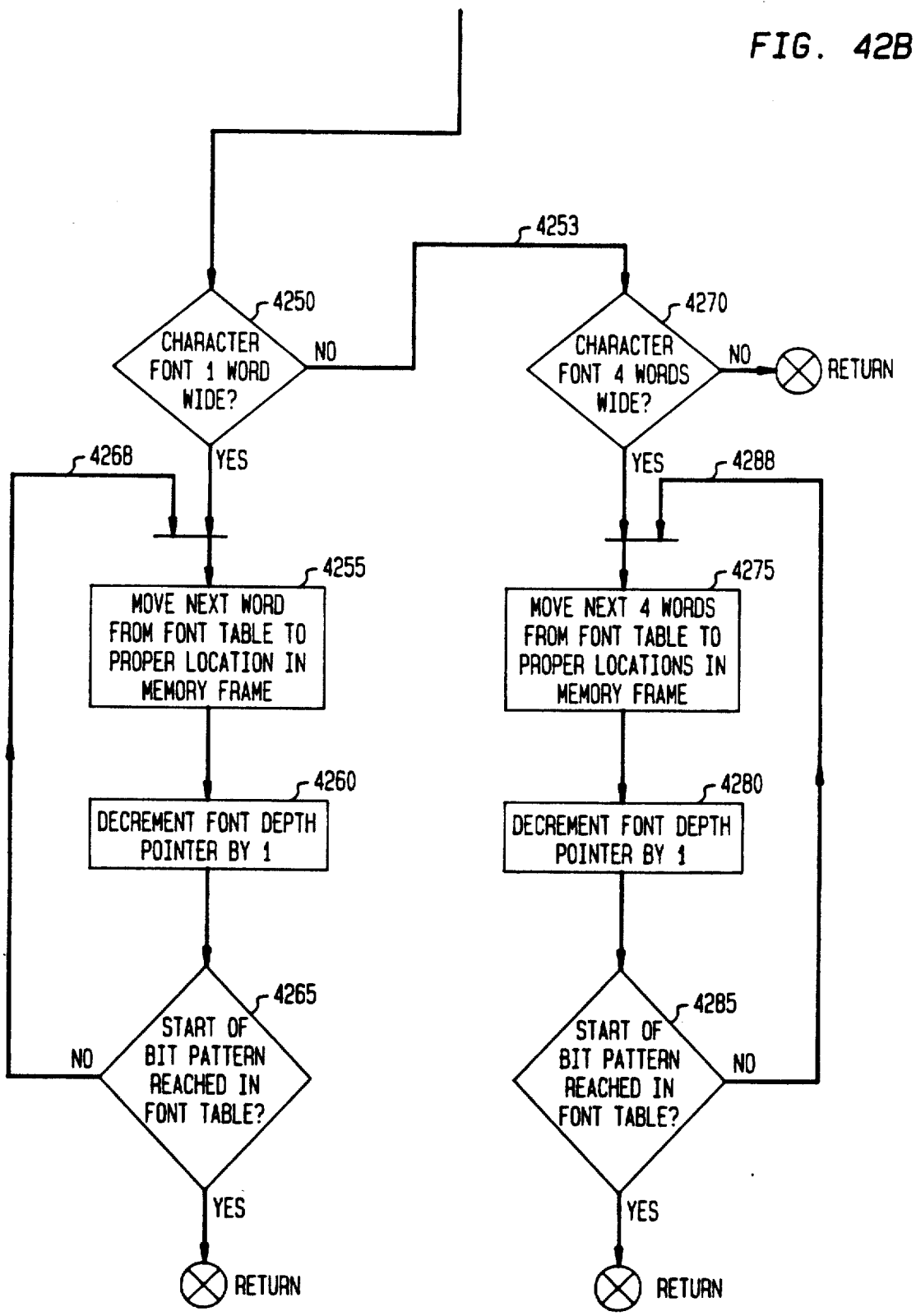

A flowchart of Reverse BLT Move Char Routine 4200 is shown in FIGS. 42a-42b, for which the correct alignment of the drawing sheets for these figures is shown in FIG. 42. As noted above, when invoked by NODE 1/2/3 Routine 3700 (see FIG. 37 and which has been discussed in detail above), BLT Move Char Routine 4200 copies the bits in a bit pattern for a printable character in reverse order, i.e. from the last bit in the pattern to the first, from a font table to appropriate locations in the current memory frame in order to produce a 180 degree rotated character.

Upon entry into this routine, execution proceeds to block 4205 which sets the value of a font depth pointer to address the last bit in the bit pattern for the printable character in the font table. Thereafter, block 4208 is executed to program the skew circuitry internal to the Block Transfer (BLT) integrated circuit (chip) that forms rasterizing circuit 342 (see FIG. 3 and which has been discussed above) in order to align bit positions of the font and image data and thereafter properly merge the two. Specifically, block 4208, when executed, loads appropriate pre-defined values into skew and the skew mask registers located within the skew circuitry to specify the desired amount of bit rotation and to control the pixel merging operation.

Once the skew register has been appropriately programmed, execution then proceeds, as shown in FIGS. 42a and 42b, to decision block 4210. This decision block, when executed, tests the font data for the present printable character to determine if this data is two words wide. If this font data is two words wide, then execution proceeds, via the "YES" path emanating from decision block 4210, to block 4215. This latter block moves the next two words of data from the font table to appropriate locations within the current memory frame. Thereafter, execution proceeds to block 4220 which, when executed, decrements the font depth pointer by one so that every line of the bit pattern for the printable character is copied into this memory frame through the BLT circuit. Once this has occurred, decision block 4225 is executed to determine whether the start of the bit pattern has been reached, i.e. by sensing an appropriate control code stored within the font table. If the beginning of the pattern has been reached, then the entire bit pattern has been completely copied, in reverse order, from the font table into the current memory frame. As a result, execution exits from Reverse BLT Move Char Routine 4200, via the "YES" path from decision block 4125, and returns to the calling program, NODE 1/2/3 Routine 3700. Alternatively, if the beginning of the bit pattern has not been reached, i.e. more pixels remain to be copied, then decision block 4225 routes execution, via "NO" path 4228, back to block 4215 to copy the next pixel in the bit pattern from the font table to the current memory frame.

Now, alternatively, in the event the font data is not two words wide, then decision block 4210 routes execution, via "NO" path 4213, to decision block 4230. This decision block, when executed, tests the font data for the present printable character to determine if this data is three words wide. If this font data is three words wide, then execution proceeds, via the "YES" path emanating from decision block 4230, to block 4235. This latter block moves the next three words of data from the font table to appropriate locations within the current memory frame. Thereafter, execution proceeds to block 4240 which, when executed, decrements the font depth pointer by one so that every line of the bit pattern for the printable character is copied into the current memory frame through the BLT circuit. Once this has occurred, decision block 4245 is executed to determine whether the start of the bit pattern has been reached. If the starting pixel in the pattern has been reached, then the entire bit pattern has been completely copied, in reverse order, from the font table into the current memory frame. As a result, execution exits from Reverse BLT Move Char Routine 4200, via the "YES" path from decision block 4245, and returns to the calling program, NODE 1/2/3 Routine 3700. Alternatively, if the start of the bit pattern has not been reached, i.e. more pixels remain to be copied, then decision block 4245 routes execution, via "NO" path 4248, back to block 4235 to copy the next pixel in the bit pattern from the font table to the current memory frame.

If, however, the font data is not two or three words wide, then decision block 4230 routes execution, via "NO" path 4233, to decision block 4250. This decision block, when executed, tests the font data for the present printable character to determine if this data is one word wide. If this font data is one word wide, then execution proceeds, via the "YES" path emanating from decision block 4250, to block 4255. This latter block moves the next word of data from the font table to an appropriate location within the current memory frame. Thereafter, execution proceeds to block 4260 which, when executed, decrements the font depth pointer by one so that every line of the bit pattern for the printable character is copied into this memory frame through the BLT circuit. Once this has occurred, decision block 4265 is executed to determine whether the starting pixel in the bit pattern has been reached. If this pixel has been reached, then the entire bit pattern has been completely copied, in reverse order, from the font table into the current memory frame. As a result, execution exits from Reverse BLT Move Char Routine 4200 via the "YES" path from decision block 4265 and returns to the calling program, NODE 1/2/3 Routine 3700. Alternatively, if the starting pixel in the bit pattern has not been reached, i.e. more pixels remain to be copied, then decision block 4265 routes execution, via "NO" path 4268, back to block 4255 to copy the next pixel in the bit pattern from the font table to the current memory frame.

Now, if the font data is not one, two or three words wide, then decision block 4250 routes execution, via "NO" path 4253, to decision block 4270. This decision block, when executed, tests the font data for the present printable character to determine if this data is four words wide. Since printable font data can only be one, two, three or four words wide, the font data is erroneous if it has any other width. Should this occur, then execution exits from Reverse BLT Move Char Routine 4200, via the "NO" path from decision block 4270. Alternatively, if the font data is four words wide, then execution proceeds, via the "YES" path emanating from decision block 4270, to block 4275. This latter block moves the next four words of data from the font table to appropriate locations within the current memory frame. Thereafter, execution proceeds to block 4280 which, when executed, decrements the font depth pointer by one so that every line of the bit pattern for the printable character is copied into the current memory frame through the BLT circuit. Once this has occurred, decision block 4285 is executed to determine whether the starting pixel in the bit pattern has been reached. If this pixel has been reached, then the entire bit pattern has been completely copied, in reverse order, from the font table into the current memory frame. As a result, execution exits from Reverse BLT Move Char Routine 4200, via the "YES" path emanating from decision block 4285, and returns to the calling program, NODE 1/2/3 Routine 3700. Alternatively, if the starting pixel in the bit pattern has not been reached, i.e. more pixels remain to be copied, then decision block 4285 routes execution, via "NO" path 4288, back to block 4275 to copy the next pixel in the bit pattern from the font table to the current memory frame.

3. BLT Move Script Routine 4300

Figure 43B:
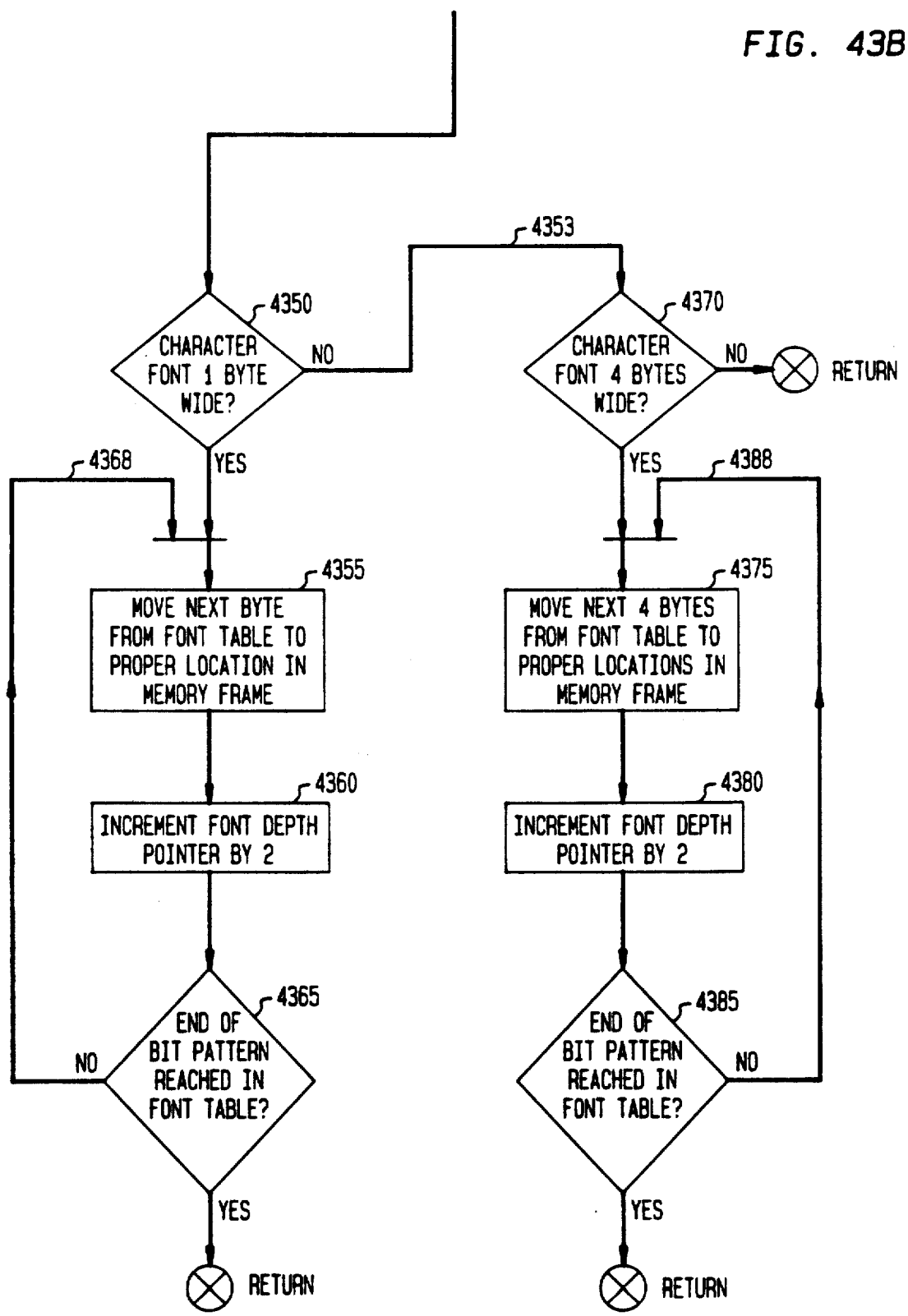

A flowchart of BLT Move Script Routine 4300 is shown in FIGS. 43a–43b, for which the correct alignment of the drawing sheets for these figures is shown in FIG. 43. As noted above, when invoked by Draw Routine 4000 (see FIG. 40 and which has been discussed in detail above), BLT Move Script Routine 4300 copies every other bit in a bit pattern for a printable character in forward order from a font table to appropriate locations in the current memory frame in order to produce a horizontally and vertically half sized character for a standard sized superscript or subscript.

Upon entry into this routine, execution proceeds to block 4305 to program the skew circuitry internal to the Block Transfer (BLT) integrated circuit (chip) that forms rasterizing circuit 342 (see FIG. 3 and which has been discussed above) in order to align bit positions of the font and image data and thereafter properly merge the two. Specifically, block 4305, when executed, loads appropriate pre-defined values into skew and the skew mask registers located within the skew circuitry to specify the desired amount of bit rotation and to control the pixel merging operation.

Once the skew register has been appropriately programmed, execution then proceeds, as shown in FIGS. 43a and 43b, to decision block 4310. This decision block, when executed, tests the font data for the present printable character to determine if this data is two bytes wide. If this font data is two bytes wide, then execution proceeds, via the "YES" path emanating from decision block 4310, to block 4315. This latter block moves the next two bytes of data from the font table to appropriate locations within the current memory frame. Thereafter, execution proceeds to block 4320 which, when executed, increments the font depth pointer by two so that every other line of the bit pattern for the printable character is copied into the current memory frame through the BLT circuit, thereby producing a half sized character in this frame. Once this has occurred, decision block 4325 is executed to determine whether the end of the bit pattern has been reached, i.e. by sensing an appropriate control code stored within the font table. If the last pixel in the pattern has been reached, then the entire bit pattern has been completely copied from the font table into the current memory frame. As a result, execution exits from BLT Move Script Routine 4300, via the "YES" path emanating from decision block 4325, and returns to the calling program, Draw Routine 4000. Alternatively, if the end of the bit pattern has not been reached, i.e. more pixels remain to be copied, then decision block 4325 routes execution, via "NO" path 4328, back to block 4315 to continue copying pixel data from the font table to the current memory frame.

Now, alternatively, in the event the font data is not two bytes wide, then decision block 4310 routes execution, via "NO" path 4313 to decision block 4330. This decision block, when executed, tests the font data for the present printable character to determine if this data is three bytes wide. If this font data is three bytes wide, then execution proceeds, via the "YES" path emanating from decision block 4330, to block 4335. This latter block moves the next three bytes of data from the font table to appropriate locations within the current memory frame. Thereafter, execution proceeds to block 4340 which, when executed, increments the font depth pointer by two so that every other line of the bit pattern for the printable character is copied into the current memory frame through the BLT circuit, thereby producing a half sized character in this frame. Once this has occurred, decision block 4345 is executed to determine whether the last pixel in the bit pattern has been reached. If this pixel has been reached, then the entire bit pattern has been completely copied from the font table into the current memory frame. As a result, execution exits from BLT Move Script Routine 4300 via the "YES" path from decision block 4345 and returns to the calling program, Draw Routine 4000. Alternatively, if the end of the bit pattern has not been reached, i.e. more pixels remain to be copied, then decision block 4345 routes execution, via "NO" path 4348, back to block 4335 to continue copying pixel data from the font table to the current memory frame.

If, however, the font data is not two or three bytes wide, then decision block 4330 routes execution, via "NO" path 4333, to decision block 4350. This decision block, when executed, tests the font data for the present printable character to determine if this data is one byte wide. If this font data is one byte wide, then execution proceeds, via the "YES" path emanating from decision block 4350, to block 4355. This latter block moves the next byte of data from the font table to appropriate locations within the current memory frame. Thereafter, execution proceeds to block 4360 which, when executed, increments the font depth pointer by two so that every other line of the bit pattern for the printable character is copied into the current memory frame through the BLT circuit. Once this has occurred, decision block 4365 is executed to determine whether the last pixel in the bit pattern has been reached. If this pixel has been reached, then the entire bit pattern has been completely copied from the font table into the current memory frame to produce a half sized character. As a result, execution exits from BLT Move Script Routine 4300, via the "YES" path emanating from decision block 4365, and returns to the calling program, Draw Routine 4000. Alternatively, if the end of the bit pattern has not been reached, i.e. more pixels remain to be copied, then decision block 4365 routes execution, via "NO" path 4368, back to block 4355 to continue copying pixel data from the font table to the current memory frame.

Now, if the font data is not one, two to three bytes wide, then decision block 4350 routes execution, via "NO" path 4353, to decision block 4370. This decision block, when executed, tests the font data for the present printable character to determine if this data is four bytes wide. Since printable font data for standard half sized characters can only be one, two, three or four bytes wide, the font data is erroneous if it has any other width. Should this occur, then execution exits from BLT Move Script Routine 4300, via the "NO" path from decision block 4370. Alternatively, if the font data is four bytes wide, then execution proceeds, via the "YES" path emanating from decision block 4370, to block 4375. This latter block moves the next four bytes of data from the font table to appropriate locations within the current memory frame. Thereafter, execution proceeds to block 4380 which, when executed, increments the font depth pointer by two so that every other line of the bit pattern for the printable character is copied into the current memory frame through the BLT circuit, thereby producing a half sized character in this frame. Once this has occurred, decision block 4385 is executed to determine whether the last pixel in the bit pattern has been reached. If this pixel has been reached, then the entire bit pattern has been completely copied from the font table into the current memory frame. As a result, execution exits from BLT Move Script Routine 4300, via the "YES" path emanating from decision block 4385, and returns to the calling program, Draw Routine 4000. Alternatively, if the end of the bit pattern has not been reached, i.e. more pixels remain to be copied, then decision block 4385 routes execution, via "NO" path 4388, back to block 4375 to continue copying pixel data from the font table to the current memory frame.

4. BLT Move Expand Script Routine 4400

Figure 44B:
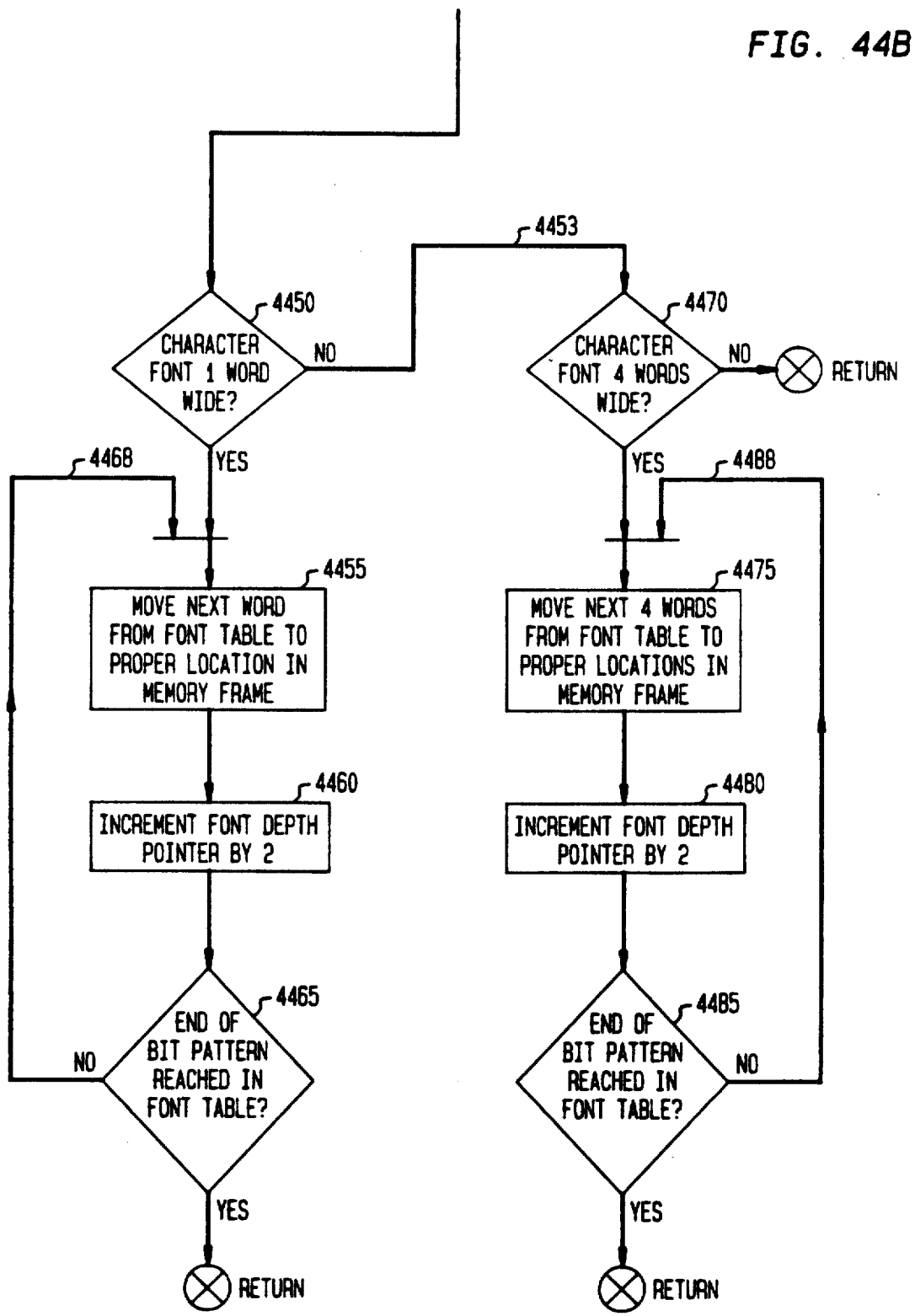

A flowchart of BLT Move Expand Script Routine 4400 is shown in FIGS. 44b–44b, for which the correct alignment of the drawing sheets for these figures is shown in FIG. 44. As noted above, when invoked by Draw Routine 4000 (see FIG. 40 and which has been discussed in detail above), BLT Move Expand Script Routine 4400 copies every other bit in a bit pattern for a printable character in forward order from a font table to appropriate locations in the current memory frame in order to produce a horizontally expanded and half vertically sized character for an expanded superscript or subscript.

Upon entry into this routine, execution proceeds to block 4405 to program the skew circuitry internal to the Block Transfer (BLT) integrated circuit (chip) that forms rasterizing circuit 342 (see FIG. 3 and which has been discussed above) in order to align bit positions of the font and image data and thereafter properly merge the two. Specifically, block 4405, when executed, loads appropriate pre-defined values into skew and the skew mask registers located within the skew circuitry to specify the desired amount of bit rotation and to control the pixel merging operation.

Once the skew register has been appropriately programmed, execution then proceeds, as shown in FIGS. 44a and 44b, to decision block 4410. This decision block, when executed, tests the font data for the present printable character to determine if this data is two words wide. If this font data is two words wide, then execution proceeds, via the "YES" path emanating from decision block 4410, to block 4415. This latter block moves the next two words to data from the font table to appropriate locations within the current memory frame to produce a horizontally expanded bit pattern. Thereafter, execution proceeds to block 4420 which, when executed, increments the font depth pointer by two so that every other line of the bit pattern for the printable character is copied into the current memory frame through the BLT circuit, thereby producing a half vertically sized character in this frame. Once this has occurred, decision block 4425 is executed to determine whether the end of the bit pattern has been reached, i.e. by sensing an appropriate control code stored within the font table. If the last pixel in the pattern has been reached, then the entire bit pattern has been completely copied from the font table into the current memory frame. As a result, execution exits from BLT Move Expand Script Routine 4400, via the "YES" path emanating from decision block 4425, and returns to the calling program, Draw Routine 4000. Alternatively, if the end of the bit pattern has not been reached, i.e. more pixels remain to be copied, then decision block 4425 routes execution, via "NO" path 4428, back to block 4415 to continue copying pixel data from the font table to the current memory frame.

Now, alternatively, in the event the font data is not two words wide, then decision block 4410 routes execution, via "NO" path 4413, to decision block 4430. This decision block, when executed, tests the font data for the present printable character to determine if this data is three words wide. If this font data is three words wide, then execution proceeds, via the "YES" path emanating from decision block 4430, to block 4435. This latter block moves the next three words of data from the font table to appropriate locations within the current memory frame to produce a horizontally expanded character. Thereafter, execution proceeds to block 4440 which, when executed, increments the font depth pointer by two so that every other line of the bit pattern for the printable character is copied into the current memory frame through the BLT circuit, thereby producing a half vertically sized character in this frame. Once this has occurred, decision block 4445 is executed to determine whether the last pixel in the bit pattern has been reached. If this pixel has been reached, then the entire bit pattern has been completely copied from the font table into the current memory frame. As a result, execution exits from BLT Move Expand Script Routine 4400 via the "YES" path from decision block 4445 and returns to the calling program, Draw Routine 4000. Alternatively, if the end of the bit pattern has not been reached, i.e. more pixels remain to be copied, then decision block 4445 routes execution, via "NO" path 4448, back to block 4435 to continue copying pixel data from the font table to the current memory frame.

If, however, the font data is not two or three words wide, then decision block 4430 routes execution, via "NO" path 4433, to decision block 4450. This decision block, when executed, tests the font data for the present printable character to determine if this data is one word wide. If this font data is one word wide, the execution proceeds, via the "YES" path emanating from decision block 4450, to block 4455. This latter block moves the next word of data from the font table to appropriate locations within the current memory frame, thereby producing a horizontally expanded character in this frame. Thereafter, execution proceeds to block 4460 which, when executed, increments the font depth pointer by two so that every other line of the bit pattern for the printable character is copied into the current memory frame through the BLT circuit to produce a half vertically sized character. Once this has occurred, decision block 4465 is executed to determine whether the last pixel in the bit pattern has been reached. If this pixel has been reached, then the entire bit pattern has been completely copied from the font table into the current memory frame to produce a character that is horizontally expanded and half vertically sized. As a result, execution exits from BLT Move Expand Script Routine 4400, via the "YES" path emanating from decision block 4465, and returns to the calling program, Draw Routine 4000. Alternatively, if the end of the bit pattern has not been reached, i.e. more pixels remain to be copied, then decision block 4465 routes execution, via "NO" path 4468, back to block 4455 to continue copying pixel data from the font table to the current memory frame.

Now, if the font data is not one, two or three words wide, then decision block 4450 routes execution, via "NO" path 4453, to decision block 4470. This decision block, when executed, tests the font data for the present printable character to determine if this data is four words wide. Since printable font data for horizontally expanded and half vertically sized characters can only be one, two, three or four words wide, the font data is erroneous if it has any other width. Should this occur, then execution exists from BLT Move Expand Script Routine 4400, via the "NO" path from decision block 4470. Alternatively, if the font data is four words wide, then execution proceeds, via the "YES" path emanating from decision block 4470, to block 4475. This latter block moves the next four words of data from the font table to appropriate locations within the current memory frame to produce a horizontally expanded character. Thereafter, execution proceeds to block 4480 which, when executed, increments the font depth pointer by two so that every other line of the bit pattern for the printable character is copied into the current memory frame through the BLT circuit, thereby producing a half vertically sized character in this memory frame. Once this has occurred, decision block 4485 is executed to determine whether the last pixel in the bit pattern has been reached. If this pixel has been reached, then the entire bit pattern has been completely copied from the font table into the current memory frame. As a result, execution exits from BLT Move Expand Script Routine 4400, via the "YES" path emanating from decision block 4485, and returns to the calling program, Draw Routine 4000. Alternatively, if the end of the bit pattern has not been reached, i.e. more pixels remain to be copied, then decision block 4485 routes execution, via "NO" path 4488, back to block 4475 to continue copying pixel data from the font table to the current memory frame.

5. BLT Move Expand Routine 4500

Figure 45B:
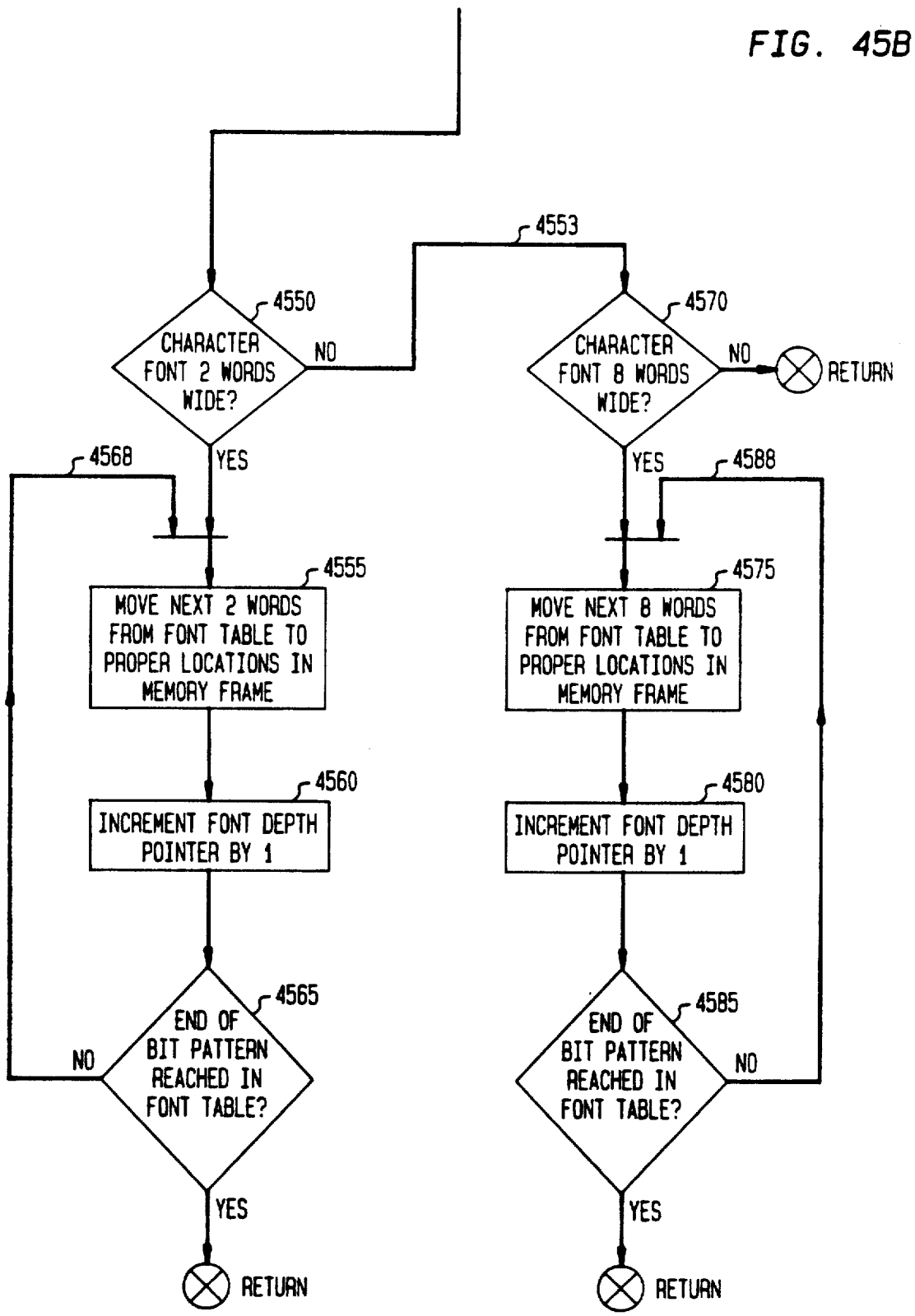
Figure 46B:
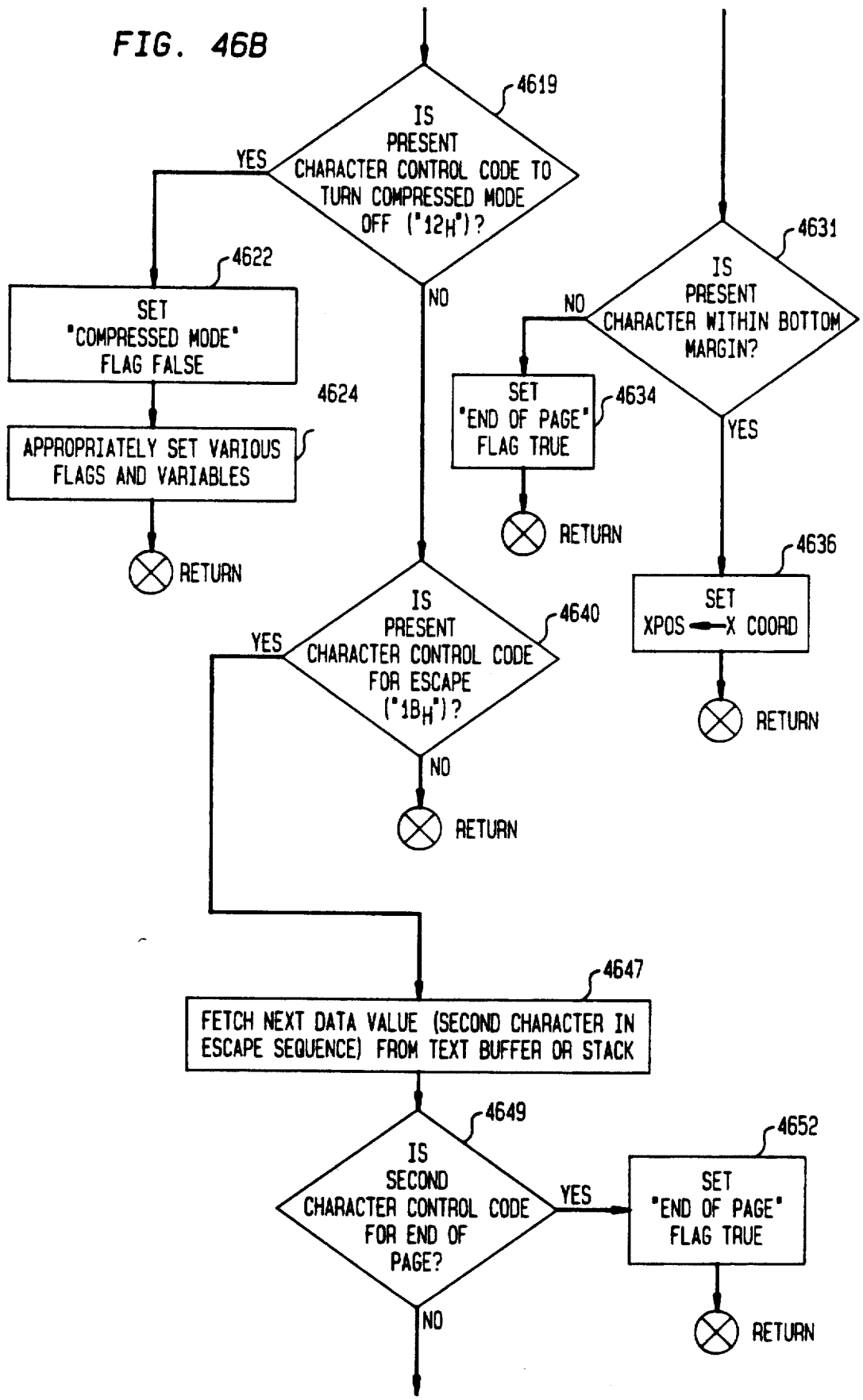
Figure 46C:
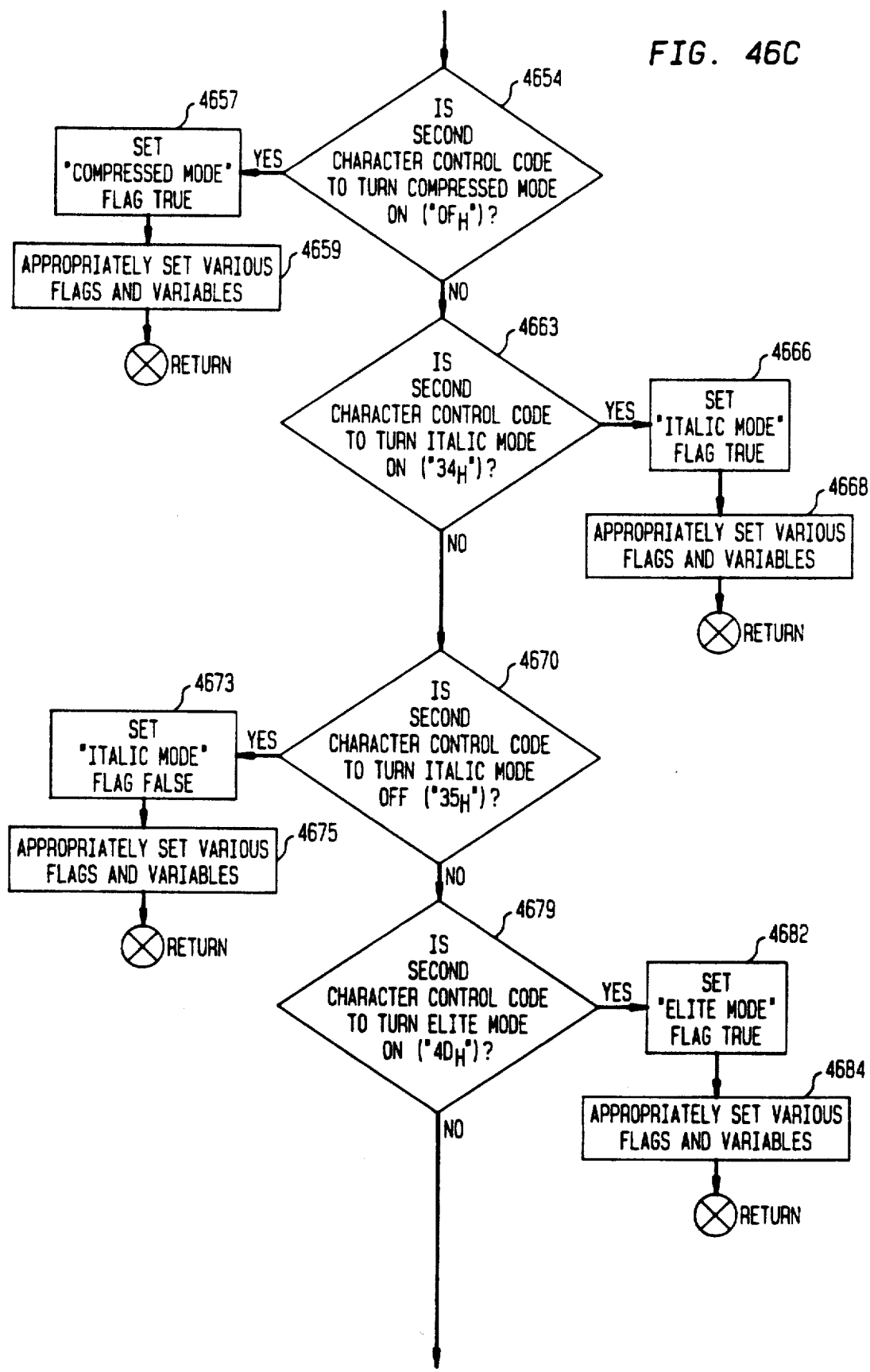
Figure 46D:
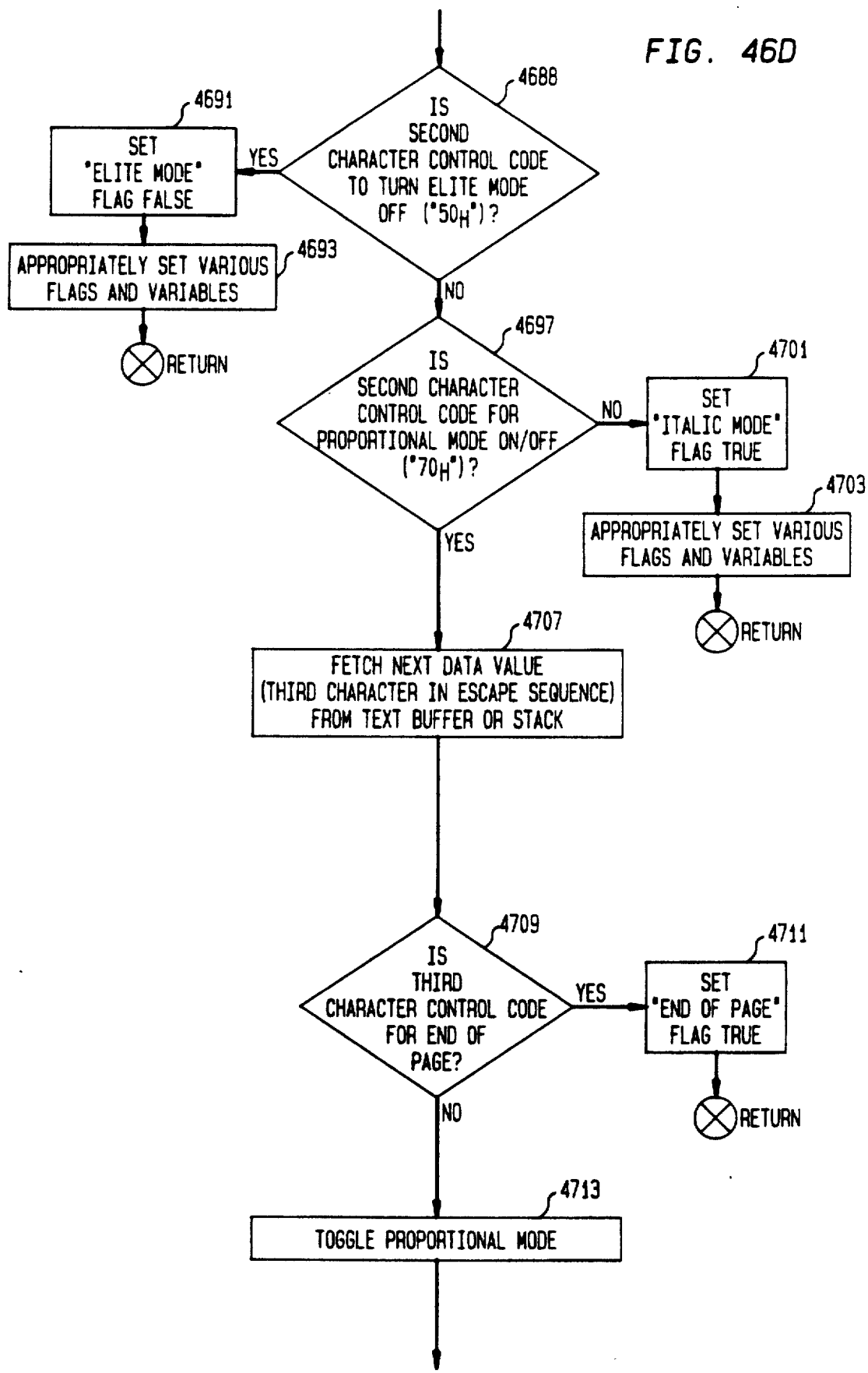
Figure 46E:
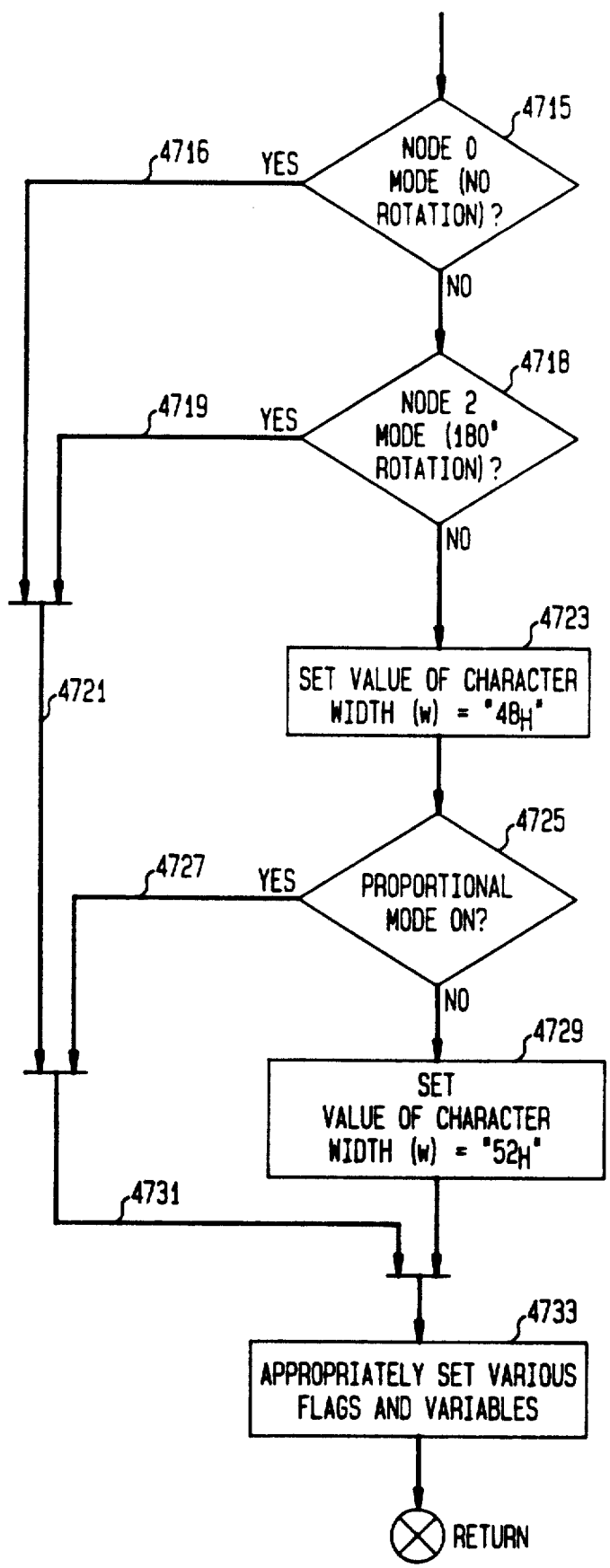
Figure 46F:
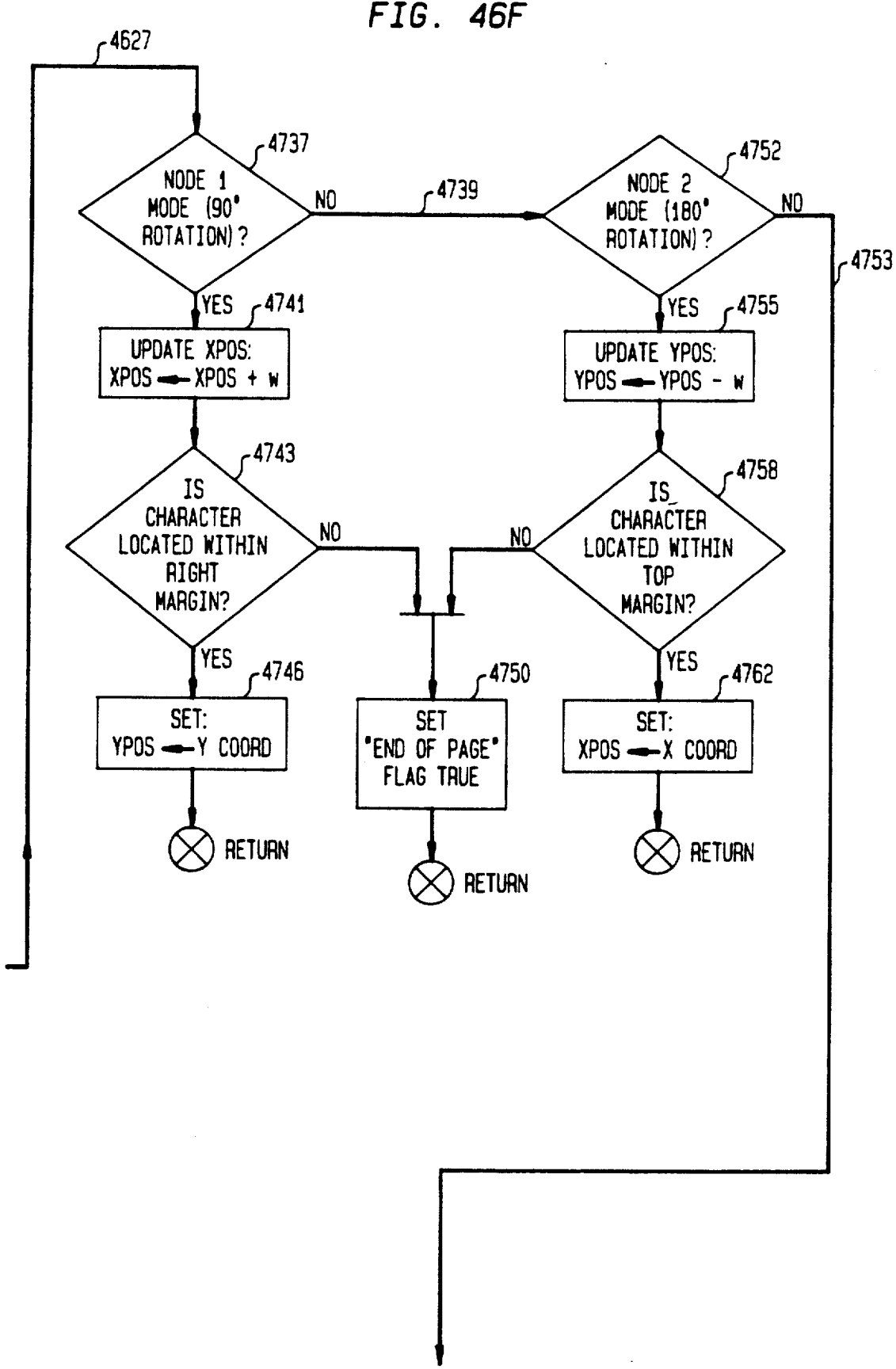
Figure 46G:
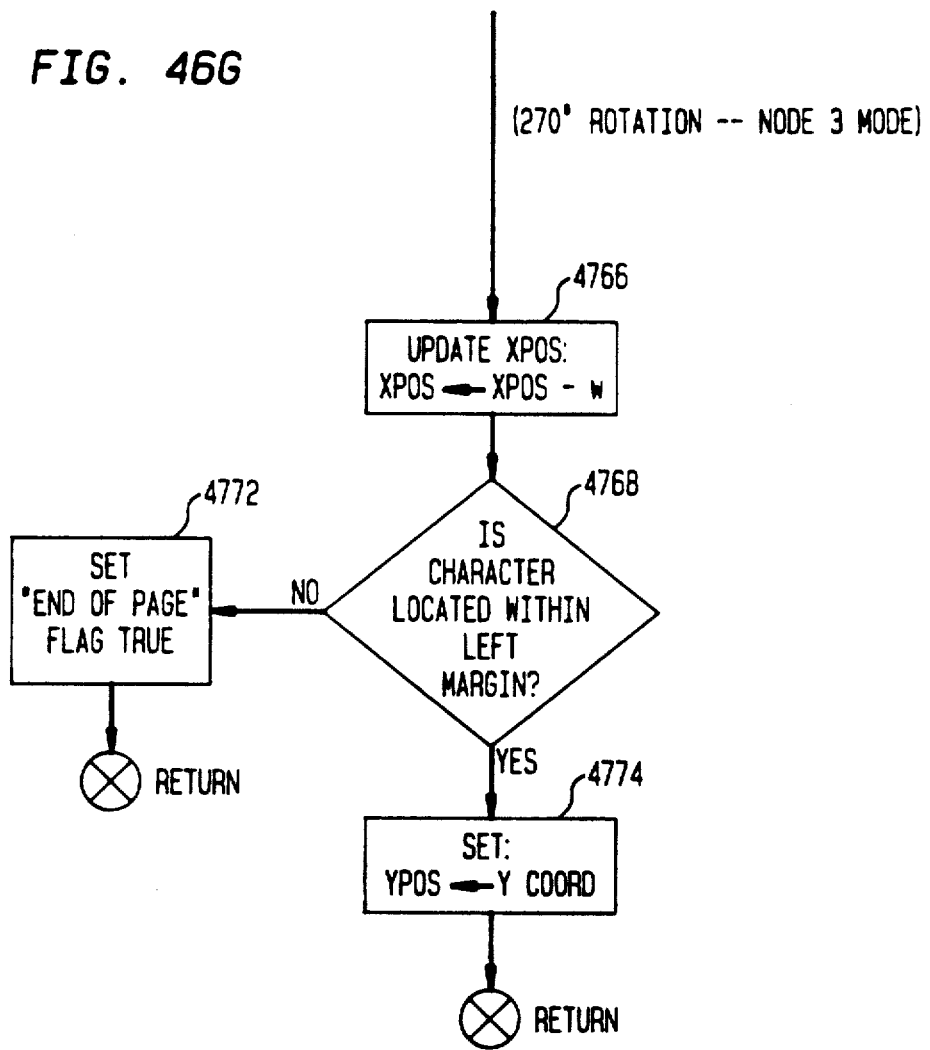

A flowchart of BLT Move Expand Routine 4500 is shown in FIGS. 45a–45b, for which the correct alignment of the drawing sheets for these figures is shown in FIG. 45. As noted above, when invoked by Draw Routine 4000 (see FIG. 40 and which has been discussed in detail above), BLT Move Expand Routine 4500 copies every bit in a bit pattern for a printable character in forward order from a font table to appropriate locations in the current memory frame in order to produce a horizontally expanded character.

Upon entry into this routine, execution proceeds to block 4505 to program the skew circuitry internal to the Block Transfer (BLT) integrated circuit (chip) that forms rasterizing circuit 342 (see FIG. 3 and which has been discussed above) in order to align bit positions of the font and image data and thereafter properly merge the two. Specifically, block 4505, when executed, loads appropriate pre-defined values into skew and the skew mask registers located within the skew circuitry to specify the desired amount of bit rotation and to control the pixel merging operation.

Once the skew register has been appropriately programmed, execution then proceeds, as shown in FIGS. 45a and 45b, to decision block 4510. This decision block, when executed, tests the font data for the present printable character to determine if this data is four words wide. If this font data is four words wide, then execution proceeds, via the "YES" path emanating from decision block 4510, to block 4515. This latter block moves the next four words of data from the font table to appropriate locations within the current memory frame to produce a horizontally expanded bit pattern. Thereafter, execution proceeds to block 4520 which, when executed, increments the font depth pointer by one so that every line of the bit pattern for the printable character is copied into the current memory frame through the BLT circuit, thereby producing a full vertically sized character is this memory frame. Once this has occurred, decision block 4525 is executed to determine whether the end of the bit pattern has been reached, i.e. by sensing an appropriate control code stored within the font table. If the last pixel in the pattern has been reached, then the entire bit pattern has been completely copied from the font table into the current memory frame. As a result, execution exits from BLT Move Expand Routine 4500, via the "YES" path emanating from decision block 4525, and returns to the calling program, Draw Routine 4000. Alternatively, if the end of the bit pattern has not been reached, i.e. more pixels remain to be copied, then decision block 4525 routes execution, via "NO" path 4528, back to block 4515 to continue copying pixel data from the font table to the current memory frame.

Now, alternatively, in the event the font data is not four words wide, then decision block 4510 routes execution, via "NO" path 4513, to decision block 4530. This decision block, when executed, tests the font data for the present printable character to determine if this data is six words wide. If this font data is six words wide, then execution proceeds, via the "YES" path emanating from decision block 4530, to block 4535. This latter block moves the next six words of data from the font table to appropriate locations within the current memory frame to produce a horizontally expanded character. Thereafter, execution proceeds to block 4540 which, when executed, increments the font depth pointer by one so that every line of the bit pattern for the printable character is copied into the current memory frame through the BLT circuit, thereby producing a full vertically sized character in the current memory frame. Once this has occurred, decision block 4545 is executed to determine whether the last pixel in the bit pattern has been reached. If this pixel has been reached, then bit pattern has been completely copied from the font table into the current memory frame. As a result, execution exits from BLT Move Expand Routine 4500 via the "YES" path from decision block 4545 and returns to the calling program, Draw Routine 4000. Alternatively, if the end of the bit pattern has not been reached, i.e. more pixels remain to be copied, then decision block 4545 routes execution, via "NO" path 4548, back to block 4535 to continue copying pixel data from the font table to the current memory frame.

If, however, the font data is not four or six words wide, then decision block 4530 routes execution, via "NO" path 4533, to decision block 4550. This decision block, when executed, tests the font data for the present printable character to determine if this data is two words wide. If this font data is two words wide, then execution proceeds, via the "YES" path emanating from decision block 4550, to block 4555. This latter block moves the next two words of data from the font table to appropriate locations within the current memory frame, thereby producing a horizontally expanded character in this memory frame. Thereafter, execution proceeds to block 4560 which, when executed, increments the font depth pointer by one so that every line of the bit pattern for the printable character is copied into the current memory frame through the BLT circuit to produce a full vertically sized character. Once this has occurred, decision block 4565 is executed to determine whether the last pixel in the bit pattern has been reached. If this pixel has been reached, then the entire bit pattern has been completely copied from the font table into the image buffer to produce an expanded character. As a result, execution exits from BLT Move Expand Routine 4500, via the "YES" path emanating from decision block 4565, and returns to the calling program, Draw Routine 4000. Alternatively, if the end of the bit pattern has not been reached, i.e. more pixels remain to be copied, then decision block 4565 routes execution, via "NO" path 4568, back to block 4555 to continue copying pixel data from the font table to the current memory frame.

Now, if the font data is not two, four or six words wide, then decision block 4550 routes execution, via "NO" path 4553, to decision block 4570. This decision block, when executed, tests the font data for the present printable character to determine if this data is eight words wide. Since printable font data for horizontally expanded and full vertically sized characters can only be two, four, six or eight words wide, the font data is erroneous if it has any other width. Should this occur, then execution exits from BLT Move Expand Routine 4500, via the "NO" path emanating from decision block 4570. Alternatively, if the font data is eight words wide, then execution proceeds, via the "YES" path emanating from decision block 4570, to block 4575. This latter block moves the next eight words of data from the font table to appropriate locations within the current memory frame to produce a horizontally expanded character. Thereafter, execution proceeds to block 4580 which, when executed, increments the font depth pointer by one so that every line of the bit pattern for the printable character is copied into the current memory frame through the BLT circuit, thereby producing a full vertically sized character in this memory frame. Once this has occurred, decision block 4585 is executed to determine whether the last pixel in the bit pattern has been reached. If this pixel has been reached, then the entire bit pattern has been completely copied from the font table into the current memory frame. As a result, execution exits from BLT Move Script Routine 4500, via the "YES" path emanating from decision block 4585, and returns to the calling program, Draw Routine 4000. Alternatively, if the end of the bit pattern has not been reached, i.e. more pixels remain to be copied, then decision block 4585 routes execution, via "NO" path 4588, back to block 4575 to continue copying pixel data from the font table to the current memory frame.

j. NodeC Routine 4600

A flowchart of NodeC Routine 4600 is shown in FIGS. 46a–46g, for which the correct alignment of the drawing sheets for these figures is shown in FIG. 46. As noted above, NodeC Routine 4600 appropriately processes EPSON printer emulation commands (control characters) that have been embedded within incoming ASCII text or annotation data.

Upon entry into routine 4600, execution proceeds to decision block 4602. This decision block tests the present character, obtained from either the text buffer or the stack, to determine if the character is a control code for a line feed (hex value "0A"). If it is such a control code, then execution proceeds, via "YES" path 4603, to decision block 4626. This decision block tests whether the next text character will not be rotated ("NODE 0" mode) prior to being overlaid onto the image, i.e. that Node0 Routine 3500 is being executed and has invoked NodeC Routine 4600. In the event no rotation has been requested, then decision block 4626 directs execution, via its "YES" path to block 4629. In response to the line feed, the values of pointers YPOS and XPOS are appropriately changed. In particular, block 4629 adds the height of one character line to the value of pointer YPOS. Thereafter, decision block 4631 is executed to determine whether the present character will be located within the bottom margin by testing the new value of pointer YPOS. If the character will not be located within this margin, then execution proceeds, via the "NO" path from decision block 4631, to block 4634 which then sets the state of the "End of Page" flag to true. Thereafter, execution exits from NodeC Routine 4600 and returns to the calling program, i.e. Node0 Routine 3500 (see FIGS. 35a–35b and which have been discussed in detail above). Alternatively, in the event that the present character will be located within the bottom margin, then decision block 4631 routes execution, via its "YES" path, to block 4636. This latter block sets the value of pointer XPOS to that of variable X COORD, the latter value, as noted above, being the starting x coordinate of an annotation and that specified by a RIP Note command. Thereafter, execution exits from NodeC Routine 4600 and returns to the calling program, i.e. Node0 Routine 3500.

Now, alternatively, in the event a character rotation has been requested which occurs whenever NodeC routine 4600 has been invoked by NODE 1/2/3 routine 3700 (see FIGS. 37a–37c and which have been discussed in detail above), decision block 4626 routes execution, via "NO" path 4627, to decision block 4737. This latter decision block tests whether a ninety degree rotation ("NODE 1" mode) has been requested. If such a rotation has been requested, then execution proceeds, via the "YES" path emanating from decision block 4737, to block 4741. This latter block, when executed, adjusts the value of pointer XPOS to the appropriate x position in the frame buffer where the next character will be written by adding the value of the character width (w) to the present value of pointer XPOS. Thereafter, decision block 4743 executes to determine, based upon the new value of pointer XPOS, whether the present character will be located within the right margin. If this character will be located within this margin, then decision block 4743 routes execution, via its "YES" path, to block 4746. This block, when executed, sets the value of address YPOS to that of variable Y COORD, the latter value, as noted above, being the starting y coordinate for an annotation and that specified by a RIP Note command. Thereafter, execution exits from NodeC routine 4600 and returns to the calling program, NODE 1/2/3 routine 3700. Alternatively, if the present character will not be located within the right margin, then decision block 4743 routes execution, via its "NO" path, to block 4750 which, when executed, sets the state of the "End of Page" flag to true. Thereafter, execution exits from NodeC Routine 4600 and returns to the calling program, i.e. NODE 1/2/3 Routine 3700.

In the event either a 180 degree or 270 degree rotation has been requested, decision block 4737 routes execution, via "NO" path 4739, to decision block 4752. This latter decision block tests whether a 180 degree rotation ("NODE 2" mode) has been requested. If such a rotation has been requested, then execution proceeds, via the "YES" path emanating from decision block 4752, to block 4755. This latter block, when executed, adjusts the value of pointer YPOS to the appropriate y position in the frame buffer where the next character will be written by subtracting the value of the character width (w) from the present value of pointer YPOS. Thereafter, decision block 4758 executes to determine, based upon the new value of pointer YPOS, whether the present character will be located within the top margin. If this character will be located within this margin, then decision block 4758 routes execution, via its "YES" path, to block 4762. This block, when executed, sets the value of pointer XPOS to that of value of annotation starting coordinate X COORD. Thereafter, execution exits from NodeC routine 4600 and returns to the calling program, NODE 1/2/3 routine 3700. Alternatively, if the present character will not be located within the top margin, then decision block 4758 routes execution, via its "NO" path, to block 4750 which, when executed, sets the state of the "End of Page" flag to true. Thereafter, execution exits from NodeC Routine 4600 and returns to the calling program, i.e. NODE 1/2/3 Routine 3700.

Now, alternatively, if a 270 degree character rotation ("NODE 3" mode) has been requested, decision block 4752 routes execution, via "NO" path 4753, to block 4766. This latter block, when executed, adjusts the value of pointer XPOS to the appropriate x position in the frame buffer where the next character will be written by subtracting the value of the character width (w) from the present value of pointer XPOS. Thereafter, decision block 4768 executes to determine, based upon the new value of pointer XPOS, whether the present character will be located within the left margin. If this character will be located within this margin, then decision block 4768 routes execution, via its "YES" path, to block 4774. This block, when executed, sets the value of pointer YPOS to that of annotation starting coordinate Y COORD. Thereafter, execution exits from NodeC routine 4600 and returns to the calling program, NODE 1/2/3 routine 3700. Alternatively, if the present character will not be located within the left margin, then decision block 4768 routes execution, via its "NO" path, to block 4772 which, when executed, sets the state of the "End of Page" flag to true. Thereafter, execution exits from NodeC Routine 4600 and returns to the calling program, i.e. NODE 1/2/3 Routine 3700.

If, however, the present character is not a control code for a line feed, then decision block 4602 routes execution, via its "NO" path, to decision block 4605. This latter decision block determines whether the present character is a control code for a form feed, i.e. is equal to hex value "0C". In the event the present character is such a control code, then decision block 4605 routes execution, via its "YES" path to block 4608 which, when executed, sets the "End of Page" flag to a true state. Thereafter, execution exits from NodeC Routine 4600 and returns to the calling program.

If the present character is not a form feed control code, then decision block 4605 routes execution, via its "NO" path, to decision block 4609. This latter decision block determines whether the present character is a control code for a carriage return, i.e. is equal to hex value "0D". In the event the present character is such a control code, then decision block 4609 routes execution, via its "YES" path, to block 4626, which has just been discussed above, in order to appropriately process this control code. Alternatively, if the present character is not a carriage return control code, then decision block 4609 directs execution, via its "NO" path, to decision block 4612. This latter decision block determines whether the present character is a control code (hex value "0F") to turn the compressed mode on, i.e. to utilize bit patterns from the compressed version of the present downloaded font. If the present character is this control code, then execution sequentially proceeds, via the "YES" path emanating from decision block 4612, to blocks 4615 and 4617. Block 4615, when executed, sets the state of the "Compressed Mode " flag (which has discussed above in conjunction with New Mode Routine 2200) to true. Thereafter, block 4617 is executed to appropriately set various flags (e.g. the "Proportional", "Compressed", "Elite" and "Italic" mode flags) and the values of various variable (e.g. font address pointers and default page length) in order to access the compressed character bit patterns stored within the present downloaded font and to establish the page length of a printed image. Once this has occurred, execution passes from block 4617, exits from NodeC Routine 4600 and then returns to the calling program. Now, in the event the present character is not a control code to turn the compressed mode on, decision block 4612 routes execution, via its "NO" path, to decision block 4619 which tests whether the present character is a control code (hex value "12") to turn the compressed mode off. If the present character is such a control code, then decision block 4619 routes execution, via its "YES" path, to block 4622. This latter block sets the state of the "Compressed Mode" flag to false. Thereafter, block 4624 is executed to appropriately set various flags and the values of various variables in order to access the standard character bit patterns stored within the present downloaded font and to establish the page length of the printed image. Once this has occurred, execution passes from block 4624, exits from NodeC Routine 4600 and then returns to the calling program.

Now, in the event the present character is not a control code to turn compressed mode off, execution then proceed, via the "NO" path emanating from decision block 4619, to decision block 4640. This decision block tests the present character to determine if it is an escape character (hex value "1B"), thereby indicating the beginning of an escape sequence. If this character is not an escape character, then execution exits from NodeC Routine 4600 via the "NO" path emanating from decision block 4640. Alternatively, if the present character is an escape character, then decision block 4640 routes execution, via its "YES" path, to block 4645.

An escape sequence invokes a desired operation on an EPSON printer and is fully emulated by the RIP. Each escape sequence is typically two or three characters long and is identified by the first character being an "escape" character. To process such a sequence, the character(s) that form the sequence must first be read, as described below, in order to correctly interpret the sequence. None of the characters that form the sequence will be processed until the entire sequence has been read. Alternatively, if the present character that has just been encountered does not form part of an escape sequence, then that character is fully processed, as a singular control code, prior to the next character being read.

Now, inasmuch as an escape sequence has just started, block 4647 is executed to fetch the next character (second character in the escape sequence) either from the text buffer or the stack (as discussed above), depending upon where this character has been stored. Execution then proceeds to decision block 4649 which tests whether this second character is a control code for end of the page, i.e. that the previous character was the last printable character in the current image (or page if text data is being printed). If this second character is an end of page control code, then decision block 4649 routes execution, via its "YES" path, to block 4652 which sets the state of the "End of Page" flag to true. Once this has occurred, execution then exits from NodeC Routine 4600. Alternatively, if the next character is not an end of page control code, then decision block 4649 routes execution, via its "NO" path, to decision block 4654.

Decision block 4654, when executed, tests the second character to determine whether it is a control code (hex value "0F") to turn the compressed mode on. If this character is such a control code, then decision block 4654 routes execution, via its "YES" path to block 4657. This latter block, when executed, sets the state of the "Compressed Mode" flag to true. Thereafter, block 4659 is executed to appropriately set various flags and the values of various variables in order to access the compressed bit patterns stored within the present font and to establish the page length of the printed image. Now, since the escape sequence for turning the compressed mode on merely consists of the escape character and the control code to turn the compressed mode on, the entire escape sequence has now been fully processed. Hence, execution now exits from NodeC Routine 4600. If, however, the second character is not a control code for turning the compressed mode on, decision block 4654 routes execution, via its "NO" path, to decision block 4663. This latter decision block, when executed, tests the second character to determine if it is a control code (hex value "34") to turn the italic mode on, i.e. to utilize bit patterns from the italic version of the present font. If this character is such a control code, then execution sequentially proceeds, via the "YES" path from decision block 4663, to blocks 4666 and 4668. Block 4666, when executed, sets the state of the "Italic Mode" flag (which has discussed above in conjunction with New Mode Routine 2200) to true. Thereafter, block 4668 is executed to appropriately set various flags and the values of various variables in order to access the italic character bit patterns stored within the present downloaded font and to establish the page length of the printed image. Once this has occurred, execution passes from block 4668, exits from NodeC Routine 4600 and then returns to the calling program. Now, in the event the second character is not a control code to turn italic mode on, decision block 4663 routes execution, via its "NO" path, to decision block 4670 which tests whether the present character is a control code (hex value "35") to turn the italic mode off. If the second character is such a control code, then decision block 4670 routes execution, via its "YES" path, to block 4673. This latter block sets the state of the "Italic Mode" flag to false. Thereafter, block 4675 is executed to appropriately set various flags and the values of various variables in order to access the standard character bit patterns stored within the present downloaded font and to establish the page length of the printed image. Since the escape sequence for turning the italic mode off has now been fully processed, execution exits from NodeC Routine 4600 and then returns to the calling program.

Now, in the event the second character is not a control code to turn the italic mode off, then execution proceeds, via the "NO" path emanating from decision block 4670, to decision block 4679. This latter decision block, when executed, tests the second character to determine whether it is a control code (hex value "4D") to turn elite mode on. If this character is such a control code, then decision block 4679 routes execution, via its "YES" path, to block 4682. This latter block, when executed, sets the state of the "Elite Mode" flag to true (discussed above in conjunction with New Mode Routine 2200). Thereafter, block 4684 is executed to appropriately set various flags and the values of various variables in order to access the elite bit patterns stored within the present downloaded font and to establish the page length of the printed image. Now, since the escape sequence for turning the elite mode on merely consists of the escape character and the control code to turn the elite mode on, the entire escape sequence has now been fully processed. Hence, execution now exits from NodeC Routine 4600. Now, in the event the second character is not a control code to turn elite mode on, decision block 4679 routes execution, via its "NO" path, to decision block 4688 which tests whether this character is a control code (hex value "50") to turn elite mode off. If the second character is such a control code, then decision block 4688 routes execution, via its "YES" path, to block 4691. This latter block sets the state of the "Elite Mode" flag to false. Thereafter, block 4693 is executed to invoke appropriately set various flags and the values of various parameters in order to access the standard character bit patterns stored within the present downloaded font and to establish the page length of the printed image. Inasmuch as the escape sequence for turning the elite mode off has now been fully processed, execution exits from NodeC Routine 4600 and then returns to the calling program.

Alternatively, if the second character is not a control code to turn the elite mode off, then execution proceeds, via the "NO" path emanating from decision block 4688, to decision block 4697. This latter decision block, when executed, tests the second character to determine whether it is a control code (hex value "70") to toggle the proportional mode on/off. If this character does not equal this control code, then decision block 4697 routes execution, via its "NO" path, to block 4701 to invoke the italic mode as a default value. To do so, this latter block, when executed, sets the state of the "Italic Mode" flag to true. Thereafter, block 4703 is executed to appropriately set various flags and the values of various variables in order needed to access the italic bit patterns stored within the present downloaded font and to establish the page length of the printed image. Now, since all the permitted two character escape sequences have been fully processed, execution exits from NodeC Routine 4600.

Now, alternatively, if the second character is the control code for toggling the proportional mode, then decision block 4697 routes execution, via its "YES" path, to block 4707. This block fetches the next successive character, i.e. the third character in escape sequence, either from the text buffer or the stack depending upon where this character has been stored. Once this has occurred, execution proceeds to decision block 4709 which tests the value of this third character to determine if it equals a control code for end of the page. If the third character such a control code, then decision block 4709 routes execution, via its "YES" path, to block 4711 which sets the state of the "End of Page" flag to true. Once this has occurred, execution then exits from NodeC Routine 4600. Alternatively, if this current character is not an end of page control code, then decision block 4709 routes execution, via its "NO" path, to block 4713 which toggles the proportional mode; i.e. if this mode was turned off, it is turned on and vice versa.

Execution then proceeds from block 4713 to blocks 4715-4729 to appropriately set the character width for either proportional or standard spaced characters that are to be rotated by 90 or 270 degrees. In particular, decision block 4715 tests whether no rotation ("NODE 0" mode) has been requested. If no rotation has been requested, then execution proceeds, via "YES" path 4716 and paths 4721 and 4731, to block 4733, which will be discussed shortly. The character width value remains unchanged from its previously accessed value. Alternatively, if rotation has been requested, execution proceeds, via the "NO" path emanating from decision block 4715, to decision block 4718. This block, when executed determines whether the requested rotation is 180 degrees ("NODE 2" mode). If it is, then execution proceeds, via "YES" path 4719 and paths 4721 and 4731, to block 4733. Again, the value of the character width remains unchanged from its previously accessed value. Alternatively, in the event either a 90 degree rotation ("NODE 1" mode) or 270 degree rotation ("NODE 3" mode) has been requested, then execution proceeds, via the "NO" path emanating from decision block 4718, to block 4723. This block sets the value of character width ("w") to the hex value "48". This width is the horizontal width in dots of a box within an image that will hold one character. Thereafter, execution passes to decision block 4725 which tests whether proportionally spaced 90 or 270 degree rotated characters are to be used. If the state of the "Proportional Mode" flag is true, then decision block 4725 routes execution, via "YES" path 4727 and path 4731, to block 4733. If, on the other hand, standard spaced 90 or 270 degree rotated characters are to be used, then execution proceeds, via the "NO" path emanating from decision block 4725, to block 4729. This latter block sets the value of the character width to the hex value "52" which is the standard character spacing. Thereafter execution passes to block 4733 which appropriately sets various flags and the values of various variables to take the new character width into account and to establish the page length of the printed image. Once this has occurred, execution exits from NodeC Routine 4600 and returns to the calling program.

As discussed above, the inventive RIP provides substantially greater throughput than raster image processors known in the art by substantially isolating the CPU used in the RIP from bit mapped data, particularly occurring during image decompression and I/O transfers, and by operating in a pipe-line fashion. This throughput can be enhanced even further, as noted above, by providing more than one bus to interconnect the components that form the RIP. One such arrangement that uses two such busses is shown in FIG. 8 and discussed above. Clearly, more than two busses can be to interconnect these components and thereby further increase the number of RIP components that are able to simultaneously transfer data therebetween and the amount of data which data can be transferred. In addition, throughput can also be increased by employing more than one compressor/decompressor scaler pair, particularly compressor/decompressor 50 and scaler 60, in the RIP. Inasmuch as the CPU is minimally involved in the decompression (or compression) and scaling operations, the CPU can easily handle several decompressor/compressor scaler pairs thereby allowing several images to be simultaneously decompressed (or compressed) or scaled. In particular, the CPU merely programs the CEP appearing in the compressor/decompressor and then instructs the CEP to perform the desired operation. When this operation is finished, the CEP appropriately signals the CPU. The CPU interacts in a similar minimal fashion with scaler 60. Therefore, for each additional decompressor/compressor scaler pair appearing in the RIP, a subroutine would need to be appropriately added to the software merely to monitor the status of each additional pair, route data to an available one of the pairs and then invoke that pair to provide a desired decompression (or compression) or scaling operation. In this manner, the RIP could utilized two, three, four, five or even more such pairs with each pair operating on a separate image. In addition, the RIP can include more than one interface and rasterizer circuit 30 in order to simultaneously transfer data to more than one image printer. These modifications may permit the RIP to supply data to each of the printers at a sufficiently rapid rate in order to operate all the printers at or near their maximum speed and thereby further increase the throughput of the entire image management system. In addition to incorporating these hardware modifications, an appropriate subroutine would need to be added to the software in order to monitor the status of each of these circuits, i.e. to determine which image printers are busy or waiting at any given time, and then route data through the printer interface, situated on an interface and rasterizer circuit, to an available printer for printing. Moreover, each additional interface and rasterizer circuit could be connected to a different computer network through an appropriate file server. In this manner, the RIP can simultaneously receive service requests from a number of different host computers, queue these requests and process them in seriatim as various resources in the RIP become available. Clearly, by now, those skilled in the art realize that the architecture of the inventive RIP is quite flexible and hence additional modifications can be made to this architecture to further increase throughput.

Moreover, the RIP can be modified to provide functionality normally associated with the KIM host computer. In particular, a mass read/write storage device (such as a magnetic disk) could advantageously be connected to the RIP to store images provided by the KIM host computer. Specifically, the disk would be connected as a SCSI device to leads 18 on the SCSI side of file server 15 within RIP 20. In this manner, when the RIP itself is busy, the KIM host computer will still be able to send images to the RIP. In this case, these images will be routed to the disk for storage until such time as the RIP is able to process and/or print them and so requests these images from the disk. In this manner, the SCSI interface within the RIP will function both as a SCSI initiator as well as a SCSI target—the latter being the function of SCSI interface 310, as discussed above in connection with FIG. 3.

Additionally, if a scanner is also included within RIP 20 and interconnected as a SCSI device to leads 18, then with an appropriate local database stored on the disk and using suitable database management software, the RIP can locally digitize images, store images and access these images, thereby, at least for these images, bypassing the KIM host computer. Not only does this arrangement reduce the storage requirement of the KIM host computer; but also, this arrangement provides a certain degree of stand alone operation. The latter advantageously imparts a degree of redundant operation into the KIM system by allowing the RIP to function as a local back-up in the event the KIM host computer fails.

Furthermore, by incorporating a scanner within the RIP, the RIP can function as an electronic copy machine. In particular, an image can be digitized by the RIP, electronically processed and printed on the image printer. This processing could encompass digitally filtering the image to remove noise, rotating the image, overlaying an annotation onto the image at a desired location, and the like. In addition, if a video camera is used as the scanner, the RIP can function as a frame grabber, i.e. capturing a single frame of video, such as from an image that contains motion, digitize the image and then process this image. This processing can entail transforming a grey scale image into a bi-tonal image. Alternatively, this function provides the RIP with the ability to provide color separations of this image. An appropriate filter would be placed over the lens of the video camera and the resulting image would be digitized to yield a corresponding color separation. This process would be repeated for each different color separation. Each digitized separation would be stored in a different memory frame within the RIP and could be processed electronically, as noted above.

Moreover, although RIP 20 has been shown and described herein as containing an image printer, any raster based output device that produces a depiction of an image in a media can be used, if desired, in lieu of the image printer. For example, if microfilm output was desired, then a microfilm printer can be used rather than a laser printer which produces a paper output. The RIP would then be supplied with the resolution of the particular output device, e.g. the microfilm printer, being used thereby permitting the RIP to appropriately scale the scanned image to match the resolution of the particular output device.

Although various embodiments of the present invention have been shown and described herein, many other embodiments that incorporate the teachings of the present invention may be readily constructed by those skilled in the art.

We claim:

1. Apparatus for a raster image processor for use in processing a bit-mapped image, said apparatus comprising:
   an internal bus;
   a plurality of application specific image processing components for undertaking a corresponding plurality of specific bit-mapped image processing tasks, wherein each of the components is connected to the internal bus and capable of undertaking a respective associated one of the bit-mapped image processing tasks in parallel with respective ones of said bit-mapped image processing tasks undertaken by and associated with other ones of said components; and
   arbiter means, connected to said bus and operating at a lower processing speed than that of any of said image processing components, for arbitrating transfers that are to occur over said bus and between individual ones of said components, wherein said arbiter means receives a request from a first one of said components for service from a second one of said components and, in response thereto, both defines a data path over said internal bus and between said first and second components and initiates an information transfer over said internal bus and between said first and second components, wherein once said transfer is complete said second component undertakes the respective one of said bit-mapped image processing tasks associated with the second component independent of both the arbiter means and said first component so as to isolate the respective bit-mapped image processing task undertaken by said second component from the arbiter means and, while said second component is undertaking the respective bit-mapped image processing task associated with the second component, to permit both said arbiter means to arbitrate a subsequent one of said transfers and the first component to subsequently undertake the respective one of said image processing tasks associated with the first component for a remaining one of said components other than said second component so as to provide pipelined operation, whereby through isolating the bit-mapped image processing tasks from executing within the arbiter means and operating the image processing components to undertake multiple bit-mapped tasks on a pipelined basis the raster image processor provides an increased throughput of processed bit-mapped images.

2. The apparatus in claim 1 wherein the service request takes the form of a request to transfer information from said first image processing component to said second image processing component.

3. The apparatus in claim 2 wherein said image processing components comprise:
   means, connected to said bus, for routing incoming image processing commands to said bus;
   means, connected to said bus, for decompressing a bit-mapped image to yield a decompressed image;
   means, connected to said bus and operative in response to the decompressed image, for scaling the decompressed image from one pre-defined resolution to another pre-defined resolution;
   means, connected to said bus, for temporarily storing a bit mapped image; and
   means, connected to said bus, for converting a bit mapped image appearing thereon to a raster image and for producing, in response to said raster image, a depiction of said raster image in a selected media.

4. The apparatus in claim 1 further comprising:
   a second bus for interconnecting a plurality of said image processing components such that information transfers can simultaneously occur between different pairs of said components over both of said busses thereby further increasing the throughput of said raster image processor.

5. Apparatus for a raster image processor for use in processing a bit-mapped image, said apparatus comprising:

an internal bus;

source and destination image processing components for undertaking a corresponding plurality of specific bit-mapped image processing tasks, wherein each of said components is capable of undertaking a respective associated one of the bit-mapped image processing tasks in parallel with respective ones of said bit-mapped image processing tasks undertaken by and associated with other ones of said components, said source and destination components comprising:

means, connected to said internal bus, for routing an incoming image processing command to said internal bus;

means, connected to said internal bus, for decompressing a bit-mapped image to yield a decompressed image;

means, connected to said internal bus and operative in response to the decompressed image, for scaling the decompressed image from one pre-defined resolution to another pre-defined resolution;

means, connected to said internal bus, for temporarily storing a bit-mapped image; and means, connected to said internal bus, for converting a bit-mapped image appearing thereon to a raster image and for producing, in response to said raster image, a depiction of said raster image in a selected media; and wherein said raster image processor further comprises arbiter means, connected to said bus and operating at a lower processing speed than that of any of said image processing components, for arbitrating transfers that are to occur over said bus and between individual ones of said components, wherein said arbiter means receives a request from a first one of said components for service from a second one of said components and, in response thereto, both defines a data path over said internal bus and between said first and second components and initiates an information transfer over said internal bus and between said first and second components, wherein once said transfer is complete said second component undertakes the respective one of said bit-mapped image processing tasks associated with the second component independent of both the arbiter means and said first component so as to isolate the respective bit-mapped image processing task undertaken by said second component from the arbiter means and, while said second component is undertaking the respective bit-mapped image processing task associated with the second component, to permit both said arbiter means to arbitrate a subsequent one of said transfers and the first component to subsequently undertake the respective one of said image processing tasks associated with the first component for a remaining one of said components other than said second component so as to provide pipelined operation, whereby through isolating the bit-mapped image processing tasks from executing within the arbiter means and operating the image processing components to undertake multiple bit-mapped tasks on a pipelined basis the raster image processor provides an increased throughput of processed bit-mapped images.

6. In a raster image processor for use in processing a bit-mapped image and having an internal bus, a plurality of application specific image processing components for undertaking a corresponding plurality of specific bit-mapped image processing tasks wherein each of the components is connected to the internal bus and is capable of undertaking a respective associated one of the bit-mapped image processing tasks in parallel with respective ones of said bit-mapped image processing tasks undertaken by and associated with other ones of said components, and arbiter means connected to said internal bus and operating at a lower processing speed than that of any of said image processing components for arbitrating transfers that are to occur over said bus and between individual ones of said components, a method for increasing throughput of said raster image processor comprising the steps of:

in said arbiter means:

receiving a request, from a first one of said image processing components, for service from a second one of said image processing components;

defining, in response to said receiving step, a data path over said internal bus and between said first and second components; and initiating, in response to said defining step, an information transfer over said internal bus between said first and second components; and in said second component, once said transfer is complete, undertaking the respective one of said bit-mapped image processing tasks associated with the second component independent of both the arbiter means and said first component so as to isolate the respective bit-mapped image processing task undertaken by said second component from the arbiter means and, while said second component is undertaking the respective bit-mapped image processing task associated with the second component, to permit both said arbiter means to arbitrate a subsequent one of said transfers and the first component to subsequently undertake the respective one of said image processing tasks associated with the first component for a remaining one of said components other than said second component so as to provide pipelined operation, whereby through isolating the bit-mapped image processing tasks from executing within the arbiter means and operating the image processing components to undertake multiple bit-mapped tasks on a pipelined basis the raster image processor provides an increased throughput of processed bit-mapped images.

7. The method in claim 6 further comprising the steps of:

routing incoming image processing commands to said bus;

decompressing a bit-mapped image to yield a decompressed image;

scaling the decompressed image from one pre-defined resolution to another pre-defined resolution;

temporarily storing a bit mapped image;

converting a bit mapped image appearing on the internal bus to a raster image; and producing, in response to said raster image, a depiction of said raster image in a selected media.

8. Apparatus for a raster image processor for use in processing a bit-mapped image, said apparatus comprising:
- an internal bus;
- a plurality of application specific image processing components for undertaking a corresponding plurality of specific bit-mapped image processing tasks, wherein each of the components is connected to the internal bus and is capable of undertaking a respective associated one of the bit-mapped image processing tasks in parallel with respective ones of said bit-mapped image processing tasks undertaken by and associated with other ones of said components, wherein said image processing components comprise:
  - means, connected to said internal bus, for routing an incoming image processing command to said bus, wherein said image processing command further comprises a header portion, for invoking a corresponding one of said image processing tasks, followed by a data portion which is comprised of data for use in providing the corresponding image processing task;
  - means, connected to said internal bus, for decompressing a bit-mapped image to yield a decompressed image;
  - means, connected to said internal bus and operative in response to the decompressed image, for scaling the decompressed image from one pre-defined resolution to another pre-defined resolution;
  - means, connected to said internal bus, for temporarily storing a bit-mapped image; and
  - means, connected to said internal bus, for converting a bit-mapped image appearing thereon to a raster image and for producing, in response to said raster image, a depiction of said raster image in a selected media; and
- arbiter means, connected to said bus and operating at a lower processing speed than that of any of said image processing components, for arbitrating transfers that are to occur over said bus and between individual ones of said components, wherein said arbiter means receives a request from a first one of said components for service from a second one of said components and, in response thereto, both defines a data path over said internal bus and between said first and second components and initiates an information transfer over said internal bus and between said first and second components, wherein once said transfer is complete said second component undertakes the respective one of said bit-mapped image processing tasks associated with the second component independent of both the arbiter means and said first component so as to isolate the respective bit-mapped image processing task undertaken by said second component from the arbiter means and, while said second component is undertaking the respective bit-mapped image processing task associated with the second component, to permit both said arbiter means to arbitrate a subsequent one of said transfers and the first component to subsequently undertake the respective one of said image processing tasks associated with the first component for a remaining one of said components other than said second component so as to provide pipelined operation, whereby through isolating the bit-mapped image processing tasks from executing within the arbiter means and operating the image processing components to undertake multiple bit-mapped tasks on a pipelined basis the raster image on a pipelined basis the raster image processor provides an increased throughput of processed bit-mapped images.

9. The apparatus in claim 8 further comprising:
- means, responsive to an image command, for storing an incoming bit-mapped image in a pre-defined portion of a memory;
- means, responsive to a text command, for storing incoming textual data in another pre-defined portion of the memory;
- means, responsive to a note command, for overlaying incoming textual data over selected locations in a bit-mapped image previously stored in said memory; and
- means, responsive to a print command, for converting a bit mapped image to said raster image, and for producing said depiction of said raster image a specified number of image in said selected media.

10. The apparatus in claim 9 further comprising:
- means for storing pre-selected font data in a selected portion of said memory; and
- wherein said overlaying means comprises means for converting a textual character in said incoming textual data into bit-mapped character data and copying each bit of said pattern to pre-defined positions of a bit-mapped image stored within a memory frame situated within said memory.

11. The apparatus in claim 10 wherein said character converting means comprises means for producing non-rotated or rotated characters by respectively copying each bit in said bit pattern in forward or reverse order from said font to said memory frame.

12. The apparatus in claim 11 wherein said character converting means comprises means for selectively copying individual bits that form said bit patterns in response to a command embedded within said incoming textual data.

13. The apparatus in claim 12 wherein said character converting means further comprises means for selecting a bit pattern in said font data corresponding to said textual character and for accessing selected bits in said pattern in a desired fashion, in response to said embedded command, in order to produce said bit-mapped character in a certain size, shape or location within said bit-mapped image.

14. The apparatus in claim 10 wherein said image processing components further comprise:
- at least one additional decompressing means and at least one additional scaling means both connected to said bus, wherein data can be transferred over said bus into said additional decompressing means or said additional scaling means and a image decompression or scaling operation can be respectively undertaken therein, whereby a plurality of images can be decompressed or scaled on a simultaneous basis within said raster image processor thereby increasing the throughput of the raster image processor.

15. Apparatus for a raster image processor for use in processing a bit-mapped image, said apparatus comprising:
- an internal bus;
- a plurality of application specific image processing components for undertaking a corresponding plurality of specific bit-mapped image processing tasks, wherein each of the components is connected to the internal bus and is capable of undertaking a respective associated one of the bit-mapped image processing tasks in parallel with respective ones of said bit-mapped image processing tasks undertaken by and associated with other ones of said components, wherein said image processing components comprise:

means, connected to said internal bus, for routing as an incoming image processing command, an incoming image, text, note or print command, to said internal bus, wherein said image processing command comprises a header portion, for invoking a corresponding one of said bit-mapped image processing tasks, followed by a data portion which is comprised of data for use in providing the corresponding bit-mapped image processing task;

means, connected to said internal bus, for decompressing a bit-mapped image to yield a decompressed image;

means, connected to said internal bus and operative in response to the decompressed image, for scaling the decompressed image from one pre-defined resolution to another pre-defined resolution;

a second data path connected between an output of said decompressing means and an input of said scaling means such that information can be transferred thereover between said decompressing means and said scaling means and without appearing on said internal bus;

a memory, connected to said internal bus, for temporarily storing a bit-mapped image; and means, connected to said internal bus, for converting a bit-mapped image appearing thereon to a raster image and for producing, in response to said raster image, a depiction of said raster image in a selected media; and arbiter means, connected to said bus and operating at a lower processing speed than that of any of said image processing components, for arbitrating transfers that are to occur over said bus and between individual ones of said components, wherein said arbiter means receives a request from a first one of said components for service from a second one of said components and, in response thereto, both defines a data path over said internal bus and between said first and second components and initiates an information transfer over said internal bus and between said first and second components, wherein once said transfer is complete said second component undertakes the respective one of said bit-mapped image processing tasks associated with the second component independent of both the arbiter means and said first component so as to isolate the respective bit-mapped image processing task undertaken by said second component from the arbiter means and, while said second component is undertaking the respective bit-mapped image processing task associated with the second component, to permit both said arbiter means to arbitrate a subsequent one of said transfers and the first component to subsequently undertake the respective one of said image processing tasks associated with the first component for a remaining one of said components other than said second component so as to provide pipelined operation, whereby through isolating the bit-mapped image processing tasks from executing within the arbiter means and operating the image processing components to undertake multiple bit-mapped tasks on a pipelined basis the raster image processor provides an increased throughput of processed bit-mapped images, and said apparatus further comprising:

means, responsive to the image command, for storing an incoming bit-mapped image in the memory;

means, responsive to the text command, for storing incoming textual data in the memory;

means, responsive to the note command, for overlaying incoming textual data over selected locations in the bit-mapped image previously stored in the memory;

means, responsive to the print command, for converting the bit-mapped image to said raster image, and for producing said depiction of said raster image a specified number of times in said selected media; and means for storing pre-selected font data in the memory; and wherein said overlaying means comprises means for converting a textual character in said incoming textual data into bit-mapped character data and copying each bit of said pattern to a pre-defined position of a bit-mapped image stored within a memory frame situated within the memory.

16. Apparatus for a raster image processor for use in processing a bit-mapped image, said apparatus comprising:

an internal bus;

a plurality of application specific image processing components for undertaking a corresponding plurality of specific bit-mapped image processing tasks, wherein each of the components is connected to the internal bus and is capable of undertaking a respective associated one of the bit-mapped image processing tasks in parallel with respective ones of said bit-mapped image processing tasks undertaken by and associated with other ones of said components, wherein said image processing components comprise:

means, connected to said internal bus, for routing as an incoming image processing command, an incoming image, text, note or print command, to said bus, wherein said image processing command further comprises a header portion, for invoking a corresponding one of said bit-mapped image processing tasks, followed by a data portion which is comprised of data for use in providing the corresponding bit-mapped image processing task;

means, connected to said internal bus, for decompressing a bit-mapped image to yield a decompressed image;

means, connected to said internal bus and operative in response to the decompressed image, for scaling the decompressed image from one pre-defined resolution to another pre-defined resolution, wherein said scaling means comprises:

means, responsive to a value of a stream of incoming pels for producing a window formed of the values of a present incoming pel and a plurality of previous incoming pels and for applying the values as a portion of an address;

a look up table for storing pre-defined values of an output pel for a plurality of different combinations of the values of the pels that form said window and for each one of a plurality of pre-defined scaling factors and for producing, in response to said address, a particular pre-defined output pel value as a value of a scaled output pel; and means for storing a plurality of said scaled pel output values and for applying said plurality of scaled pel output values to said internal bus;

a memory, connected to said internal bus, for temporarily storing a bit-mapped image; and means, connected to said internal bus, for converting a bit-mapped image appearing thereon to a raster image and for producing, in response to said raster image, a depiction of said raster image in a selected media; and arbiter means, connected to said bus and operating at a lower processing speed than that of any of said image processing components, for arbitrating transfers that are to occur over said bus and between individual ones of said components, wherein said arbiter means receives a request from a first one of said components for service from a second one of said components and, in response thereto, both defines a data path over said internal bus and between said first and second components and initiates an information transfer over said internal bus and between said first and second components, wherein once said transfer is complete said second component undertakes the respective one of said bit-mapped image processing tasks associated with the second component independent of both the arbiter means and said first component so as to isolate the respective bit-mapped image processing task undertaken by said second component from the arbiter means and, while said second component is undertaking the respective bit-mapped image processing task associated with the second component, to permit both said arbiter means to arbitrate a subsequent one of said transfers and the first component to subsequently undertake the respective one of said image processing tasks associated with the first component for a remaining one of said components other than said second component so as to provide pipelined operation, whereby through isolating the bit-mapped image processing tasks from executing within the arbiter means and operating the image processing components to undertake multiple bit-mapped tasks on a pipelined basis the raster image processor provides an increased throughput of processed bit-mapped images, and said apparatus further comprising:

means, responsive to an image command, for storing an incoming bit-mapped image in the memory;

means, responsive to a text command, for storing incoming textual data in the memory;

means, responsive to a note command, for overlaying incoming textual data over selected locations in the bit-mapped image previously stored in the memory;

means, responsive to a print command, for converting the bit-mapped image to said raster image, and for producing said depiction of said raster image a specified number of times in said selected media; and means for storing pre-selected font data in the memory; and wherein said overlaying means comprises means for converting a textual character in said incoming textual data into bit-mapped character data and copying each bit of said pattern to a pre-defined position of a bit-mapped image stored within a memory frame situated within the memory.

17. The apparatus in claim 16 wherein the value of each of the pre-defined output pel values stored in said data memory is determined using two-dimensional bi-linear interpolation of the values of said pels that form said window.

18. The apparatus in claim 17 wherein said window producing means comprises:

means, responsive to said stream of incoming pels, for providing, in parallel, values of the present and immediately preceding pels situated on a present scan line; and means, responsive to said stream of incoming pels, for providing, simultaneously with the values of said present and previous pels, values of two additional pels located in a scan line that immediately precedes the present scan line wherein one of said additional pels is situated immediately under the present pel and the other one of said additional pels is situated under the previous pel.

19. The apparatus in claim 18 wherein said image processing components further comprises:

at least one additional decompressing means and at least one additional scaling means both connected to said bus, wherein data can be transferred over said bus into said additional decompressing means or said additional scaling means and a image decompression or scaling operation can be respectively undertaken therein, whereby a plurality of images can be decompressed or scaled on a substantially simultaneous basis within said raster image processor thereby increasing the throughput of the raster image processor.

20. The apparatus in claim 19 further comprising:

a second bus for interconnecting a plurality of said image processing components such that information transfers can simultaneously occur among said components over both said busses thereby further increasing the throughput of said raster image processor.

21. Apparatus for a raster image processor for use in processing a bit-mapped image, said apparatus comprising:

an internal bus;

source and destination image processing components for undertaking a corresponding plurality of specific bit-mapped image processing tasks, wherein each of said components is capable of undertaking a respective associated one of the bit-mapped image processing tasks in parallel with respective ones of said bit-mapped image processing tasks undertaken by and associated with other ones of said components, said source and destination components comprising:

means, connected to said internal bus, for routing an incoming image processing command to said internal bus, wherein said image processing command comprises a header portion, for invoking a corresponding one of said bit-mapped image processing tasks, followed by a data portion which is comprised of data for use in providing the corresponding bit-mapped image processing task;

means, connected to said internal bus, for decompressing a bit-mapped image to yield a decompressed image;

means, connected to said internal bus and operative in response to the decompressed image, for scaling the decompressed image from one pre-defined resolution to another pre-defined resolution;

means, connected to said internal bus, for temporarily storing a bit-mapped image; and means, connected to said internal bus, for converting a bit-mapped image appearing thereon to a raster image and for producing, in response to said raster image, a depiction of said raster image in a selected media; and wherein said raster image processor further comprises arbiter means, connected to said bus and operating at a lower processing speed than that of any of said image processing components, for arbitrating transfers that are to occur over said bus and between individual ones of said components, wherein said arbiter means receives a request from a first one of said components for service from a second one of said components and, in response thereto and to the availability of said internal bus and said second component, both defines a data path over said internal bus and between said first and second components and initiates an information transfer over said internal bus and between said first and second components, wherein once said transfer is complete said second component undertakes the respective one of said bit-mapped image processing tasks associated with the second component independent of both the arbiter means and said first component so as to isolate the respective bit-mapped image processing task undertaken by said second component from the arbiter means and, while said second component is undertaking the respective bit-mapped image processing task associated with the second component, to permit both said arbiter means to arbitrate a subsequent one of said transfers and the first component to subsequently undertake the respective one of said image processing tasks associated with the first component for a remaining one of said components other than said second component so as to provide pipelined operation, whereby through isolating the bit-mapped image processing tasks from executing within the arbiter means and operating the image processing components to undertake multiple bit-mapped tasks on a pipelined basis the raster image processor provides an increased throughput of processed bit-mapped images.

22. The apparatus in claim 21 further comprising:

means, responsive to an image command, for storing an incoming bit-mapped image in a pre-defined portion of a memory;

means, responsive to a text command, for storing incoming textual data in another pre-defined portion of the memory;

means, responsive to a note command, for overlaying incoming textual data over selected locations in a bit-mapped image previously stored in said memory; and means, responsive to a print command, for converting a bit mapped image to said raster image, and for producing said depiction of said raster image a specified number of times in said selected media.

23. The apparatus in claim 22 further comprising:

means for storing pre-selected font data in a selected portion of said memory; and wherein said overlaying means comprises means for converting a textual character in said incoming textual data into bit-mapped character data and copying each bit of said pattern to pre-defined positions of a bit-mapped image stored within a memory frame situated within said memory.

24. The apparatus in claim 23 wherein said character converting means comprises means for producing non-rotated or rotated characters by respectively copying each bit in said bit pattern in forward or reverse order from said font to said memory frame.

25. The apparatus in claim 24 wherein said character converting means comprises means for selectively copying individual bits that form said bit patterns in response to a command embedded within said incoming textual data.

26. The apparatus in claim 25 wherein said character converting means further comprises means for selecting a bit pattern in said font data corresponding to said textual character and for accessing selected bits in said pattern in a desired fashion, in response to said embedded command, in order to produce said bit-mapped character in a certain size, shape or location within said bit-mapped image.

27. The apparatus in claim 22 wherein said image processing components further comprise:

at least one additional decompressing means and at least one additional scaling means both connected to said bus, wherein data can be transferred over said bus into said additional decompressing means or said additional scaling means and a image decompression or scaling operation can be respectively undertaken therein, whereby a plurality of images can be decompressed or scaled on a substantially simultaneous basis within said raster image processor thereby increasing the throughput of the raster image processor.

28. The apparatus in claim 27 further comprising:

a second bus for interconnecting a plurality of said image processing components such that information transfers can simultaneously occur between different pairs of said components over both of said busses thereby further increasing the throughput of said raster image processor.

29. The apparatus in claim 22 wherein said decompressing means further comprises a data path connected between an output of said decompressing means and an input of said scaling means such that information can be transferred therebetween without appearing on said bus.

30. The apparatus in claim 22 wherein said scaling means further comprises:

means, responsive to a value of a stream of incoming pels for producing a window formed of the values of a present incoming pel and a plurality of previous incoming pels and for applying the values as a portion of an address;

a data memory for storing pre-defined values of an output pel for a plurality of different combinations of the values of the pels that form said window and for each one of plurality of pre-defined scaling factors, and for producing, in response to said address, a particular pre-defined output pel value as a value of a scaled output pel; and means for storing a plurality of said scaled pel output values and for applying said plurality of scaled pel values to said bus.

31. The apparatus in claim 30 wherein the value of each of the pre-defined output pel values stored in said data memory is determined using two-dimensional bilinear interpolation of the values of said pels that form said window.

32. The apparatus in claim 31 wherein said window producing means comprises:

means, responsive to said stream of incoming pels, for providing, in parallel, values of the present and immediately preceding pels situated on a present scan line; and means, responsive to said stream of incoming pels, for providing, simultaneously with the values of said present and previous pels, values of two additional pels located in a scan line that immediately precedes the present scan line wherein one of said additional pels is situated immediately under the present pel and the other one of said additional pels is situated under the previous pel.

33. The apparatus in claim 32 wherein said image processing components further comprise:

at least one additional decompressing means and at least one additional scaling means both connected to said bus, wherein data can be transferred over said bus into said additional decompressing means or said additional scaling means and a image decompression or scaling operation can be respectively undertaken therein, whereby a plurality of images can be decompressed or scaled on a simultaneous basis within said raster image processor thereby increasing the throughput of the raster image processor.

34. The apparatus in claim 33 further comprising:

a second bus for interconnecting a plurality of said image processing components such that information transfers can simultaneously occur among said components over both of said busses thereby further increasing the throughput of said raster image processor.

35. In a raster image processor for use in processing a bit-mapped image and having an internal bus, a plurality of application specific image processing components for undertaking a corresponding plurality of specific bit-mapped image processing tasks wherein each of the components is connected to the internal bus and is capable of undertaking a respective associated one of the bit-mapped image processing tasks in parallel with respective ones of said bit-mapped image processing tasks undertaken by and associated with other ones of said components, and arbiter means connected to said internal bus and operating at a lower processing speed than that of any of said image processing components for arbitrating transfers that are to occur over said bus and between individual ones of said components, a method for increasing throughput of said raster image processor comprising the steps of:

in said arbiter means:

receiving a request, from a first one of said image processing components, for service from a second one of said image processing components;

defining, in response to said receiving step, a data path over said internal bus and between said first and second components; and initiating, in response to said defining step, an information transfer over said internal bus between said first and second components; and in said second component, once said transfer is complete, undertaking the respective one of said bit-mapped image processing tasks associated with the second component independent of both the arbiter means and said first component so as to isolate the respective bit-mapped image processing task undertaken by said second component from the arbiter means and, while said second component is undertaking the respective bit-mapped image processing task associated with the second component, to permit both said arbiter means to arbitrate subsequent one of said transfers and the first component to subsequently undertake the respective one of said image processing tasks associated with the first component for a remaining one of said components other than said second component so as to provide pipelined operation, whereby through isolating the bit-mapped image processing tasks from executing within the arbiter means and operating the image processing components to undertake multiple bit-mapped tasks on a pipelined basis the raster image processor provides an increased throughput of processed bit-mapped images; wherein said method further comprises the steps of:

routing incoming image processing commands to said internal bus;

decompressing an incoming bit-mapped image to yield a decompressed image;

scaling the decompressed image from one pre-defined resolution to another pre-defined resolution to yield a scaled bit-mapped image and storing the scaled bit-mapped image as a bit-mapped image in a memory;

storing, in response to an image command, an incoming bit-mapped image in the memory;

storing, in response to a text command, incoming textual data in the memory;

overlaying, in response to a note command, incoming textual data over selected locations in a bit-mapped image previously stored in said memory;

converting, in response to a print command, a bit-mapped image appearing on said internal bus to a raster image;

producing, in response to the raster image, a depiction of said raster image in a selected media; and producing said depiction of the raster image a specified number of times.

36. The method in claim 35 further comprising the steps of:

storing pre-selected font data in a selected portion of said memory;

converting a textual character in said incoming textual data into bit-mapped character data; and copying selected bits of said pattern to pre-defined positions of a bit-mapped image stored within a memory frame situated within said memory.

37. The method in claim 36 further comprising the step of producing non-rotated or rotated characters by respectively copying each bit in said bit pattern in forward or reverse order from said font to said memory frame.

38. The method in claim 37 wherein said character producing step comprises the step of selectively copying individual bits that form said bit patterns into appropriate locations in said memory frame in response to a command embedded within said incoming textual data.

39. The method in claim 38 wherein the scaling step further comprises the steps of:
   producing, in response to a value of a stream of incoming pels, a window formed of the values of a present incoming pel and a plurality of previous incoming pels;
   applying the values of the pels that form said window as a portion of an address to a data memory which stores pre-defined values of an output pel for a plurality of different combinations of the values of the pels that form said window and for each one of a plurality of pre-defined scaling factors;
   producing, in response to said address, a particular pre-defined output pel value as a value of a scaled output pel; and
   storing a plurality of said scaled pel output values and for applying said plurality of scaled pel values to said bus.

40. The method in claim 39 wherein said window producing step further comprises the steps of:
   providing, in parallel and in response to said stream of incoming pels, values of the present and immediately preceding pels situated on a present scan line; and
   providing, in response to said stream of incoming pels simultaneously with the values of said present and previous pels, values of two additional pels located in a scan line that immediately precedes the present scan line wherein one of said additional pels is situated immediately under the present pel and the other one of said additional pels is situated under the previous pel.

* * * * *

UNITED STATES PATENT AND TRADEMARK OFFICE
CERTIFICATE OF CORRECTION

PATENT NO. : 5,113,494

DATED : May 12, 1992

INVENTOR(S) : Juan G. Menendez, et al.

It is certified that error appears in the above-indentified patent and that said Letters Patent is hereby corrected as shown below:

Claim 8, column 92, lines 4 and 5, delete "on a pipelined basis the raster image".

Column 92, line 21, after "number of", delete "image" and insert --times--.

Claim 40, column 102, line 14, before "simultaneously", insert --and--.

Signed and Sealed this

Twenty-sixth Day of July, 1994

Attest:

BRUCE LEHMAN

*Attesting Officer*  *Commissioner of Patents and Trademarks*